(12) United States Patent
Doyle et al.

(10) Patent No.: US 11,995,767 B2
(45) Date of Patent: May 28, 2024

(54) APPARATUS AND METHOD FOR COMPRESSING RAY TRACING ACCELERATION STRUCTURE BUILD DATA

(71) Applicant: Intel Corporation, Santa Clara, CA (US)

(72) Inventors: Michael Doyle, San Jose, CA (US); Sreenivas Kothandaraman, Sammamish, WA (US)

(73) Assignee: Intel Corporation, Santa Clara, CA (US)

(*) Notice: Subject to any disclaimer, the term of this patent is extended or adjusted under 35 U.S.C. 154(b) by 569 days.

(21) Appl. No.: 17/083,123

(22) Filed: Oct. 28, 2020

(65) Prior Publication Data
US 2022/0051466 A1 Feb. 17, 2022

Related U.S. Application Data

(60) Provisional application No. 63/066,799, filed on Aug. 17, 2020.

(51) Int. Cl.
| | |
|---|---|
| *G06T 17/10* | (2006.01) |
| *G06T 1/20* | (2006.01) |
| *G06T 3/4007* | (2024.01) |
| *G06T 9/00* | (2006.01) |
| *G06T 15/00* | (2011.01) |
| *G06T 15/06* | (2011.01) |

(Continued)

(52) U.S. Cl.
CPC ........... *G06T 17/10* (2013.01); *G06T 1/20* (2013.01); *G06T 3/4007* (2013.01); *G06T 9/00* (2013.01); *G06T 15/06* (2013.01); *G06T 15/08* (2013.01); *G06T 17/20* (2013.01); *G06T 15/005* (2013.01); *G06T 2210/12* (2013.01)

(58) Field of Classification Search
None
See application file for complete search history.

(56) References Cited

U.S. PATENT DOCUMENTS

| | | |
|---|---|---|
| 5,263,136 A | 11/1993 | Deaguiar et al. |
| 6,047,088 A | 4/2000 | van Beek et al. |

(Continued)

OTHER PUBLICATIONS

Doyle et al., "Apparatus and Method for Reduced Precision Bounding Volume Hierarchy Construction", U.S. Appl. No. 16/746,636, filed Jan. 17, 2020, 166 pages.

(Continued)

*Primary Examiner* — Nurun Flora
(74) *Attorney, Agent, or Firm* — NICHOLSON DE VOS WEBSTER & ELLIOTT LLP

(57) ABSTRACT

Apparatus and method for compression of acceleration structure build data in a ray tracing implementation. For example, one embodiment of an apparatus comprises: traversal hardware logic to traverse rays through a graphics scene comprising a plurality of primitives; and an acceleration data structure processing unit comprising: a bounding box compressor to compress a set of bounding boxes to generate a plurality of bounding box compression blocks, and an index compressor to compress a set of indices to generate a plurality of index compression blocks, and an acceleration data structure builder for constructing acceleration structures based on bounding box compression blocks and index compression blocks.

33 Claims, 83 Drawing Sheets

(51) Int. Cl.
G06T 15/08 (2011.01)
G06T 17/20 (2006.01)

(56) References Cited

U.S. PATENT DOCUMENTS

| | | | |
|---|---|---|---|
| 6,219,058 | B1 | 4/2001 | Trika |
| 6,344,852 | B1 | 2/2002 | Zhu et al. |
| 6,445,390 | B1 | 9/2002 | Aftosmis et al. |
| 7,102,646 | B1 | 9/2006 | Rubinstein et al. |
| 7,570,271 | B1 | 8/2009 | Brandt |
| 9,223,789 | B1 | 12/2015 | Seigle et al. |
| 10,839,475 | B2 | 11/2020 | Benthin et al. |
| 11,321,910 | B2 | 5/2022 | Doyle et al. |
| 2004/0155885 | A1 | 8/2004 | Munshi et al. |
| 2005/0179686 | A1 | 8/2005 | Christensen et al. |
| 2008/0122841 | A1 | 5/2008 | Brown et al. |
| 2009/0128562 | A1 | 5/2009 | McCombe et al. |
| 2009/0189898 | A1 | 7/2009 | Dammertz et al. |
| 2009/0284523 | A1 | 11/2009 | Peterson et al. |
| 2010/0079451 | A1 | 4/2010 | Zhou et al. |
| 2010/0289799 | A1 | 11/2010 | Hanika et al. |
| 2011/0216068 | A1 | 9/2011 | Sathe |
| 2012/0293515 | A1 | 11/2012 | Clarberg et al. |
| 2013/0179787 | A1 | 7/2013 | Brockmann et al. |
| 2014/0015835 | A1 | 1/2014 | Akenine-Moller et al. |
| 2014/0168221 | A1 | 6/2014 | Fishwick |
| 2014/0176589 | A1 | 6/2014 | Duluk, Jr. et al. |
| 2014/0292782 | A1 | 10/2014 | Fishwick et al. |
| 2015/0332429 | A1 | 11/2015 | Fernandez et al. |
| 2016/0027144 | A1 | 1/2016 | Fernandez et al. |
| 2017/0178387 | A1 | 6/2017 | Woop et al. |
| 2017/0287203 | A1* | 10/2017 | Vaidyanathan ......... G06T 15/06 |
| 2020/0051314 | A1 | 2/2020 | Laine et al. |
| 2020/0211264 | A1 | 7/2020 | Janus et al. |

OTHER PUBLICATIONS

Ernst et al., "Early Split Clipping for Bounding Volume Hierarchies," in Proceedings Eurographics/IEEE Symposium on Interactive Ray Tracing 2007, 2007, 6 pages.

Karras et al., "Fast parallel construction of high-quality bounding volume hierarchies," in HPG '13: Proceedings of the 5th High-Performance Graphics Conference, 2013, 11 pages.

Keely, Sean, "Reduced Precision Hardware for Ray Tracing", in GPUs, in Eurographics/ACM SIGGRAPH Symposium on High Performance Graphics, 2014, 55 pages.

Lauterbach et al., "Fast BVH Construction on GPUs," Computer Graphics Forum, Eurographics, vol. 28, No. 2, 2009, pp. 375-384.

Segovia et al., "Memory efficient ray tracing with hierarchical mesh quantization," in Graphics Interface '10: Proceedings of Graphics Interface 2010, 2010, pp. 153-160.

Stich et al., "Spatial splits in bounding volume hierarchies," in HPG '09: Proceedings of the Conference on High Performance Graphics 2009, 2009, 23 pages.

Vaidyanathan et al., "Watertight ray traversal with reduced precision," in HPG '16: Proceedings of High Performance Graphics, 2016, 8 pages.

Wald, Ingo, "Fast Construction of SAH BVHs on the Intel Many Integrated Core (MIC) Architecture," IEEE Transactions on Visualization and Computer Graphics, pp. 47-57, 2012, 9 pages.

Search Report and Written Opinion, NL App. No. 2028744, dated Apr. 13, 2022, 9 pages of Original Document Only.

International Search Report and Written Opinion, PCT App. No. PCT/US21/42374, dated Oct. 22, 2021, 9 pages.

International Search Report and Written Opinion, PCT App. No. PCT/US21/42381, dated Oct. 29, 2021, 8 pages.

Rivera, Kris Krishna, "Ray Collection Bounding Volume Hierarchy," Electronic Theses and Dissertations, 2004-2019, University of Central Florida, STARS, 2011, 93 pages.

International Preliminary Report on Patentability, PCT App. No. PCT/US2021/042374, dated Mar. 2, 2023, 8 pages.

International Preliminary Report on Patentability, PCT App. No. PCT/US21/42381, dated Mar. 2, 2023, 8 pages.

Search Report and Written Opinion, NL App. No. 2028745, dated Mar. 3, 2022, 9 pages of Original Document Only.

Laine, "Restart Trail for Stackless BVH Traversal", NVIDIA Research, High Performance Graphics, 2010, 5 pages.

Lloyd et al., "Implementing Stochastic Levels of Detail with Microsoft DirectX Raytracing", NVIDIA Corporation, Technical Blog, Jun. 15, 2020, 6 pages.

Non-Final Office Action, U.S. Appl. No. 17/133,547, dated Oct. 6, 2023, 15 pages.

Non-Final Office Action, U.S. Appl. No. 17/133,573, dated Oct. 23, 2023, 8 pages.

Notice of Grant, NL App. No. 2028744, dated Aug. 11, 2022, 6 pages of Original Document Only.

Notice of Grant, NL App. No. 2028745, dated Jul. 4, 2022, 6 pages of Original Document Only.

\* cited by examiner

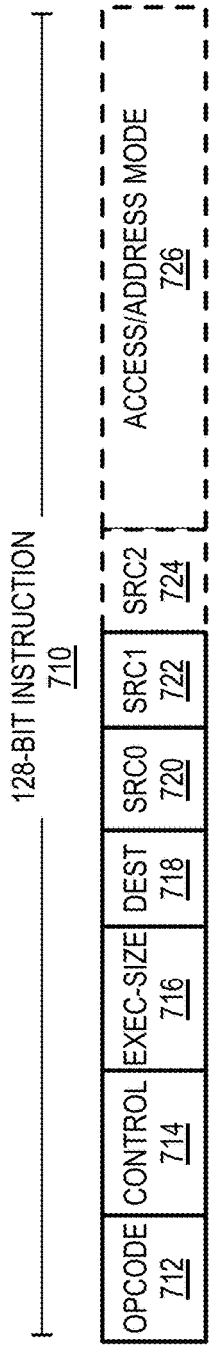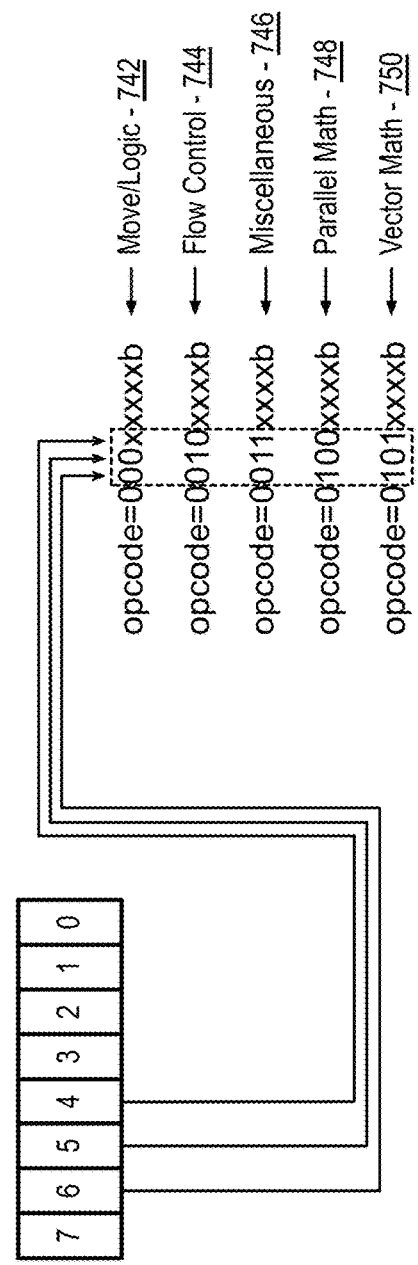
FIG. 7

FIG. 9A  GRAPHICS PROCESSOR COMMAND FORMAT
900
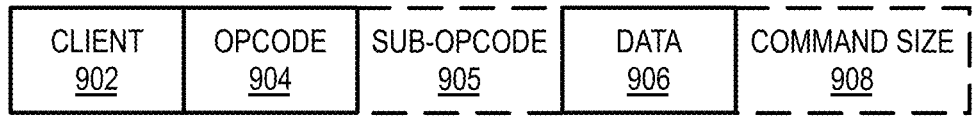
FIG. 9B  GRAPHICS PROCESSOR COMMAND SEQUENCE
910
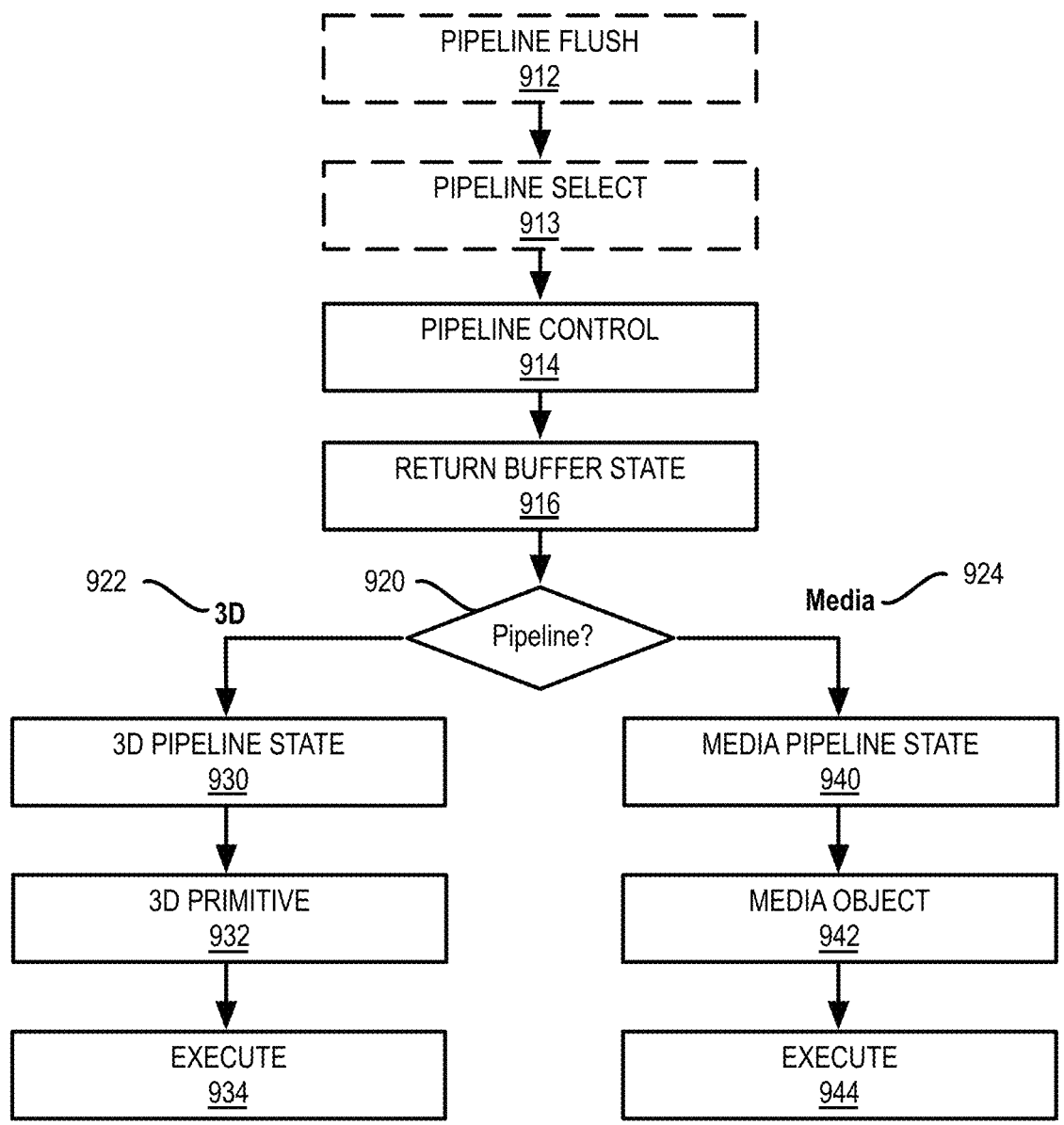

| Ray Flag | Instance Flag | Geometry Flag | Final Flag | |
|---|---|---|---|---|
| FLAG_NONE | FLAG_NONE | FLAG_OPAQUE | Opaque | |
| | | FLAG_NON-OPAQUE | Non-opaque | |
| | FORCE_OPAQUE | X | Opaque | |
| | FORCE_NON-OPAQUE | X | Non-opaque | |
| FORCE_OPAQUE | X | X | Opaque | These are Mutually Exclusive |
| FORCE_NON-OPAQUE | X | X | Non-opaque | These are Mutually Exclusive |

FIG. 54

| Ray Flag | Instance Flag | Geometry Flag | Cull |
|---|---|---|---|
| CULL_OPAQUE | FORCE_OPAQUE | X | True |
| | X | FLAG_OPAQUE | True |
| CULL_NOPAQUE | FORCE_NON-OPAQUE | X | True |
| | X | FLAG_NON-OPAQUE | True |

FIG. 55A

| Node Type | Ray Flag | Instance Flag | Geometry Flag | Cull |
|---|---|---|---|---|
| | CULL_OPAQUE | FORCE_OPAQUE | x | |
| | | x | FLAG_OPAQUE | |
| | CULL_NON-OPAQUE | FORCE_NON-OPAQUE | x | |
| | | x | FLAG_NON-OPAQUE | |

FIG. 55B

| Name | Sub-Struct | Vertical-Struct | Reads | Writes |
|---|---|---|---|---|
| RAY 6101 | RAY CTRL (rt_ray_ctrl_t) | Root Node Ptr | RTC Read<br>Ray Eviction | RTM Fill<br>RTC Inst Return |
| | | Flag, Mask | RTC Return<br>Ray Eviction | RTM Fill<br>RTC Inst Read Req |
| | | Inst Leaf Ptr | Hit Assembly<br>Ray Eviction | RTM Fill<br>RTC Inst Return |
| | | Hit Group SRBasePTR, SRStride & ShaderIndxMult | Hit Assembly<br>Ray Eviction<br>RTC Inst Return | RTM Fill |
| | | Miss SR PTR | BTD Dispatch<br>Ray Eviction | RTM Fill |
| | RAY DATA (rt_ray_data_t) | Ray data | Box/Quad<br>Ray Eviction | RTQ Ray Transform |
| | INV DIR | Ray Inv Dir | Box/Quad | |

FIG. 61A

| Name | Sub-Struct | Vertical-Struct | Reads | Writes |
|---|---|---|---|---|
| HIT 6102 | HitInfo (rt_hitinfo_t) | Hit T | Quad & Eviction | RTM Fill Committed Hit |
| | | Hit | Eviction | |
| STACK 6103 | Stack | | | |
| | | Stack | Stack proc start Eviction | RTM fill Stack proc end |
| | | Stack current | RTC read req Stack proc start Eviction | RTM fill Stack proc end |
| | | Node | RTC Response | |
| | | Node ctrl | Committed Hit | |
| | | Node info | Prisel | |
| | | Node data (union) | Box/Quad | |

FIG. 61B

APPARATUS AND METHOD FOR COMPRESSING RAY TRACING ACCELERATION STRUCTURE BUILD DATA

CROSS REFERENCE TO RELATED APPLICATIONS

This application claims the benefit of U.S. Provisional Application No. 63/066,799, filed Aug. 17, 2020, all of which is herein incorporated by reference.

BACKGROUND

Field of the Invention

This invention relates generally to the field of graphics processors. More particularly, the invention relates to an apparatus and method for compressing ray tracing acceleration structure build data.

Description of the Related Art

Ray tracing is a technique in which a light transport is simulated through physically-based rendering. Widely used in cinematic rendering, it was considered too resource-intensive for real-time performance until just a few years ago. One of the key operations in ray tracing is processing a visibility query for ray-scene intersections known as "ray traversal" which computes ray-scene intersections by traversing and intersecting nodes in a bounding volume hierarchy (BVH).

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

FIGS. 54 and 55A-B illustrate different types of ray tracing data including flags, exceptions, and culling data used in one embodiment of the invention;

FIGS. 61A-B illustrate example data structures, substructures, and operations performed for rays, hits, and stacks;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
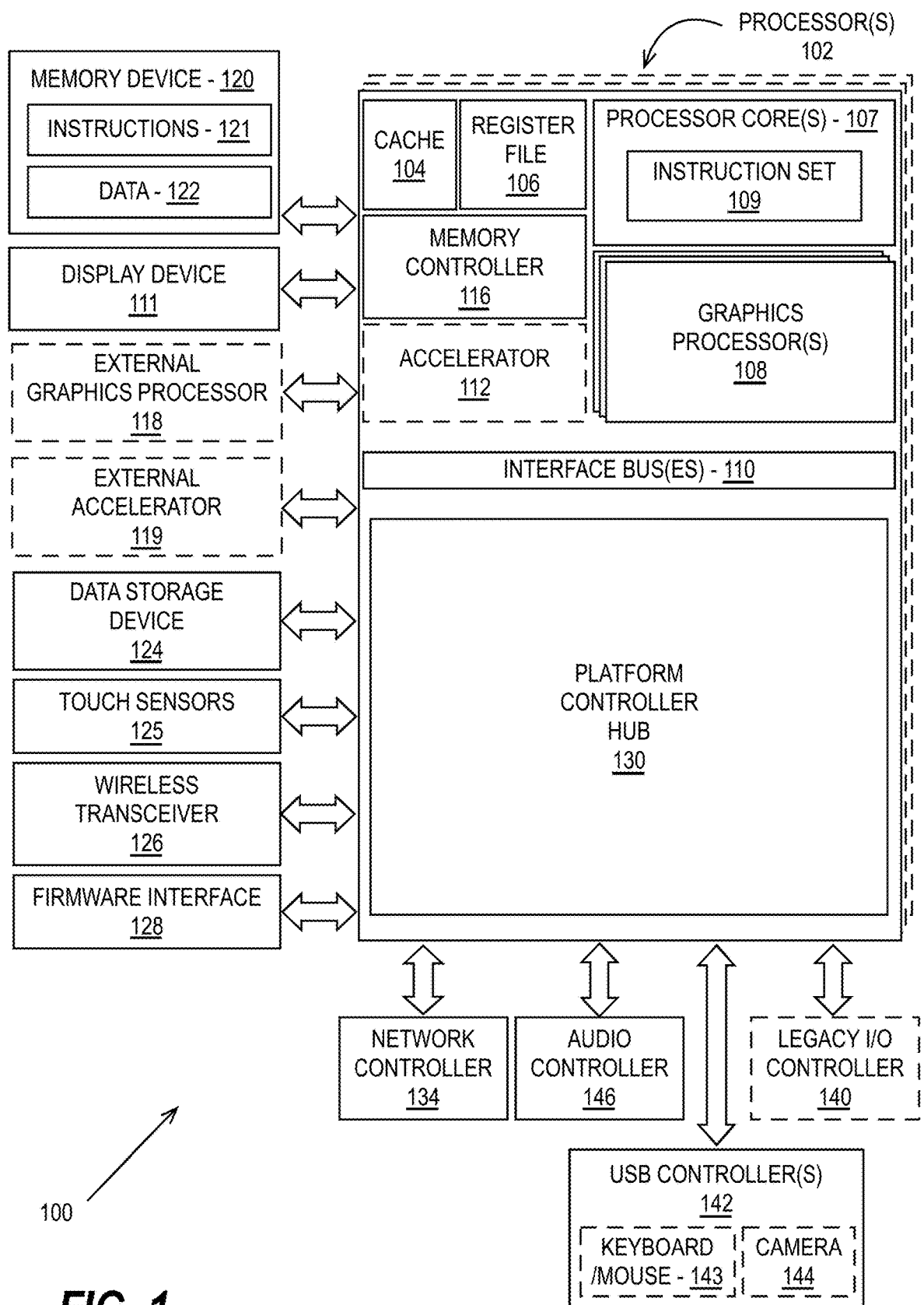
FIG. 1 is a block diagram of an embodiment of a computer system with a processor having one or more processor cores and graphics processors.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
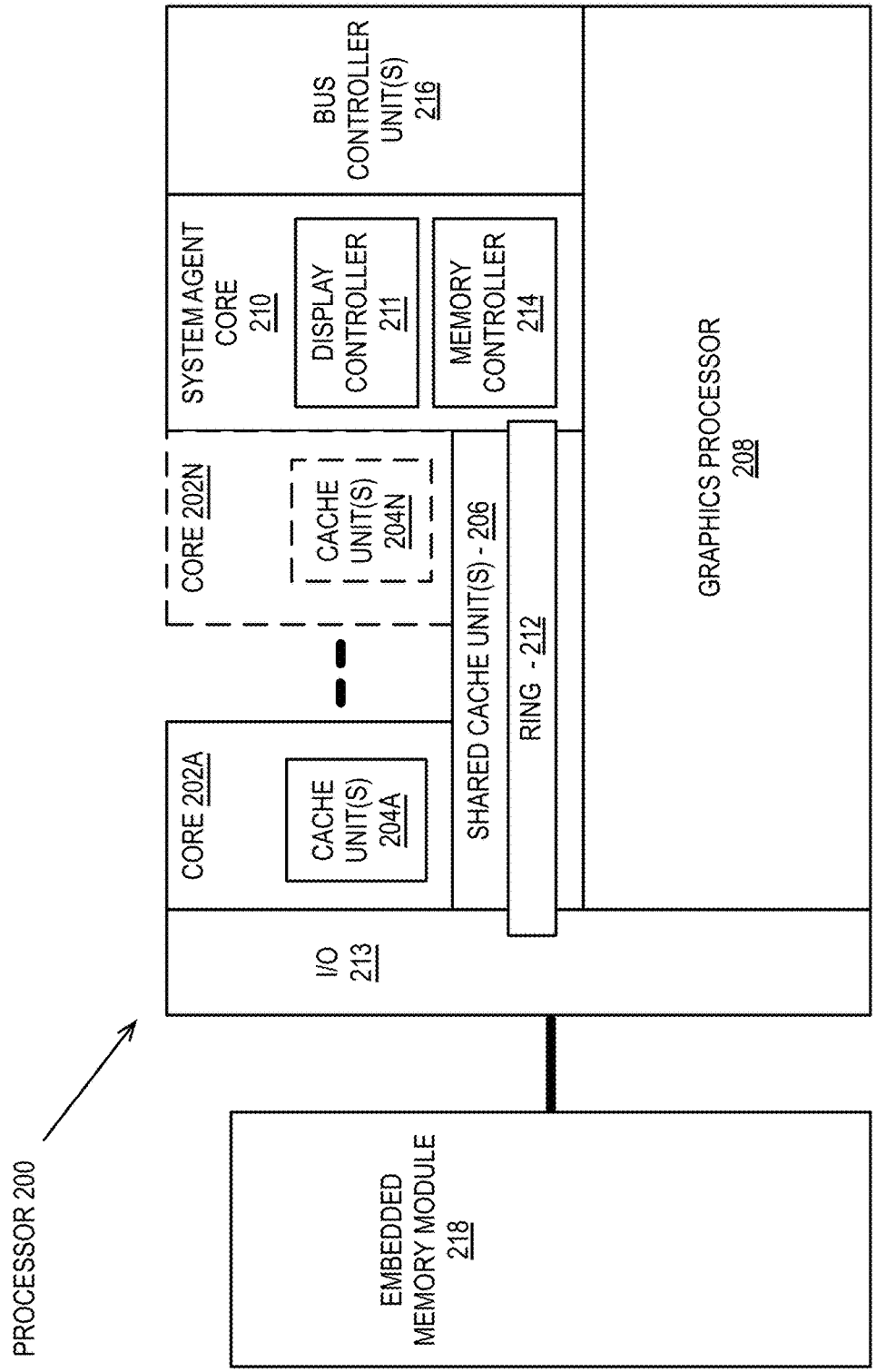
FIGS. 2A-D illustrate computing systems and graphics processors provided by embodiments of the invention.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
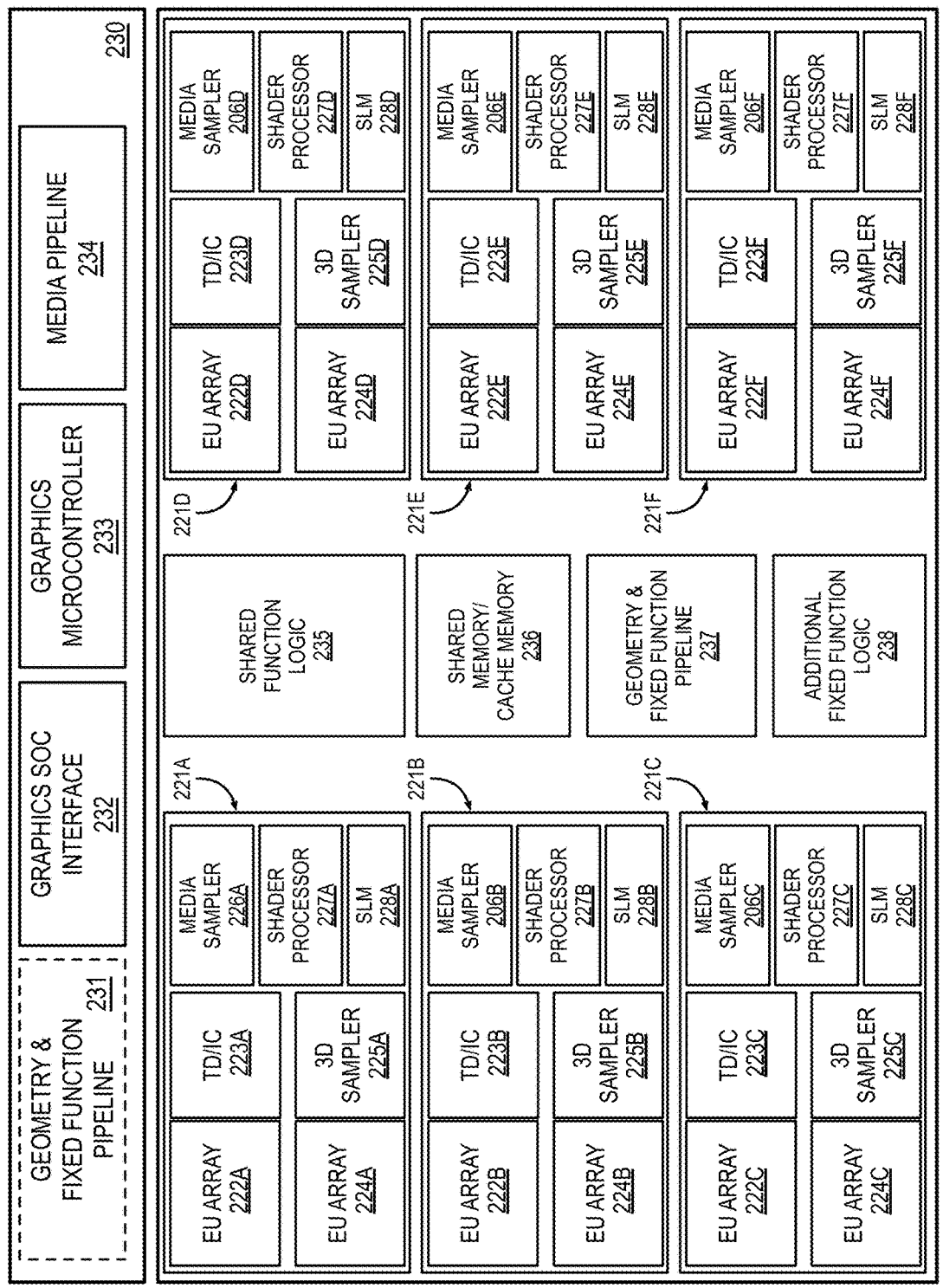

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3 and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and pre-emption. The media pipeline 234 (e.g., media pipeline 316 of FIG. 3 and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphic core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 206A-206F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 206A-206F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
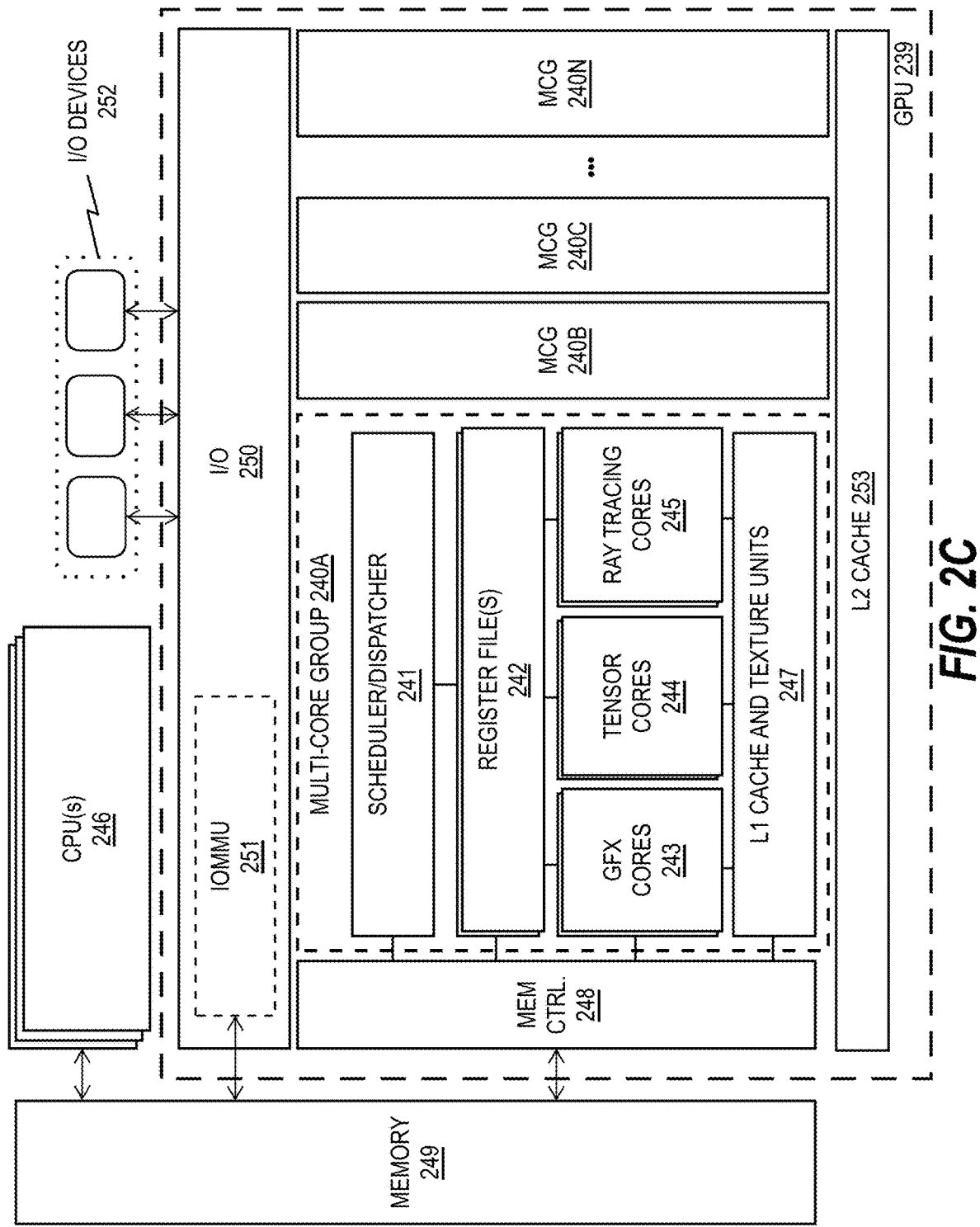

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
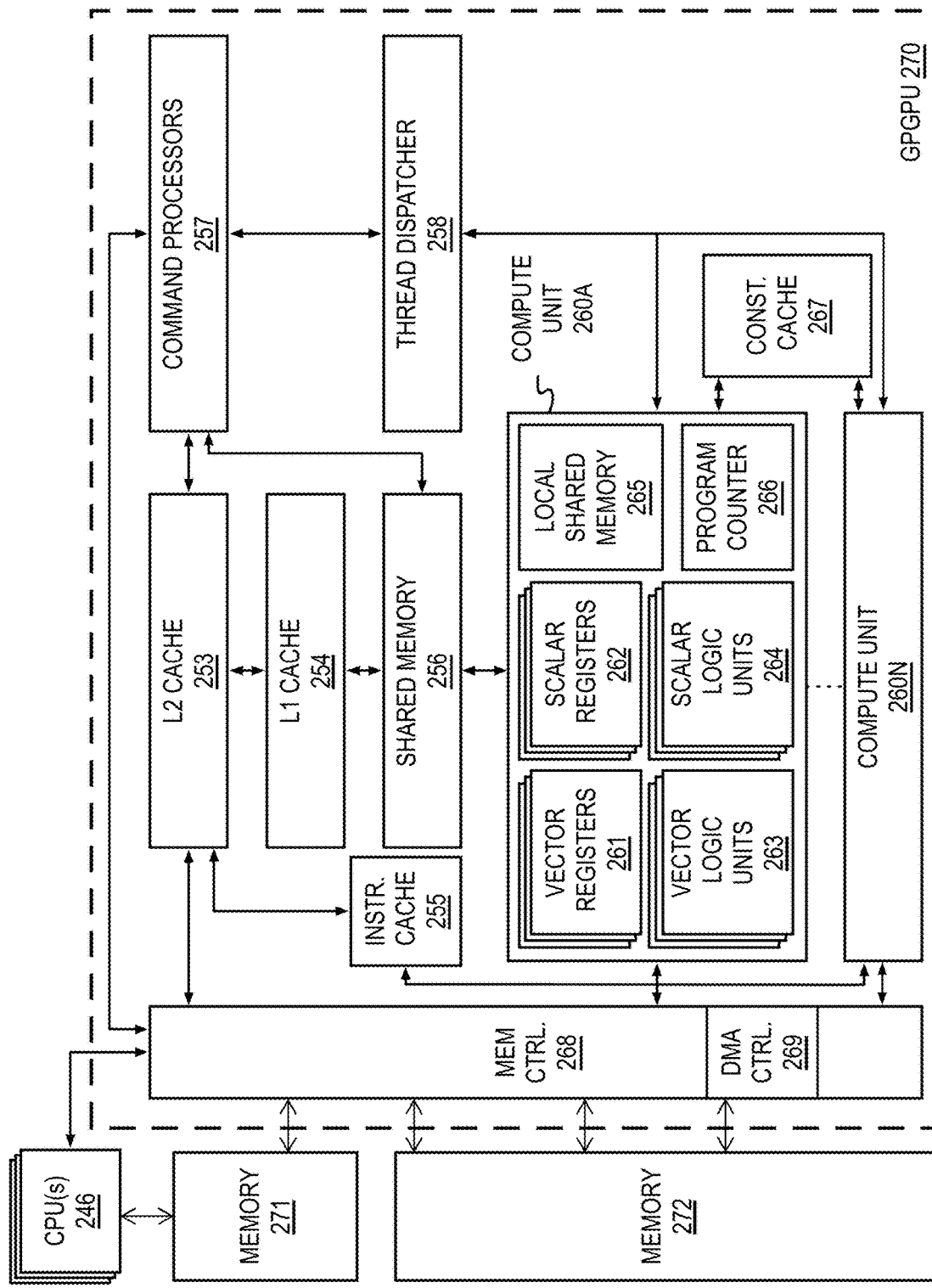

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally each compute unit 260A-260N can be independently configured for conditional computation and can conditionally output the results of computation to memory. The command processors 257 can interrupt the one or more CPU(s) 246 when the submitted commands are complete.

Figure 3A:
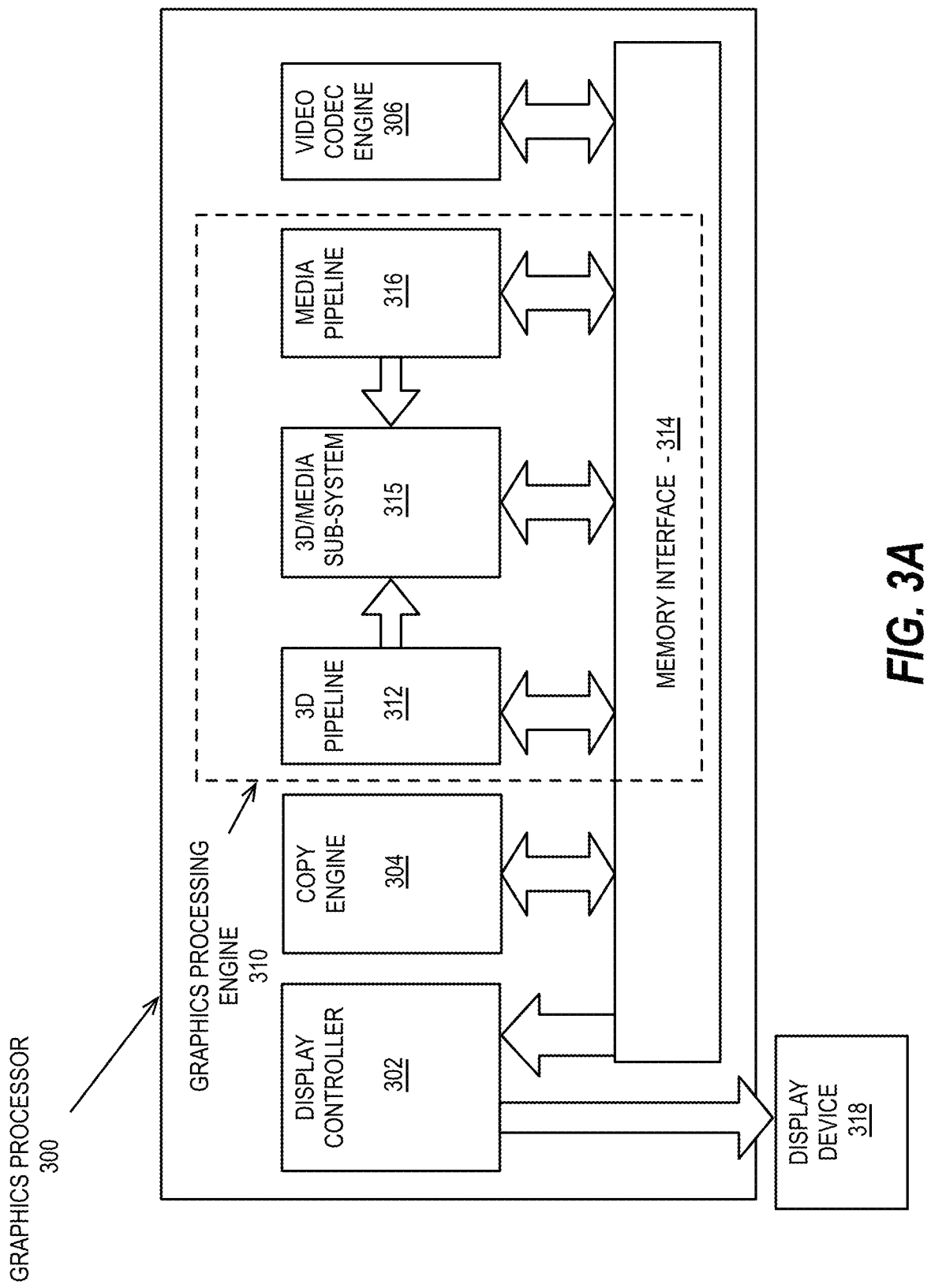
FIGS. 3A-C illustrate block diagrams of additional graphics processor and compute accelerator architectures.
Figure 3B:
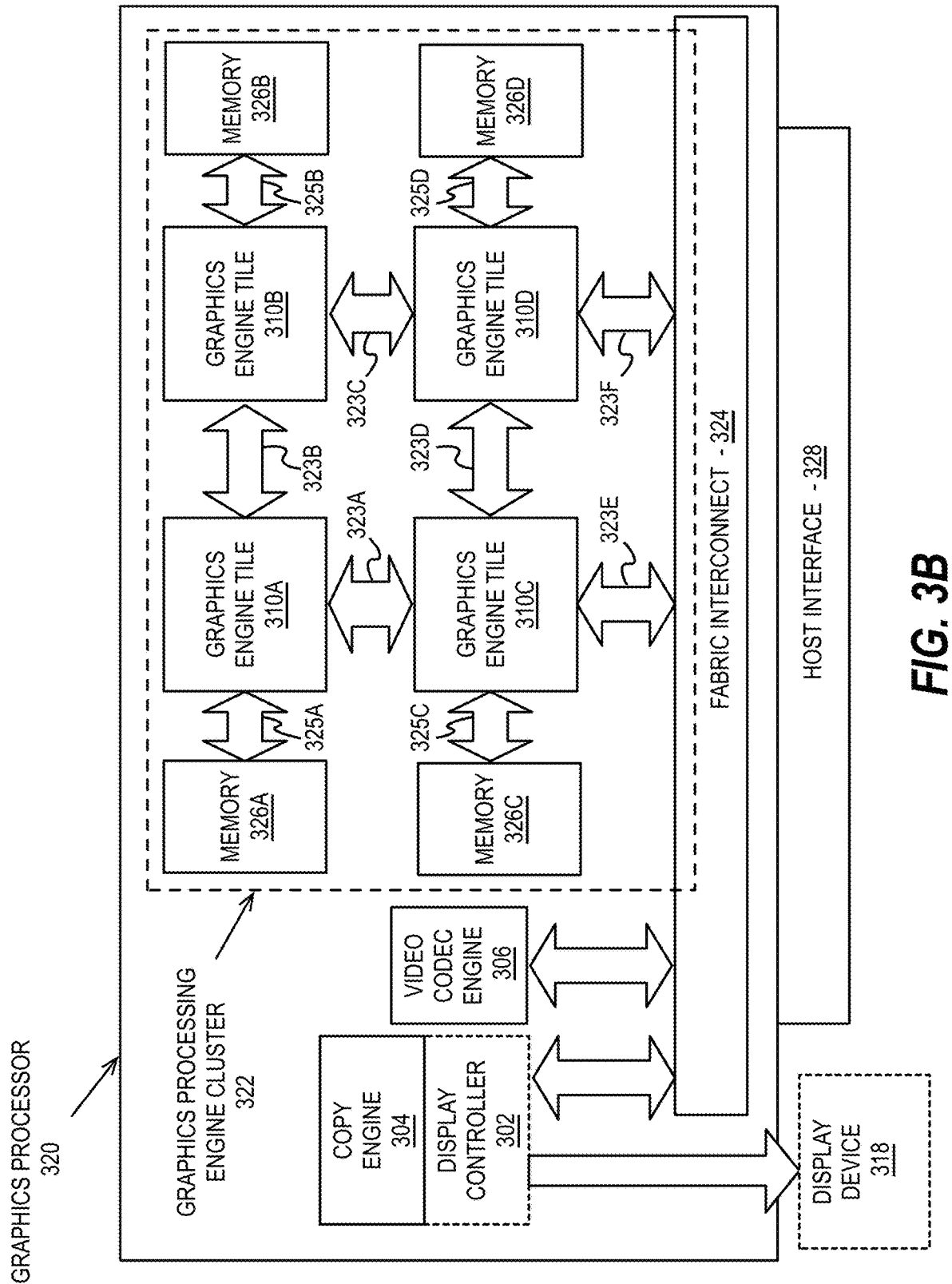
Figure 3C:
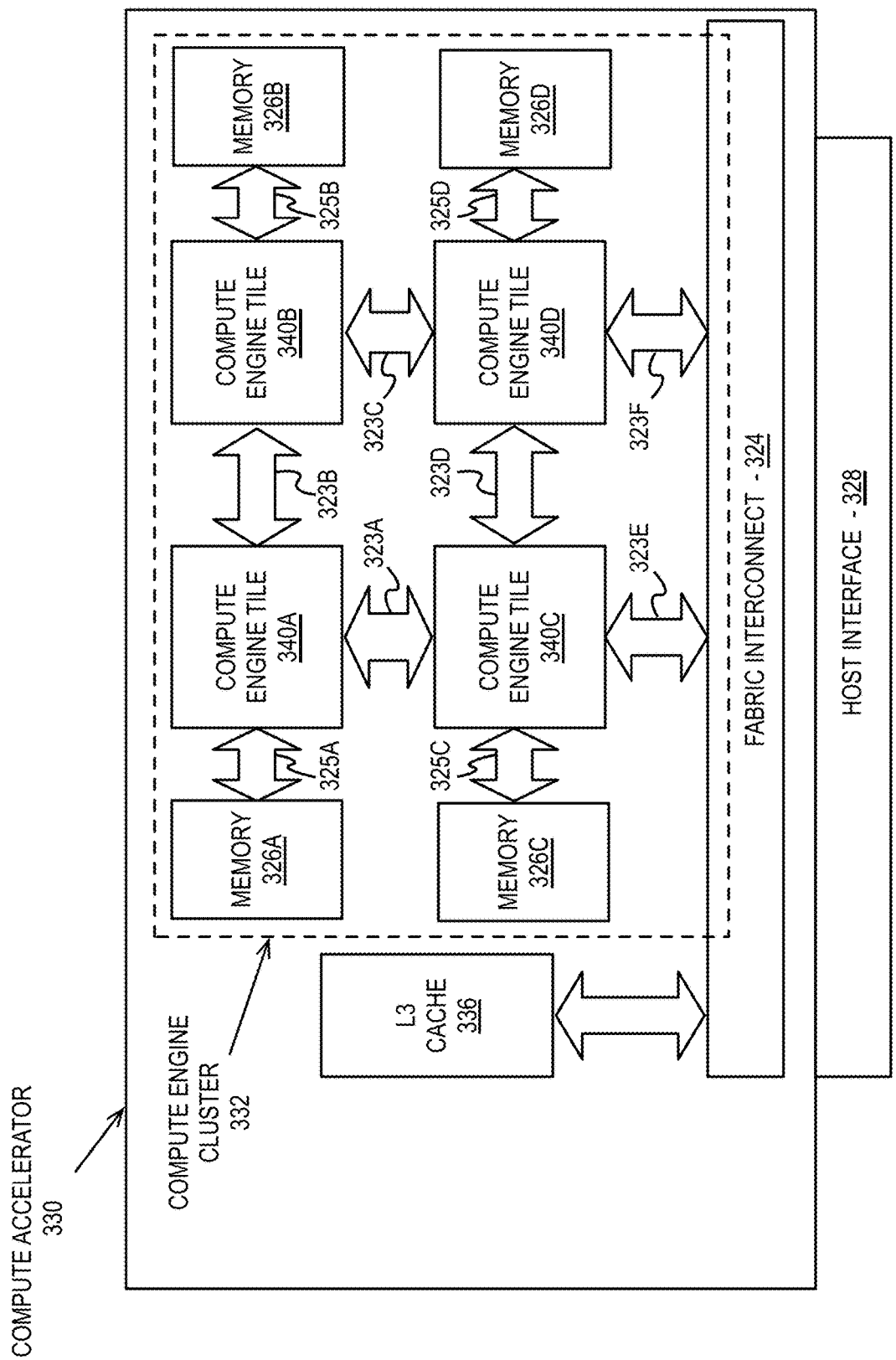

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processing engine cluster 322 can connect with an on-chip or on-package fabric interconnect 324. The fabric interconnect 324 can enable communication between graphics engine tiles 310A-310D and components such as the video codec 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
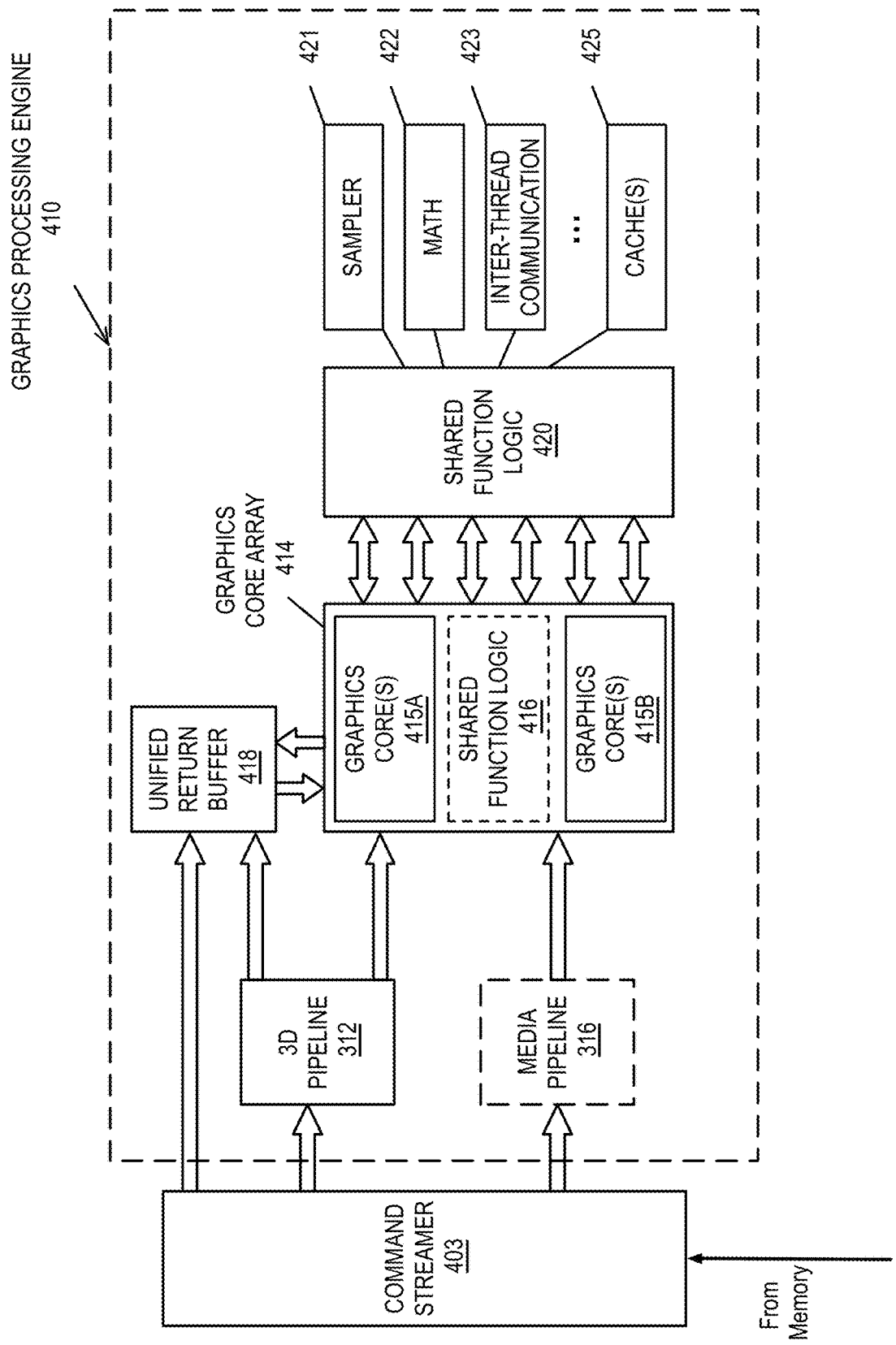
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
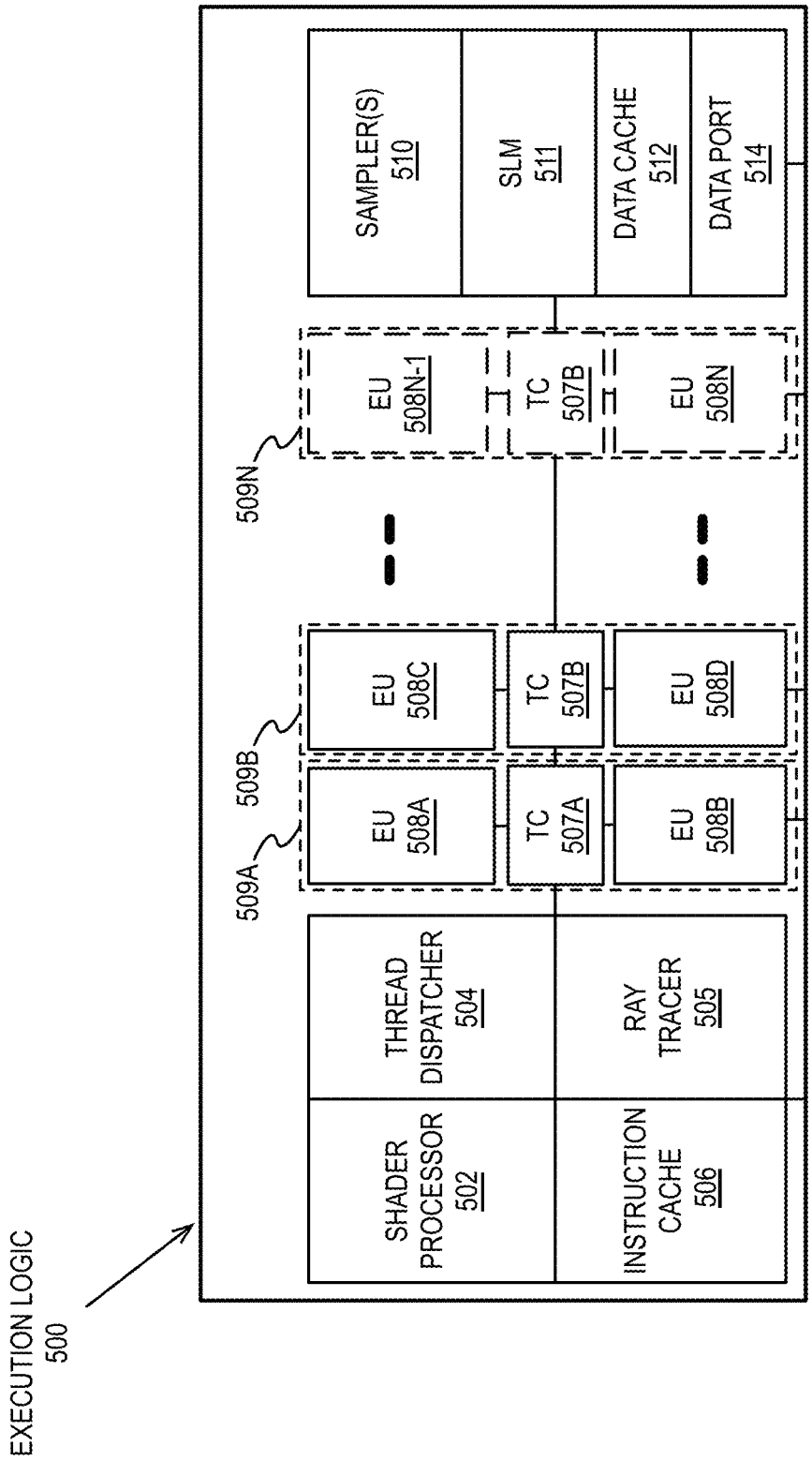
FIGS. 5A-B illustrate thread execution logic including an array of processing elements.
Figure 5B:
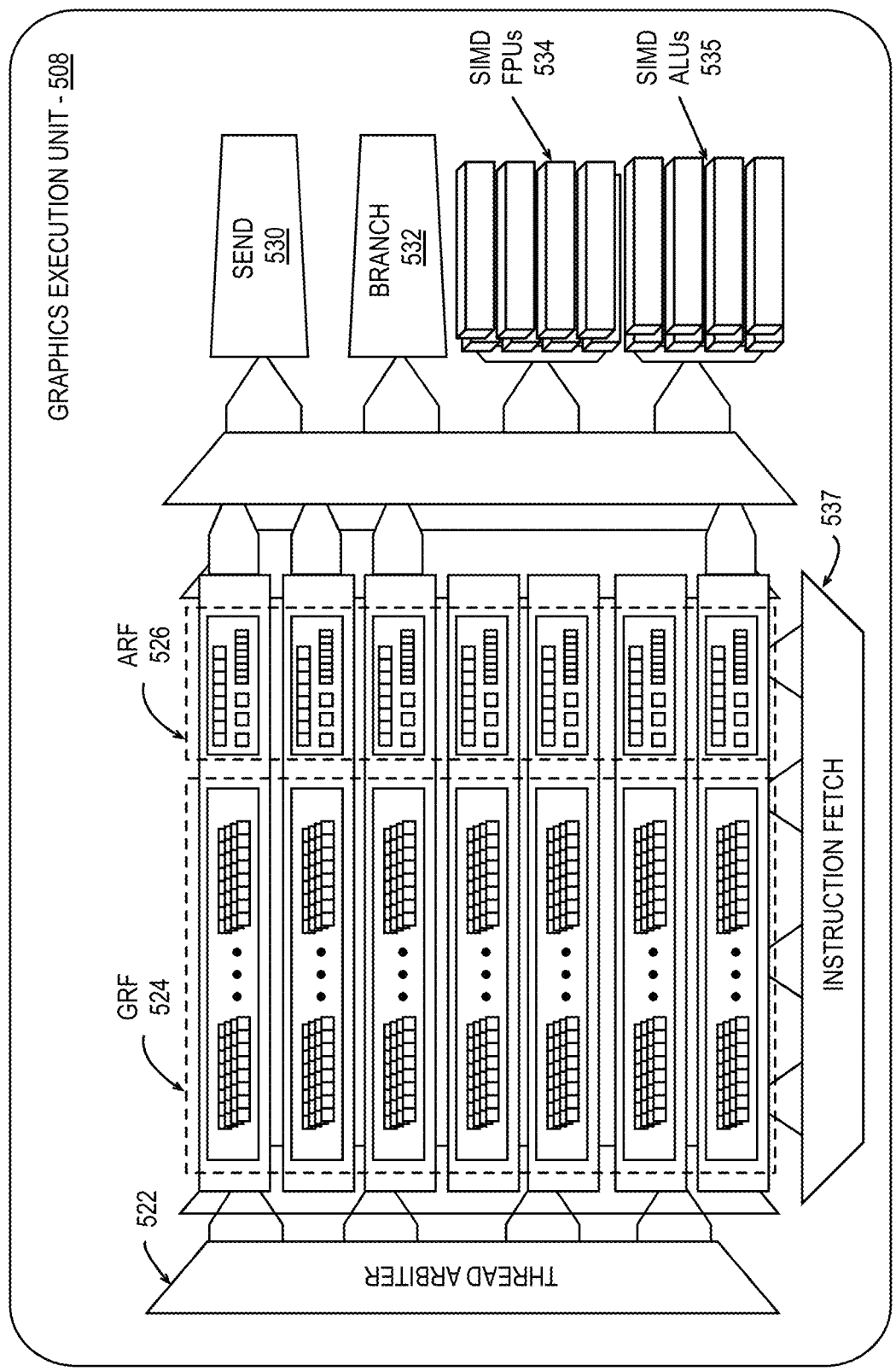

FIGS. 5A-5B illustrate thread execution logic 500 including an array of processing elements employed in a graphics processor core according to embodiments described herein. Elements of FIGS. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
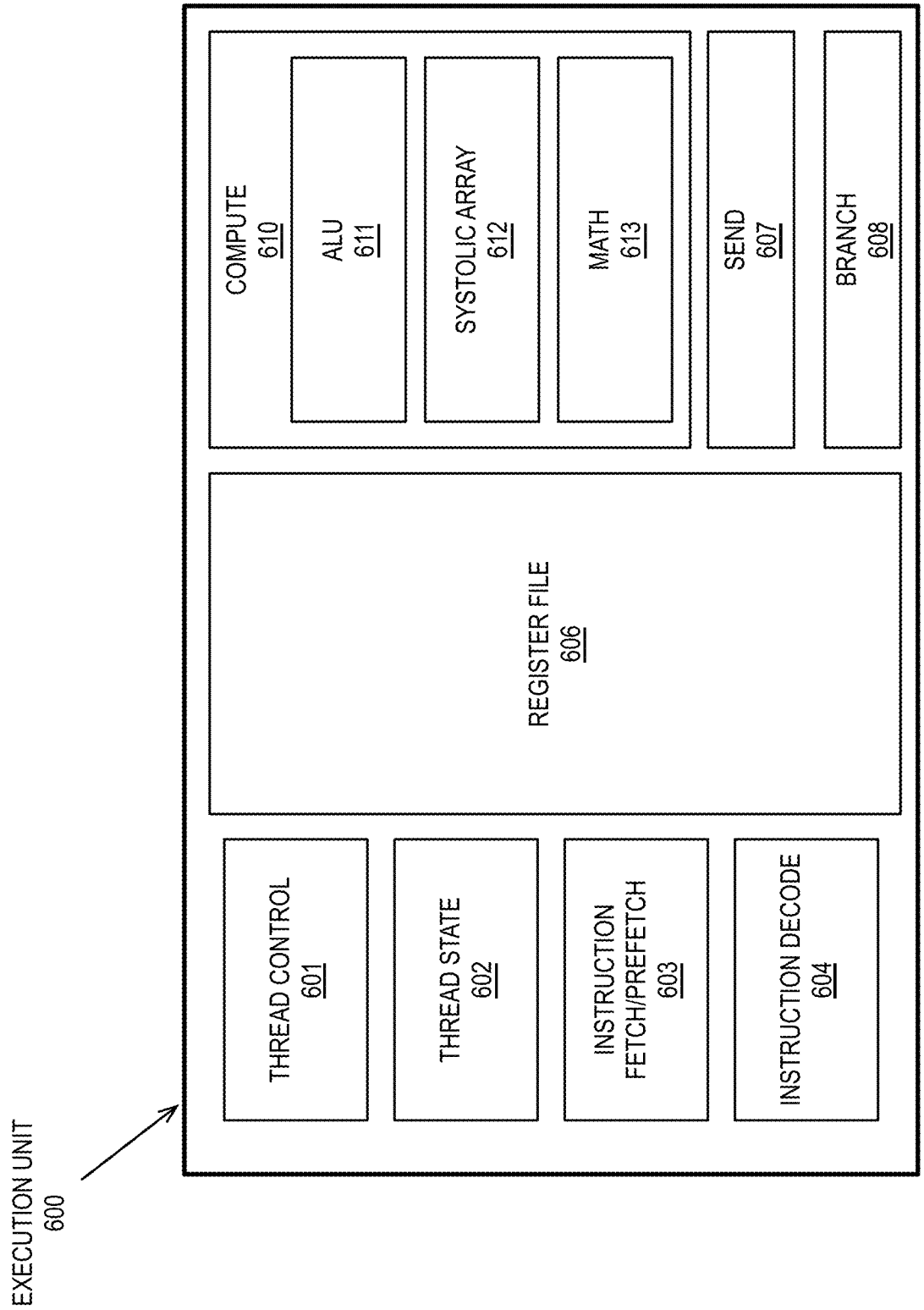
FIG. 6 is a block diagram of thread execution logic including an array of processing elements.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
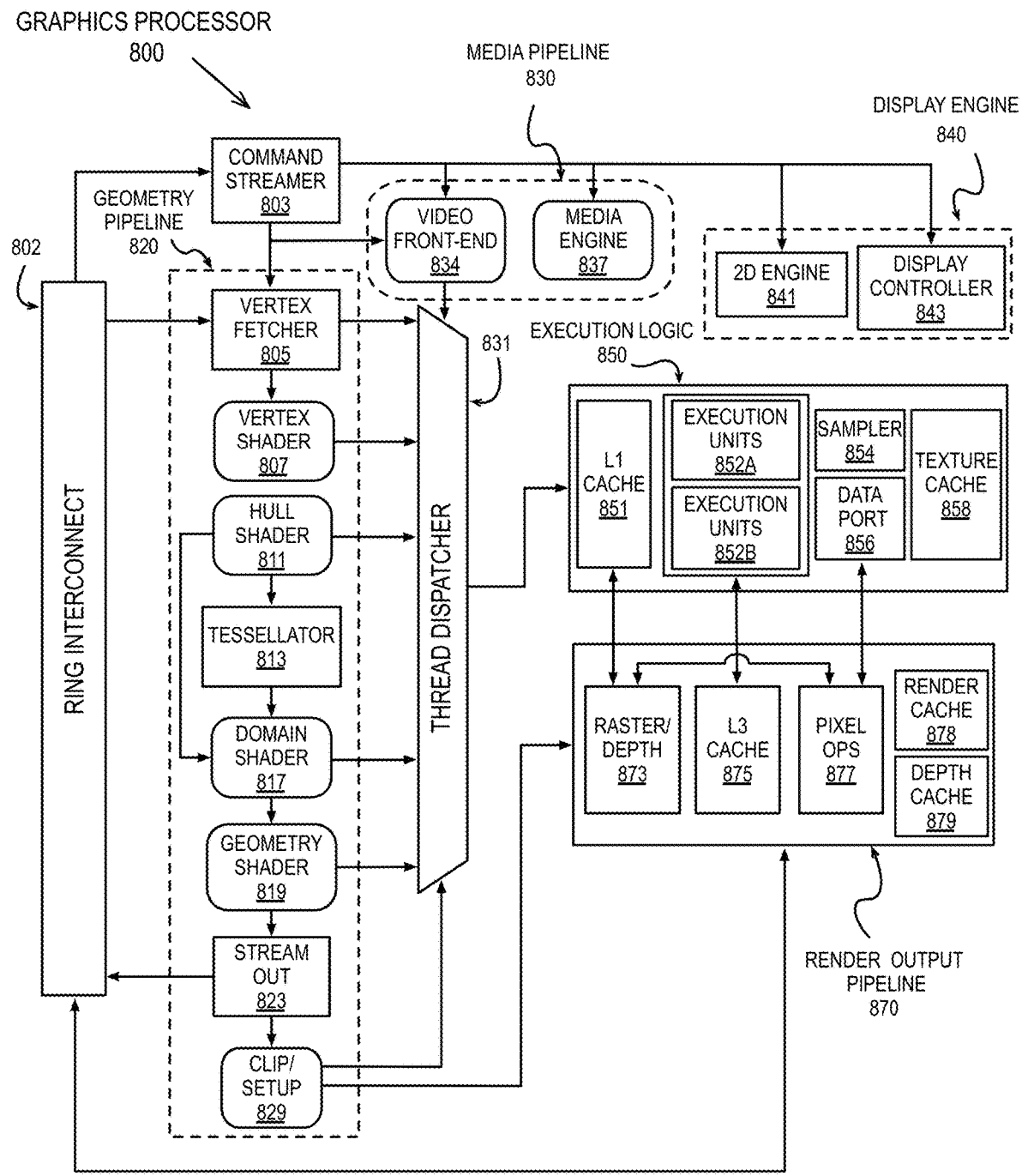
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
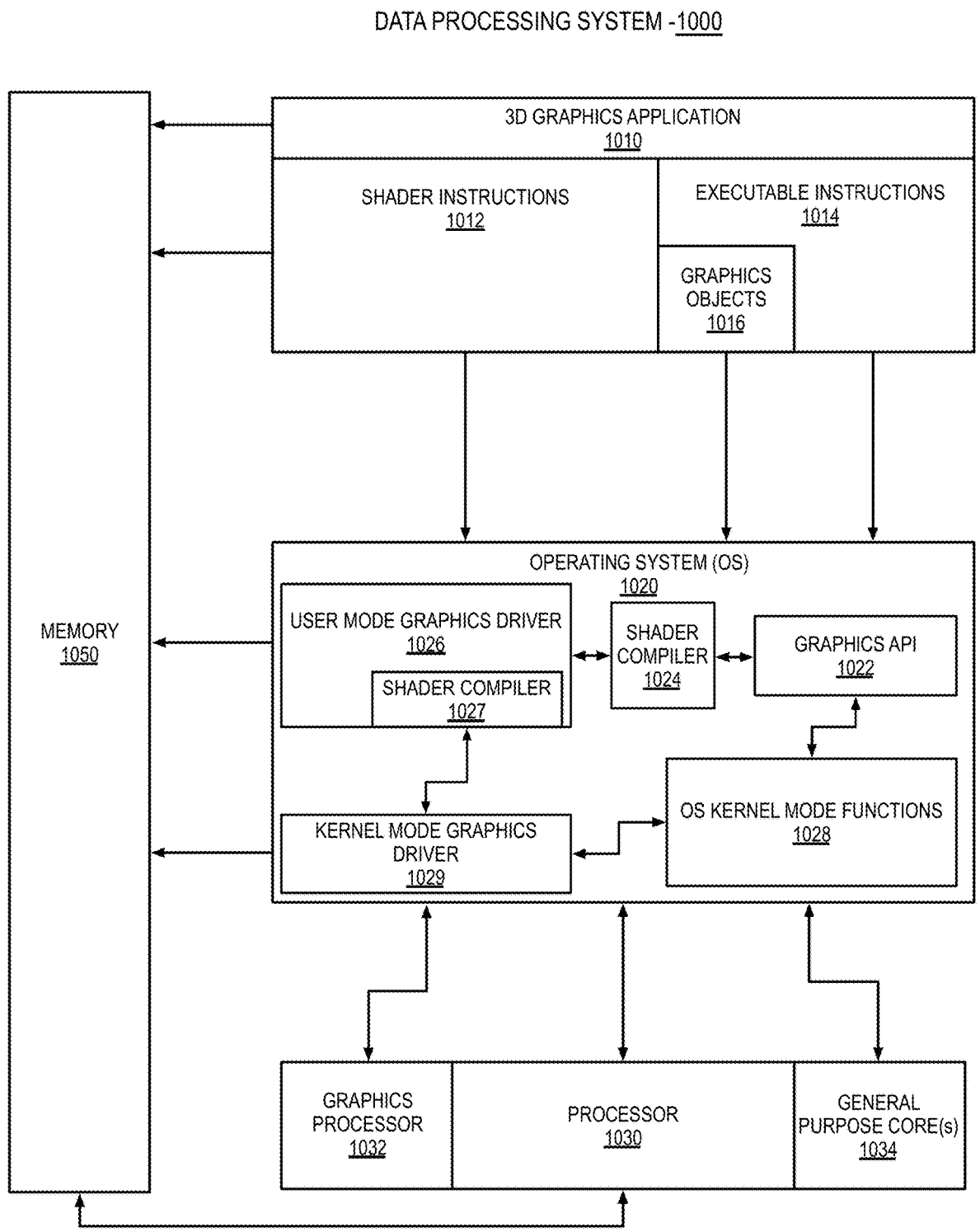
FIG. 10 illustrates exemplary graphics software architecture for a data processing system according to an embodiment.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
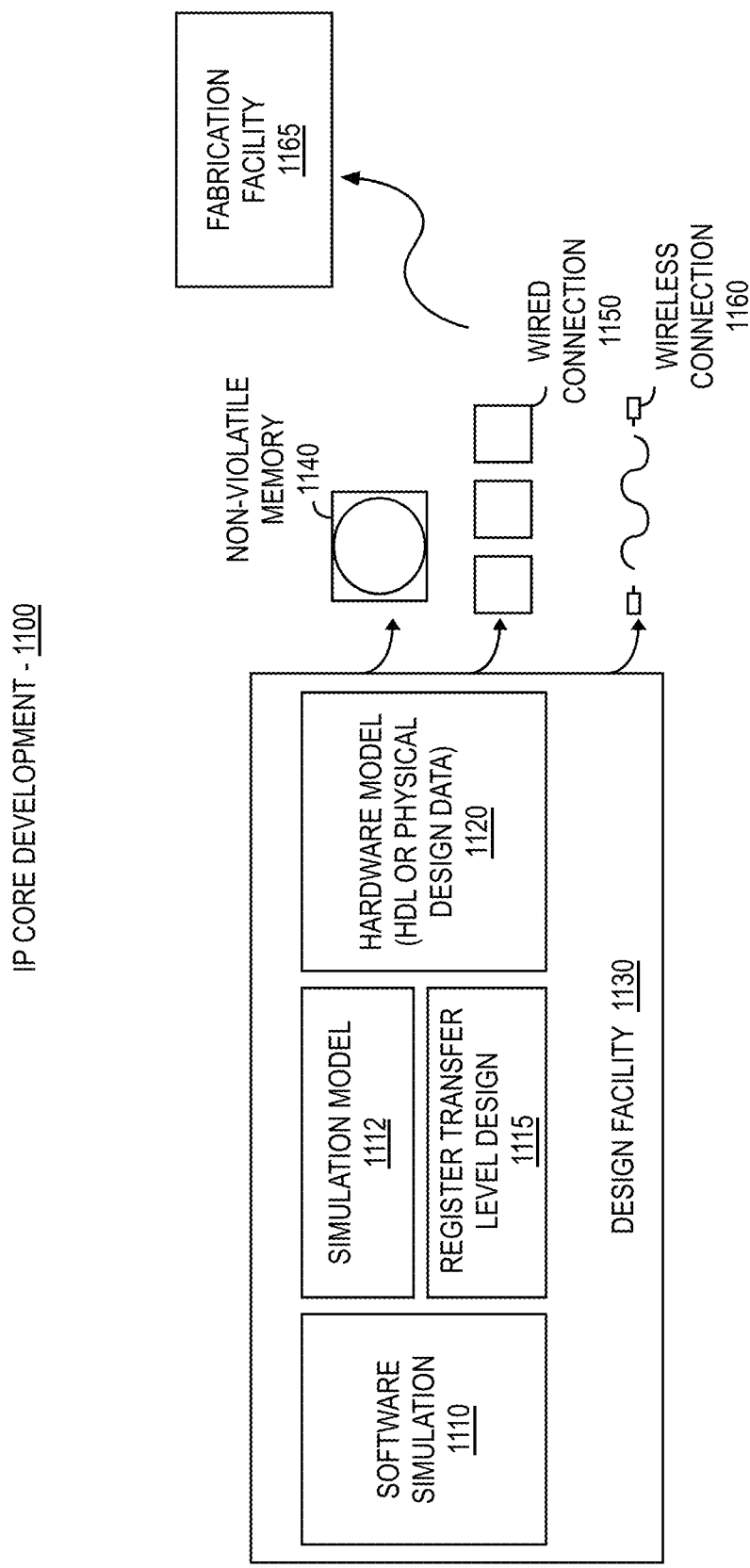
FIG. 11A illustrates exemplary IP core development systems that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
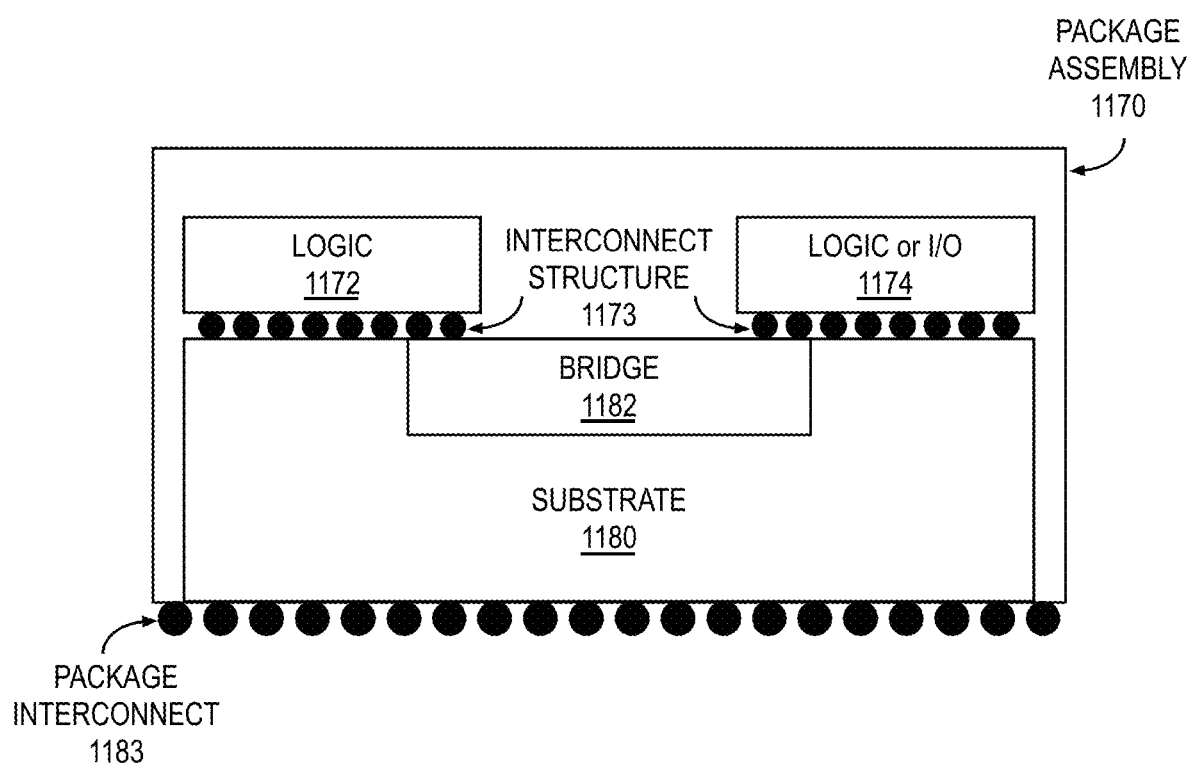
FIGS. 11B-D illustrate exemplary packaging arrangements including chiplets and interposer substrates.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
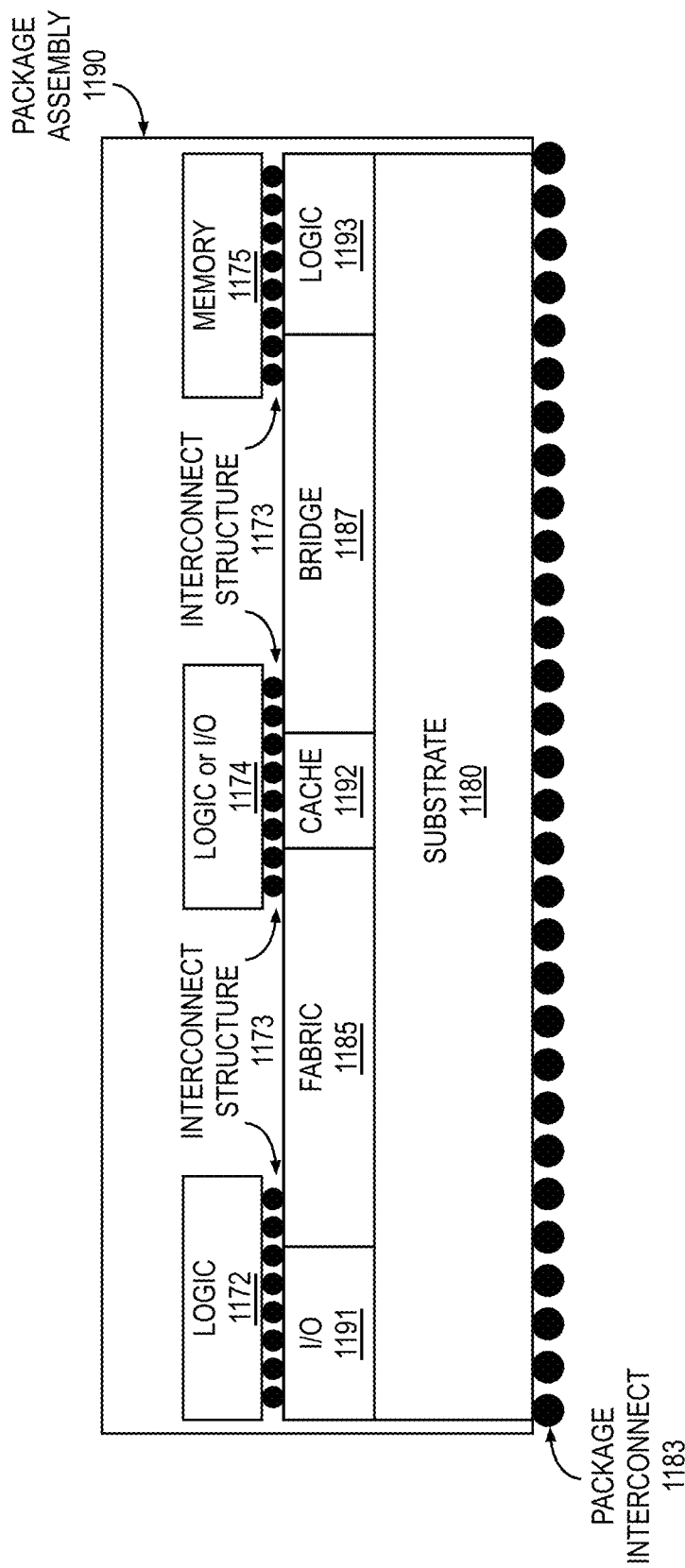

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 11D:
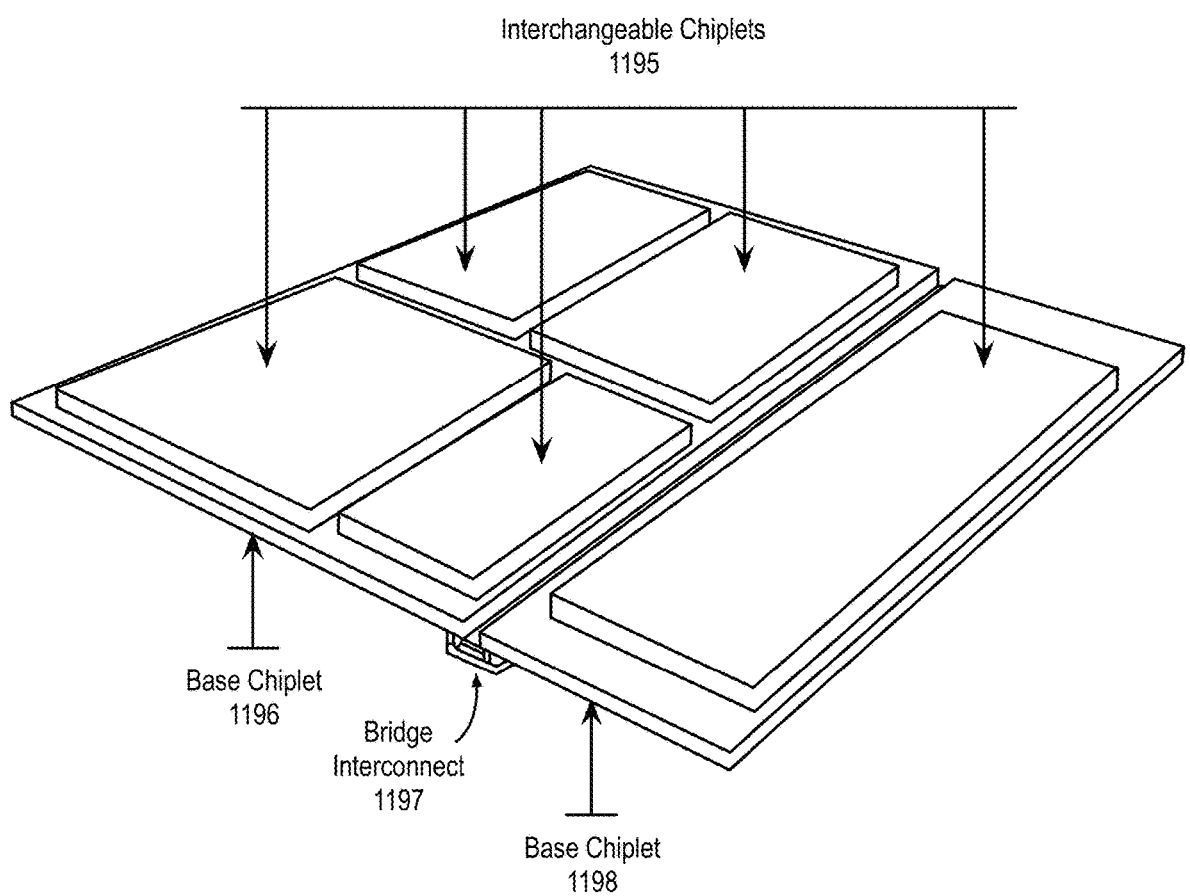

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
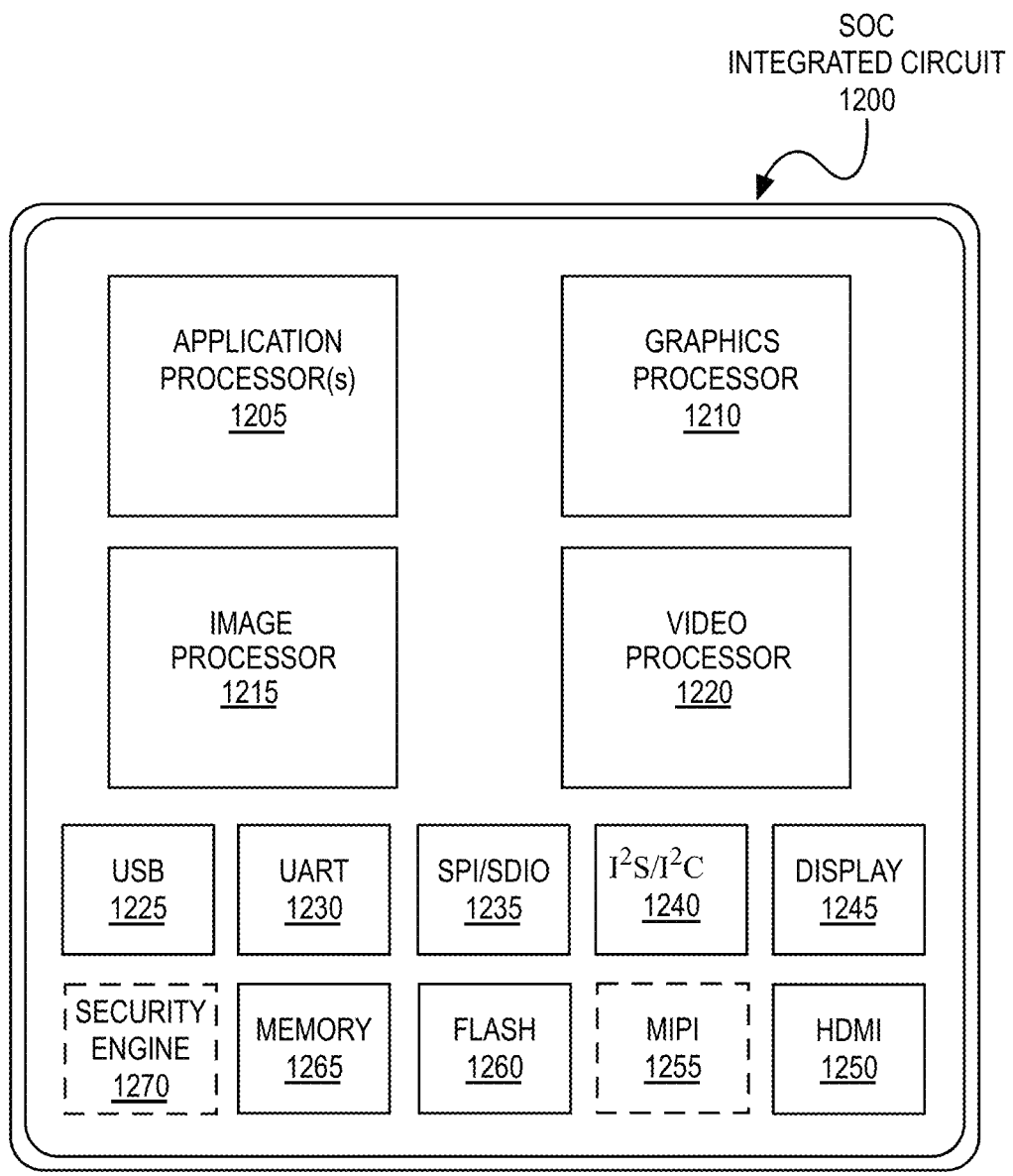
FIG. 12 illustrates an exemplary system on a chip integrated circuit that may be fabricated using one or more IP cores, according to an embodiment.
Figure 13:
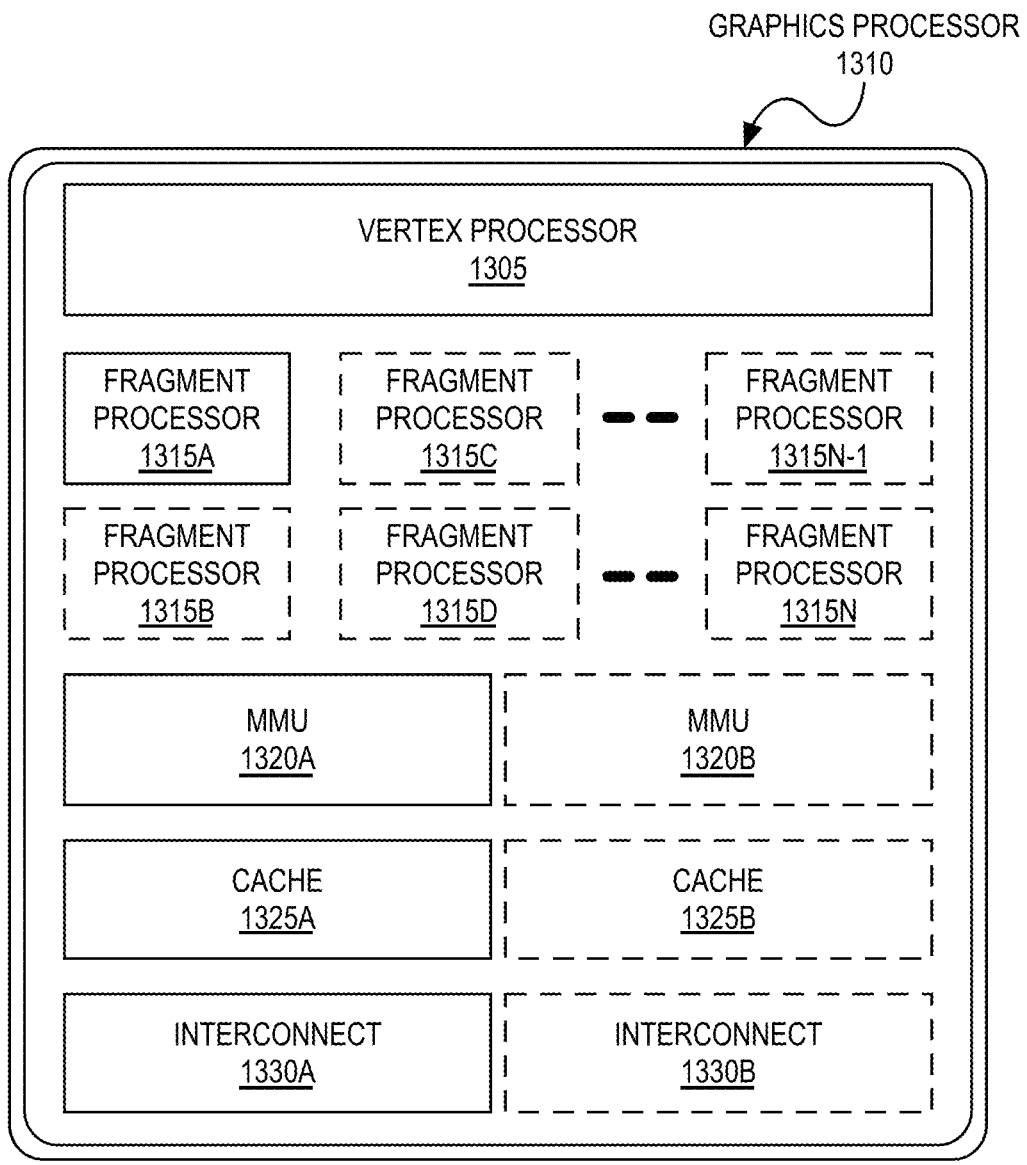
FIG. 13 illustrates an exemplary graphics processor of a system on a chip integrated circuit that may be fabricated using one or more IP cores.

FIGS. 12-13 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 14:
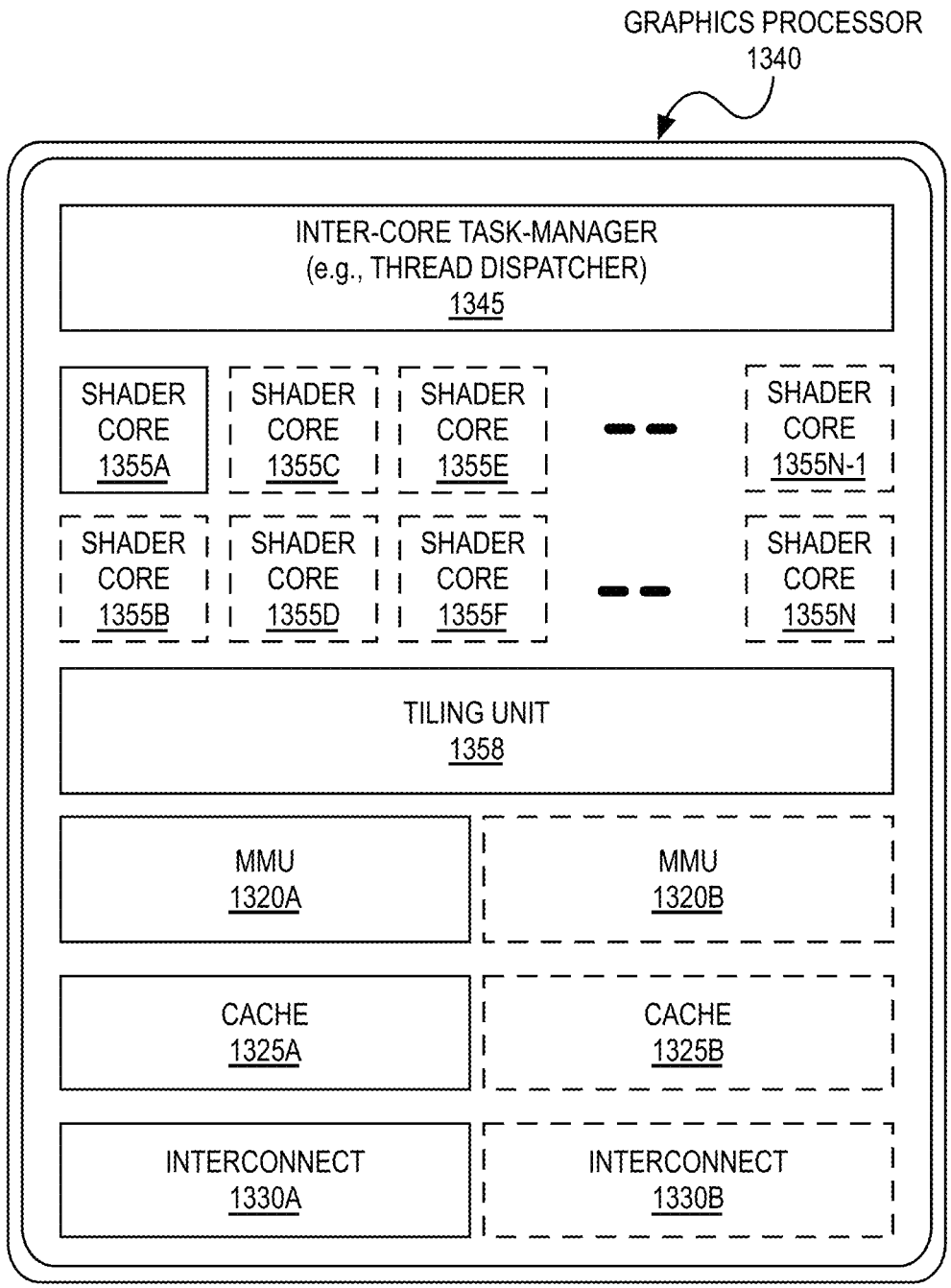
FIG. 14 illustrates an additional exemplary graphics processor of a system on a chip integrated circuit that may be fabricated using one or more IP cores.

FIGS. 13-14 are block diagrams illustrating exemplary graphics processors for use within an SoC, according to embodiments described herein. FIG. 13 illustrates an exemplary graphics processor 1310 of a system on a chip integrated circuit that may be fabricated using one or more IP cores, according to an embodiment. FIG. 14 illustrates an additional exemplary graphics processor 1340 of a system on a chip integrated circuit that may be fabricated using one or more IP cores, according to an embodiment. Graphics processor 1310 of FIG. 13 is an example of a low power graphics processor core. Graphics processor 1340 of FIG. 14 is an example of a higher performance graphics processor core. Each of the graphics processors 1310, 1340 can be variants of the graphics processor 1210 of FIG. 12.

As shown in FIG. 13, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 14, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Ray Tracing with Machine Learning

As mentioned above, ray tracing is a graphics processing technique in which a light transport is simulated through physically-based rendering. One of the key operations in ray tracing is processing a visibility query which requires traversal and intersection testing of nodes in a bounding volume hierarchy (BVH).

Ray- and path-tracing based techniques compute images by tracing rays and paths through each pixel, and using random sampling to compute advanced effects such as shadows, glossiness, indirect illumination, etc. Using only a few samples is fast but produces noisy images while using many samples produces high quality images, but is cost prohibitive.

Machine learning includes any circuitry, program code, or combination thereof capable of progressively improving performance of a specified task or rendering progressively more accurate predictions or decisions. Some machine learning engines can perform these tasks or render these predictions/decisions without being explicitly programmed to perform the tasks or render the predictions/decisions. A variety of machine learning techniques exist including (but not limited to) supervised and semi-supervised learning, unsupervised learning, and reinforcement learning.

In the last several years, a breakthrough solution to ray-/path-tracing for real-time use has come in the form of "denoising"—the process of using image processing techniques to produce high quality, filtered/denoised images from noisy, low-sample count inputs. The most effective denoising techniques rely on machine learning techniques where a machine-learning engine learns what a noisy image would likely look like if it had been computed with more samples. In one particular implementation, the machine learning is performed by a convolutional neural network (CNN); however, the underlying principles of the invention are not limited to a CNN implementation. In such an implementation, training data is produced with low-sample count inputs and ground-truth. The CNN is trained to predict the converged pixel from a neighborhood of noisy pixel inputs around the pixel in question.

Though not perfect, this AI-based denoising technique has proven surprisingly effective. The caveat, however, is that good training data is required, since the network may otherwise predict the wrong results. For example, if an animated movie studio trained a denoising CNN on past movies with scenes on land and then attempted to use the trained CNN to denoise frames from a new movie set on water, the denoising operation will perform sub-optimally.

To address this problem, learning data can be dynamically gathered, while rendering, and a machine learning engine, such as a CNN, may be continuously trained based on the data on which it is currently being run, thus continuously improving the machine learning engine for the task at hand. Therefore, a training phase may still performed prior to runtime, but continued to adjust the machine learning weights as needed during runtime. Therby, the high cost of computing the reference data required for the training is avoided by restricting the generation of learning data to a sub-region of the image every frame or every N frames. In particular, the noisy inputs of a frame are generated for denoising the full frame with the current network. In addition, a small region of reference pixels are generated and used for continuous training, as described below.

While a CNN implementation is described herein, any form of machine learning engine may be used including, but not limited to systems which perform supervised learning (e.g., building a mathematical model of a set of data that contains both the inputs and the desired outputs), unsupervised learning (e.g., which evaluate the input data for certain types of structure), and/or a combination of supervised and unsupervised learning.

Existing de-noising implementations operate in a training phase and a runtime phase. During the training phase, a network topology is defined which receives a region of N×N pixels with various per-pixel data channels such as pixel color, depth, normal, normal deviation, primitive IDs, and albedo and generates a final pixel color. A set of "representative" training data is generated using one frame's worth of low-sample count inputs, and referencing the "desired" pixel colors computed with a very high sample count. The network is trained towards these inputs, generating a set of "ideal" weights for the network. In these implementations, the reference data is used to train the network's weights to most closely match the network's output to the desired result.

At runtime, the given, pre-computed ideal network weights are loaded and the network is initialized. For each frame, a low-sample count image of denoising inputs (i.e., the same as used for training) is generated. For each pixel, the given neighborhood of pixels' inputs is run through the network to predict the "denoised" pixel color, generating a denoised frame.

Figure 15:
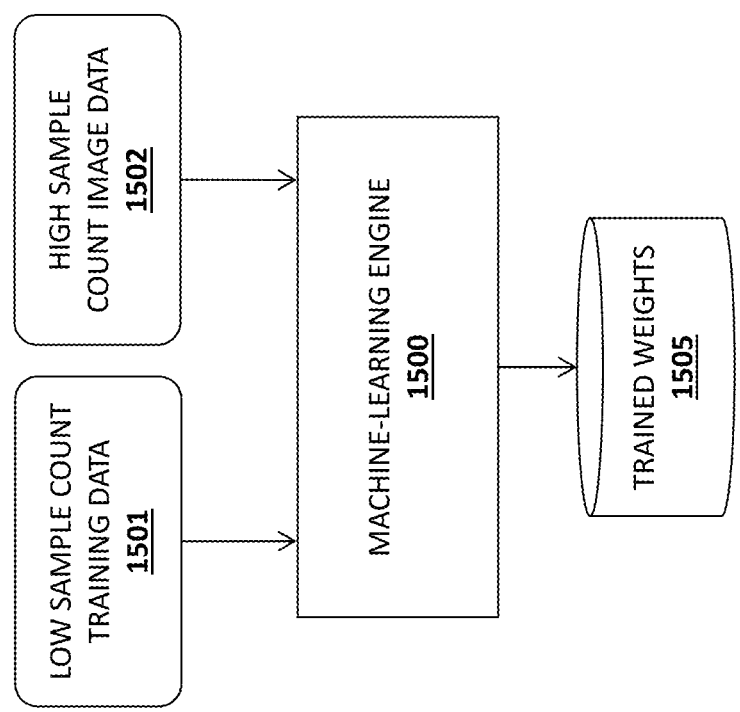
FIG. 15 illustrates an architecture for performing initial training of a machine-learning architecture.

FIG. 15 illustrates an initial training implementation. A machine learning engine 1500 (e.g., a CNN) receives a region of N×N pixels as high sample count image data 1702 with various per-pixel data channels such as pixel color, depth, normal, normal deviation, primitive IDs, and albedo and generates final pixel colors. Representative training data is generated using one frame's worth of low-sample count inputs 1501. The network is trained towards these inputs, generating a set of "ideal" weights 1505 which the machine learning engine 1500 subsequently uses to denoise low sample count images at runtime.

Figure 16:
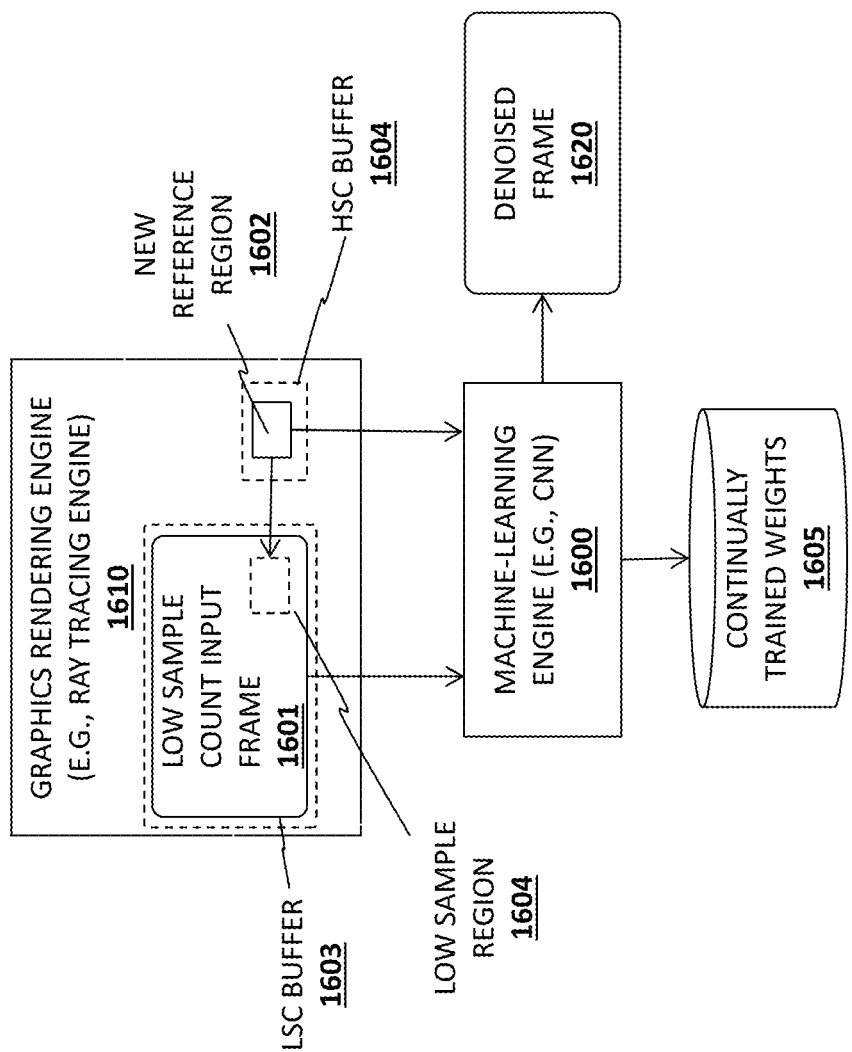
FIG. 16 illustrates how a machine-learning engine is continually trained and updated during runtime.

To improve the above techniques, the denoising phase to generate new training data every frame or a subset of frames (e.g., every N frames where N=2, 3, 4, 10, 25, etc) is augmented. In particular, as illustrated in FIG. 16, one or more regions in each frame are chosen, referred to here as "new reference regions" 1602 which are rendered with a high sample count into a separate high sample count buffer 1604. A low sample count buffer 1603 stores the low sample count input frame 1601 (including the low sample region 1604 corresponding to the new reference region 1602).

The location of the new reference region 1602 may be randomly selected. Alternatively, the location of the new reference region 1602 may be adjusted in a pre-specified manner for each new frame (e.g., using a predefined movement of the region between frames, limited to a specified region in the center of the frame, etc).

Regardless of how the new reference region is selected, it is used by the machine learning engine 1600 to continually refine and update the trained weights 1605 used for denoising. In particular, reference pixel colors from each new reference region 1602 and noisy reference pixel inputs from a corresponding low sample count region 1607 are rendered. Supplemental training is then performed on the machine learning engine 1600 using the high-sample-count reference region 1602 and the corresponding low sample count region 1607. In contrast to the initial training, this training is performed continuously during runtime for each new reference region 1602—thereby ensuring that the machine learning engine 1600 is precisely trained. For example, per-pixel data channels (e.g., pixel color, depth, normal, normal deviation, etc) may be evaluated, which the machine learning engine 1600 uses to make adjustments to the trained weights 1605. As in the training case (FIG. 15), the machine learning engine 1600 is trained towards a set of ideal weights 1605 for removing noise from the low sample count input frame 1601 to generate the denoised frame 1620. However, the trained weights 1605 are continually updated, based on new image characteristics of new types of low sample count input frames 1601.

The re-training operations performed by the machine learning engine 1600 may be executed concurrently in a background process on the graphics processor unit (GPU) or host processor. The render loop, which may be implemented as a driver component and/or a GPU hardware component, may continuously produce new training data (e.g., in the form of new reference regions 1602) which it places in a queue. The background training process, executed on the GPU or host processor, may continuously read the new training data from this queue, re-trains the machine learning engine 1600, and update it with new weights 1605 at appropriate intervals.

Figure 17:
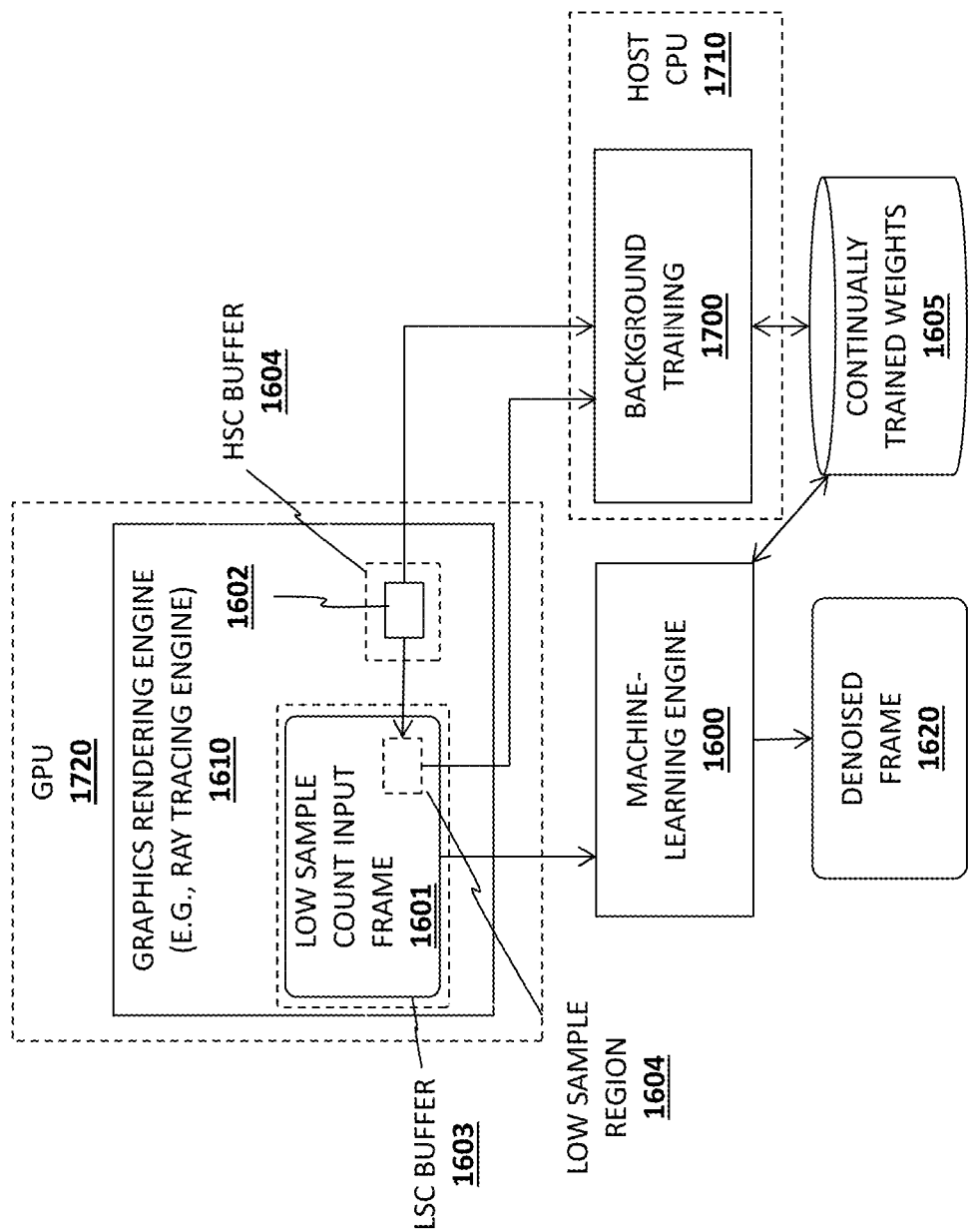
FIG. 17 illustrates how a machine-learning engine is continually trained and updated during runtime.

FIG. 17 illustrates an example of one such implementation in which the background training process 1700 is implemented by the host CPU 1710. In particular, the background training process 1700 uses the high sample count new reference region 1602 and the corresponding low sample region 1604 to continually update the trained weights 1605, thereby updating the machine learning engine 1600.

Figure 18A:
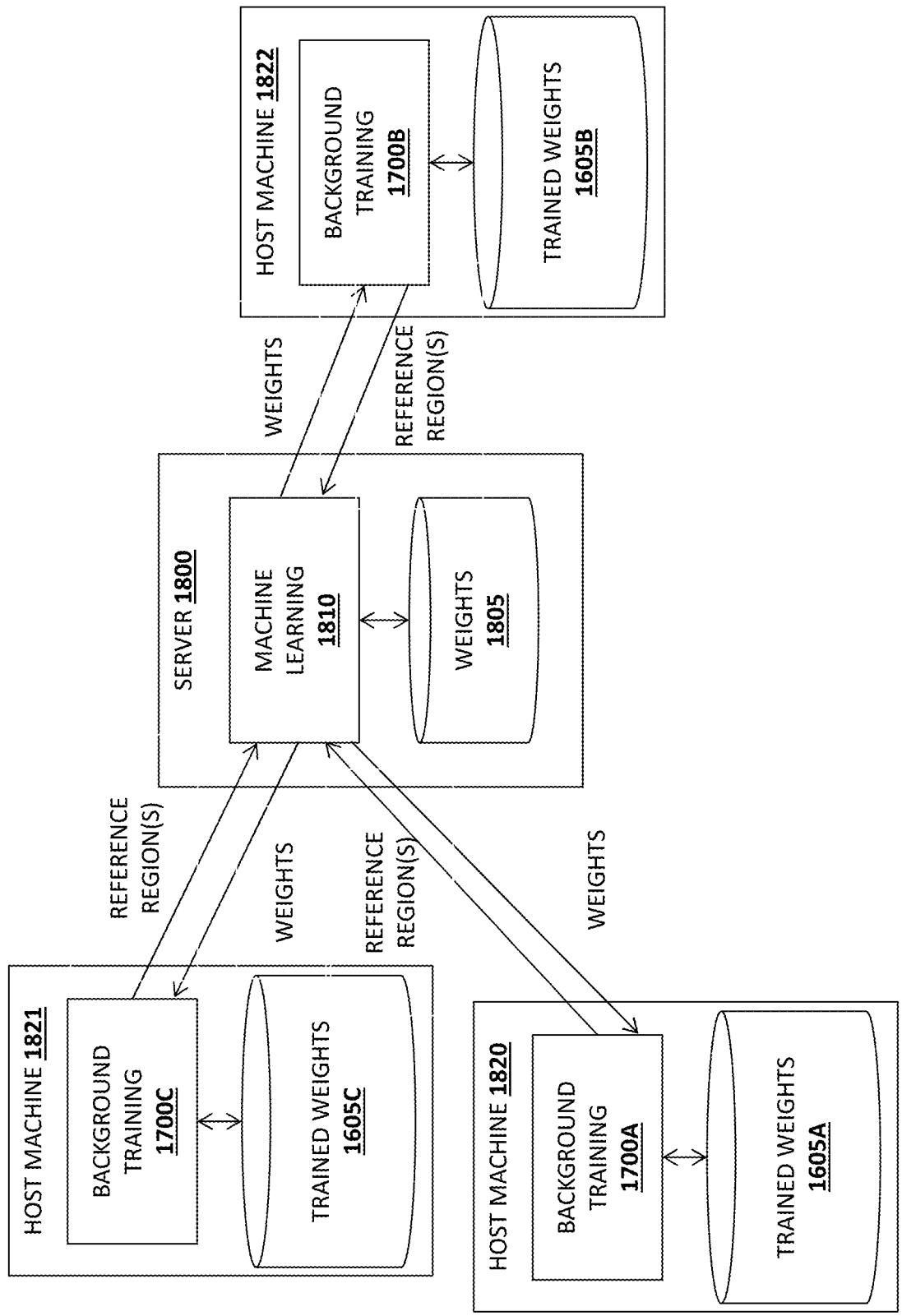
FIGS. 18A-B illustrate how machine learning data is shared on a network.

As illustrated in FIG. 18A for the non-limiting example of a multi-player online game, different host machines 1820-1822 individually generate reference regions which a background training process 1700A-C transmits to a server 1800 (e.g., such as a gaming server). The server 1800 then performs training on a machine learning engine 1810 using the new reference regions received from each of the hosts 1821-1822, updating the weights 1805 as previously described. It transmits these weights 1805 to the host machines 1820 which store the weights 1605A-C, thereby updating each individual machine learning engine (not shown). Because the server 1800 may be provided a large number of reference regions in a short period of time, it can efficiently and precisely update the weights for any given application (e.g., an online game) being executed by the users.

Figure 18B:
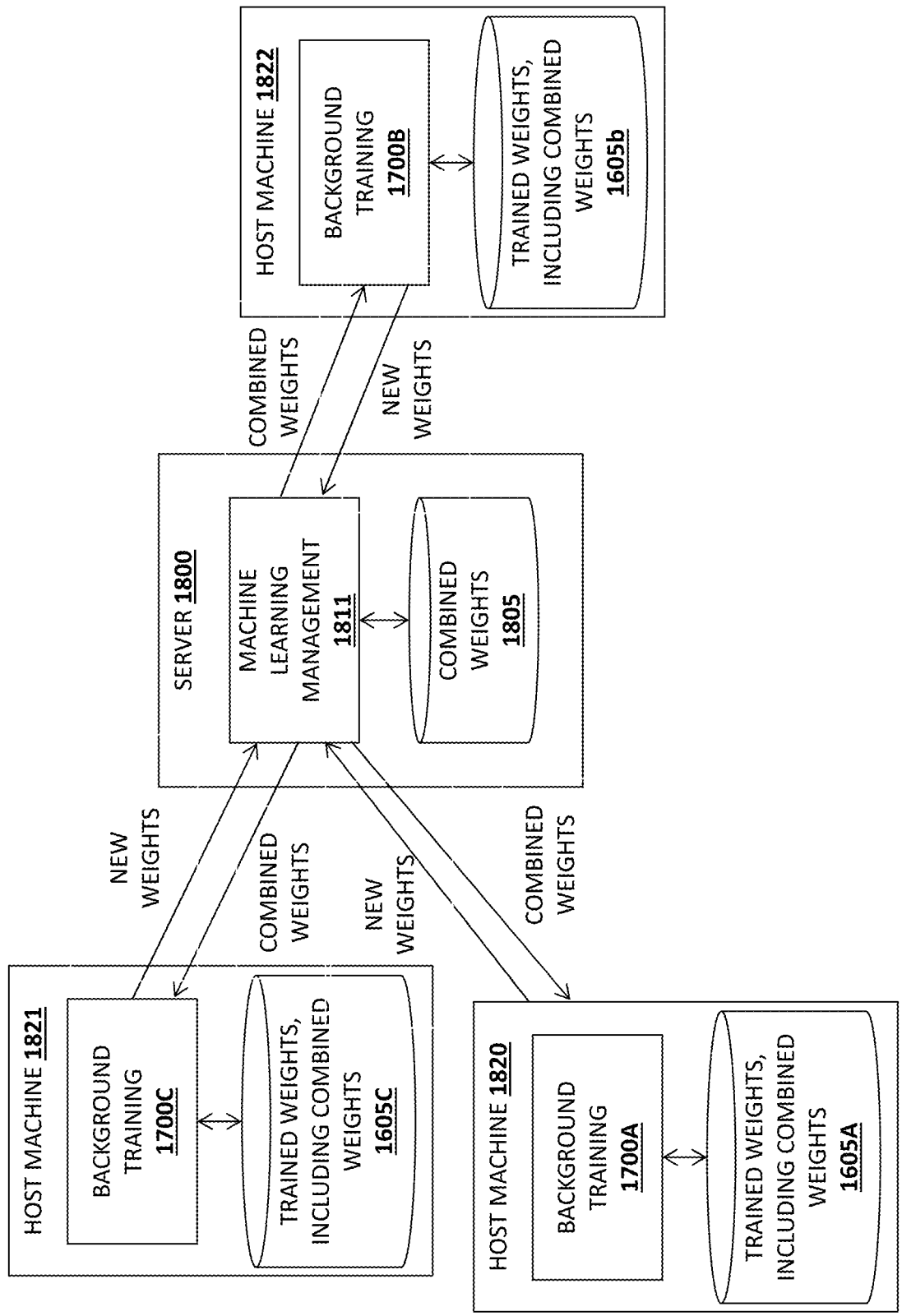

As illustrated in FIG. 18B, the different host machines may generate new trained weights (e.g., based on training/reference regions 1602 as previously described) and share the new trained weights with a server 1800 (e.g., such as a gaming server) or, alternatively, use a peer-to-peer sharing protocol. A machine learning management component 1810 on the server generates a set of combined weights 1805 using the new weights received from each of the host machines. The combined weights 1805, for example, may be an average generated from the new weights and continually updated as described herein. Once generated, copies of the combined weights 1605A-C may be transmitted and stored on each of the host machines 1820-1821 which may then use the combined weights as described herein to perform de-noising operations.

The semi-closed loop update mechanism can also be used by the hardware manufacturer. For example, the reference network may be included as part of the driver distributed by the hardware manufacturer. As the driver generates new training data using the techniques described herein and continuously submits these back to the hardware manufacturer, the hardware manufacturer uses this information to continue to improve its machine learning implementations for the next driver update.

In an example implementation (e.g., in batch movie rendering on a render farm), the renderer transmits the newly generated training regions to a dedicated server or database (in that studio's render farm) that aggregates this data from multiple render nodes over time. A separate process on a separate machine continuously improves the studio's dedicated denoising network, and new render jobs always use the latest trained network.

Figure 19:
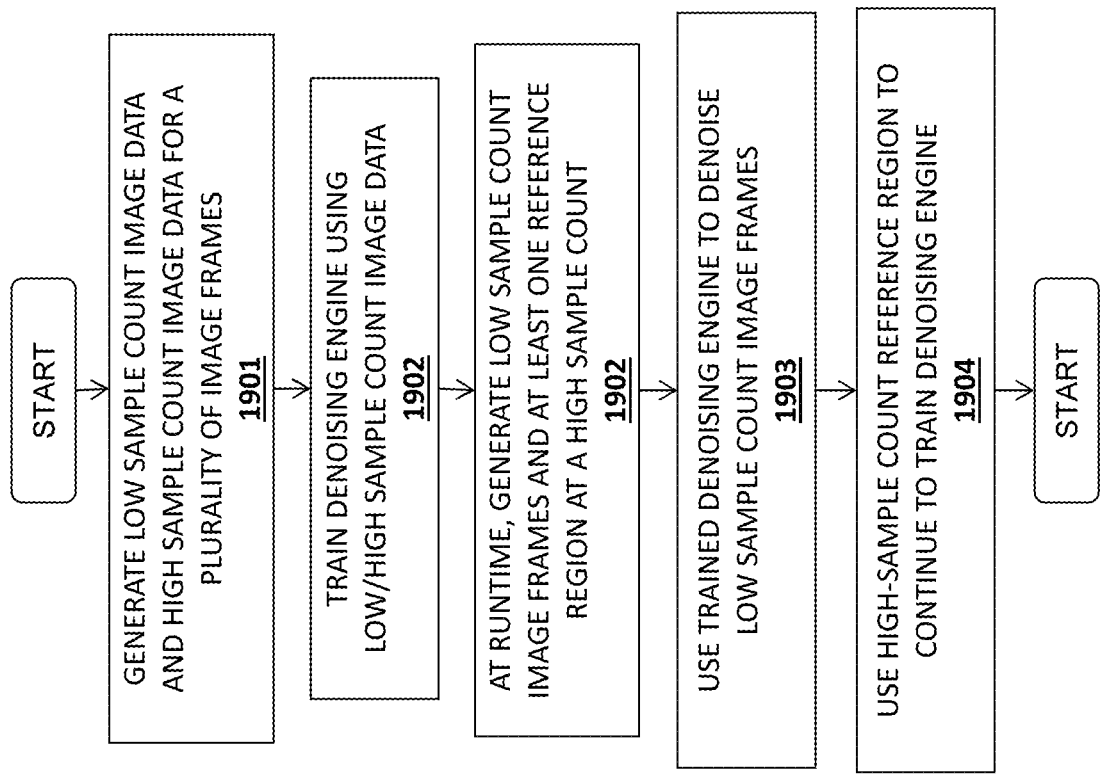
FIG. 19 illustrates a method for training a machine-learning engine.

A machine-learning method is illustrated in FIG. 19. The method may be implemented on the architectures described herein, but is not limited to any particular system or graphics processing architecture.

At 1901, as part of the initial training phase, low sample count image data and high sample count image data are generated for a plurality of image frames. At 1902, a machine-learning denoising engine is trained using the high/low sample count image data. For example, a set of convolutional neural network weights associated with pixel features may be updated in accordance with the training. However, any machine-learning architecture may be used.

At 1903, at runtime, low sample count image frames are generated along with at least one reference region having a high sample count. At 1904, the high sample count reference region is used by the machine-learning engine and/or separate training logic (e.g., background training module 1700) to continually refine the training of the machine learning engine. For example, the high sample count reference region may be used in combination with a corresponding portion of the low sample count image to continue to teach the machine learning engine 1904 how to most effectively perform denoising. In a CNN implementation, for example, this may involve updating the weights associated with the CNN.

Multiple variations described above may be implemented, such as the manner in which the feedback loop to the machine learning engine is configured, the entities which generate the training data, the manner in which the training data is fed back to training engine, and how the improved network is provided to the rendering engines. In addition, while the examples described above perform continuous training using a single reference region, any number of reference regions may be used. Moreover, as previously mentioned, the reference regions may be of different sizes, may be used on different numbers of image frames, and may be positioned in different locations within the image frames using different techniques (e.g., random, according to a predetermined pattern, etc).

In addition, while a convolutional neural network (CNN) is described as one example of a machine-learning engine 1600, the underlying principles of the invention may be implemented using any form of machine learning engine which is capable of continually refining its results using new training data. By way of example, and not limitation, other machine learning implementations include the group method of data handling (GMDH), long short-term memory, deep reservoir computing, deep belief networks, tensor deep stacking networks, and deep predictive coding networks, to name a few.

Apparatus and Method for Efficient Distributed Denoising

As described above, denoising has become a critical feature for real-time ray tracing with smooth, noiseless images. Rendering can be done across a distributed system on multiple devices, but so far the existing denoising frameworks all operate on a single instance on a single machine. If rendering is being done across multiple devices, they may not have all rendered pixels accessible for computing a denoised portion of the image.

A distributed denoising algorithm that works with both artificial intelligence (AI) and non-AI based denoising techniques is presented. Regions of the image are either already distributed across nodes from a distributed render operation, or split up and distributed from a single framebuffer. Ghost regions of neighboring regions needed for computing sufficient denoising are collected from neighboring nodes when needed, and the final resulting tiles are composited into a final image.

Distributed Processing

Figure 20:
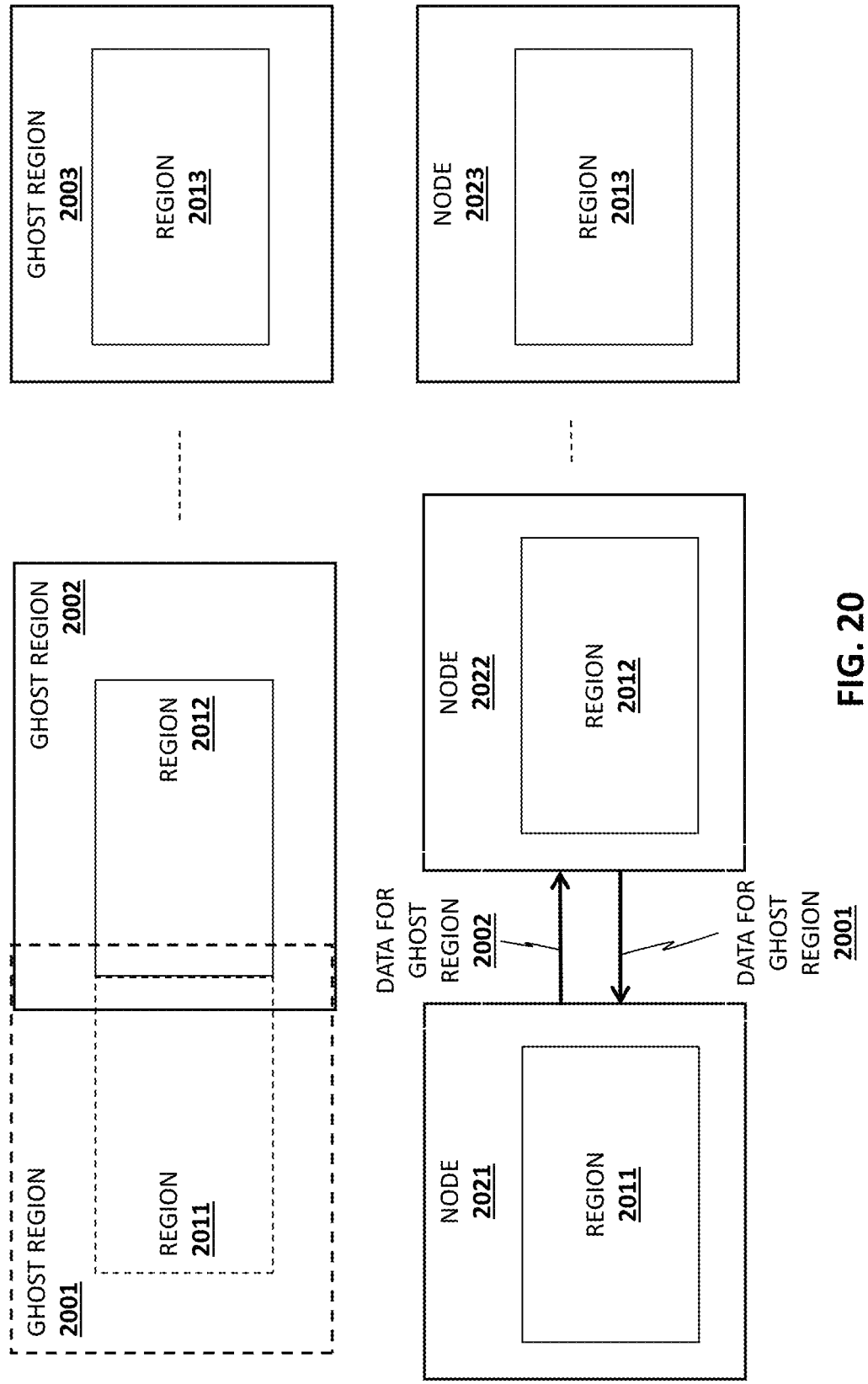
FIG. 20 illustrates how nodes exchange ghost region data to perform distributed denoising operations.

FIG. 20 illustrates multiple nodes 2021-2023 that perform rendering. While only three nodes are illustrated for simplicity, the underlying principles of the invention are not limited to any particular number of nodes. In fact, a single node may be used to implement certain embodiments of the invention.

Nodes 2021-2023 each render a portion of an image, resulting in regions 2011-2013 in this example. While rectangular regions 2011-2013 are shown in FIG. 20, regions of any shape may be used and any device can process any number of regions. The regions that are needed by a node to perform a sufficiently smooth denoising operation are referred to as ghost regions 2011-2013. In other words, the ghost regions 2001-2003 represent the entirety of data required to perform denoising at a specified level of quality. Lowering the quality level reduces the size of the ghost region and therefore the amount of data required and raising the quality level increases the ghost region and corresponding data required.

If a node such as node 2021 does have a local copy of a portion of the ghost region 2001 required to denoise its region 2011 at a specified level of quality, the node will retrieve the required data from one or more "adjacent" nodes, such as node 2022 which owns a portion of ghost region 2001 as illustrated. Similarly, if node 2022 does have a local copy of a portion of ghost region 2002 required to denoise its region 2012 at the specified level of quality, node 2022 will retrieve the required ghost region data 2032 from node 2021. The retrieval may be performed over a bus, an interconnect, a high speed memory fabric, a network (e.g., high speed Ethernet), or may even be an on-chip interconnect in a multi-core chip capable of distributing rendering work among a plurality of cores (e.g., used for rendering large images at either extreme resolutions or time varying). Each node 2021-2023 may comprise an individual execution unit or specified set of execution units within a graphics processor.

The specific amount of data to be sent is dependent on the denoising techniques being used. Moreover, the data from the ghost region may include any data needed to improve denoising of each respective region. For example, the ghost region data may include image colors/wavelengths, intensity/alpha data, and/or normals. However, the underlying principles of the invention are not limited to any particular set of ghost region data.

ADDITIONAL DETAILS

For slower networks or interconnects, compression of this data can be utilized using existing general purpose lossless or lossy compression. Examples include, but are not limited to, zlib, gzip, and Lempel-Ziv-Markov chain algorithm (LZMA). Further content-specific compression may be used by noting that the delta in ray hit information between frames can be quite sparse, and only the samples that contribute to that delta need to be sent when the node already has the collected deltas from previous frames. These can be selectively pushed to nodes that collect those samples, i, or node i can request samples from other nodes. Lossless compression is used for certain types of data and program code while lossy data is used for other types of data.

Figure 21:
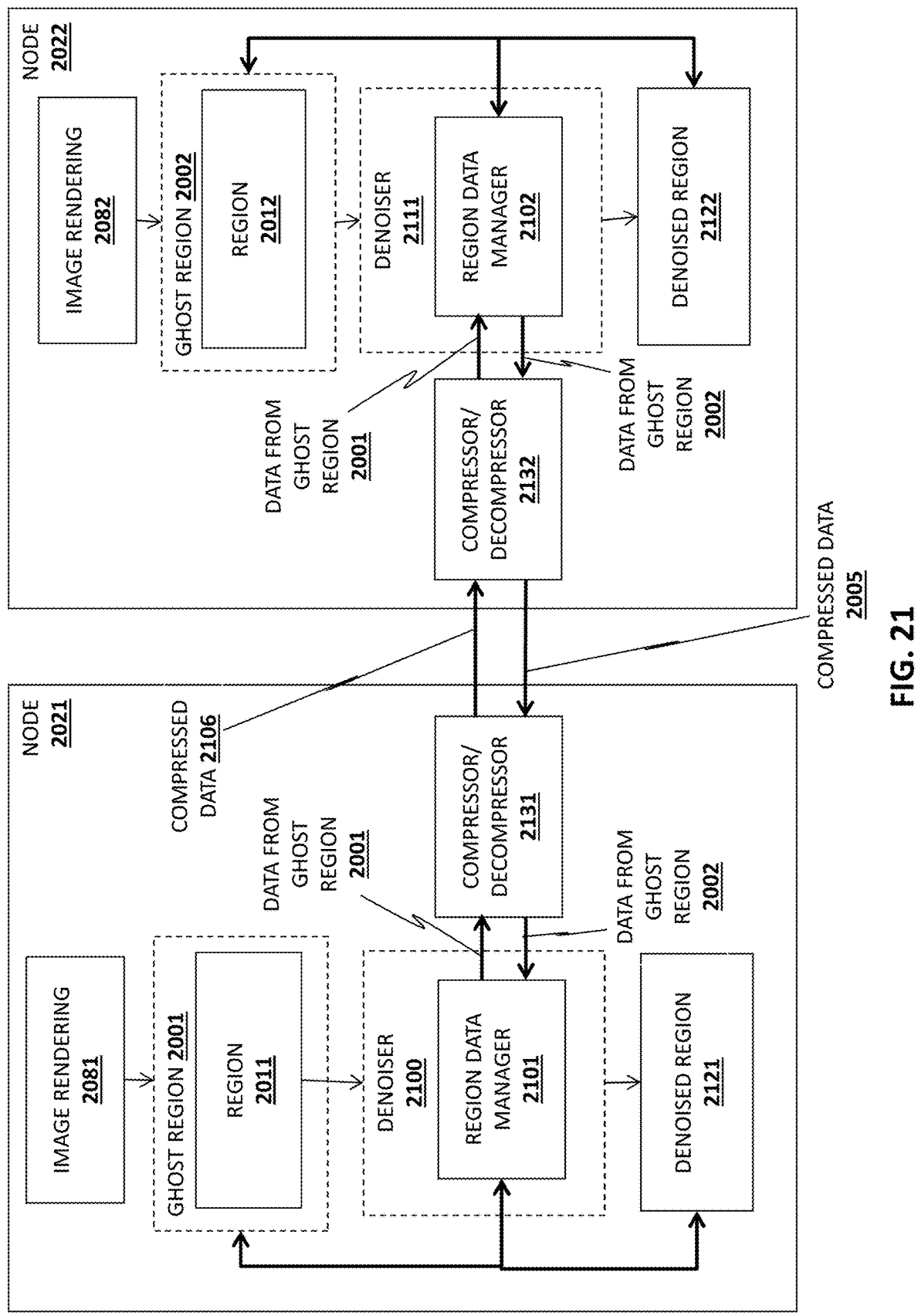
FIG. 21 illustrates an architecture in which image rendering and denoising operations are distributed across a plurality of nodes.

FIG. 21 illustrates additional details of the interactions between nodes 2021-2022. Each node 2021-2022 includes a ray tracing rendering circuitry 2081-2082 for rendering the respective image regions 2011-2012 and ghost regions 2001-2002. Denoisers 2100-2111 execute denoising operations on the regions 2011-2012, respectively, which each node 2021-2022 is responsible for rendering and denoising. The denoisers 2021-2022, for example, may comprise circuitry, software, or any combination thereof to generate the denoised regions 2121-2122, respectively. As mentioned, when generating denoised regions the denoisers 2021-2022 may need to rely on data within a ghost region owned by a different node (e.g., denoiser 2100 may need data from ghost region 2002 owned by node 2022).

Thus, the denoisers 2100-2111 may generate the denoised regions 2121-2122 using data from regions 2011-2012 and ghost regions 2001-2002, respectively, at least a portion of which may be received from another node. Region data managers 2101-2102 may manage data transfers from ghost regions 2001-2002 as described herein. Compressor/decompressor units 2131-2132 may perform compression and decompression of the ghost region data exchanged between the nodes 2021-2022, respectively.

For example, region data manager 2101 of node 2021 may, upon request from node 2022, send data from ghost region 2001 to compressor/decompressor 2131, which compresses the data to generate compressed data 2106 which it transmits to node 2022, thereby reducing bandwidth over the interconnect, network, bus, or other data communication link. Compressor/decompressor 2132 of node 2022 then decompresses the compressed data 2106 and denoiser 2111 uses the decompressed ghost data to generate a higher quality denoised region 2012 than would be possible with only data from region 2012. The region data manager 2102 may store the decompressed data from ghost region 2001 in a cache, memory, register file or other storage to make it available to the denoiser 2111 when generating the denoised region 2122. A similar set of operations may be performed to provide the data from ghost region 2002 to denoiser 2100 on node 2021 which uses the data in combination with data from region 2011 to generate a higher quality denoised region 2121.

Grab Data or Render

If the connection between devices such as nodes 2021-2022 is slow (i.e., lower than a threshold latency and/or threshold bandwidth), it may be faster to render ghost regions locally rather than requesting the results from other devices. This can be determined at run-time by tracking network transaction speeds and linearly extrapolated render times for the ghost region size. In such cases where it is faster to render out the entire ghost region, multiple devices may end up rendering the same portions of the image. The resolution of the rendered portion of the ghost regions may be adjusted based on the variance of the base region and the determined degree of blurring.

Load Balancing

Static and/or dynamic load balancing schemes may be used to distribute the processing load among the various nodes 2021-2023. For dynamic load balancing, the variance determined by the denoising filter may require both more time in denoising but drive the amount of samples used to render a particular region of the scene, with low variance and blurry regions of the image requiring fewer samples. The specific regions assigned to specific nodes may be adjusted dynamically based on data from previous frames or dynamically communicated across devices as they are rendering so that all devices will have the same amount of work.

Figure 22:
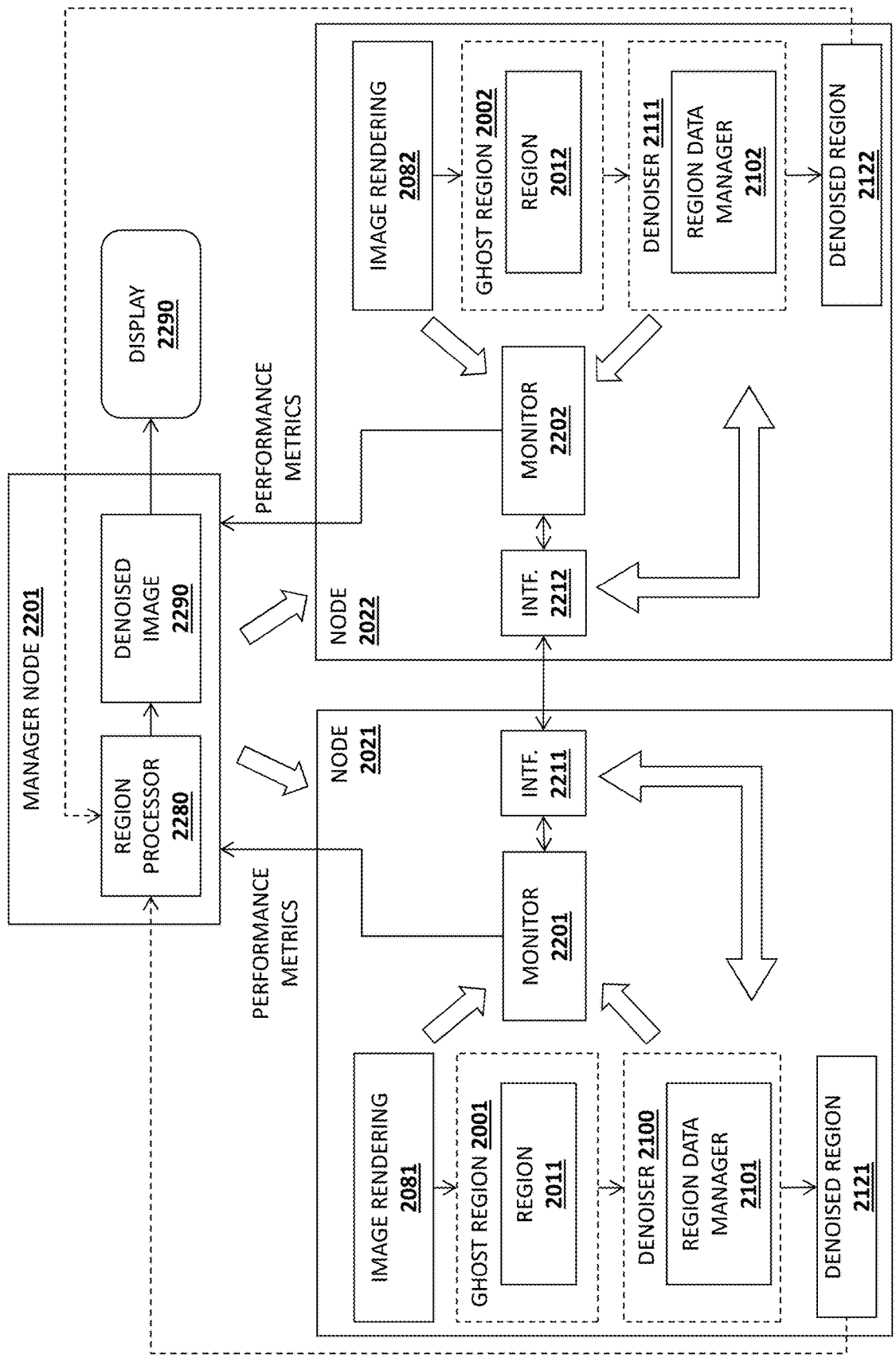
FIG. 22 illustrates additional details of an architecture for distributed rendering and denoising.

FIG. 22 illustrates how a monitor 2201-2202 running on each respective node 2021-2022 collects performance metric data including, but not limited to, the time consumed to transmit data over the network interface 2211-2212, the time consumed when denoising a region (with and without ghost region data), and the time consumed rendering each region/ghost region. The monitors 2201-2202 report these performance metrics back to a manager or load balancer node 2201, which analyzes the data to identify the current workload on each node 2021-2022 and potentially determines a more efficient mode of processing the various denoised regions 2121-2122. The manager node 2201 then distributes new workloads for new regions to the nodes 2021-2022 in accordance with the detected load. For example, the manager node 2201 may transmit more work to those nodes which are not heavily loaded and/or reallocate work from those nodes which are overloaded. In addition, the load balancer node 2201 may transmit a reconfiguration command to adjust the specific manner in which rendering and/or denoising is performed by each of the nodes (some examples of which are described above).

Determining Ghost Regions

The sizes and shapes of the ghost regions 2001-2002 may be determined based on the denoising algorithm implemented by the denoisers 2100-2111. Their respective sizes can then be dynamically modified based on the detected variance of the samples being denoised. The learning algorithm used for AI denoising itself may be used for determining appropriate region sizes, or in other cases such as a bilateral blur the predetermined filter width will determine the size of the ghost regions 2001-2002. In an exemplary implementation which uses a learning algorithm, the machine learning engine may be executed on the manager node 2201 and/or portions of the machine learning may be executed on each of the individual nodes 2021-2023 (see, e.g., FIGS. 18A-B and associated text above).

Gathering the Final Image

The final image may be generated by gathering the rendered and denoised regions from each of the nodes 2021-2023, without the need for the ghost regions or normals. In FIG. 22, for example, the denoised regions 2121-2122 are transmitted to regions processor 2280 of the manager node 2201 which combines the regions to generate the final denoised image 2290, which is then displayed on a display 2290. The region processor 2280 may combine the regions using a variety of 2D compositing techniques. Although illustrated as separate components, the region processor 2280 and denoised image 2290 may be integral to the display 2290. The various nodes 2021-2022 may use a direct-send technique to transmit the denoised regions 2121-2122 and potentially using various lossy or lossless compression of the region data.

AI denoising is still a costly operation and as gaming moves into the cloud. As such, distributing processing of denoising across multiple nodes 2021-2022 may become required for achieving real-time frame rates for traditional gaming or virtual reality (VR) which requires higher frame rates. Movie studios also often render in large render farms which can be utilized for faster denoising.

Figure 23:
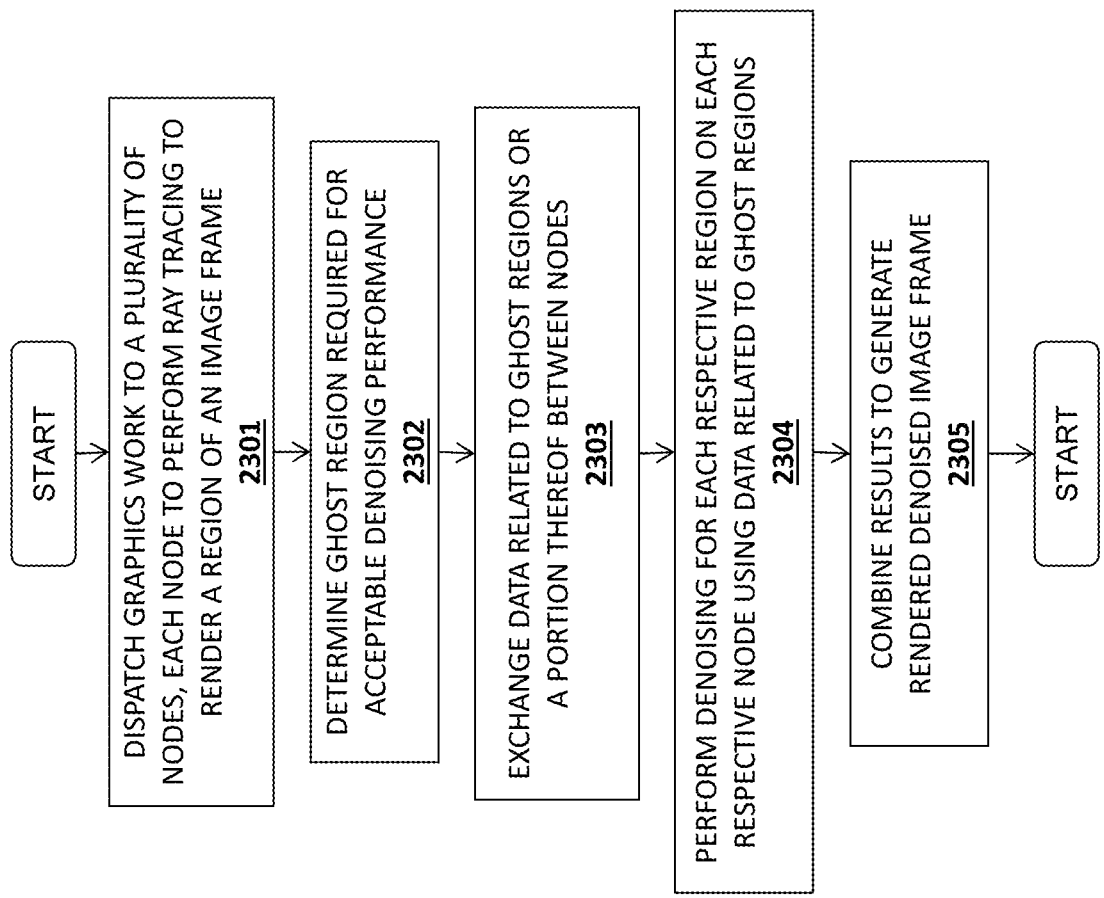
FIG. 23 illustrates a method for performing distributed rendering and denoising.

An exemplary method for performing distributed rendering and denoising is illustrated in FIG. 23. The method may be implemented within the context of the system architectures described above, but is not limited to any particular system architecture.

At 2301, graphics work is dispatched to a plurality of nodes which perform ray tracing operations to render a region of an image frame. Each node may already have data required to perform the operations in memory. For example, two or more of the nodes may share a common memory or the local memories of the nodes may already have stored data from prior ray tracing operations. Alternatively, or in addition, certain data may be transmitted to each node.

At 2302, the "ghost region" required for a specified level of denoising (i.e., at an acceptable level of performance) is determined. The ghost region comprises any data required to perform the specified level of denoising, including data owned by one or more other nodes.

At 2303, data related to the ghost regions (or portions thereof) is exchanged between nodes. At 2304 each node performs denoising on its respective region (e.g., using the exchanged data) and at 2305 the results are combined to generate the final denoised image frame.

A manager node or primary node such as shown in FIG. 22 may dispatche the work to the nodes and then combine the work performed by the nodes to generate the final image frame. A peer-based architecture can be used where the nodes are peers which exchange data to render and denoise the final image frame.

The nodes described herein (e.g., nodes 2021-2023) may be graphics processing computing systems interconnected via a high speed network. Alternatively, the nodes may be individual processing elements coupled to a high speed memory fabric. All of the nodes may share a common virtual memory space and/or a common physical memory.

Alternatively, the nodes may be a combination of CPUs and GPUs. For example, the manager node 2201 described above may be a CPU and/or software executed on the CPU and the nodes 2021-2022 may be GPUs and/or software executed on the GPUs. Various different types of nodes may be used while still complying with the underlying principles of the invention.

Example Neural Network Implementations

There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 24:
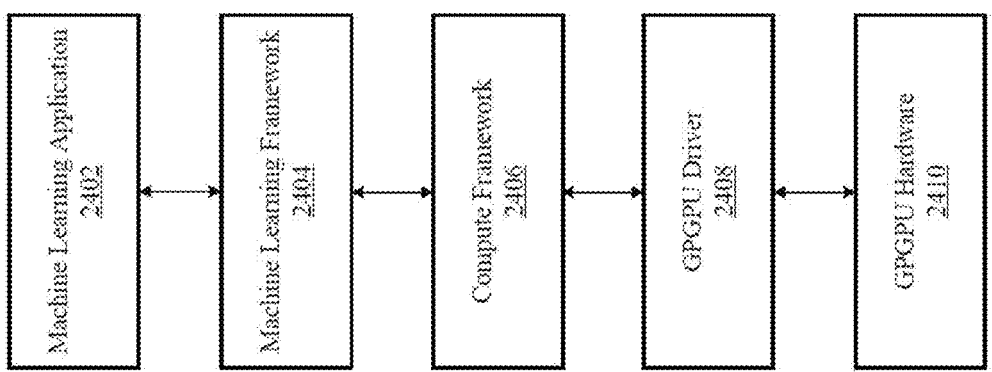
FIG. 24 illustrates a machine learning method.

FIG. 24 is a generalized diagram of a machine learning software stack 2400. A machine learning application 2402 can be configured to train a neural network using a training dataset or to use a trained deep neural network to implement machine intelligence. The machine learning application 2402 can include training and inference functionality for a neural network and/or specialized software that can be used to train a neural network before deployment. The machine learning application 2402 can implement any type of machine intelligence including but not limited to image recognition, mapping and localization, autonomous navigation, speech synthesis, medical imaging, or language translation.

Hardware acceleration for the machine learning application 2402 can be enabled via a machine learning framework 2404. The machine learning framework 2404 may be implemented on hardware described herein, such as the processing system 100 comprising the processors and components described herein. The elements described for FIG. 24 having the same or similar names as the elements of any other figure herein describe the same elements as in the other figures, can operate or function in a manner similar to that, can comprise the same components, and can be linked to other entities, as those described elsewhere herein, but are not limited to such. The machine learning framework 2404 can provide a library of machine learning primitives. Machine learning primitives are basic operations that are commonly performed by machine learning algorithms. Without the machine learning framework 2404, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 2404. Exemplary primitives include tensor convolutions, activation functions, and pooling, which are computational operations that are performed while training a convolutional neural network (CNN). The machine learning framework 2404 can also provide primitives to implement basic linear algebra subprograms performed by many machine-learning algorithms, such as matrix and vector operations.

The machine learning framework 2404 can process input data received from the machine learning application 2402 and generate the appropriate input to a compute framework 2406. The compute framework 2406 can abstract the underlying instructions provided to the GPGPU driver 2408 to enable the machine learning framework 2404 to take advantage of hardware acceleration via the GPGPU hardware 2410 without requiring the machine learning framework 2404 to have intimate knowledge of the architecture of the GPGPU hardware 2410. Additionally, the compute framework 2406 can enable hardware acceleration for the machine learning framework 2404 across a variety of types and generations of the GPGPU hardware 2410.

GPGPU Machine Learning Acceleration

Figure 25:
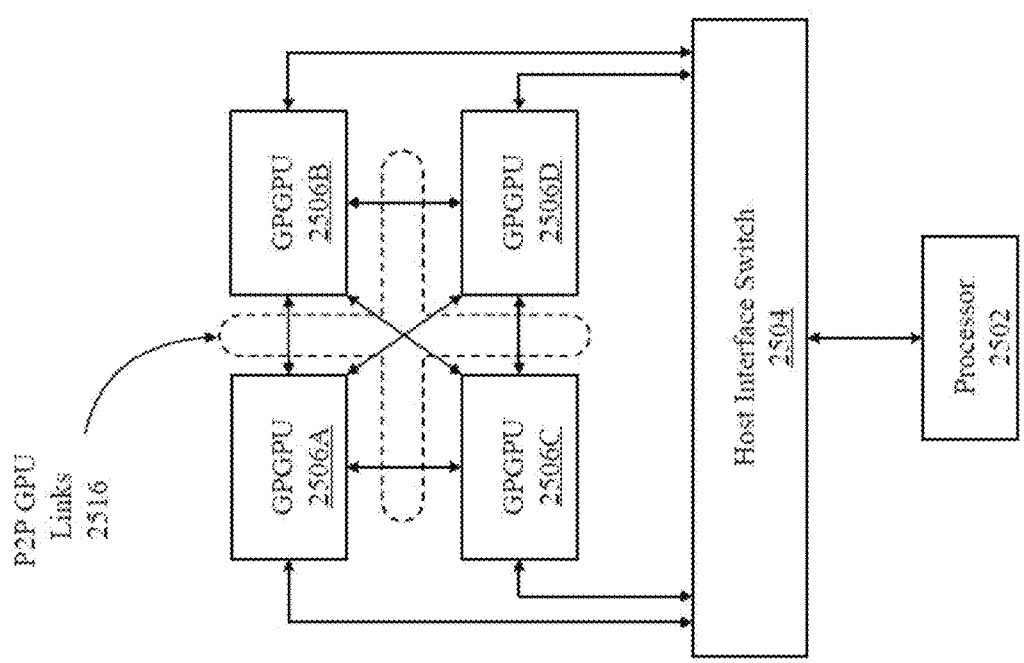
FIG. 25 illustrates a plurality of interconnected general purpose graphics processors.

FIG. 25 illustrates a multi-GPU computing system 2500, which may be a variant of the processing system 100. Therefore, the disclosure of any features in combination with the processing system 100 herein also discloses a corresponding combination with multi-GPU computing system 2500, but is not limited to such. The elements of FIG. 25 having the same or similar names as the elements of any other figure herein describe the same elements as in the other figures, can operate or function in a manner similar to that, can comprise the same components, and can be linked to other entities, as those described elsewhere herein, but are not limited to such. The multi-GPU computing system 2500 can include a processor 2502 coupled to multiple GPGPUs 2506A-D via a host interface switch 2504. The host interface switch 2504 may for example be a PCI express switch device that couples the processor 2502 to a PCI express bus over which the processor 2502 can communicate with the set of GPGPUs 2506A-D. Each of the multiple GPGPUs 2506A-D can be an instance of the GPGPU described above. The GPGPUs 2506A-D can interconnect via a set of high-speed point to point GPU to GPU links 2516. The high-speed GPU to GPU links can connect to each of the GPGPUs 2506A-D via a dedicated GPU link. The P2P GPU links 2516 enable direct communication between each of the GPGPUs 2506A-D without requiring communication over the host interface bus to which the processor 2502 is connected. With GPU-to-GPU traffic directed to the P2P GPU links, the host interface bus remains available for system memory access or to communicate with other instances of the multi-GPU computing system 2500, for example, via one or more network devices. Instead of connecting the GPGPUs 2506A-D to the processor 2502 via the host interface switch 2504, the processor 2502 can include direct support for the P2P GPU links 2516 and, thus, connect directly to the GPGPUs 2506A-D.

Machine Learning Neural Network Implementations

The computing architecture described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 26:
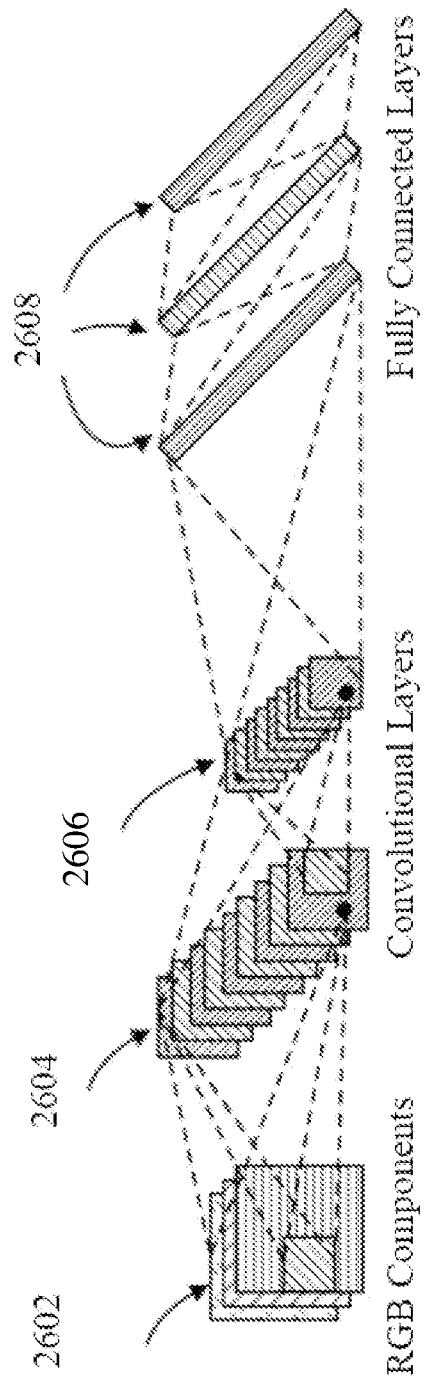
FIG. 26 illustrates a set of convolutional layers and fully connected layers for a machine learning implementation.
Figure 27:
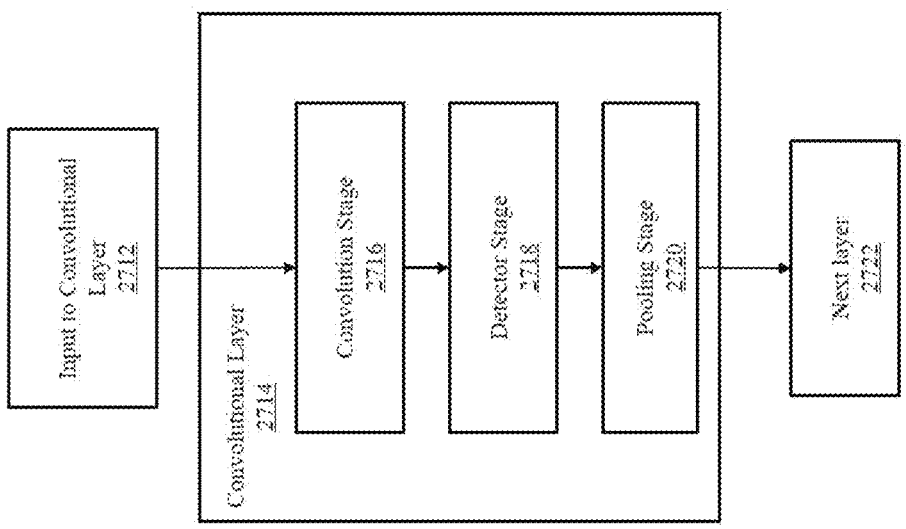
FIG. 27 illustrates an example of a convolutional layer.

FIGS. 26-27 illustrate an exemplary convolutional neural network. FIG. 26 illustrates various layers within a CNN. As shown in FIG. 26, an exemplary CNN used to model image processing can receive input 2602 describing the red, green, and blue (RGB) components of an input image. The input 2602 can be processed by multiple convolutional layers (e.g., convolutional layer 2604, convolutional layer 2606). The output from the multiple convolutional layers may optionally be processed by a set of fully connected layers 2608. Neurons in a fully connected layer have full connections to all activations in the previous layer, as previously described for a feedforward network. The output from the fully connected layers 2608 can be used to generate an output result from the network. The activations within the fully connected layers 2608 can be computed using matrix multiplication instead of convolution. Not all CNN implementations make use of fully connected layers. For example, in some implementations the convolutional layer 2606 can generate output for the CNN.

The convolutional layers are sparsely connected, which differs from traditional neural network configuration found in the fully connected layers 2608. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 27 illustrates exemplary computation stages within a convolutional layer of a CNN. Input to a convolutional layer 2712 of a CNN can be processed in three stages of a convolutional layer 2714. The three stages can include a convolution stage 2716, a detector stage 2718, and a pooling stage 2720. The convolution layer 2714 can then output data to a successive convolutional layer. The final convolutional layer of the network can generate output feature map data or provide input to a fully connected layer, for example, to generate a classification value for the input to the CNN.

In the convolution stage 2716 performs several convolutions in parallel to produce a set of linear activations. The convolution stage 2716 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 2716 defines a set of linear activations that are processed by successive stages of the convolutional layer 2714.

The linear activations can be processed by a detector stage 2718. In the detector stage 2718, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0,x)$, such that the activation is thresholded at zero.

The pooling stage 2720 uses a pooling function that replaces the output of the convolutional layer 2606 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 2720, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 2714 can then be processed by the next layer 2722. The next layer 2722 can be an additional convolutional layer or one of the fully connected layers 2708. For example, the first convolutional layer 2604 of FIG. 26 can output to the second convolutional layer 2606, while the second convolutional layer can output to a first layer of the fully connected layers 2608.

Figure 28:
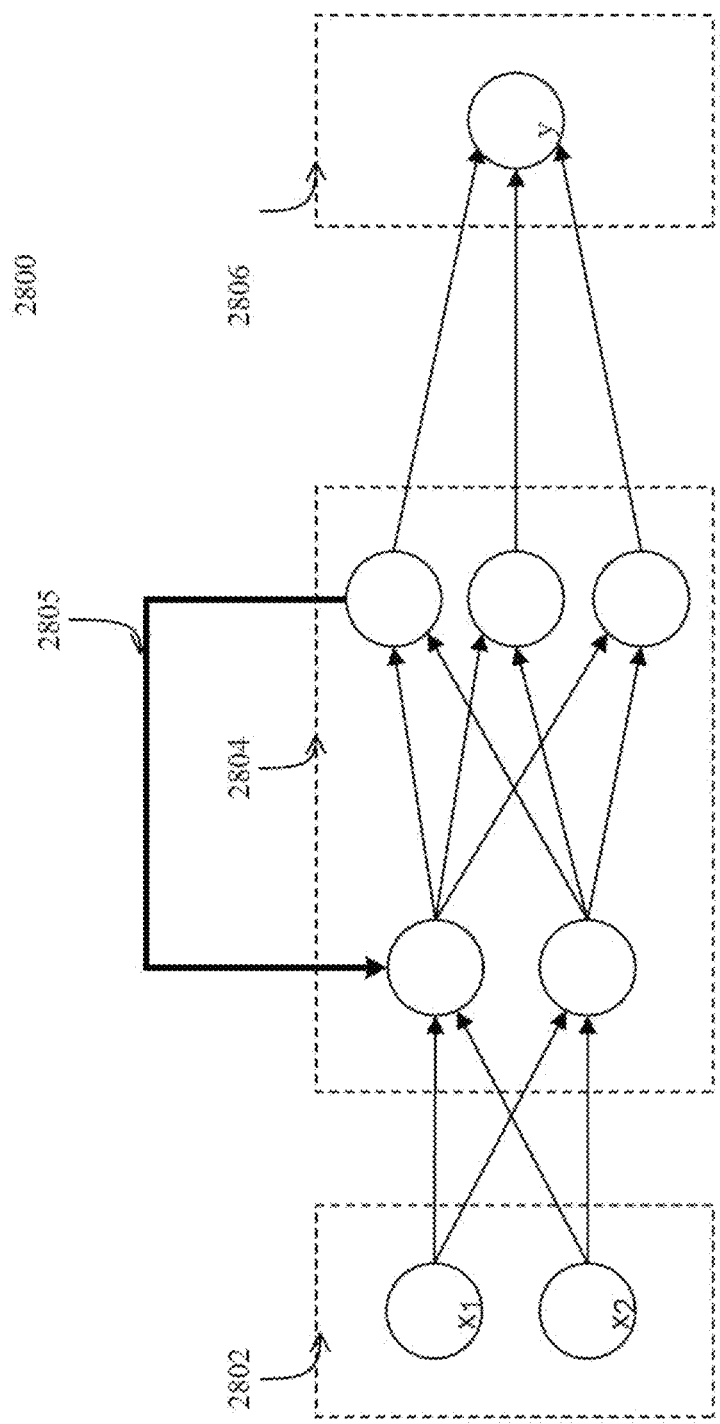
FIG. 28 illustrates an example of a set of interconnected nodes in a machine learning implementation.

FIG. 28 illustrates an exemplary recurrent neural network 2800. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 2800 can be described has having an input layer 2802 that receives an input vector, hidden layers 2804 to implement a recurrent function, a feedback mechanism 2805 to enable a 'memory' of previous states, and an output layer 2806 to output a result. The RNN 2800 operates based on time-steps. The state of the RNN at a given time step is influenced based on the previous time step via the feedback mechanism 2805. For a given time step, the state of the hidden layers 2804 is defined by the previous state and the input at the current time step. An initial input (x1) at a first time step can be processed by the hidden layer 2804. A second input (x2) can be processed by the hidden layer 2804 using state information that is determined during the processing of the initial input (x1). A given state can be computed as $s_t = f(Ux_t + Ws_{t-1})$, where U and W are parameter matrices. The function f is generally a non-linearity, such as the hyperbolic tangent function (Tanh) or a variant of the rectifier function $f(x) = \max(0,x)$. However, the specific mathematical function used in the hidden layers 2804 can vary depending on the specific implementation details of the RNN 2800.

In addition to the basic CNN and RNN networks described, variations on those networks may be enabled. One example RNN variant is the long short term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 29:
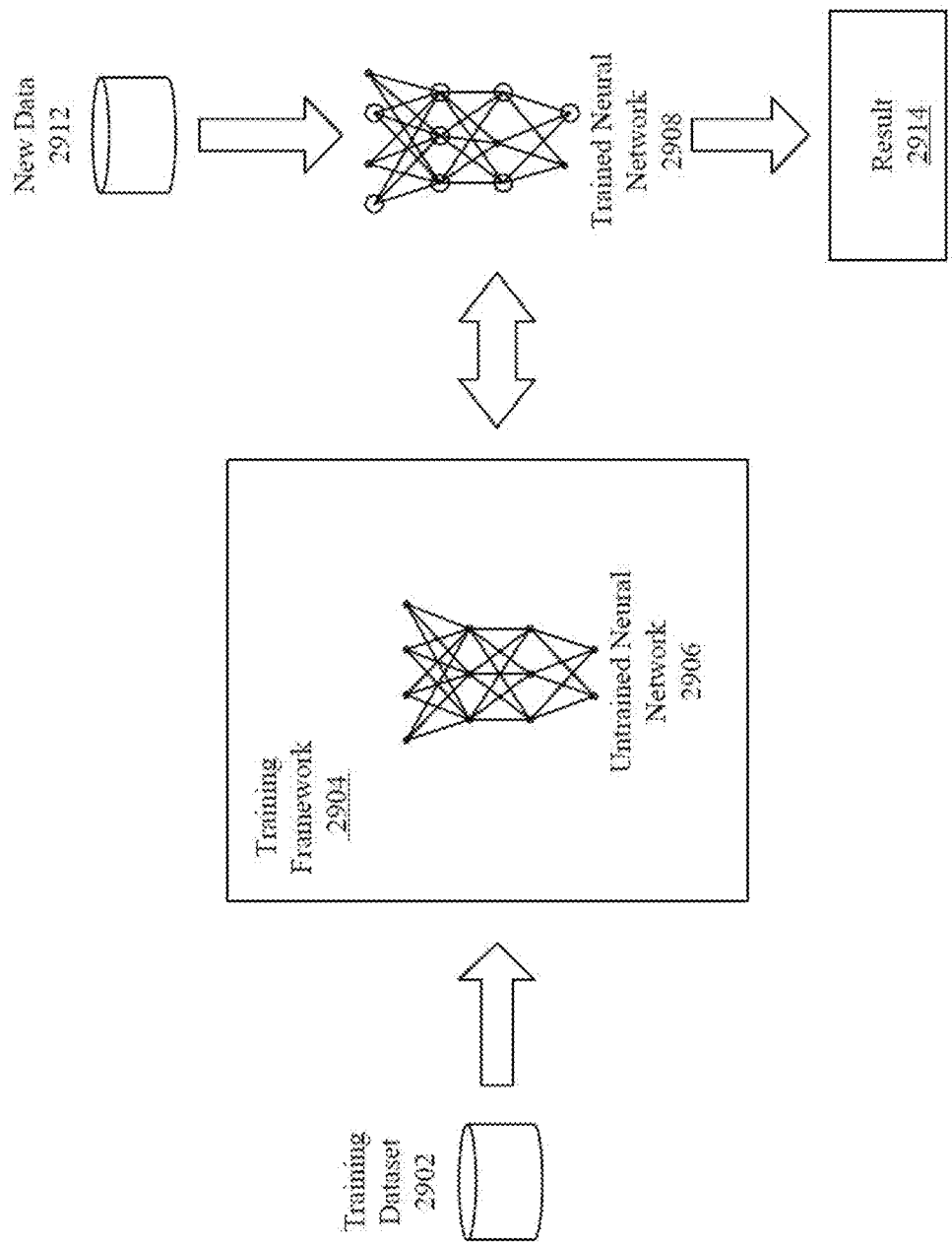
FIG. 29 illustrates a training framework within which a neural network learns using a training dataset.

FIG. 29 illustrates training and deployment of a deep neural network. Once a given network has been structured for a task the neural network is trained using a training dataset 2902. Various training frameworks 2904 have been developed to enable hardware acceleration of the training process. For example, the machine learning framework described above may be configured as a training framework. The training framework 2904 can hook into an untrained neural network 2906 and enable the untrained neural net to be trained using the parallel processing resources described herein to generate a trained neural net 2908.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 2902 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 2904 can adjust to adjust the weights that control the untrained neural network 2906. The training framework 2904 can provide tools to monitor how well the untrained neural network 2906 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural net 2908. The trained neural network 2908 can then be deployed to implement any number of machine learning operations.

Unsupervised learning is a learning method in which the network attempts to train itself using unlabeled data. Thus, for unsupervised learning the training dataset 2902 will include input data without any associated output data. The untrained neural network 2906 can learn groupings within the unlabeled input and can determine how individual inputs are related to the overall dataset. Unsupervised training can be used to generate a self-organizing map, which is a type of trained neural network 2908 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 2902 includes a mix of labeled and unlabeled data of the same distribution. Incremental learning is a variant of supervised learning in which input data is continuously used to further train the model. Incremental learning enables the trained neural network 2908 to adapt to the new data 2912 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 30A:
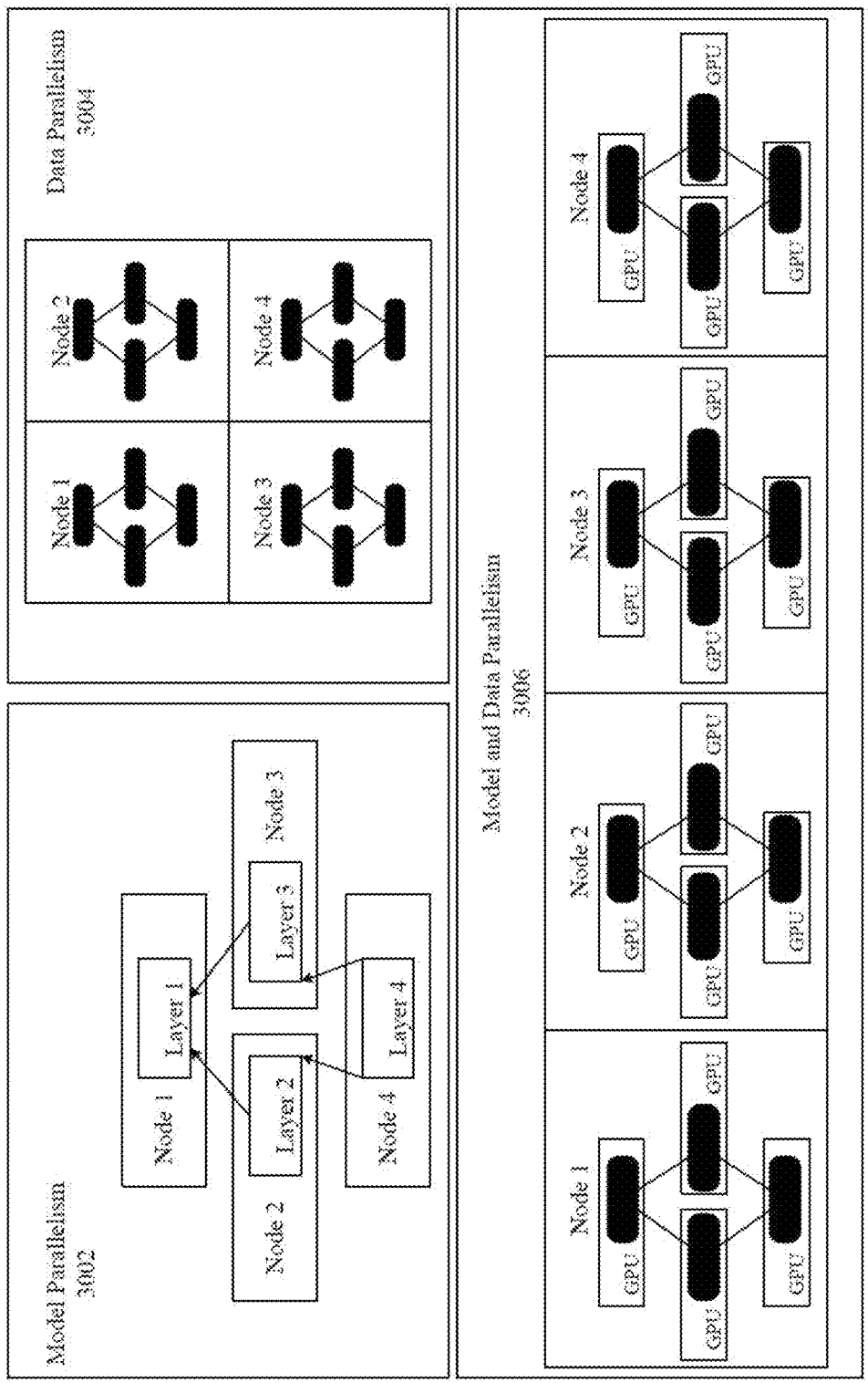
FIG. 30A illustrates examples of model parallelism and data parallelism.

FIG. 30A is a block diagram illustrating distributed learning. Distributed learning is a training model that uses multiple distributed computing nodes such as the nodes described above to perform supervised or unsupervised training of a neural network. The distributed computational nodes can each include one or more host processors and one or more of the general-purpose processing nodes, such as a highly-parallel general-purpose graphics processing unit. As illustrated, distributed learning can be performed model parallelism 3002, data parallelism 3004, or a combination of model and data parallelism.

In model parallelism 3002, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 3004, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 3006 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the highly-parallel general-purpose graphics processing unit and/or the multi-GPU computing systems described herein. On the contrary, deployed machine learning platforms generally include lower power parallel processors suitable for use in products such as cameras, autonomous robots, and autonomous vehicles.

Figure 30B:
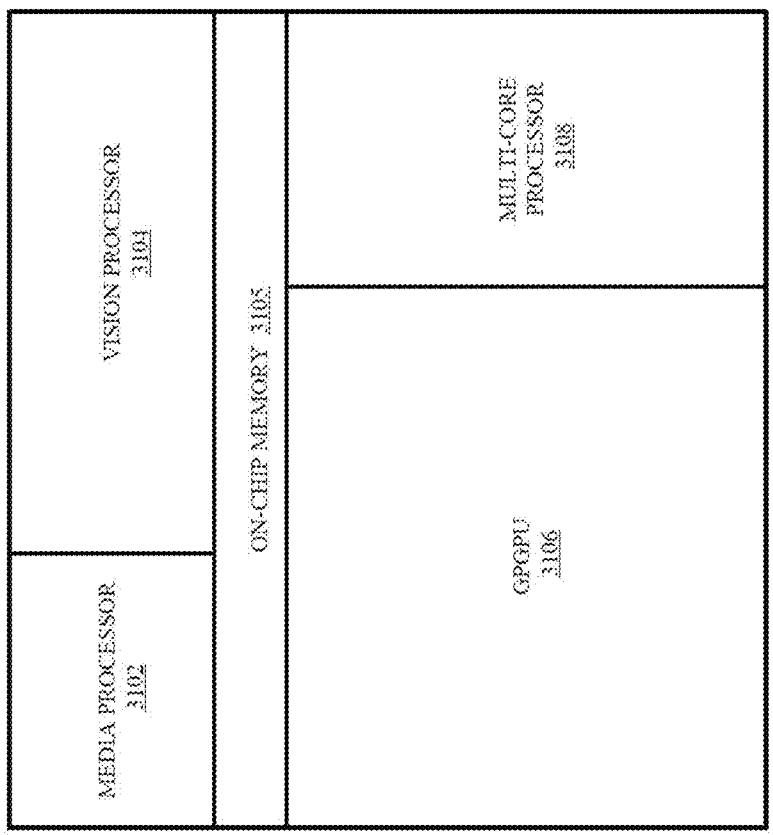
FIG. 30B illustrates a system on a chip (SoC)

FIG. 30B illustrates an exemplary inferencing system on a chip (SOC) 3100 suitable for performing inferencing using a trained model. The elements of FIG. 30B having the same or similar names as the elements of any other figure herein describe the same elements as in the other figures, can operate or function in a manner similar to that, can comprise the same components, and can be linked to other entities, as those described elsewhere herein, but are not limited to such. The SOC 3100 can integrate processing components including a media processor 3102, a vision processor 3104, a GPGPU 3106 and a multi-core processor 3108. The SOC 3100 can additionally include on-chip memory 3105 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 3100 can be used as a portion of the main control system for an autonomous vehicle. Where the SOC 3100 is configured for use in autonomous vehicles the SOC is designed and configured for compliance with the relevant functional safety standards of the deployment jurisdiction.

During operation, the media processor 3102 and vision processor 3104 can work in concert to accelerate computer vision operations. The media processor 3102 can enable low latency decode of multiple high-resolution (e.g., 4K, 8K) video streams. The decoded video streams can be written to a buffer in the on-chip-memory 3105. The vision processor 3104 can then parse the decoded video and perform preliminary processing operations on the frames of the decoded video in preparation of processing the frames using a trained image recognition model. For example, the vision processor 3104 can accelerate convolution operations for a CNN that is used to perform image recognition on the high-resolution video data, while back end model computations are performed by the GPGPU 3106.

The multi-core processor 3108 can include control logic to assist with sequencing and synchronization of data transfers and shared memory operations performed by the media processor 3102 and the vision processor 3104. The multi-core processor 3108 can also function as an application processor to execute software applications that can make use of the inferencing compute capability of the GPGPU 3106. For example, at least a portion of the navigation and driving logic can be implemented in software executing on the multi-core processor 3108. Such software can directly issue computational workloads to the GPGPU 3106 or the computational workloads can be issued to the multi-core processor 3108, which can offload at least a portion of those operations to the GPGPU 3106.

The GPGPU 3106 can include processing clusters such as a low power configuration of the processing clusters DPLAB06A-DPLAB06H within the highly-parallel general-purpose graphics processing unit DPLAB00. The processing clusters within the GPGPU 3106 can support instructions that are specifically optimized to perform inferencing computations on a trained neural network. For example, the GPGPU 3106 can support instructions to perform low precision computations such as 8-bit and 4-bit integer vector operations.

Ray Tracing Architecture

In one implementation, the graphics processor includes circuitry and/or program code for performing real-time ray tracing. A dedicated set of ray tracing cores may be included in the graphics processor to perform the various ray tracing operations described herein, including ray traversal and/or ray intersection operations. In addition to the ray tracing cores, multiple sets of graphics processing cores for performing programmable shading operations and multiple sets of tensor cores for performing matrix operations on tensor data may also be included.

Figure 31:
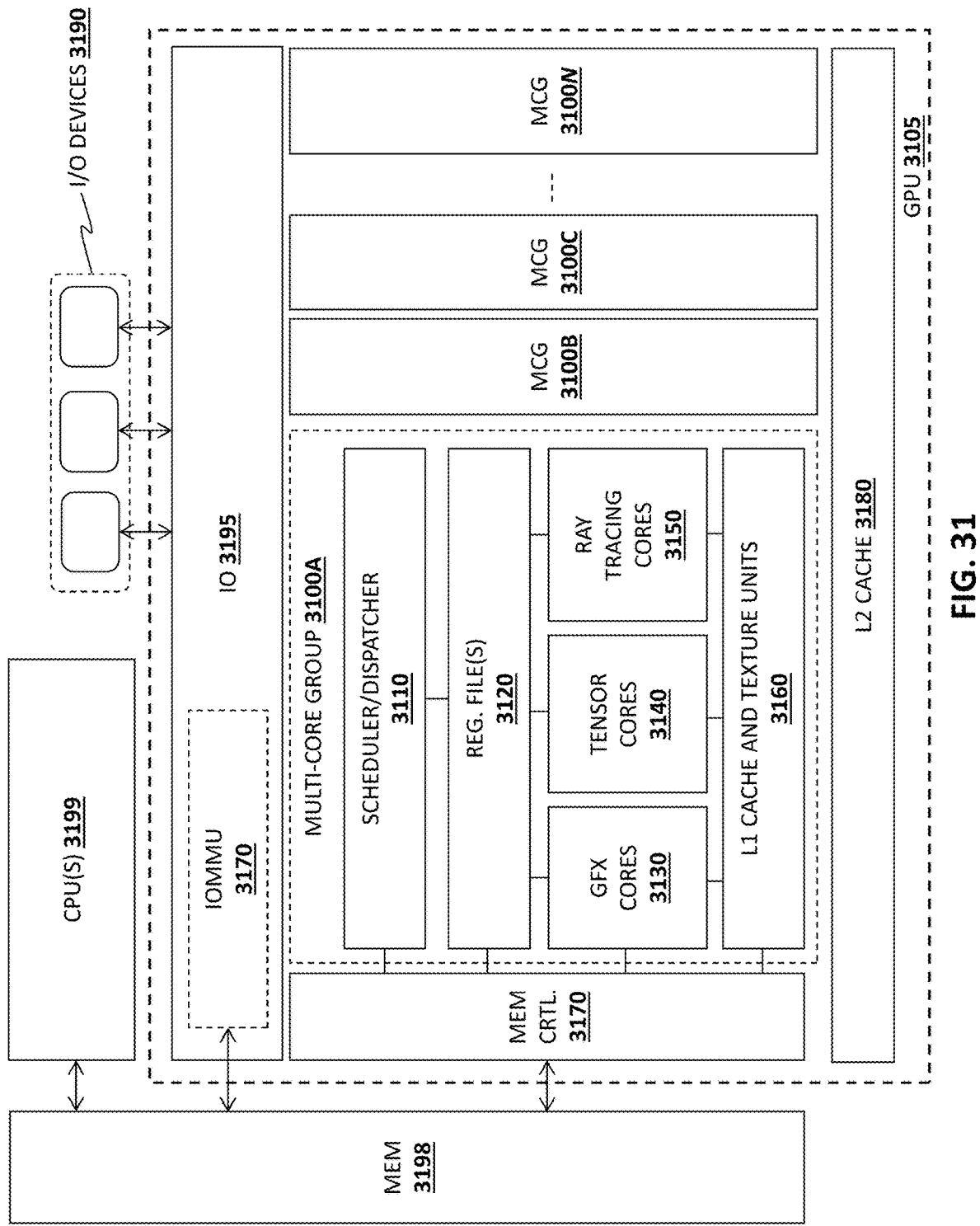
FIG. 31 illustrates a processing architecture which includes ray tracing cores and tensor cores.

FIG. 31 illustrates an exemplary portion of one such graphics processing unit (GPU) 3105 which includes dedicated sets of graphics processing resources arranged into multi-core groups 3100A-N. The graphics processing unit (GPU) 3105 may be a variant of the graphics processor 300, the GPGPU 1340 and/or any other graphics processor described herein. Therefore, the disclosure of any features for graphics processors also discloses a corresponding combination with the GPU 3105, but is not limited to such. Moreover, the elements of FIG. 31 having the same or similar names as the elements of any other figure herein describe the same elements as in the other figures, can operate or function in a manner similar to that, can comprise the same components, and can be linked to other entities, as those described elsewhere herein, but are not limited to such. While the details of only a single multi-core group 3100A are provided, it will be appreciated that the other multi-core groups 3100B-N may be equipped with the same or similar sets of graphics processing resources.

As illustrated, a multi-core group 3100A may include a set of graphics cores 3130, a set of tensor cores 3140, and a set of ray tracing cores 3150. A scheduler/dispatcher 3110 schedules and dispatches the graphics threads for execution on the various cores 3130, 3140, 3150. A set of register files 3120 store operand values used by the cores 3130, 3140, 3150 when executing the graphics threads. These may include, for example, integer registers for storing integer values, floating point registers for storing floating point values, vector registers for storing packed data elements (integer and/or floating point data elements) and tile registers for storing tensor/matrix values. The tile registers may be implemented as combined sets of vector registers.

One or more Level 1 (L1) caches and texture units 3160 store graphics data such as texture data, vertex data, pixel data, ray data, bounding volume data, etc, locally within each multi-core group 3100A. A Level 2 (L2) cache 3180 shared by all or a subset of the multi-core groups 3100A-N stores graphics data and/or instructions for multiple concurrent graphics threads. As illustrated, the L2 cache 3180 may be shared across a plurality of multi-core groups 3100A-N. One or more memory controllers 3170 couple the GPU 3105 to a memory 3198 which may be a system memory (e.g., DRAM) and/or a local graphics memory (e.g., GDDR6 memory).

Input/output (IO) circuitry 3195 couples the GPU 3105 to one or more IO devices 3195 such as digital signal processors (DSPs), network controllers, or user input devices. An on-chip interconnect may be used to couple the I/O devices 3190 to the GPU 3105 and memory 3198. One or more IO memory management units (IOMMUs) 3170 of the IO circuitry 3195 couple the IO devices 3190 directly to the system memory 3198. The IOMMU 3170 may manage multiple sets of page tables to map virtual addresses to physical addresses in system memory 3198. Additionally, the IO devices 3190, CPU(s) 3199, and GPU(s) 3105 may share the same virtual address space.

The IOMMU 3170 may also support virtualization. In this case, it may manage a first set of page tables to map guest/graphics virtual addresses to guest/graphics physical addresses and a second set of page tables to map the guest/graphics physical addresses to system/host physical addresses (e.g., within system memory 3198). The base addresses of each of the first and second sets of page tables may be stored in control registers and swapped out on a context switch (e.g., so that the new context is provided with access to the relevant set of page tables). While not illustrated in FIG. 31, each of the cores 3130, 3140, 3150 and/or multi-core groups 3100A-N may include translation lookaside buffers (TLBs) to cache guest virtual to guest physical translations, guest physical to host physical translations, and guest virtual to host physical translations.

The CPUs 3199, GPUs 3105, and IO devices 3190 can be integrated on a single semiconductor chip and/or chip package. The illustrated memory 3198 may be integrated on the same chip or may be coupled to the memory controllers 3170 via an off-chip interface. In one implementation, the memory 3198 comprises GDDR6 memory which shares the same virtual address space as other physical system-level memories, although the underlying principles of the invention are not limited to this specific implementation.

The tensor cores 3140 may include a plurality of execution units specifically designed to perform matrix operations, which are the fundamental compute operation used to perform deep learning operations. For example, simultaneous matrix multiplication operations may be used for neural network training and inferencing. The tensor cores 3140 may perform matrix processing using a variety of operand precisions including single precision floating-point (e.g., 32 bits), half-precision floating point (e.g., 16 bits), integer words (16 bits), bytes (8 bits), and half-bytes (4 bits). A neural network implementation may also extract features of each rendered scene, potentially combining details from multiple frames, to construct a high-quality final image.

In deep learning implementations, parallel matrix multiplication work may be scheduled for execution on the tensor cores 3140. The training of neural networks, in particular, requires a significant number matrix dot product operations. In order to process an inner-product formulation of an N× N×N matrix multiply, the tensor cores 3140 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 3140 to ensure that the most efficient precision is used for different workloads (e.g., such as inferencing workloads which can tolerate quantization to bytes and half-bytes).

The ray tracing cores 3150 may be used to accelerate ray tracing operations for both real-time ray tracing and non-real-time ray tracing implementations. In particular, the ray tracing cores 3150 may include ray traversal/intersection circuitry for performing ray traversal using bounding volume hierarchies (BVHs) and identifying intersections between rays and primitives enclosed within the BVH volumes. The ray tracing cores 3150 may also include circuitry for performing depth testing and culling (e.g., using a Z buffer or similar arrangement). In one implementation, the ray tracing cores 3150 perform traversal and intersection operations in concert with the image denoising techniques described herein, at least a portion of which may be executed on the tensor cores 3140. For example, the tensor cores 3140 may implement a deep learning neural network to perform denoising of frames generated by the ray tracing cores 3150. However, the CPU(s) 3199, graphics cores 3130, and/or ray tracing cores 3150 may also implement all or a portion of the denoising and/or deep learning algorithms.

In addition, as described above, a distributed approach to denoising may be employed in which the GPU 3105 is in a computing device coupled to other computing devices over a network or high speed interconnect. The interconnected computing devices may additionally share neural network learning/training data to improve the speed with which the overall system learns to perform denoising for different types of image frames and/or different graphics applications.

The ray tracing cores 3150 may process all BVH traversal and ray-primitive intersections, saving the graphics cores 3130 from being overloaded with thousands of instructions per ray. Each ray tracing core 3150 may include a first set of specialized circuitry for performing bounding box tests (e.g., for traversal operations) and a second set of specialized circuitry for performing the ray-triangle intersection tests (e.g., intersecting rays which have been traversed). Thus, the multi-core group 3100A can simply launch a ray probe, and the ray tracing cores 3150 independently perform ray traversal and intersection and return hit data (e.g., a hit, no hit, multiple hits, etc) to the thread context. The other cores 3130, 3140 may be freed to perform other graphics or compute work while the ray tracing cores 3150 perform the traversal and intersection operations.

Each ray tracing core 3150 may include a traversal unit to perform BVH testing operations and an intersection unit which performs ray-primitive intersection tests. The intersection unit may then generate a "hit", "no hit", or "multiple hit" response, which it provides to the appropriate thread. During the traversal and intersection operations, the execution resources of the other cores (e.g., graphics cores 3130 and tensor cores 3140) may be freed to perform other forms of graphics work.

A hybrid rasterization/ray tracing approach may also be used in which work is distributed between the graphics cores 3130 and ray tracing cores 3150.

The ray tracing cores 3150 (and/or other cores 3130, 3140) may include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 3150, graphics cores 3130 and tensor cores 3140 is Vulkan 1.1.85. Note, however, that the underlying principles of the invention are not limited to any particular ray tracing ISA.

In general, the various cores 3150, 3140, 3130 may support a ray tracing instruction set that includes instructions/functions for ray generation, closest hit, any hit, ray-primitive intersection, per-primitive and hierarchical bounding box construction, miss, visit, and exceptions. More specifically, ray tracing instructions can be included to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Hierarchical Beam Tracing

Bounding volume hierarchies are commonly used to improve the efficiency with which operations are performed on graphics primitives and other graphics objects. A BVH is a hierarchical tree structure which is built based on a set of geometric objects. At the top of the tree structure is the root node which encloses all of the geometric objects in a given scene. The individual geometric objects are wrapped in bounding volumes that form the leaf nodes of the tree. These nodes are then grouped as small sets and enclosed within larger bounding volumes. These, in turn, are also grouped and enclosed within other larger bounding volumes in a recursive fashion, eventually resulting in a tree structure with a single bounding volume, represented by the root node, at the top of the tree. Bounding volume hierarchies are used to efficiently support a variety of operations on sets of geometric objects, such as collision detection, primitive culling, and ray traversal/intersection operations used in ray tracing.

In ray tracing architectures, rays are traversed through a BVH to determine ray-primitive intersections. For example, if a ray does not pass through the root node of the BVH, then the ray does not intersect any of the primitives enclosed by the BVH and no further processing is required for the ray with respect to this set of primitives. If a ray passes through a first child node of the BVH but not the second child node, then the ray need not be tested against any primitives enclosed by the second child node. In this manner, a BVH provides an efficient mechanism to test for ray-primitive intersections.

Figure 32:
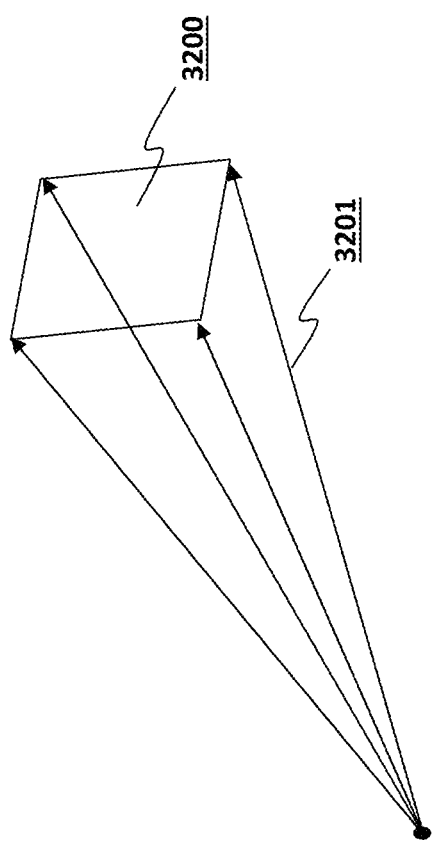
FIG. 32 illustrates an example of a beam.

Groups of contiguous rays, referred to as "beams" may be tested against the BVH, rather than individual rays. FIG. 32 illustrates an exemplary beam 3201 outlined by four different rays. Any rays which intersect the patch 3200 defined by the four rays are considered to be within the same beam. While the beam 3201 in FIG. 32 is defined by a rectangular arrangement of rays, beams may be defined in various other ways while still complying with the underlying principles of the invention (e.g., circles, ellipses, etc).

Figure 33:
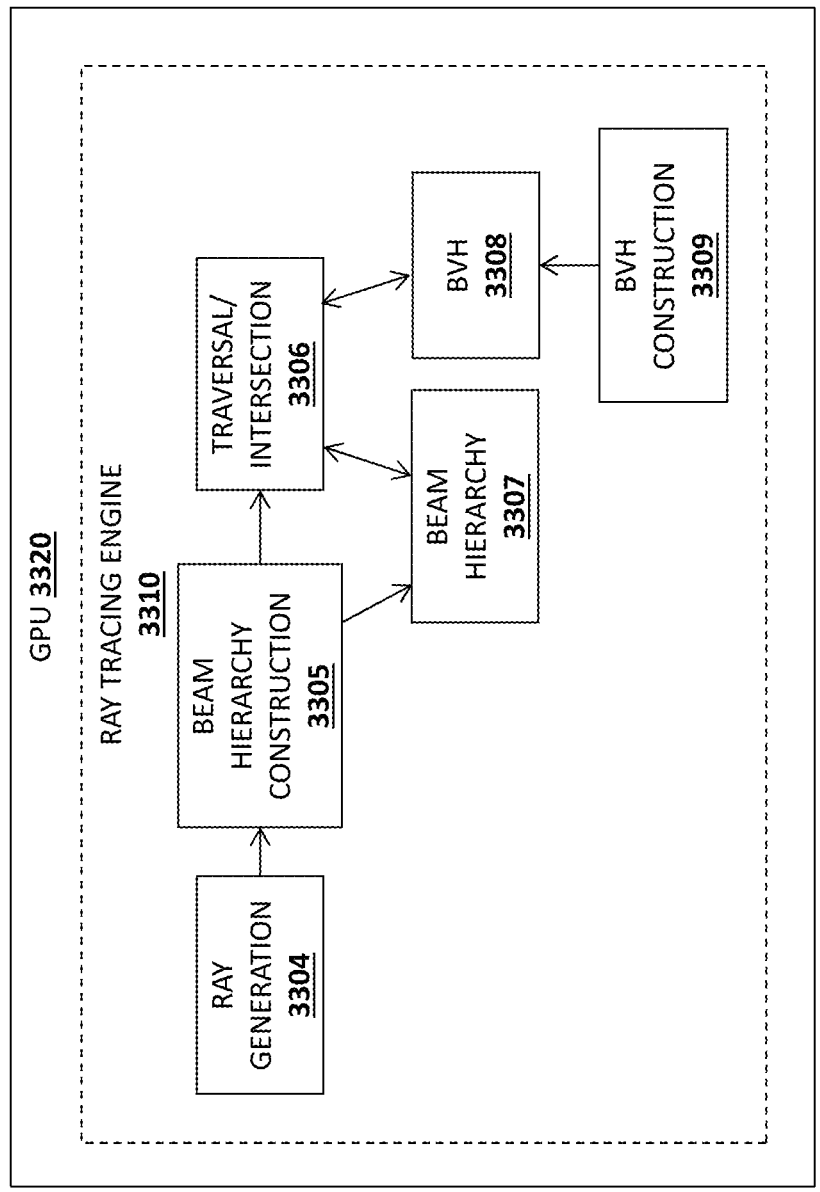
FIG. 33 illustrates an apparatus for performing beam tracing.
Figure 34:
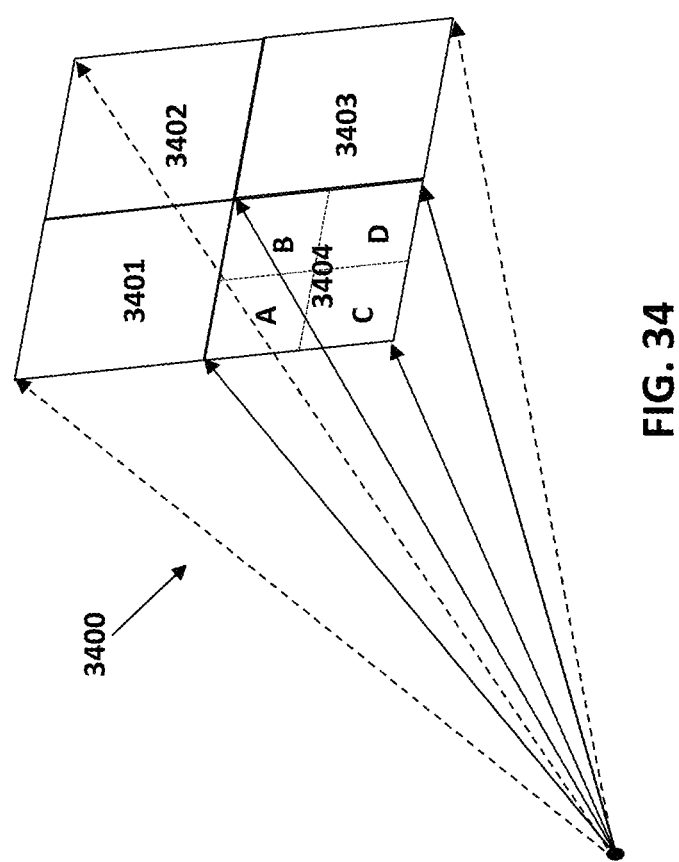
FIG. 34 illustrates an example of a beam hierarchy.

FIG. 33 illustrates how a ray tracing engine 3310 of a GPU 3320 implements the beam tracing techniques described herein. In particular, ray generation circuitry 3304 generates a plurality of rays for which traversal and intersection operations are to be performed. However, rather than performing traversal and intersection operations on individual rays, traversal and intersection operations are performed using a hierarchy of beams 3307 generated by beam hierarchy construction circuitry 3305. The beam hierarchy is analogous to the bounding volume hierarchy (BVH). For example, FIG. 34 provides an example of a primary beam 3400 which may be subdivided into a plurality of different components. In particular, primary beam 3400 may be divided into quadrants 3401-3404 and each quadrant may itself be divided into sub-quadrants such as sub-quadrants A-D within quadrant 3404. The primary beam may be subdivided in a variety of ways. For example, the primary beam may be divided in half (rather than quadrants) and each half may be divided in half, and so on. Regardless of how the subdivisions are made, a hierarchical structure is generated in a similar manner as a BVH, e.g., with a root node representing the primary beam 3400, a first level of child nodes, each represented by a quadrant 3401-3404, second level child nodes for each sub-quadrant A-D, and so on.

Once the beam hierarchy 3307 is constructed, traversal/intersection circuitry 3306 may perform traversal/intersection operations using the beam hierarchy 3307 and the BVH 3308. In particular, it may test the beam against the BVH and cull portions of the beam which do not intersect any portions of the BVH. Using the data shown in FIG. 34, for example, if the sub-beams associated with sub-regions 3402 and 3403 do not intersect with the BVH or a particular branch of the BVH, then they may be culled with respect to the BVH or the branch. The remaining portions 3401, 3404 may be tested against the BVH by performing a depth-first search or other search algorithm.

Figure 35:
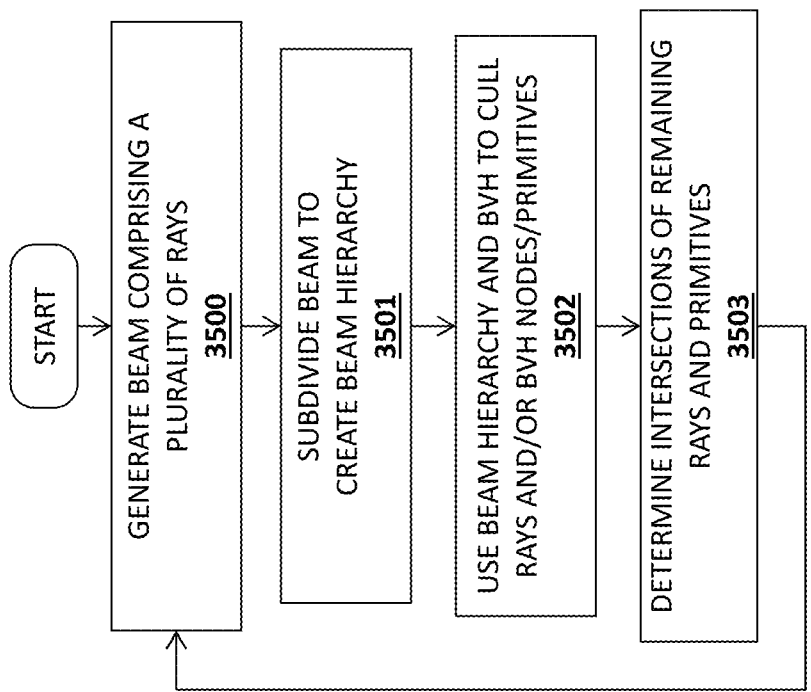
FIG. 35 illustrates a method for performing beam tracing.

A method for ray-tracing is illustrated in FIG. 35. The method may be implemented within the context of the graphics processing architectures described above, but is not limited to any particular architecture.

At 3500 a primary beam is constructed comprising a plurality of rays and at 3501, the beam is subdivided and hierarchical data structures generated to create a beam hierarchy. The operations 3500-3501 may be performed as a single, integrated operation which constructs a beam hierarchy from a plurality of rays. At 3502, the beam hierarchy is used with a BVH to cull rays (from the beam hierarchy) and/or nodes/primitives from the BVH. At 3503, ray-primitive intersections are determined for the remaining rays and primitives.

Lossy and Lossless Packet Compression in a Distributed Ray Tracing System

Figure 36:
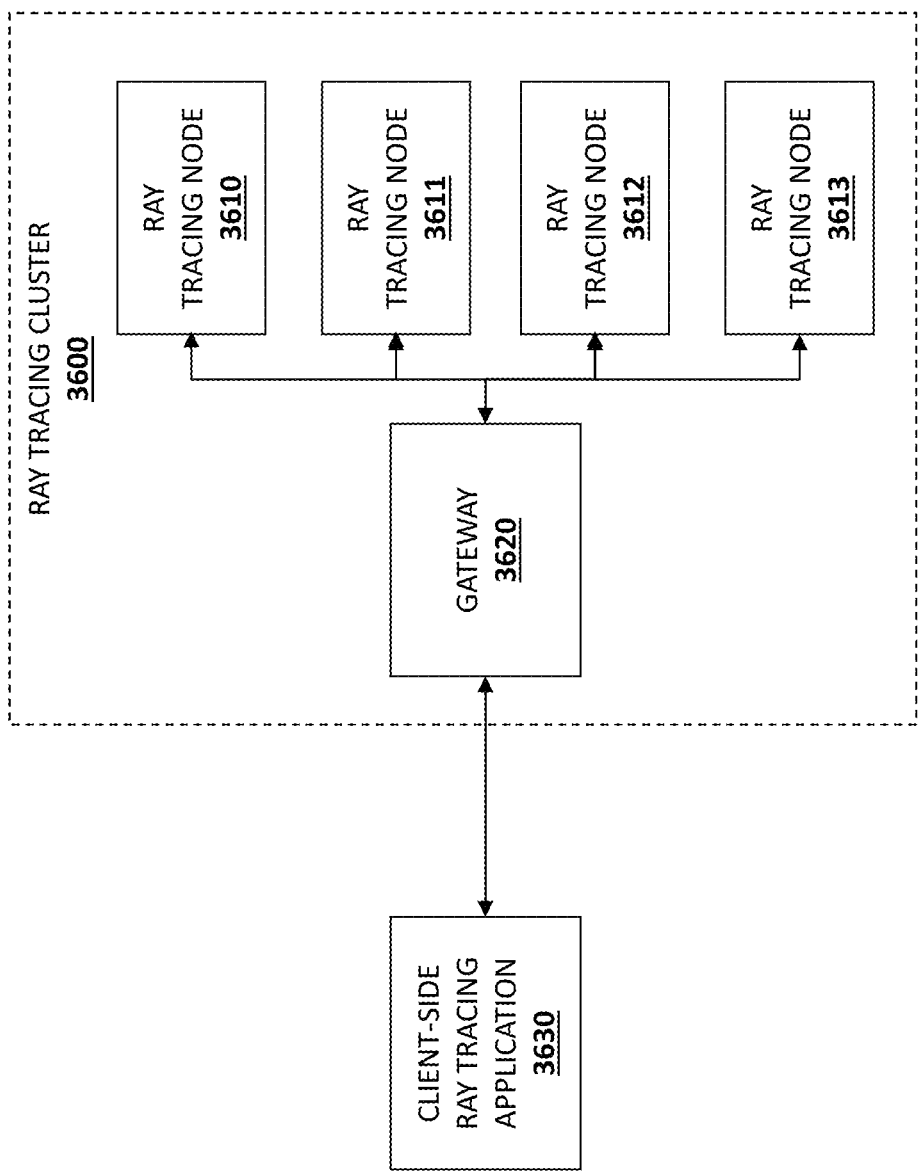
FIG. 36 illustrates an example of a distributed ray tracing engine.

Ray tracing operations may be distributed across a plurality of compute nodes coupled together over a network. FIG. 36, for example, illustrates a ray tracing cluster 3600 comprising a plurality of ray tracing nodes 3610-3613 perform ray tracing operations in parallel, potentially combining the results on one of the nodes. In the illustrated architecture, the ray tracing nodes 3610-3613 are communicatively coupled to a client-side ray tracing application 3630 via a gateway.

One of the difficulties with a distributed architecture is the large amount of packetized data that must be transmitted between each of the ray tracing nodes 3610-3613. Both lossless compression techniques and lossy compression techniques may be used to reduce the data transmitted between the ray tracing nodes 3610-3613.

To implement lossless compression, rather than sending packets filled with the results of certain types of operations, data or commands are sent which allow the receiving node to reconstruct the results. For example, stochastically sampled area lights and ambient occlusion (AO) operations do not necessarily need directions. Consequently, a transmitting node can simply send a random seed which is then used by the receiving node to perform random sampling. For example, if a scene is distributed across nodes 3610-3612, to sample light 1 at points p1-p3, only the light ID and origins need to be sent to nodes 3610-3612. Each of the nodes may then stochastically sample the light independently. The random seed may be generated by the receiving node. Similarly, for primary ray hit points, ambient occlusion (AO) and soft shadow sampling can be computed on nodes 3610-3612 without waiting for the original points for successive frames. Additionally, if it is known that a set of rays will go to the same point light source, instructions may be sent identifying the light source to the receiving node which will apply it to the set of rays. As another example, if there are N ambient occlusion rays transmitted a single point, a command may be sent to generate N samples from this point.

Various additional techniques may be applied for lossy compression. For example, a quantization factor may be employed to quantize all coordinate values associated with the BVH, primitives, and rays. In addition, 32-bit floating point values used for data such as BVH nodes and primitives may be converted into 8-bit integer values. In an exemplary implementation, the bounds of ray packets are stored in in full precision but individual ray points P1-P3 are transmitted as indexed offsets to the bounds. Similarly, a plurality of local coordinate systems may be generated which use 8-bit integer values as local coordinates. The location of the origin of each of these local coordinate systems may be encoded using the full precision (e.g., 32-bit floating point) values, effectively connecting the global and local coordinate systems.

The following is an example of lossless compression. An example of a Ray data format used internally in a ray tracing program is as follows:

```
struct Ray
{
    uint32 pixId;
    uint32 materialID;
    uint32 instanceID;
    uint64 primitiveID;
    uint32 geometryID;
    uint32 lightID;
    float origin[3];
    float direction[3];
    float t0;
    float t;
    float time;
    float normal[3]; //used for geometry intersections
    float u;
    float v;
    float wavelength;
    float phase; //Interferometry
    float refracted Offset; //Schlieren-esque
    float amplitude;
    float weight;
};
```

Instead of sending the raw data for each and every node generated, this data can be compressed by grouping values and by creating implicit rays using applicable metadata where possible.

Bundling and Grouping Ray Data

Flags may be used for common data or masks with modifiers.

struct RayPacket

```
{
  uint32 size;
  uint32 flags;
  list<Ray> rays;
}
```

For example:

RayPacket.rays=ray_1 to ray_256

Origins are all Shared

All ray data is packed, except only a single origin is stored across all rays. RayPacket.flags is set for RAYPACKET_COMMON_ORIGIN. When RayPacket is unpacked when received, origins are filled in from the single origin value.

Origins are Shared Only Among Some Rays

All ray data is packed, except for rays that share origins. For each group of unique shared origins, an operator is packed on that identifies the operation (shared origins), stores the origin, and masks which rays share the information. Such an operation can be done on any shared values among nodes such as material IDs, primitive IDs, origin, direction, normals, etc.

```
struct RayOperation
{
  uint8 operationID;
  void* value;
  uint64 mask;
}
```

Sending Implicit Rays

Often times, ray data can be derived on the receiving end with minimal meta information used to generate it. A very common example is generating multiple secondary rays to stochastically sample an area. Instead of the sender generating a secondary ray, sending it, and the receiver operating on it, the sender can send a command that a ray needs to be generated with any dependent information, and the ray is generated on the receiving end. In the case where the ray needs to be first generated by the sender to determine which receiver to send it to, the ray is generated and the random seed can be sent to regenerate the exact same ray.

For example, to sample a hit point with 64 shadow rays sampling an area light source, all 64 rays intersect with regions from the same compute N4. A RayPacket with common origin and normal is created. More data could be sent if one wished the receiver to shade the resulting pixel contribution, but for this example let us assume we wish to only return whether a ray hits another nodes data. A RayOperation is created for a generate shadow ray operation, and is assigned the value of the lightID to be sampled and the random number seed. When N4 receives the ray packet, it generates the fully filled Ray data by filling in the shared origin data to all rays and setting the direction based on the lightID stochastically sampled with the random number seed to generate the same rays that the original sender generated. When the results are returned, only binary results for every ray need be returned, which can be handed by a mask over the rays.

Sending the original 64 rays in this example would have used 104 Bytes*64 rays=6656 Bytes. If the returning rays were sent in their raw form as well, than this is also doubled to 13312 Bytes. Using lossless compression with only sending the common ray origin, normal, and ray generation operation with seed and ID, only 29 Bytes are sent with 8 Bytes returned for the was intersected mask. This results in a data compression rate that needs to be sent over the network of ~360:1. This does not include overhead to process the message itself, which would need to be identified in some way, but that is left up to the implementation. Other operations may be done for recomputing ray origin and directions from the pixelID for primary rays, recalculating pixelIDs based on the ranges in the raypacket, and many other possible implementations for recomputation of values. Similar operations can be used for any single or group of rays sent, including shadows, reflections, refraction, ambient occlusion, intersections, volume intersections, shading, bounced reflections in path tracing, etc.

Figure 37:
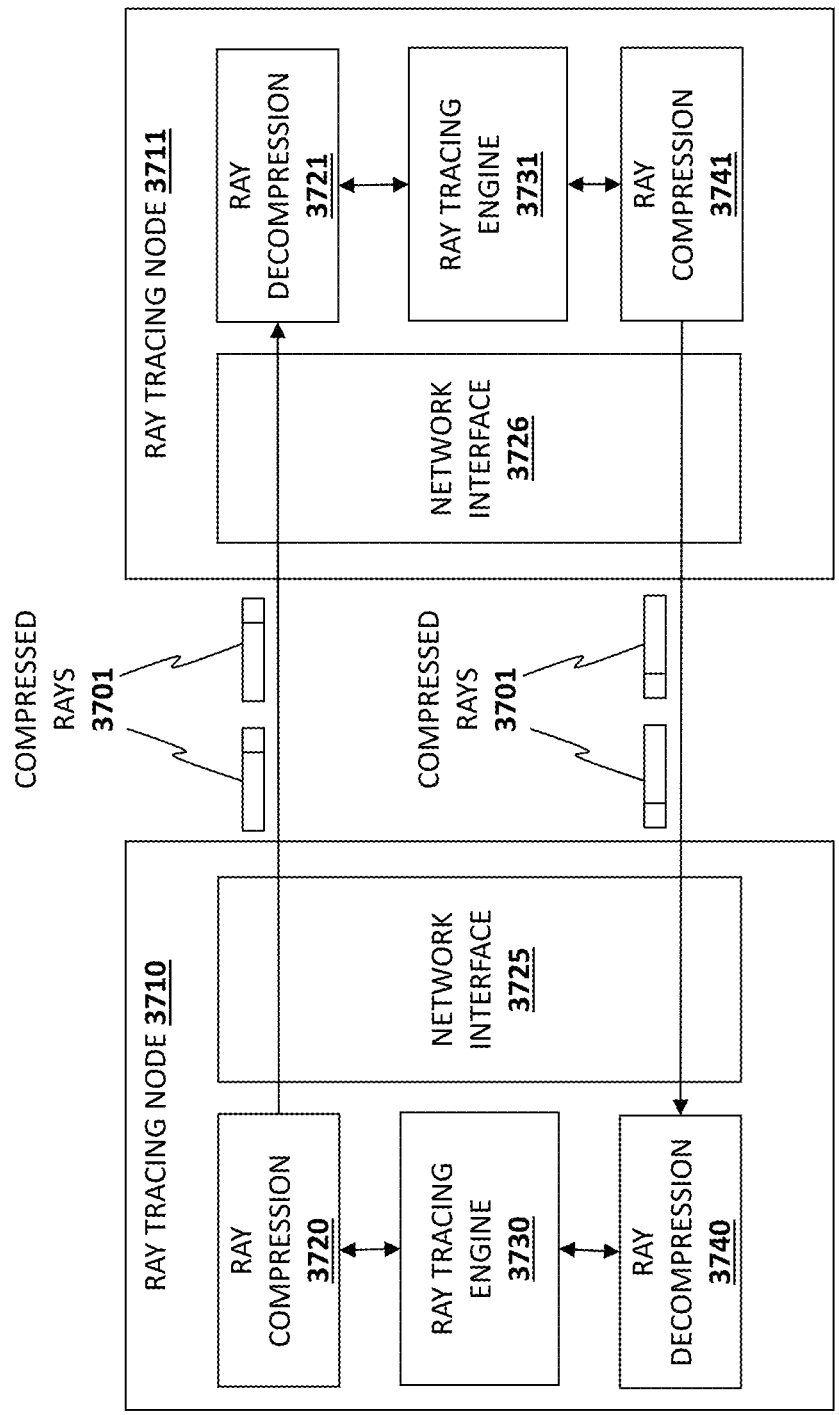
FIGS. 37-38 illustrate compression performed in a ray tracing system.

FIG. 37 illustrates additional details for two ray tracing nodes 3710-3711 which perform compression and decompression of ray tracing packets. In particular, when a first ray tracing engine 3730 is ready to transmit data to a second ray tracing engine 3731, ray compression circuitry 3720 performs lossy and/or lossless compression of the ray tracing data as described herein (e.g., converting 32-bit values to 8-bit values, substituting raw data for instructions to reconstruct the data, etc). The compressed ray packets 3701 are transmitted from network interface 3725 to network interface 3726 over a local network (e.g., a 10 Gb/s, 100 Gb/s Ethernet network). Ray decompression circuitry then decompresses the ray packets when appropriate. For example, it may execute commands to reconstruct the ray tracing data (e.g., using a random seed to perform random sampling for lighting operations). Ray tracing engine 3731 then uses the received data to perform ray tracing operations.

In the reverse direction, ray compression circuitry 3741 compresses ray data, network interface 3726 transmits the compressed ray data over the network (e.g., using the techniques described herein), ray decompression circuitry 3740 decompresses the ray data when necessary and ray tracing engine 3730 uses the data in ray tracing operations. Although illustrated as a separate unit in FIG. 37, ray decompression circuitry 3740-3741 may be integrated within ray tracing engines 3730-3731, respectively. For example, to the extent the compressed ray data comprises commands to reconstruct the ray data, these commands may be executed by each respective ray tracing engine 3730-3731.

Figure 38:
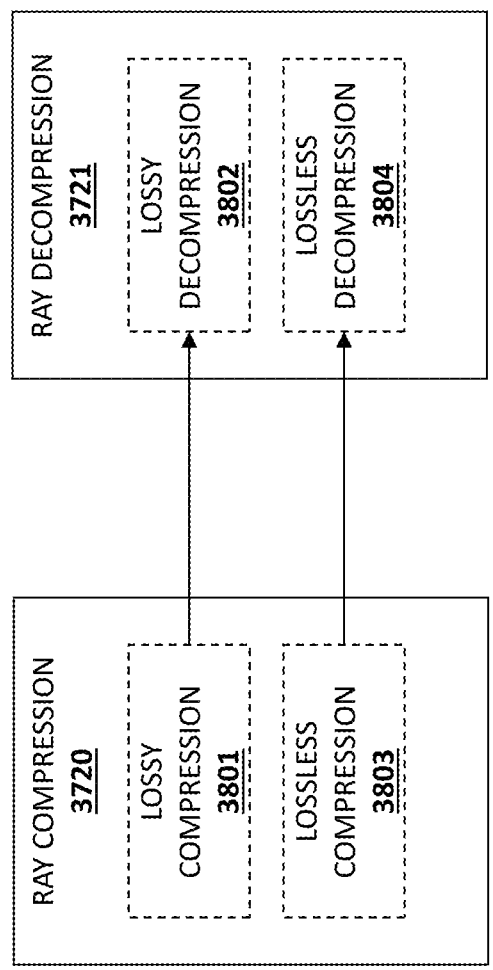

As illustrated in FIG. 38, ray compression circuitry 3720 may include lossy compression circuitry 3801 for performing the lossy compression techniques described herein (e.g., converting 32-bit floating point coordinates to 8-bit integer coordinates) and lossless compression circuitry 3803 for performing the lossless compression techniques (e.g., transmitting commands and data to allow ray recompression circuitry 3821 to reconstruct the data). Ray decompression circuitry 3721 includes lossy decompression circuitry 3802 and lossless decompression circuitry 3804 for performing lossless decompression.

Figure 39:
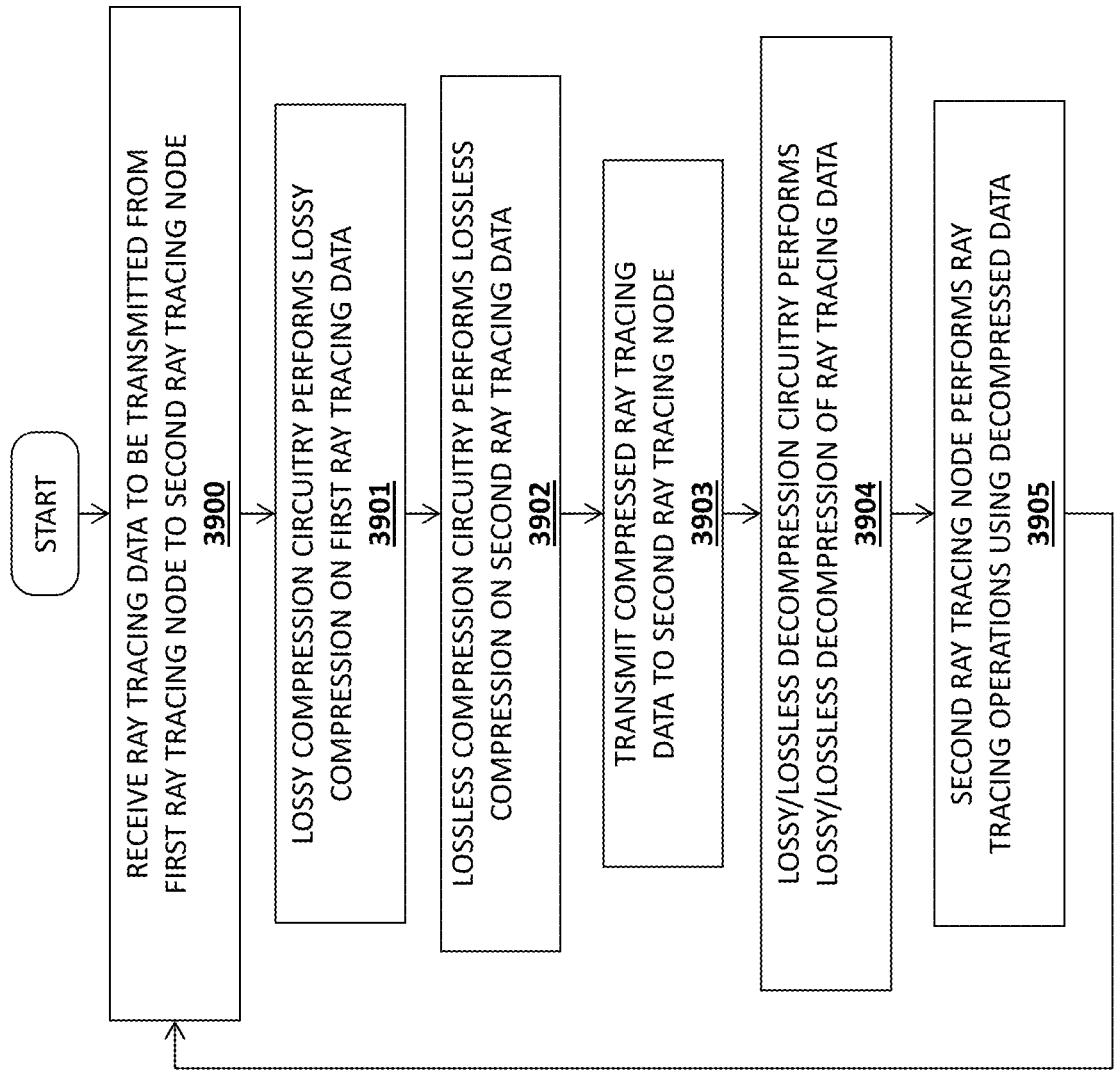
FIG. 39 illustrates a method implemented on a ray tracing architecture.

Another exemplary method is illustrated in FIG. 39. The method may be implemented on the ray tracing architectures or other architectures described herein but is not limited to any particular architecture.

At 3900, ray data is received which will be transmitted from a first ray tracing node to a second ray tracing node. At 3901, lossy compression circuitry performs lossy compression on first ray tracing data and, at 3902, lossless compression circuitry performs lossless compression on second ray tracing data. At 3903, the compressed ray racing data is transmitted to a second ray tracing node. At 3904, lossy/lossless decompression circuitry performs lossy/lossless decompression of the ray tracing data and, at 3905, the second ray tracing node performs ray tracing operations sing the decompressed data.

Graphics Processor with Hardware Accelerated Hybrid Ray Tracing

A hybrid rendering pipeline which performs rasterization on graphics cores 3130 and ray tracing operations on the ray tracing cores 3150, graphics cores 3130, and/or CPU 3199 cores, is presented next. For example, rasterization and depth testing may be performed on the graphics cores 3130 in place of the primary ray casting stage. The ray tracing cores 3150 may then generate secondary rays for ray reflections, refractions, and shadows. In addition, certain regions of a scene in which the ray tracing cores 3150 will perform ray tracing operations (e.g., based on material property thresholds such as high reflectivity levels) will be selected while other regions of the scene will be rendered with rasterization on the graphics cores 3130. This hybrid implementation may be used for real-time ray tracing applications—where latency is a critical issue.

The ray traversal architecture described below may, for example, perform programmable shading and control of ray traversal using existing single instruction multiple data (SIMD) and/or single instruction multiple thread (SIMT) graphics processors while accelerating critical functions, such as BVH traversal and/or intersections, using dedicated hardware. SIMD occupancy for incoherent paths may be improved by regrouping spawned shaders at specific points during traversal and before shading. This is achieved using dedicated hardware that sorts shaders dynamically, on-chip. Recursion is managed by splitting a function into continuations that execute upon returning and regrouping continuations before execution for improved SIMD occupancy.

Programmable control of ray traversal/intersection is achieved by decomposing traversal functionality into an inner traversal that can be implemented as fixed function hardware and an outer traversal that executes on GPU processors and enables programmable control through user defined traversal shaders. The cost of transferring the traversal context between hardware and software is reduced by conservatively truncating the inner traversal state during the transition between inner and outer traversal.

Programmable control of ray tracing can be expressed through the different shader types listed in Table A below. There can be multiple shaders for each type. For example each material can have a different hit shader.

TABLE A

| Shader Type | Functionality |
| --- | --- |
| Primary | Launching primary rays |
| Hit | Bidirectional reflectance distribution function (BRDF) sampling, launching secondary rays |
| Any Hit | Computing transmittance for alpha textured geometry |
| Miss | Computing radiance from a light source |
| Intersection | Intersecting custom shapes |
| Traversal | Instance selection and transformation |
| Callable | A general-purpose function |

Recursive ray tracing may be initiated by an API function that commands the graphics processor to launch a set of primary shaders or intersection circuitry which can spawn ray-scene intersections for primary rays. This in turn spawns other shaders such as traversal, hit shaders, or miss shaders. A shader that spawns a child shader can also receive a return value from that child shader. Callable shaders are general-purpose functions that can be directly spawned by another shader and can also return values to the calling shader.

Figure 40:
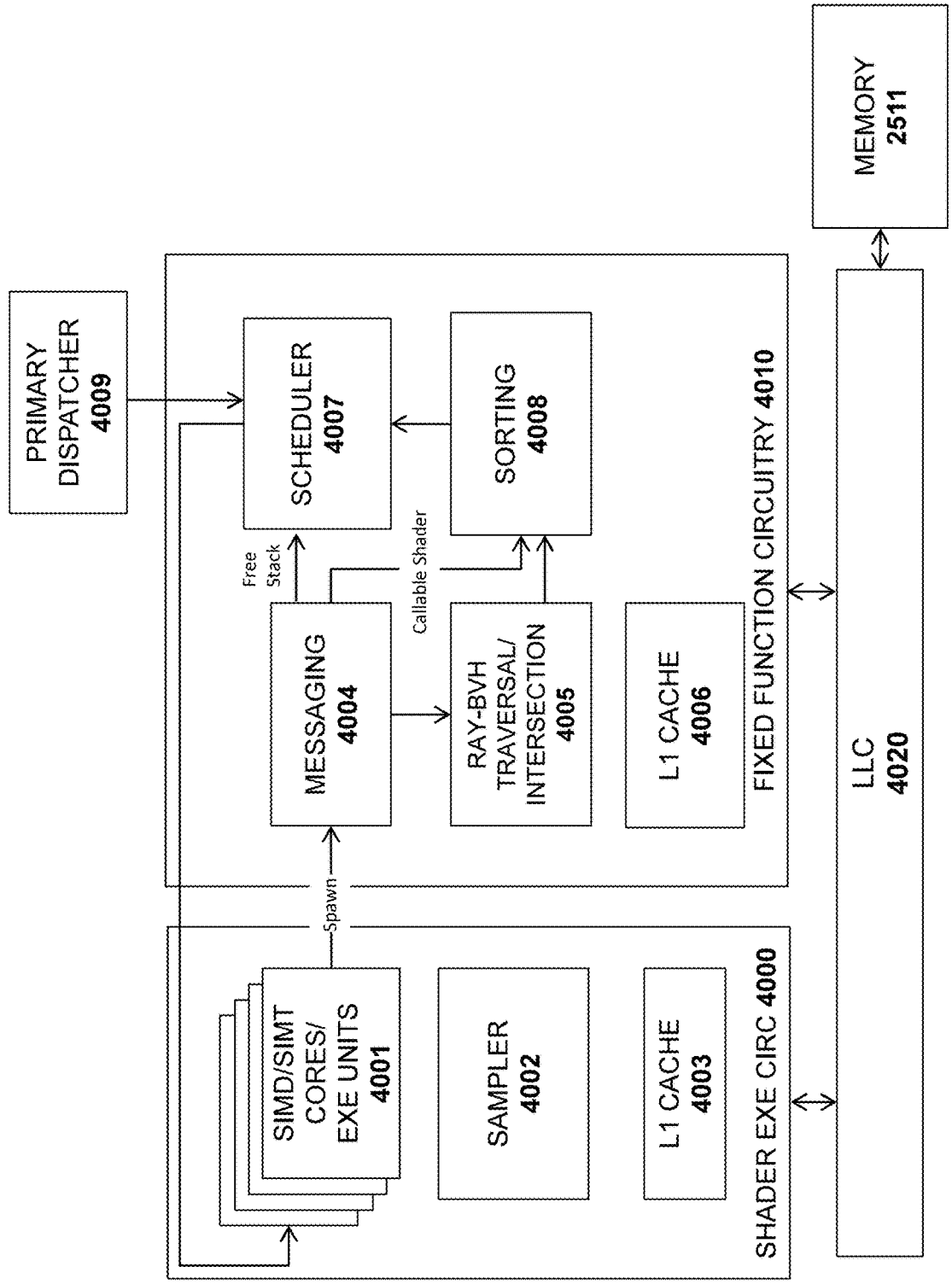
FIG. 40 illustrates an exemplary hybrid ray tracing apparatus.

FIG. 40 illustrates a graphics processing architecture which includes shader execution circuitry 4000 and fixed function circuitry 4010. The general purpose execution hardware subsystem includes a plurality of single instruction multiple data (SIMD) and/or single instructions multiple threads (SIMT) cores/execution units (EUs) 4001 (i.e., each core may comprise a plurality of execution units), one or more samplers 4002, and a Level 1 (L1) cache 4003 or other form of local memory. The fixed function hardware subsystem 4010 includes message unit 4004, a scheduler 4007, ray-BVH traversal/intersection circuitry 4005, sorting circuitry 4008, and a local L1 cache 4006.

In operation, primary dispatcher 4009 dispatches a set of primary rays to the scheduler 4007, which schedules work to shaders executed on the SIMD/SIMT cores/EUs 4001. The SIMD cores/EUs 4001 may be ray tracing cores 3150 and/or graphics cores 3130 described above. Execution of the primary shaders spawns additional work to be performed (e.g., to be executed by one or more child shaders and/or fixed function hardware). The message unit 4004 distributes work spawned by the SIMD cores/EUs 4001 to the scheduler 4007, accessing the free stack pool as needed, the sorting circuitry 4008, or the ray-BVH intersection circuitry 4005. If the additional work is sent to the scheduler 4007, it is scheduled for processing on the SIMD/SIMT cores/EUs 4001. Prior to scheduling, the sorting circuitry 4008 may sort the rays into groups or bins as described herein (e.g., grouping rays with similar characteristics). The ray-BVH intersection circuitry 4005 performs intersection testing of rays using BVH volumes. For example, the ray-BVH intersection circuitry 4005 may compare ray coordinates with each level of the BVH to identify volumes which are intersected by the ray.

Shaders can be referenced using a shader record, a user-allocated structure that includes a pointer to the entry function, vendor-specific metadata, and global arguments to the shader executed by the SIMD cores/EUs 4001. Each executing instance of a shader is associated with a call stack which may be used to store arguments passed between a parent shader and child shader. Call stacks may also store references to the continuation functions that are executed when a call returns.

Figure 41:
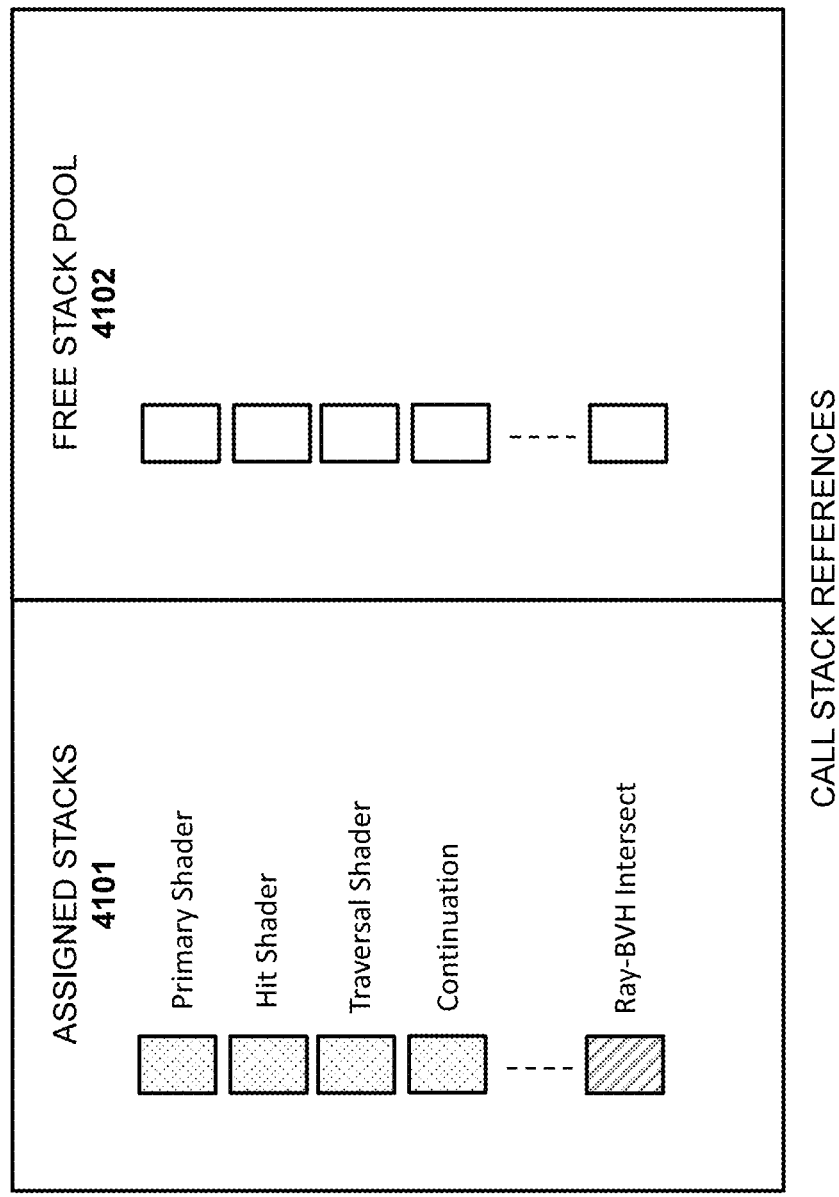
FIG. 41 illustrates stacks used for ray tracing operations.

FIG. 41 illustrates an example set of assigned stacks 4101 which includes a primary shader stack, a hit shader stack, a traversal shader stack, a continuation function stack, and a ray-BVH intersection stack (which, as described, may be executed by fixed function hardware 4010). New shader invocations may implement new stacks from a free stack pool 4102. The call stacks, e.g. stacks comprised by the set of assigned stacks, may be cached in a local L1 cache 4003, 4006 to reduce the latency of accesses.

There may be a finite number of call stacks, each with a fixed maximum size "Sstack" allocated in a contiguous region of memory. Therefore the base address of a stack can be directly computed from a stack index (SID) as base address=SID*Sstack. Stack IDs may be allocated and deallocated by the scheduler 4007 when scheduling work to the SIMD cores/EUs 4001.

The primary dispatcher 4009 may comprise a graphics processor command processor which dispatches primary shaders in response to a dispatch command from the host (e.g., a CPU). The scheduler 4007 may receive these dispatch requests and launches a primary shader on a SIMD processor thread if it can allocate a stack ID for each SIMD lane. Stack IDs may be allocated from the free stack pool 4102 that is initialized at the beginning of the dispatch command.

An executing shader can spawn a child shader by sending a spawn message to the messaging unit 4004. This command includes the stack IDs associated with the shader and also includes a pointer to the child shader record for each active SIMD lane. A parent shader can only issue this message once for an active lane. After sending spawn messages for all relevant lanes, the parent shader may terminate.

A shader executed on the SIMD cores/EUs 4001 can also spawn fixed-function tasks such as ray-BVH intersections using a spawn message with a shader record pointer reserved for the fixed-function hardware. As mentioned, the messaging unit 4004 sends spawned ray-BVH intersection work to the fixed-function ray-BVH intersection circuitry 4005 and callable shaders directly to the sorting circuitry 4008. The sorting circuitry may group the shaders by shader record pointer to derive a SIMD batch with similar characteristics. Accordingly, stack IDs from different parent shaders can be grouped by the sorting circuitry 4008 in the same batch. The sorting circuitry 4008 sends grouped batches to the scheduler 4007 which accesses the shader record from graphics memory 2511 or the last level cache (LLC) 4020 and launches the shader on a processor thread.

Continuations may be treated as callable shaders and may also be referenced through shader records. When a child shader is spawned and returns values to the parent shader, a pointer to the continuation shader record may be pushed on the call stack 4101. When a child shader returns, the continuation shader record may then be popped from the call stack 4101 and a continuation shader may be spawned. Optionally, spawned continuations may go through the sorting unit similar to callable shaders and get launched on a processor thread.

Figure 42:
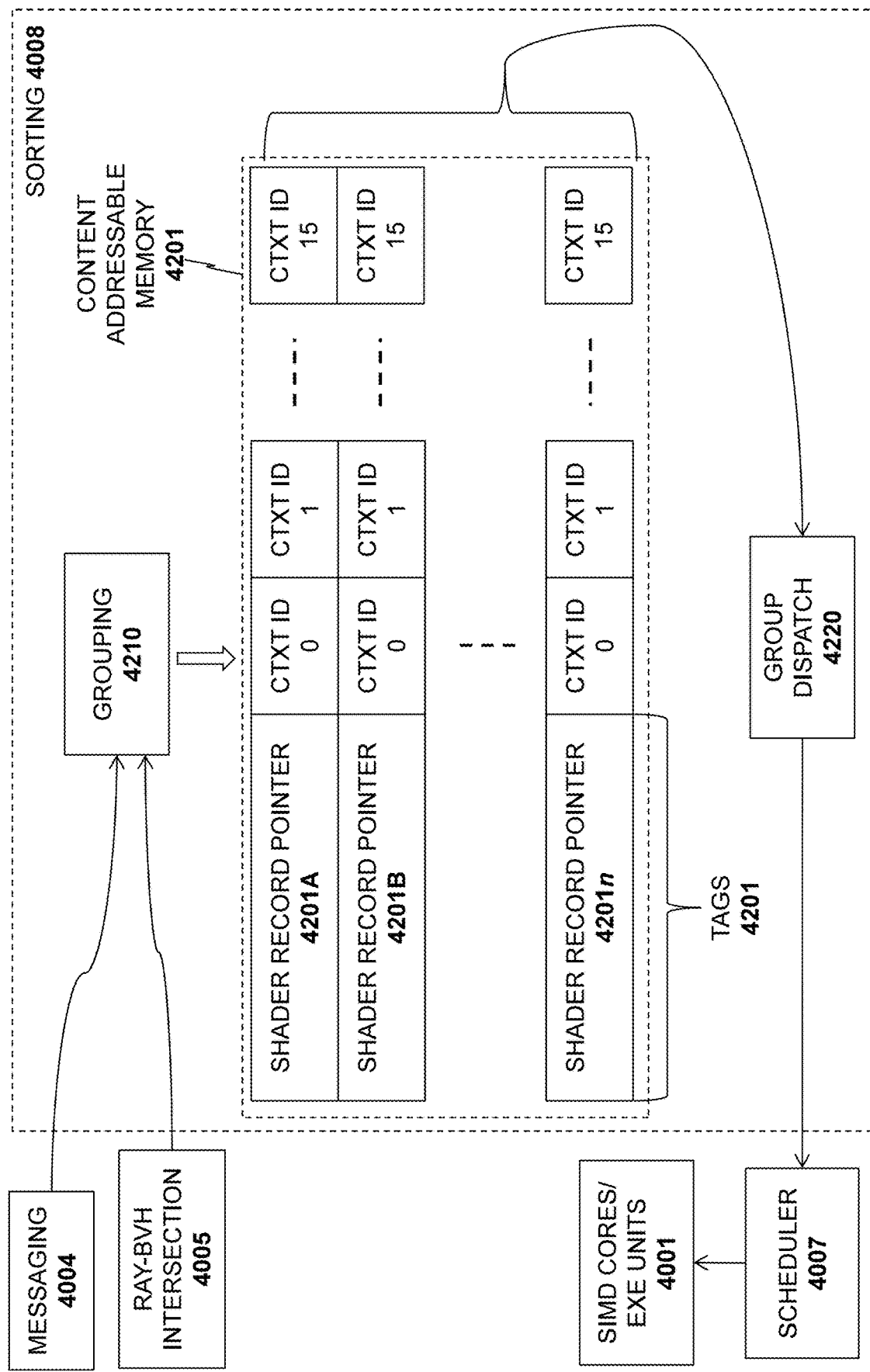
FIG. 42 illustrates additional details for a hybrid ray tracing apparatus.

As illustrated in FIG. 42, the sorting circuitry 4008 groups spawned tasks by shader record pointers 4201A, 4201B, 4201n to create SIMD batches for shading. The stack IDs or context IDs in a sorted batch can be grouped from different dispatches and different input SIMD lanes. A grouping circuitry 4210 may perform the sorting using a content addressable memory (CAM) structure 4201 comprising a plurality of entries with each entry identified with a tag 4201. As mentioned, the tag 4201 may be a corresponding shader record pointer 4201A, 4201B, 4201n. The CAM structure 4201 may store a limited number of tags (e.g. 32, 64, 128, etc) each associated with an incomplete SIMD batch corresponding to a shader record pointer.

For an incoming spawn command, each SIMD lane has a corresponding stack ID (shown as 16 context IDs 0-15 in each CAM entry) and a shader record pointer 4201 A-B, . . . n (acting as a tag value). The grouping circuitry 4210 may compare the shader record pointer for each lane against the tags 4201 in the CAM structure 4201 to find a matching batch. If a matching batch is found, the stack ID/context ID may be added to the batch. Otherwise a new entry with a new shader record pointer tag may be created, possibly evicting an older entry with an incomplete batch.

An executing shader can deallocate the call stack when it is empty by sending a deallocate message to the message unit. The deallocate message is relayed to the scheduler which returns stack IDs/context IDs for active SIMD lanes to the free pool.

Figure 43:
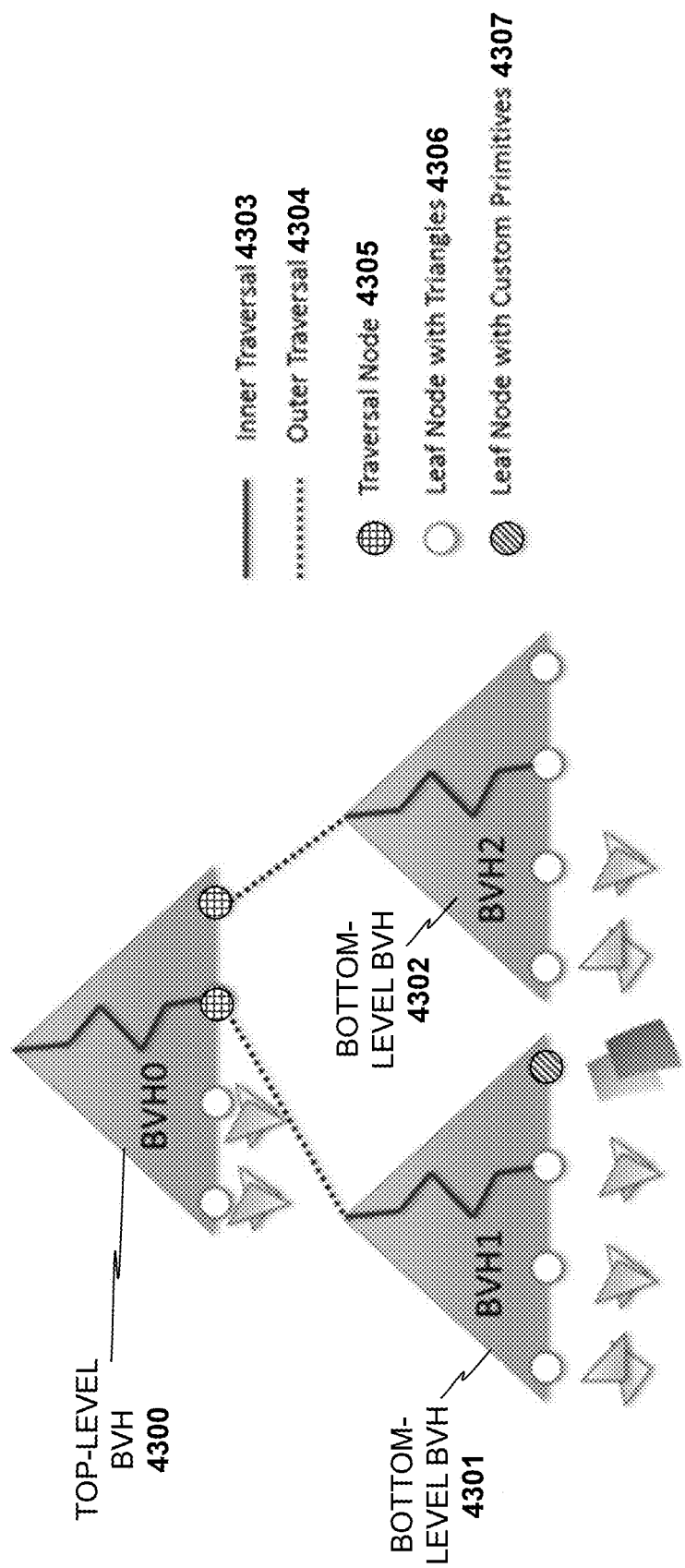
FIG. 43 illustrates a bounding volume hierarchy.

A hybrid approach for ray traversal operations, using a combination of fixed-function ray traversal and software ray traversal, is presented. Consequently, it provides the flexibility of software traversal while maintaining the efficiency of fixed-function traversal. FIG. 43 shows an acceleration structure which may be used for hybrid traversal, which is a two-level tree with a single top level BVH 4300 and several bottom level BVHs 4301 and 4302. Graphical elements are shown to the right to indicate inner traversal paths 4303, outer traversal paths 4304, traversal nodes 4305, leaf nodes with triangles 4306, and leaf nodes with custom primitives 4307.

The leaf nodes with triangles 4306 in the top level BVH 4300 can reference triangles, intersection shader records for custom primitives or traversal shader records. The leaf nodes with triangles 4306 of the bottom level BVHs 4301-4302 can only reference triangles and intersection shader records for custom primitives. The type of reference is encoded within the leaf node 4306. Inner traversal 4303 refers to traversal within each BVH 4300-4302. Inner traversal operations comprise computation of ray-BVH intersections and traversal across the BVH structures 4300-4302 is known as outer traversal. Inner traversal operations can be implemented efficiently in fixed function hardware while outer traversal operations can be performed with acceptable performance with programmable shaders. Consequently, inner traversal operations may be performed using fixed-function circuitry 4010 and outer traversal operations may be performed using the shader execution circuitry 4000 including SIMD/SIMT cores/EUs 4001 for executing programmable shaders.

Note that the SIMD/SIMT cores/EUs 4001 are sometimes simply referred to herein as "cores," "SIMD cores," "EUs," or "SIMD processors" for simplicity. Similarly, the ray-BVH traversal/intersection circuitry 4005 is sometimes simply referred to as a "traversal unit," "traversal/intersection unit" or "traversal/intersection circuitry." When an alternate term is used, the particular name used to designate the respective circuitry/logic does not alter the underlying functions which the circuitry/logic performs, as described herein.

Moreover, while illustrated as a single component in FIG. 40 for purposes of explanation, the traversal/intersection unit 4005 may comprise a distinct traversal unit and a separate intersection unit, each of which may be implemented in circuitry and/or logic as described herein.

When a ray intersects a traversal node during an inner traversal, a traversal shader may be spawned. The sorting circuitry 4008 may group these shaders by shader record pointers 4201A-B, n to create a SIMD batch which is launched by the scheduler 4007 for SIMD execution on the graphics SIMD cores/EUs 4001. Traversal shaders can modify traversal in several ways, enabling a wide range of applications. For example, the traversal shader can select a BVH at a coarser level of detail (LOD) or transform the ray to enable rigid body transformations. The traversal shader may then spawn inner traversal for the selected BVH.

Inner traversal computes ray-BVH intersections by traversing the BVH and computing ray-box and ray-triangle intersections. Inner traversal is spawned in the same manner as shaders by sending a message to the messaging circuitry 4004 which relays the corresponding spawn message to the ray-BVH intersection circuitry 4005 which computes ray-BVH intersections.

The stack for inner traversal may be stored locally in the fixed-function circuitry 4010 (e.g., within the L1 cache 4006). When a ray intersects a leaf node corresponding to a traversal shader or an intersection shader, inner traversal may be terminated and the inner stack truncated. The truncated stack along with a pointer to the ray and BVH may be written to memory at a location specified by the calling shader and then the corresponding traversal shader or intersection shader may be spawned. If the ray intersects any triangles during inner traversal, the corresponding hit information may be provided as input arguments to these shaders as shown in the below code. These spawned shaders may be grouped by the sorting circuitry 4008 to create SIMD batches for execution.

```
struct HitInfo {
    float barycentrics[2];
    float tmax;
    bool imerTravComplete;
    uint primID;
    uint geomID;
    ShaderRecord* leafShaderRecord;
}
```

Truncating the inner traversal stack reduces the cost of spilling it to memory. The approach described in *Restart Trail for Stackless BVH Traversal*, High Performance Graphics (2010), pp. 107-111, to truncate the stack to a small number of entries at the top of the stack, a 42-bit restart trail and a 6-bit depth value may be applied. The restart trail indicates branches that have already been taken inside the BVH and the depth value indicates the depth of traversal corresponding to the last stack entry. This is sufficient information to resume inner traversal at a later time.

Inner traversal is complete when the inner stack is empty and there no more BVH nodes to test. In this case an outer stack handler is spawned that pops the top of the outer stack and resumes traversal if the outer stack is not empty.

Outer traversal may execute the main traversal state machine and may be implemented in program code executed by the shader execution circuitry 4000. It may spawn an inner traversal query under the following conditions: (1) when a new ray is spawned by a hit shader or a primary shader; (2) when a traversal shader selects a BVH for traversal; and (3) when an outer stack handler resumes inner traversal for a BVH.

Figure 44:
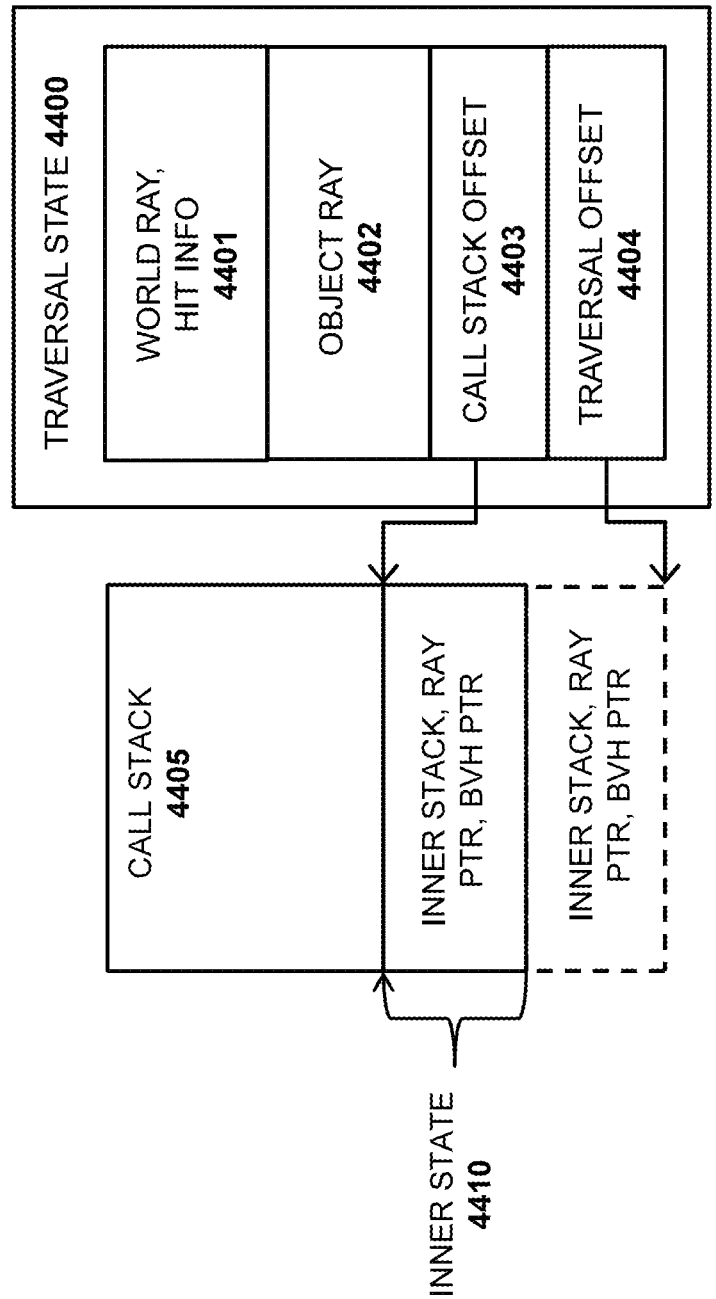
FIG. 44 illustrates a call stack and traversal state storage.

As illustrated in FIG. 44, before inner traversal is spawned, space is allocated on the call stack 4405 for the fixed-function circuitry 4010 to store the truncated inner stack 4410. Offsets 4403-4404 to the top of the call stack and the inner stack are maintained in the traversal state 4400 which is also stored in memory 2511. The traversal state 4400 also includes the ray in world space 4401 and object space 4402 as well as hit information for the closest intersecting primitive.

The traversal shader, intersection shader and outer stack handler are all spawned by the ray-BVH intersection circuitry 4005. The traversal shader allocates on the call stack 4405 before initiating a new inner traversal for the second level BVH. The outer stack handler is a shader that is responsible for updating the hit information and resuming any pending inner traversal tasks. The outer stack handler is also responsible for spawning hit or miss shaders when traversal is complete. Traversal is complete when there are no pending inner traversal queries to spawn. When traversal is complete and an intersection is found, a hit shader is spawned; otherwise a miss shader is spawned.

While the hybrid traversal scheme described above uses a two-level BVH hierarchy, an arbitrary number of BVH levels with a corresponding change in the outer traversal implementation may also be implemented.

In addition, while fixed function circuitry 4010 is described above for performing ray-BVH intersections, other system components may also be implemented in fixed function circuitry. For example, the outer stack handler described above may be an internal (not user visible) shader that could potentially be implemented in the fixed function BVH traversal/intersection circuitry 4005. This implementation may be used to reduce the number of dispatched shader stages and round trips between the fixed function intersection hardware 4005 and the processor.

The examples described herein enable programmable shading and ray traversal control using user-defined functions that can execute with greater SIMD efficiency on existing and future GPU processors. Programmable control of ray traversal enables several important features such as procedural instancing, stochastic level-of-detail selection, custom primitive intersection and lazy BVH updates.

A programmable, multiple instruction multiple data (MIMD) ray tracing architecture which supports speculative execution of hit and intersection shaders is also provided. In particular, the architecture focuses on reducing the scheduling and communication overhead between the programmable SIMD/SIMT cores/execution units 4001 described above with respect to FIG. 40 and fixed-function MIMD traversal/intersection units 4005 in a hybrid ray tracing architecture. Multiple speculative execution schemes of hit and intersection shaders are described below that can be dispatched in a single batch from the traversal hardware, avoiding several traversal and shading round trips. A dedicated circuitry to implement these techniques may be used.

The embodiments of the invention are particularly beneficial in use-cases where the execution of multiple hit or intersection shaders is desired from a ray traversal query that would impose significant overhead when implemented without dedicated hardware support. These include, but are not limited to nearest k-hit query (launch a hit shader for the k closest intersections) and multiple programmable intersection shaders.

The techniques described here may be implemented as extensions to the architecture illustrated in FIG. 40 (and described with respect to FIGS. 40-44). In particular, the present embodiments of the invention build on this architecture with enhancements to improve the performance of the above-mentioned use-cases.

A performance limitation of hybrid ray tracing traversal architectures is the overhead of launching traversal queries from the execution units and the overhead of invoking programmable shaders from the ray tracing hardware. When multiple hit or intersection shaders are invoked during the traversal of the same ray, this overhead generates "execution roundtrips" between the programmable cores 4001 and traversal/intersection unit 4005. This also places additional pressure to the sorting unit 4008 which needs to extract SIMD/SIMT coherence from the individual shader invocations.

Several aspects of ray tracing require programmable control which can be expressed through the different shader types listed in TABLE A above (i.e., Primary, Hit, Any Hit, Miss, Intersection, Traversal, and Callable). There can be multiple shaders for each type. For example each material can have a different hit shader. Some of these shader types are defined in the current Microsoft® Ray Tracing API.

As a brief review, recursive ray tracing is initiated by an API function that commands the GPU to launch a set of primary shaders which can spawn ray-scene intersections (implemented in hardware and/or software) for primary rays. This in turn can spawn other shaders such as traversal, hit or miss shaders. A shader that spawns a child shader can also receive a return value from that shader. Callable shaders are general-purpose functions that can be directly spawned by another shader and can also return values to the calling shader.

Ray traversal computes ray-scene intersections by traversing and intersecting nodes in a bounding volume hierarchy (BVH). Recent research has shown that the efficiency of computing ray-scene intersections can be improved by over an order of magnitude using techniques that are better suited to fixed-function hardware such as reduced-precision arithmetic, BVH compression, per-ray state machines, dedicated intersection pipelines and custom caches.

The architecture shown in FIG. 40 comprises such a system where an array of SIMD/SIMT cores/execution units 4001 interact with a fixed function ray tracing/intersection unit 4005 to perform programmable ray tracing. Programmable shaders are mapped to SIMD/SIMT threads on the execution units/cores 4001, where SIMD/SIMT utilization, execution, and data coherence are critical for optimal performance. Ray queries often break up coherence for various reasons such as:

Traversal divergence: The duration of the BVH traversal varies highly among rays favoring asynchronous ray processing.

Execution divergence: Rays spawned from different lanes of the same SIMD/SIMT thread may result in different shader invocations.

Data access divergence: Rays hitting different surfaces sample different BVH nodes and primitives and shaders access different textures, for example. A variety of other scenarios may cause data access divergence.

The SIMD/SIMT cores/execution units 4001 may be variants of cores/execution units described herein including graphics core(s) 415A-415B, shader cores 1355A-N, graphics cores 3130, graphics execution unit 608, execution units 852A-B, or any other cores/execution units described herein. The SIMD/SIMT cores/execution units 4001 may be used in place of the graphics core(s) 415A-415B, shader cores 1355A-N, graphics cores 3130, graphics execution unit 608, execution units 852A-B, or any other cores/execution units described herein. Therefore, the disclosure of any features in combination with the graphics core(s) 415A-415B, shader cores 1355A-N, graphics cores 3130, graphics execution unit 608, execution units 852A-B, or any other cores/execution units described herein also discloses a corresponding combination with the SIMD/SIMT cores/execution units 4001 of FIG. 40, but is not limited to such.

The fixed-function ray tracing/intersection unit 4005 may overcome the first two challenges by processing each ray individually and out-of-order. That, however, breaks up SIMD/SIMT groups. The sorting unit 4008 is hence responsible for forming new, coherent SIMD/SIMT groups of shader invocations to be dispatched to the execution units again.

It is easy to see the benefits of such an architecture compared to a pure software-based ray tracing implementation directly on the SIMD/SIMT processors. However, there is an overhead associated with the messaging between the SIMD/SIMT cores/execution units 4001 (sometimes simply referred to herein as SIMD/SIMT processors or cores/EUs) and the MIMD traversal/intersection unit 4005. Furthermore, the sorting unit 4008 may not extract perfect SIMD/SIMT utilization from incoherent shader calls.

Use-cases can be identified where shader invocations can be particularly frequent during traversal. Enhancements are described for hybrid MIMD ray tracing processors to significantly reduce the overhead of communication between the cores/EUs 4001 and traversal/intersection units 4005. This may be particularly beneficial when finding the k-closest intersections and implementation of programmable intersection shaders. Note, however, that the techniques described here are not limited to any particular processing scenario.

A summary of the high-level costs of the ray tracing context switch between the cores/EUs 4001 and fixed function traversal/intersection unit 4005 is provided below. Most of the performance overhead is caused by these two context switches every time when the shader invocation is necessary during single-ray traversal.

Each SIMD/SIMT lane that launches a ray generates a spawn message to the traversal/intersection unit 4005 associated with a BVH to traverse. The data (ray traversal context) is relayed to the traversal/intersection unit 4005 via the spawn message and (cached) memory. When the traversal/intersection unit 4005 is ready to assign a new hardware thread to the spawn message it loads the traversal state and performs traversal on the BVH. There is also a setup cost that needs to be performed before first traversal step on the BVH.

Figure 45:
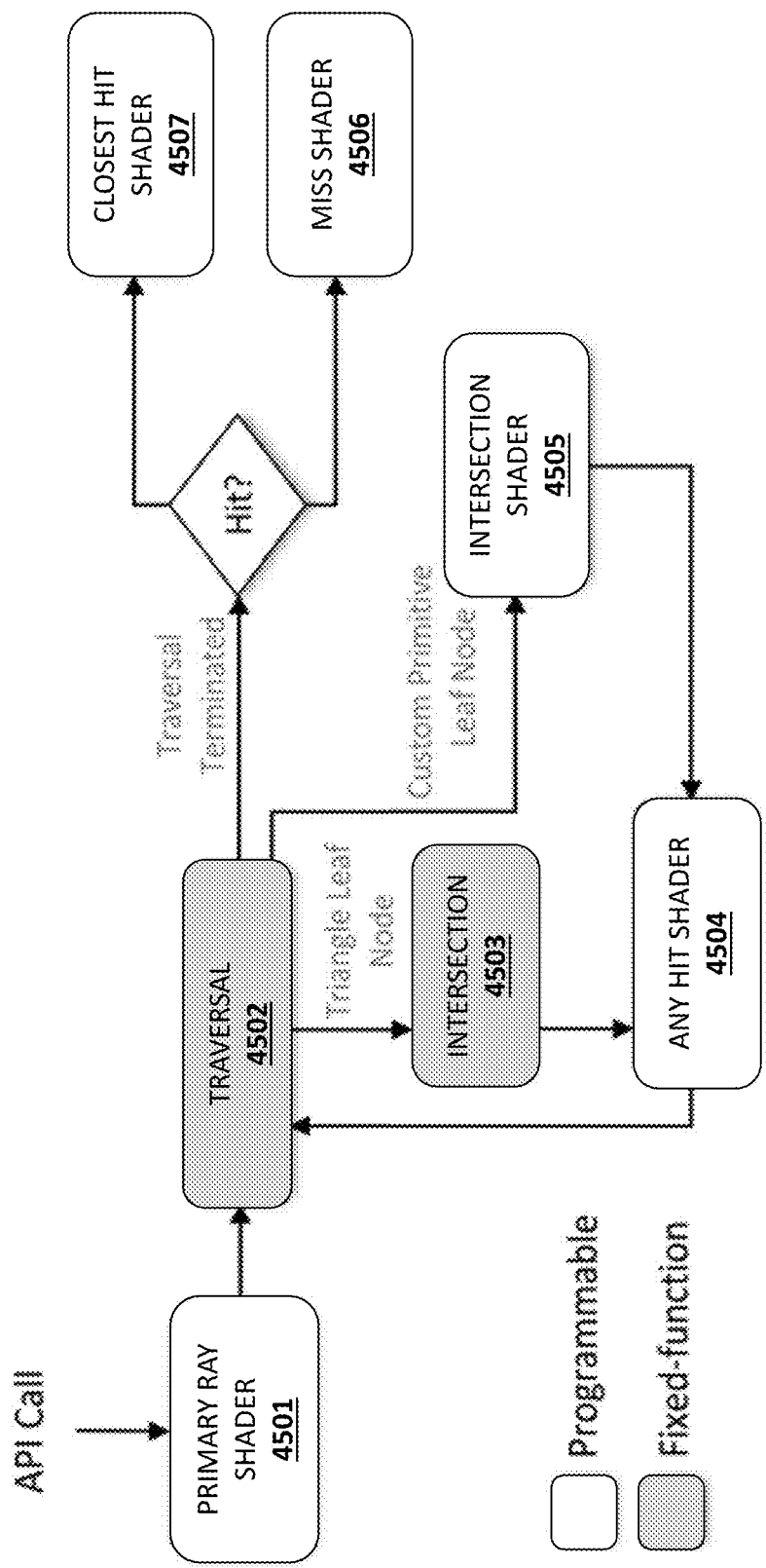
FIG. 45 illustrates a method for traversal and intersection.

FIG. 45 illustrates an operational flow of a programmable ray tracing pipeline. The shaded elements including traversal 4502 and intersection 4503 may be implemented in fixed function circuitry while the remaining elements may be implemented with programmable cores/execution units.

A primary ray shader 4501 sends work to the traversal circuitry at 4502 which traverses the current ray(s) through the BVH (or other acceleration structure). When a leaf node is reached, the traversal circuitry calls the intersection circuitry at 4503 which, upon identifying a ray-triangle intersection, invokes an any hit shader at 4504 (which may provide results back to the traversal circuitry as indicated).

Alternatively, the traversal may be terminated prior to reaching a leaf node and a closest hit shader invoked at 4507 (if a hit was recorded) or a miss shader at 4506 (in the event of a miss).

As indicated at 4505, an intersection shader may be invoked if the traversal circuitry reaches a custom primitive leaf node. A custom primitive may be any non-triangle primitive such as a polygon or a polyhedra (e.g., tetrahedrons, voxels, hexahedrons, wedges, pyramids, or other "unstructured" volume). The intersection shader 4505 identifies any intersections between the ray and custom primitive to the any hit shader 4504 which implements any hit processing.

When hardware traversal 4502 reaches a programmable stage, the traversal/intersection unit 4005 may generate a shader dispatch message to a relevant shader 4505-4507, which corresponds to a single SIMD lane of the execution unit(s) used to execute the shader. Since dispatches occur in an arbitrary order of rays, and they are divergent in the programs called, the sorting unit 4008 may accumulate multiple dispatch calls to extract coherent SIMD batches. The updated traversal state and the optional shader arguments may be written into memory 2511 by the traversal/intersection unit 4005.

In the k-nearest intersection problem, a closest hit shader 4507 is executed for the first k intersections. In the conventional way this would mean ending ray traversal upon finding the closest intersection, invoking a hit-shader, and spawning a new ray from the hit shader to find the next closest intersection (with the ray origin offset, so the same intersection will not occur again). It is easy to see that this implementation would require k ray spawns for a single ray. Another implementation operates with any-hit shaders 4504, invoked for all intersections and maintaining a global list of nearest intersections, using an insertion sort operation. The main problem with this approach is that there is no upper bound of any-hit shader invocations.

As mentioned, an intersection shader 4505 may be invoked on non-triangle (custom) primitives. Depending on the result of the intersection test and the traversal state (pending node and primitive intersections), the traversal of the same ray may continue after the execution of the intersection shader 4505. Therefore finding the closest hit may require several roundtrips to the execution unit.

A focus can also be put on the reduction of SIMD-MIMD context switches for intersection shaders 4505 and hit shaders 4504, 4507 through changes to the traversal hardware and the shader scheduling model. First, the ray traversal circuitry 4005 defers shader invocations by accumulating multiple potential invocations and dispatching them in a larger batch. In addition, certain invocations that turn out to be unnecessary may be culled at this stage. Furthermore, the shader scheduler 4007 may aggregate multiple shader invocations from the same traversal context into a single SIMD batch, which results in a single ray spawn message. In one exemplary implementation, the traversal hardware 4005 suspends the traversal thread and waits for the results of multiple shader invocations. This mode of operation is referred to herein as "speculative" shader execution because it allows the dispatch of multiple shaders, some of which may not be called when using sequential invocations.

Figure 46B:
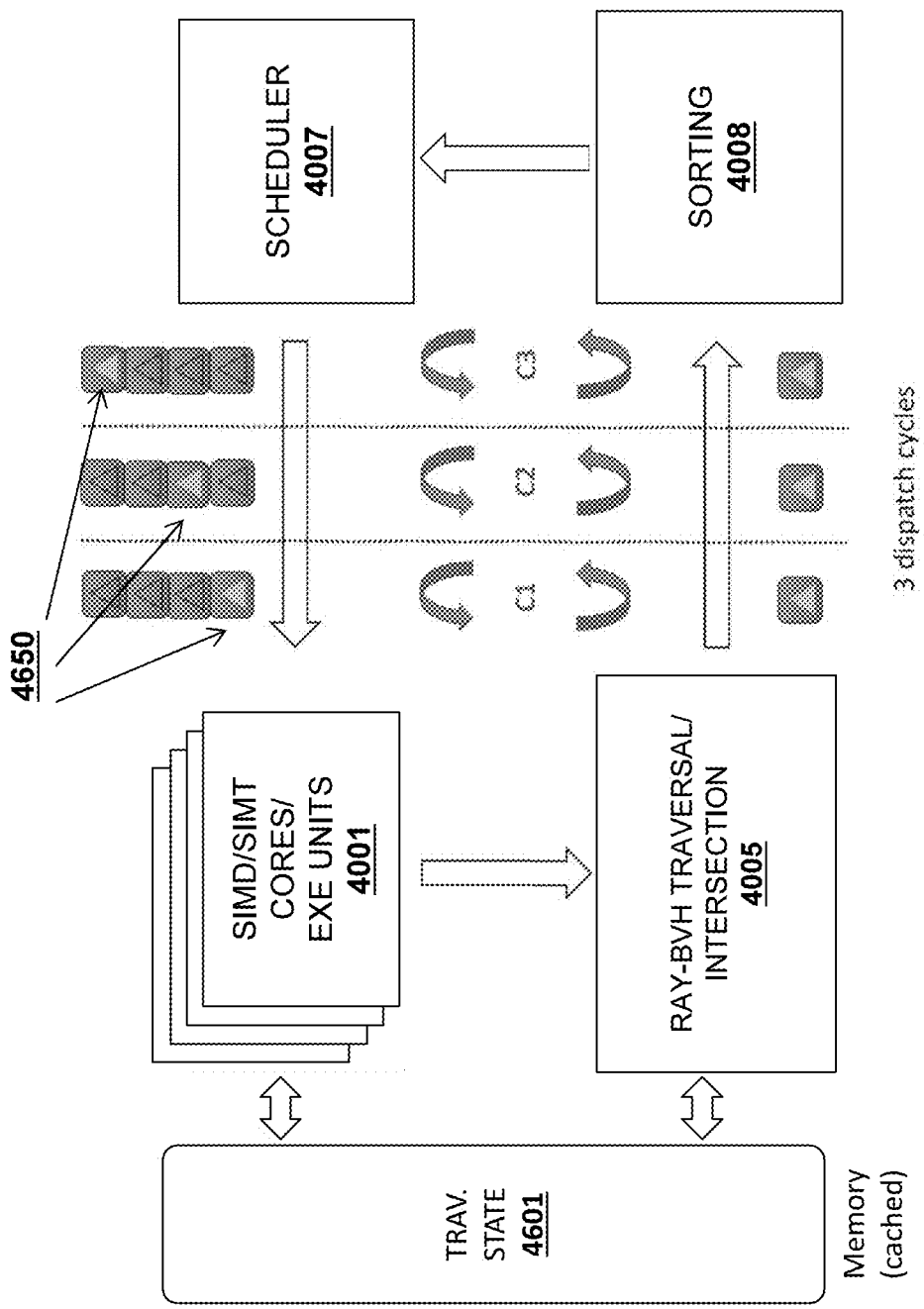
FIGS. 46A-B illustrate how multiple dispatch cycles are required to execute certain shaders.
Figure 46A:
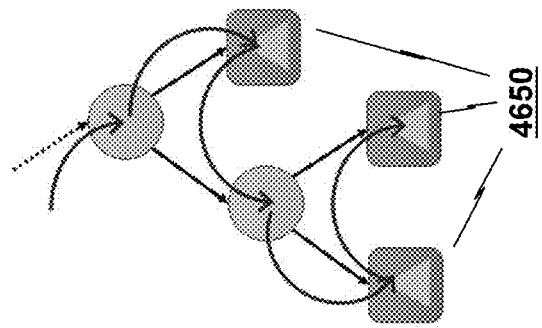

FIG. 46A illustrates an example in which the traversal operation encounters multiple custom primitives 4650 in a subtree and FIG. 46B illustrates how this can be resolved with three intersection dispatch cycles C1-C3. In particular, the scheduler 4007 may require three cycles to submit the work to the SIMD processor 4001 and the traversal circuitry 4005 requires three cycles to provide the results to the sorting unit 4008. The traversal state 4601 required by the traversal circuitry 4005 may be stored in a memory such as a local cache (e.g., an L1 cache and/or L2 cache).

A. Deferred Ray Tracing Shader Invocations

The manner in which the hardware traversal state 4601 is managed to allow the accumulation of multiple potential intersection or hit invocations in a list can also be modified. At a given time during traversal each entry in the list may be used to generate a shader invocation. For example, the k-nearest intersection points can be accumulated on the traversal hardware 4005 and/or in the traversal state 4601 in memory, and hit shaders can be invoked for each element if the traversal is complete. For hit shaders, multiple potential intersections may be accumulated for a subtree in the BVH.

For the nearest-k use case the benefit of this approach is that instead of k−1 roundtrips to the SIMD core/EU 4001 and k−1 new ray spawn messages, all hit shaders are invoked from the same traversal thread during a single traversal operation on the traversal circuitry 4005. A challenge for potential implementations is that it is not trivial to guarantee the execution order of hit shaders (the standard "roundtrip" approach guarantees that the hit shader of the closest intersection is executed first, etc.). This may be addressed by either the synchronization of the hit shaders or the relaxation of the ordering.

For the intersection shader use case the traversal circuitry 4005 does not know in advance whether a given shader would return a positive intersection test. However, it is possible to speculatively execute multiple intersection shaders and if at least one returns a positive hit result, it is merged into the global nearest hit. Specific implementations need to find an optimal number of deferred intersection tests to reduce the number of dispatch calls but avoid calling too many redundant intersection shaders.

B. Aggregate Shader Invocations from the Traversal Circuitry

When dispatching multiple shaders from the same ray spawn on the traversal circuitry 4005, branches in the flow of the ray traversal algorithm may be created. This may be problematic for intersection shaders because the rest of the BVH traversal depend on the result of all dispatched intersection tests. This means that a synchronization operation is necessary to wait for the result of the shader invocations, which can be challenging on asynchronous hardware.

Two points of merging the results of the shader calls may be: the SIMD processor 4001, and the traversal circuitry 4005. With respect to the SIMD processor 4001, multiple shaders can synchronize and aggregate their results using standard programming models. One relatively simple way to do this is to use global atomics and aggregate results in a shared data structure in memory, where intersection results of multiple shaders could be stored. Then the last shader can resolve the data structure and call back the traversal circuitry 4005 to continue the traversal.

A more efficient approach may also be implemented which limits the execution of multiple shader invocations to lanes of the same SIMD thread on the SIMD processor 4001. The intersection tests are then locally reduced using SIMD/SIMT reduction operations (rather than relying on global atomics). This implementation may rely on new circuitry within the sorting unit 4008 to let a small batch of shader invocations stay in the same SIMD batch.

The execution of the traversal thread may further be suspended on the traversal circuitry 4005. Using the conventional execution model, when a shader is dispatched during traversal, the traversal thread is terminated and the ray traversal state is saved to memory to allow the execution of other ray spawn commands while the execution units 4001 process the shaders. If the traversal thread is merely suspended, the traversal state does not need to be stored and can wait for each shader result separately. This implementation may include circuitry to avoid deadlocks and provide sufficient hardware utilization.

Figure 47:
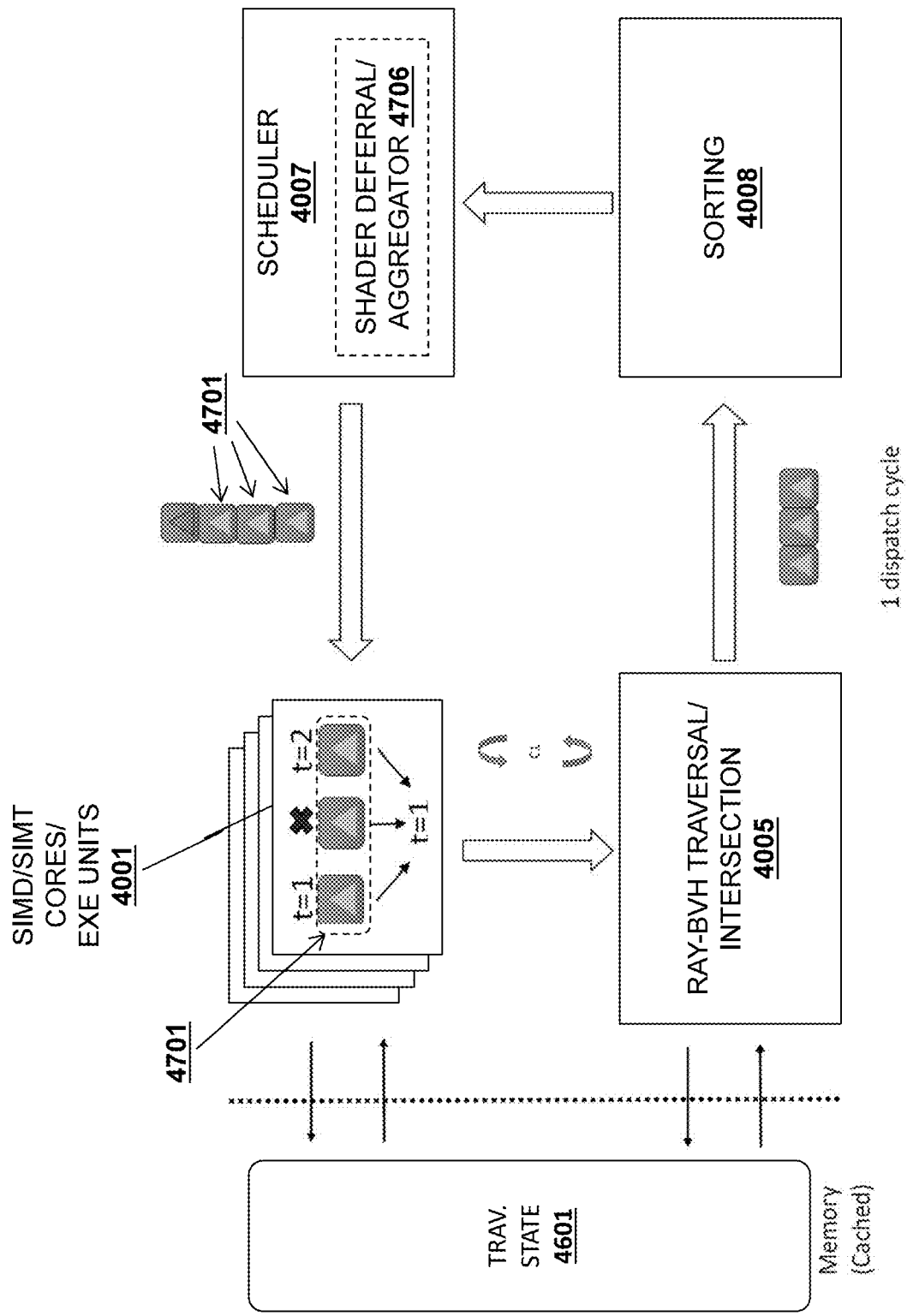
FIG. 47 illustrates how a single dispatch cycle executes a plurality of shaders.
Figure 48:
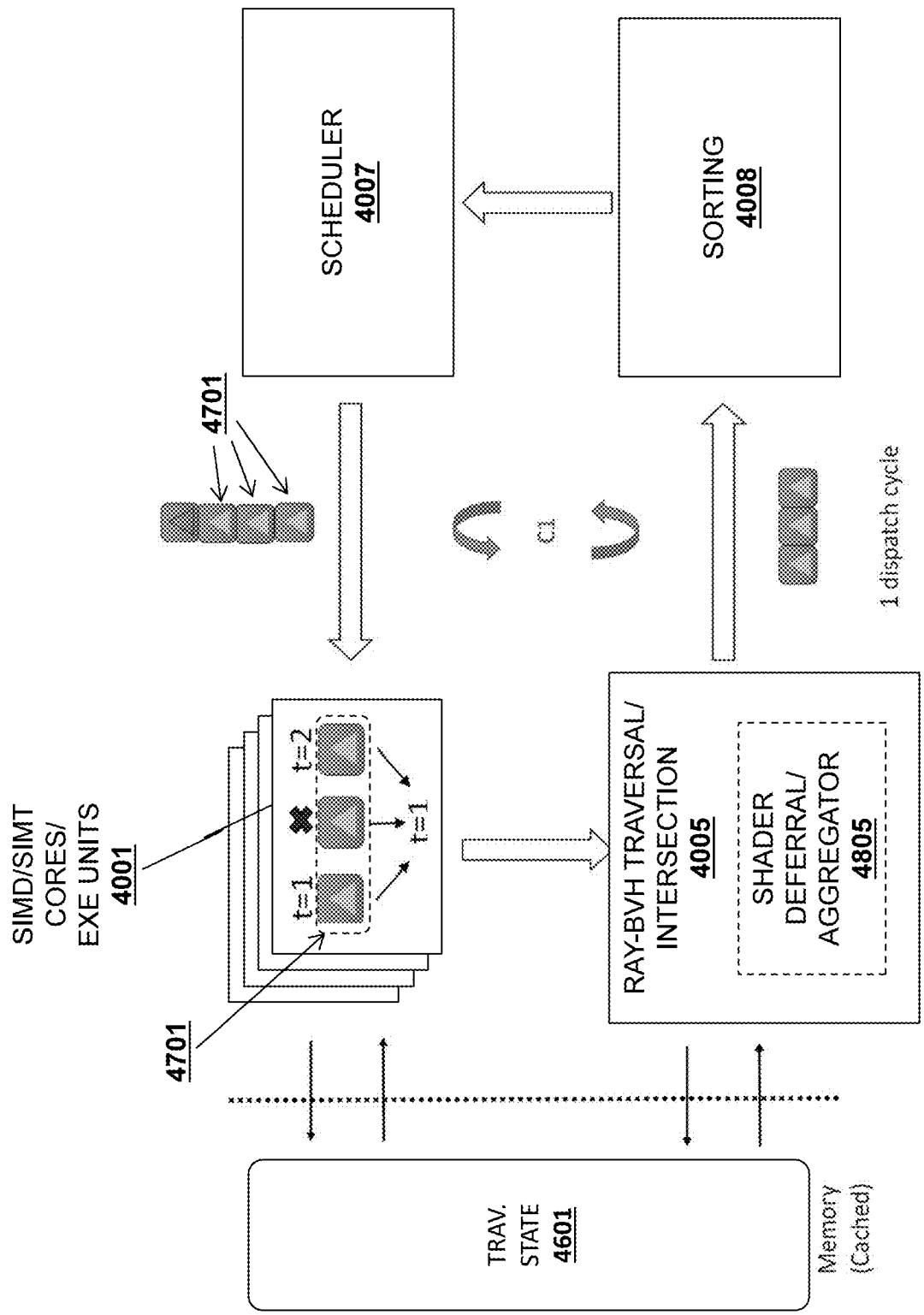
FIG. 48 illustrates how a single dispatch cycle executes a plurality of shaders.

FIGS. 47-48 illustrate examples of a deferred model which invokes a single shader invocation on the SIMD cores/execution units 4001 with three shaders 4701. When preserved, all intersection tests are evaluated within the same SIMD/SIMT group. Consequently, the nearest intersection can also be computed on the programmable cores/execution units 4001.

As mentioned, all or a portion of the shader aggregation and/or deferral may be performed by the traversal/intersection circuitry 4005 and/or the core/EU scheduler 4007. FIG. 47 illustrates how shader deferral/aggregator circuitry 4706 within the scheduler 4007 can defer scheduling of shaders associated with a particular SIMD/SIMT thread/lane until a specified triggering event has occurred. Upon detecting the triggering event, the scheduler 4007 dispatches the multiple aggregated shaders in a single SIMD/SIMT batch to the cores/EUs 4001.

FIG. 48 illustrates how shader deferral/aggregator circuitry 4805 within the traversal/intersection circuitry 4005 can defer scheduling of shaders associated with a particular SIMD thread/lane until a specified triggering event has occurred. Upon detecting the triggering event, the traversal/intersection circuitry 4005 submits the aggregated shaders to the sorting unit 4008 in a single SIMD/SIMT batch.

Note, however, that the shader deferral and aggregation techniques may be implemented within various other components such as the sorting unit 4008 or may be distributed across multiple components. For example, the traversal/intersection circuitry 4005 may perform a first set of shader aggregation operations and the scheduler 4007 may perform a second set of shader aggregation operations to ensure that shaders for a SIMD thread are scheduled efficiently on the cores/EUs 4001.

The "triggering event" to cause the aggregated shaders to be dispatched to the cores/EUs may be a processing event such as a particular number of accumulated shaders or a minimum latency associated with a particular thread. Alternatively, or in addition, the triggering event may be a temporal event such as a certain duration from the deferral of the first shader or a particular number of processor cycles. Other variables such as the current workload on the cores/EUs 4001 and the traversal/intersection unit 4005 may also be evaluated by the scheduler 4007 to determine when to dispatch the SIMD/SIMT batch of shaders.

Different embodiments of the invention may be implemented using different combinations of the above approaches, based on the particular system architecture being used and the requirements of the application.

Ray Tracing Instructions

The ray tracing instructions described below are included in an instruction set architecture (ISA) supported the CPU 3199 and/or GPU 3105. If executed by the CPU, the single instruction multiple data (SIMD) instructions may utilize vector/packed source and destination registers to perform the described operations and may be decoded and executed by a CPU core. If executed by a GPU 3105, the instructions may be executed by graphics cores 3130. For example, any of the execution units (EUs) 4001 described above may execute the instructions. Alternatively, or in addition, the instructions may be executed by execution circuitry on the ray tracing cores 3150 and/or tensor cores tensor cores 3140.

Figure 49:
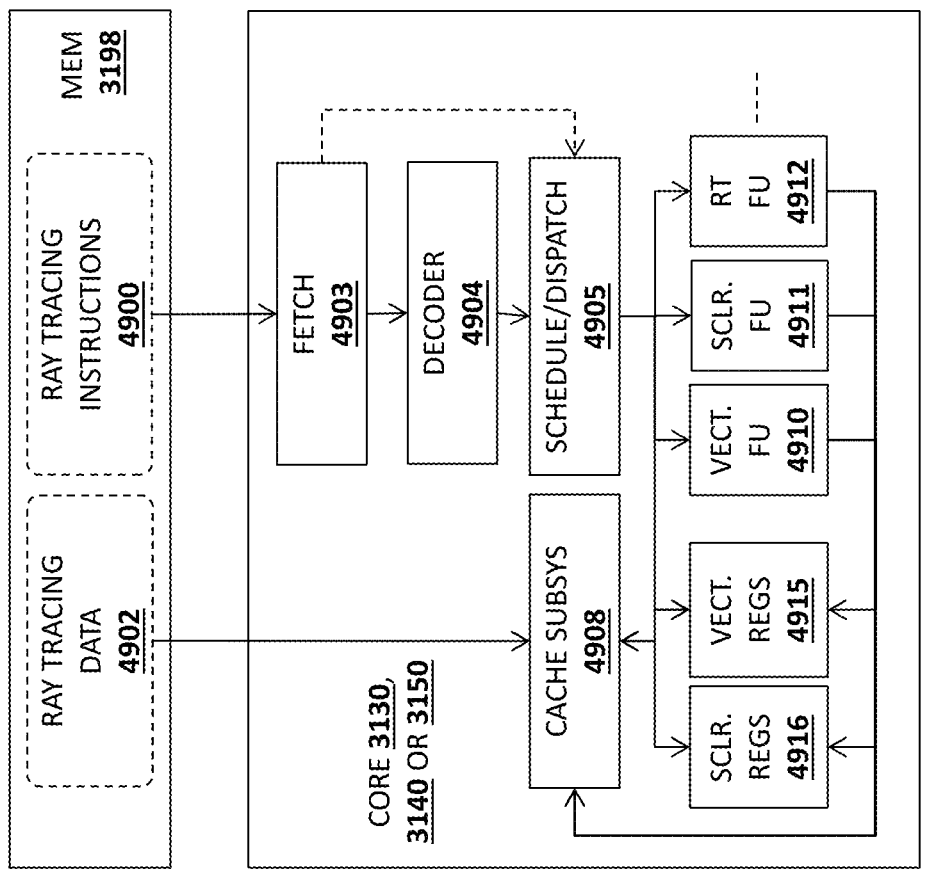
FIG. 49 illustrates an architecture for executing ray tracing instructions.

FIG. 49 illustrates an architecture for executing the ray tracing instructions described below. The illustrated architecture may be integrated within one or more of the cores 3130, 3140, 3150 described above (see, e.g., FIG. 31 and associated text) of may be included in a different processor architecture.

In operation, an instruction fetch unit 4903 fetches ray tracing instructions 4900 from memory 3198 and a decoder 4995 decodes the instructions. In one implementation the decoder 4995 decodes instructions to generate executable operations (e.g., microoperations or uops in a microcoded core). Alternatively, some or all of the ray tracing instructions 4900 may be executed without decoding and, as such a decoder 4904 is not required.

In either implementation, a scheduler/dispatcher 4905 schedules and dispatches the instructions (or operations) across a set of functional units (FUs) 4910-4912. The illustrated implementation includes a vector FU 4910 for executing single instruction multiple data (SIMD) instructions which operate concurrently on multiple packed data elements stored in vector registers 4915 and a scalar FU 4911 for operating on scalar values stored in one or more scalar registers 4916. An optional ray tracing FU 4912 may operate on packed data values stored in the vector registers 4915 and/or scalar values stored in the scalar registers 4916. In an implementation without a dedicated FU 4912, the vector FU 4910 and possibly the scalar FU 4911 may perform the ray tracing instructions described below.

The various FUs 4910-4912 access ray tracing data 4902 (e.g., traversal/intersection data) needed to execute the ray tracing instructions 4900 from the vector registers 4915, scalar register 4916 and/or the local cache subsystem 4908 (e.g., a L1 cache). The FUs 4910-4912 may also perform accesses to memory 3198 via load and store operations, and the cache subsystem 4908 may operate independently to cache the data locally.

While the ray tracing instructions may be used to increase performance for ray traversal/intersection and BVH builds, they may also be applicable to other areas such as high performance computing (HPC) and general purpose GPU (GPGPU) implementations.

In the below descriptions, the term double word is sometimes abbreviated dw and unsigned byte is abbreviated ub. In addition, the source and destination registers referred to below (e.g., src0, src1, dest, etc) may refer to vector registers 4915 or in some cases a combination of vector registers 4915 and scalar registers 4916. Typically, if a source or destination value used by an instruction includes packed data elements (e.g., where a source or destination stores N data elements), vector registers 4915 are used. Other values may use scalar registers 4916 or vector registers 4915.

Dequantize

One example of the Dequantize instruction "dequantizes" previously quantized values. By way of example, in a ray tracing implementation, certain BVH subtrees may be quantized to reduce storage and bandwidth requirements. The dequantize instruction may take the form dequantize dest src0 src1 src2 where source register src0 stores N unsigned bytes, source register src1 stores 1 unsigned byte, source register src2 stores 1 floating point value, and destination register dest stores N floating point values. All of these registers may be vector registers 4915. Alternatively, src0 and dest may be vector registers 4915 and src 1 and src2 may be scalar registers 4916.

The following code sequence defines one particular implementation of the dequantize instruction:

```
for (int i = 0; i < SIMD_WIDTH) {
  if (execMask[i]) {
    dst[i] = src2[i] + Idexp(convert_to_float(src0[i]),src1);
  }
}
```

In this example, Idexp multiplies a double precision floating point value by a specified integral power of two (i.e., Idexp(x, exp)=x*$2^{exp}$). In the above code, if the execution mask value associated with the current SIMD data element (execMask[i])) is set to 1, then the SIMD data element at location i in src0 is converted to a floating point value and multiplied by the integral power of the value in src1 ($2^{src1\ value}$) and this value is added to the corresponding SIMD data element in src2.

Selective Min or Max

A selective min or max instruction may perform either a min or a max operation per lane (i.e., returning the minimum or maximum of a set of values), as indicated by a bit in a bitmask. The bitmask may utilize the vector registers 4915, scalar registers 4916, or a separate set of mask registers (not shown). The following code sequence defines one particular implementation of the min/max instruction: sel_min_max dest src0 src1 src2, where src0 stores N doublewords, src1 stores N doublewords, src2 stores one doubleword, and the destination register stores N doublewords.

The following code sequence defines one particular implementation of the selective min/max instruction:

```
for (int i = 0; i < SIMD_WIDTH) {
  if (execMask[i]) {
    dst[i] = (1 << i) & src2 ? min(src0[i],src1[i]):
    max(src0[i],src1[i]);
  }
}
```

In this example, the value of (1<<i) & src2 (a 1 left-shifted by i ANDed with src2) is used to select either the minimum of the $i^{th}$ data element in src0 and src1 or the maximum of the $i^{th}$ data element in src0 and src1. The operation is performed for the $i^{th}$ data element only if the execution mask value associated with the current SIMD data element (execMask[i])) is set to 1.

Shuffle Index Instruction

A shuffle index instruction can copy any set of input lanes to the output lanes. For a SIMD width of 32, this instruction can be executed at a lower throughput. This instruction takes the form: shuffle_index dest src0 src1 <optional flag>, where src0 stores N doublewords, src1 stores N unsigned bytes (i.e., the index value), and dest stores N doublewords.

The following code sequence defines one particular implementation of the shuffle index instruction:

```
for (int i = 0; i < SIMD_WIDTH) {
  uint8_t srcLane = src1.index[i];
  if (execMask[i]) {
    bool invalidLane = srcLane < 0 || srcLane >= SIMD_WIDTH ||
!execMask[srcLaneMod];
    if (FLAG) {
      invalidLane |= flag[srcLaneMod];
    }
    if (invalidLane) {
      dst[i] = src0[i];
    }
    else {
      dst[i] = src0[srcLane];
    }
  }
}
```

In the above code, the index in src1 identifies the current lane. If the $i^{th}$ value in the execution mask is set to 1, then a check is performed to ensure that the source lane is within the range of 0 to the SIMD width. If so, then flag is set (srcLaneMod) and data element i of the destination is set equal to data element i of src0. If the lane is within range (i.e., is valid), then the index value from src1 (srcLane0) is used as an index into src0 (dst[i]=src0[srcLane]).

Immediate Shuffle Up/Dn/XOR Instruction

An immediate shuffle instruction may shuffle input data elements/lanes based on an immediate of the instruction. The immediate may specify shifting the input lanes by 1, 2, 4, 8, or 16 positions, based on the value of the immediate. Optionally, an additional scalar source register can be specified as a fill value. When the source lane index is invalid, the fill value (if provided) is stored to the data element location in the destination. If no fill value is provided, the data element location is set to all 0.

A flag register may be used as a source mask. If the flag bit for a source lane is set to 1, the source lane may be marked as invalid and the instruction may proceed.

The following are examples of different implementations of the immediate shuffle instruction:

```
shuffle_<up/dn/xor>_<1/2/4/8/16> dest src0 <optional src1>
<optional flag>
shuffle_<up/dn/xor>_<1/2/4/8/16> dest src0 <optional src1>
<optional flag>
```

In this implementation, src0 stores N doublewords, src1 stores one doubleword for the fill value (if present), and dest stores N doublewords comprising the result.

The following code sequence defines one particular implementation of the immediate shuffle instruction:

```
for (int i = 0; i < SIMD_WIDTH) {
  int8_t srcLane;
  switch(SHUFFLE_TYPE) {
    case UP:
      srcLane = i - SHIFT;
    case DN:
      srcLane = i + SHIFT;
    case XOR:
      srcLane = i ^ SHIFT;
  }
  if (execMask[i]) {
    bool invalidLane = srcLane < 0 || srcLane >= SIMD_WIDTH ||
!execMask[srcLane];
    if (FLAG) {
      invalidLane |= flag[srcLane];
    }
    if (invalidLane) {
      if (SRC1)
        dst[i] = src1;
      else
        dst[i] = 0;
    }
    else {
      dst[i] = src0[srcLane];
    }
  }
}
```

Here the input data elements/lanes are shifted by 1, 2, 4, 8, or 16 positions, based on the value of the immediate. The register src1 is an additional scalar source register which is used as a fill value which is stored to the data element location in the destination when the source lane index is invalid. If no fill value is provided and the source lane index is invalid, the data element location in the destination is set to 0s. The flag register (FLAG) is used as a source mask. If the flag bit for a source lane is set to 1, the source lane is marked as invalid and the instruction proceeds as described above.

Indirect Shuffle Up/Dn/XOR Instruction

The indirect shuffle instruction has a source operand (src1) that controls the mapping from source lanes to destination lanes. The indirect shuffle instruction may take the form:

shuffle_<up/dn/xor> dest src0 src1 <optional flag> where src0 stores N doublewords, src1 stores 1 doubleword, and dest stores N doublewords.

The following code sequence defines one particular implementation of the immediate shuffle instruction:

```
for (int i = 0; i < SIMD_WIDTH) {
  Int8_t srcLane;
  switch(SHUFFLE_TYPE) {
    case UP:
      srcLane = i - src1;
    case DN:
      srcLane = i + src1;
    case XOR:
      srcLane = i ^ src1;
  }
  If (execMask[i] ) {
    bool invalidLane = srcLane < 0 || srcLane >= SIMD_WIDTH ||
!execMask[srcLane];
    If (FLAG) {
      invalidLane | = flag[srcLane];
    }
    If (invalidLane) {
      dst[i] = 0;
    }
    else {
      dst[i] = src0[srcLane];
    }
  }
}
```

Thus, the indirect shuffle instruction operates in a similar manner to the immediate shuffle instruction described above, but the mapping of source lanes to destination lanes is controlled by the source register src1 rather than the immediate.

Cross Lane Min/Max Instruction

A cross lane minimum/maximum instruction may be supported for float and integer data types. The cross lane minimum instruction may take the form lane_min dest src0 and the cross lane maximum instruction may take the form lane_max dest src0, where src0 stores N doublewords and dest stores 1 doubleword.

By way of example, the following code sequence defines one particular implementation of the cross lane minimum:

```
dst = src[0];
for (int i = 1; i < SIMD_WIDTH) {
  if (execMask[i]) {
    dst = min(dst, src[i]);
  }
}
```

In this example, the doubleword value in data element position i of the source register is compared with the data element in the destination register and the minimum of the two values is copied to the destination register. The cross lane maximum instruction operates in substantially the same manner, the only difference being that the maximum of the data element in position i and the destination value is selected.

Cross Lane Min/Max Index Instruction

A cross lane minimum index instruction may take the form lane_nnin_index dest src0 and the cross lane maximum index instruction may take the form lane_max_index dest src0, where src0 stores N doublewords and dest stores 1 doubleword.

By way of example, the following code sequence defines one particular implementation of the cross lane minimum index instruction:

```
dst_index = 0;
tmp = src[0]
for (int i = 1; i < SIMD_WIDTH) {
  if (src[i] < tmp && execMask[i])
  {
    tmp = src[i];
    dst_index = i;
  }
}
```

In this example, the destination index is incremented from 0 to SIMD width, spanning the destination register. If the execution mask bit is set, then the data element at position i in the source register is copied to a temporary storage location (tmp) and the destination index is set to data element position i.

Cross Lane Sorting Network Instruction

A cross-lane sorting network instruction may sort all N input elements using an N-wide (stable) sorting network, either in ascending order (sortnet_min) or in descending order (sortnet_max). The min/max versions of the instruction may take the forms sortnet_min dest src0 and sortnet_max dest src0, respectively. In one implementation, src0 and dest store N doublewords. The min/max sorting is performed on the N doublewords of src0, and the ascending ordered elements (for min) or descending ordered elements (for max) are stored in dest in their respective sorted orders. One example of a code sequence defining the instruction is: dst=apply_N_wide_sorting_network_min/max(src0).

Cross Lane Sorting Network Index Instruction

A cross-lane sorting network index instruction may sort all N input elements using an N-wide (stable) sorting network but returns the permute index, either in ascending order (sortnet_min) or in descending order (sortnet_max). The min/max versions of the instruction may take the forms sortnet_rnin_index dest src0 and sortnet_rnax_index dest src0 where src0 and dest each store N doublewords. One example of a code sequence defining the instruction is dst=apply_N_wide_sorting_network_min/max_index (src0).

Figure 50:
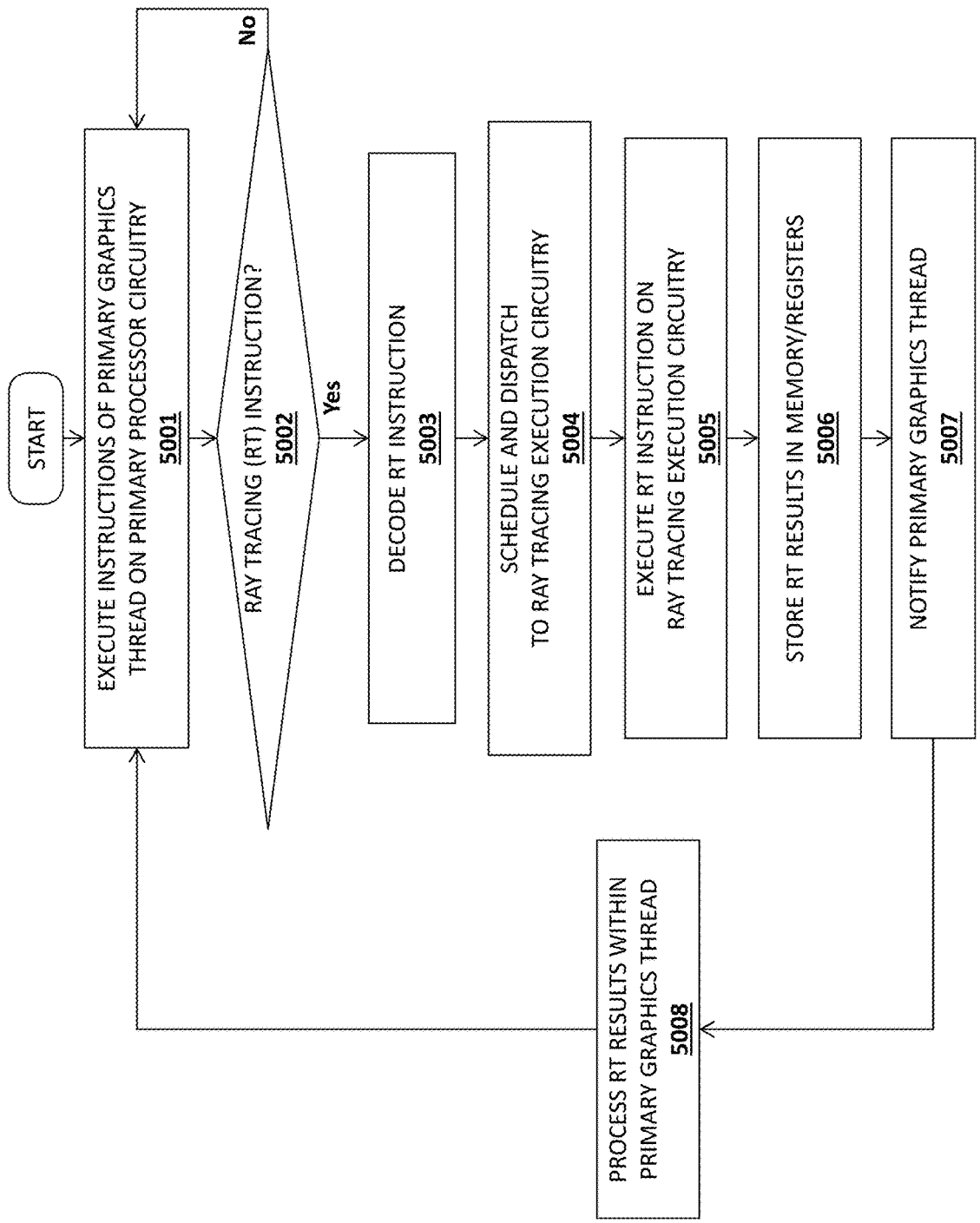
FIG. 50 illustrates a method for executing ray tracing instructions within a thread.

A method for executing any of the above instructions is illustrated in FIG. 50. The method may be implemented on the specific processor architectures described above, but is not limited to any particular processor or system architecture.

At 5001 instructions of a primary graphics thread are executed on processor cores. This may include, for example, any of the cores described above (e.g., graphics cores 3130). When ray tracing work is reached within the primary graphics thread, determined at 5002, the ray tracing instructions are offloaded to the ray tracing execution circuitry which may be in the form of a functional unit (FU) such as described above with respect to FIG. 49 or which may be in a dedicated ray tracing core 3150 as described with respect to FIG. 31.

At 5003, the ray tracing instructions are decoded are fetched from memory and, at 5005, the instructions are decoded into executable operations (e.g., in an embodiment which requires a decoder). At 5004 the ray tracing instructions are scheduled and dispatched for execution by ray tracing circuitry. At 5005 the ray tracing instructions are executed by the ray tracing circuitry. For example, the instructions may be dispatched and executed on the FUs described above (e.g., vector FU 4910, ray tracing FU4912, etc) and/or the graphics cores 3130 or ray tracing cores 3150.

When execution is complete for a ray tracing instruction, the results are stored at 5006 (e.g., stored back to the memory 3198) and at 5007 the primary graphics thread is notified. At 5008, the ray tracing results are processed within the context of the primary thread (e.g., read from memory and integrated into graphics rendering results).

In embodiments, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine, module, or logic may be implemented in firmware, hardware, software, or any combination of firmware, hardware, and software.

Apparatus and Method for Asynchronous Ray Tracing

Embodiments of the invention include a combination of fixed function acceleration circuitry and general purpose processing circuitry to perform ray tracing. For example, certain operations related to ray traversal of a bounding volume hierarchy (BVH) and intersection testing may be performed by the fixed function acceleration circuitry, while a plurality of execution circuits execute various forms of ray tracing shaders (e.g., any hit shaders, intersection shaders, miss shaders, etc). One embodiment includes dual high-bandwidth storage banks comprising a plurality of entries for storing rays and corresponding dual stacks for storing BVH nodes. In this embodiment, the traversal circuitry alternates between the dual ray banks and stacks to process a ray on each clock cycle. In addition, one embodiment includes priority selection circuitry/logic which distinguishes between internal nodes, non-internal nodes, and primitives and uses this information to intelligently prioritize processing of the BVH nodes and the primitives bounded by the BVH nodes.

One particular embodiment reduces the high speed memory required for traversal using a short stack to store a limited number of BVH nodes during traversal operations. This embodiment includes stack management circuitry/logic to efficiently push and pop entries to and from the short stack to ensure that the required BVH nodes are available. In addition, traversal operations are tracked by performing updates to a tracking data structure. When the traversal circuitry/logic is paused, it can consult the tracking data structure to begin traversal operations at the same location within the BVH where it left off. and the tracking data maintained in a data structure tracking is performed so that the traversal circuitry/logic can restart.

Figure 51:
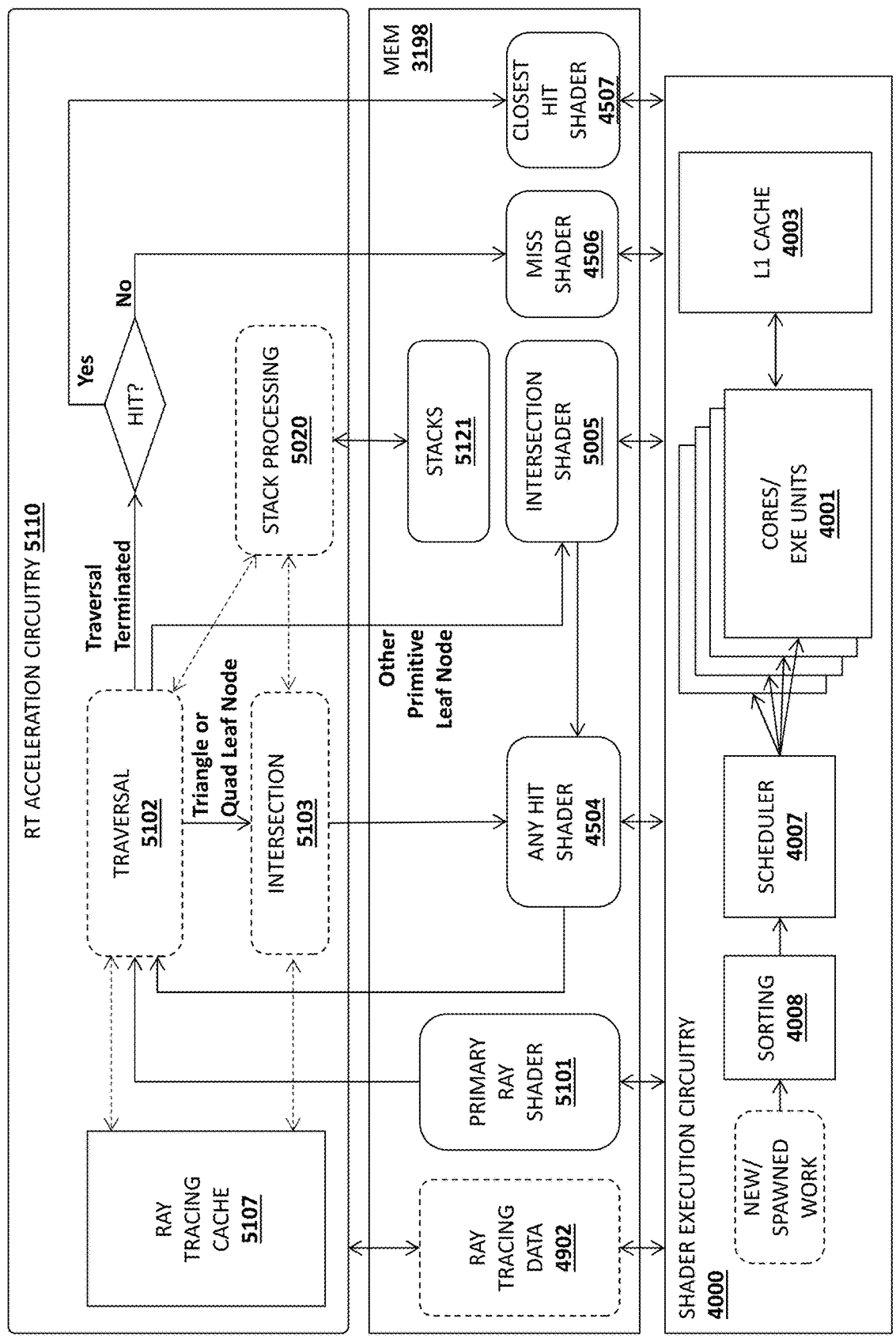
FIG. 51 illustrates one embodiment of an architecture for asynchronous ray tracing.

FIG. 51 illustrates one embodiment comprising shader execution circuitry 4000 for executing shader program code and processing associated ray tracing data 4902 (e.g., BVH node data and ray data), ray tracing acceleration circuitry 5110 for performing traversal and intersection operations, and a memory 3198 for storing program code and associated data processed by the RT acceleration circuitry 5110 and shader execution circuitry 4000.

In one embodiment, the shader execution circuitry 4000 includes a plurality of cores/execution units 4001 which execute shader program code to perform various forms of data-parallel operations. For example, in one embodiment, the cores/execution units 4001 can execute a single instruction across multiple lanes, where each instance of the instruction operates on data stored in a different lane. In a SIMT implementation, for example, each instance of the instruction is associated with a different thread. During execution, an L1 cache stores certain ray tracing data for efficient access (e.g., recently or frequently accessed data).

A set of primary rays may be dispatched to the scheduler 4007, which schedules work to shaders executed by the cores/EUs 4001. The cores/EUs 4001 may be ray tracing cores 3150, graphics cores 3130, CPU cores 3199 or other types of circuitry capable of executing shader program code. One or more primary ray shaders 5101 process the primary rays and spawn additional work to be performed by ray tracing acceleration circuitry 5110 and/or the cores/EUs 4001 (e.g., to be executed by one or more child shaders). New work spawned by the primary ray shader 5101 or other shaders executed by the cores/EUs 4001 may be distributed to sorting circuitry 4008 which sorts the rays into groups or bins as described herein (e.g., grouping rays with similar characteristics). The scheduler 4007 then schedules the new work on the cores/EUs 4001.

Other shaders which may be executed include any hit shaders 4514 and closest hit shaders 4507 which process hit results as described above (e.g., identifying any hit or the closest hit for a given ray, respectively). A miss shader 4506 processes ray misses (e.g., where a ray does not intersect the node/primitive). As mentioned, the various shaders can be referenced using a shader record which may include one or more pointers, vendor-specific metadata, and global arguments. In one embodiment, shader records are identified by shader record identifiers (SRI). In one embodiment, each executing instance of a shader is associated with a call stack 5203 which stores arguments passed between a parent shader and child shader. Call stacks 5121 may also store references to continuation functions that are executed when a call returns.

Ray traversal circuitry 5102 traverses each ray through nodes of a BVH, working down the hierarchy of the BVH (e.g., through parent nodes, child nodes, and leaf nodes) to identify nodes/primitives traversed by the ray. Ray-BVH intersection circuitry 5103 performs intersection testing of rays, determining hit points on primitives, and generates results in response to the hits. The traversal circuitry 5102 and intersection circuitry 5103 may retrieve work from the one or more call stacks 5121. Within the ray tracing acceleration circuitry 5110, call stacks 5121 and associated ray tracing data 4902 may be stored within a local ray tracing cache (RTC) 5107 or other local storage device for efficient access by the traversal circuitry 5102 and intersection circuitry 5103. One particular embodiment described below includes high-bandwidth ray banks (see, e.g., FIG. 52A).

The ray tracing acceleration circuitry 5110 may be a variant of the various traversal/intersection circuits described herein including ray-BVH traversal/intersection circuit 4005, traversal circuit 4502 and intersection circuit 4503, and ray tracing cores 3150. The ray tracing acceleration circuitry 5110 may be used in place of the ray-BVH traversal/intersection circuit 4005, traversal circuit 4502 and intersection circuit 4503, and ray tracing cores 3150 or any other circuitry/logic for processing BVH stacks and/or performing traversal/intersection. Therefore, the disclosure of any features in combination with the ray-BVH traversal/intersection circuit 4005, traversal circuit 4502 and intersection circuit 4503, and ray tracing cores 3150 described herein also discloses a corresponding combination with the ray tracing acceleration circuitry 5110, but is not limited to such.

Figure 52A:
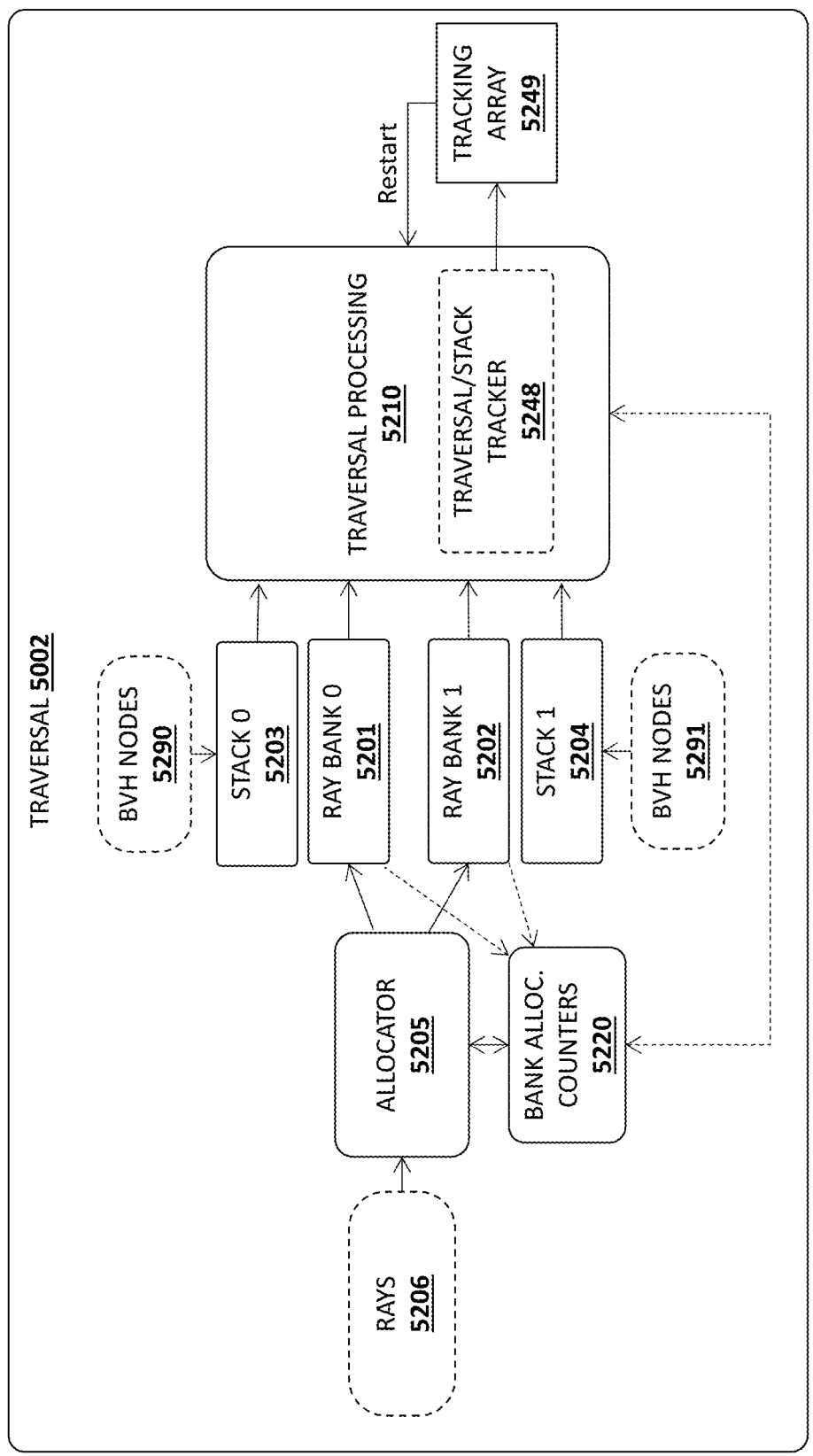
FIG. 52A illustrates one embodiment of a ray traversal circuit.

Referring to FIG. 52A, one embodiment of the ray traversal circuitry 5102 includes first and second ray storage banks, 5201 and 5202, respectively, where each bank comprises a plurality of entries for storing a corresponding plurality of incoming rays 5206 loaded from memory. Corresponding first and second stacks, 5203 and 5204, respectively, comprise selected BVH node data 5290-5291 read from memory and stored locally for processing. As described herein, in one embodiment, the stacks 5203-5204 are "short" stacks comprising a limited number of entries for storing BVH node data (e.g., six entries in one embodiment). While illustrated separately from the ray banks 5201-5202, the stacks 5203-5204 may also be maintained within the corresponding ray banks 5201-5202. Alternatively, the stacks 5203-5204 may be stored in a separate local memory or cache.

One embodiment of the traversal processing circuitry 5210 alternates between the two banks 5201-5202 and stacks 5203-5204 when selecting the next ray and node to process (e.g., in a ping-pong manner). For example, the traversal processing circuitry 5210 may select a new ray/BVH node from an alternate ray bank/stack on each clock cycle, thereby ensuring highly efficient operation. It should be noted, however, this specific arrangement is not necessary for complying with the underlying principles of the invention.

In one embodiment, a ray allocator 5205 balances the entry of incoming rays 5206 into the first and second memory banks 5201-5202, respectively, based on current relative values of a set of bank allocation counters 5220. In one embodiment, the bank allocation counters 5220 maintain a count of the number of untraversed rays in each of the first and second memory banks 5201-5202. For example, a first bank allocation counter may be incremented when the ray allocator 5205 adds a new ray to the first bank 5201 and decremented when a ray is processed from the first bank 5201. Similarly, the second bank allocation counter may be incremented when the ray allocator 5205 adds a new ray to the second bank 5201 and decremented when a ray is processed from the second bank 5201.

In one embodiment, the ray allocator 5205 allocates the current ray to a bank associated with the smaller counter value. If the two counters are equal, the ray allocator 5205 may select either bank or may select a different bank from the one selected the last time the counters were equal. In one embodiment, each ray is stored in one entry of one of the banks 5201-5202 and each bank comprises 32 entries for storing up to 32 rays. However, the underlying principles of the invention are not limited to these details.

Figure 52B:
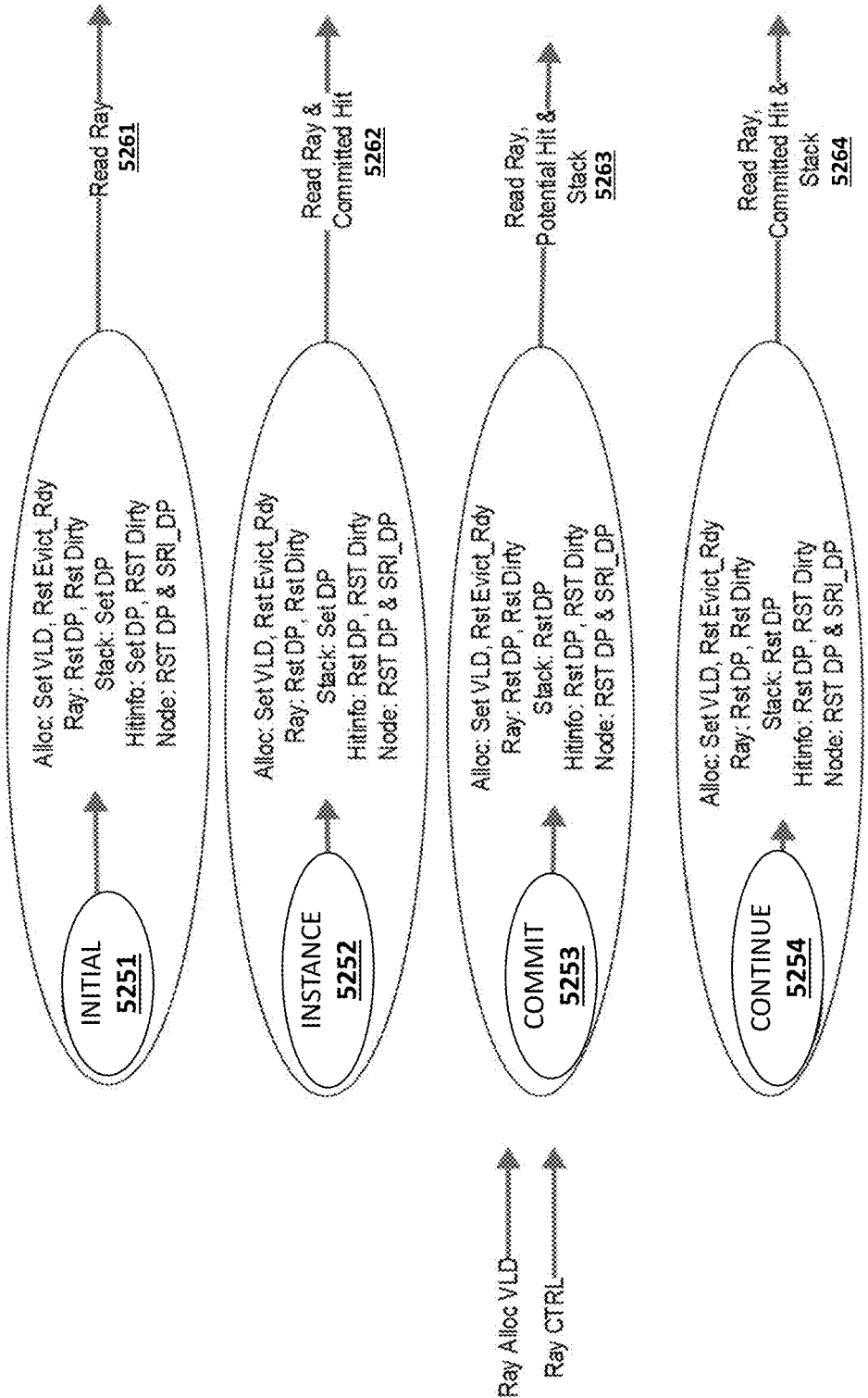
FIG. 52B illustrates processes executed in one embodiment to manage ray storage banks.

FIG. 52B illustrates four processes 5251-5254 executed in one embodiment to manage the ray storage banks 5201-5202 and stacks 5203-5204. In one embodiment, the four processes 5251-5254 are different implementations or configurations of a common set of program code (sometimes referred to herein as "TraceRay"). The Initial process 5251 may be executed to read the ray 5261 and perform a new top-down traversal of a BVH, starting from the root node. The Alloc function modifies control bits and launches corresponding read requests to the ray tracing stack. In particular, to allocate the new entry, Alloc sets the valid (VLD) bit and resets the evict ready (Evict_Rdy) bit. In the bank entry for the ray, the data present (DP) bit and the dirty bit are reset. The DP bit in the corresponding stack entry is set. For the corresponding Hitinfo, the DP bit is set and the dirty bit is reset. The DP bit and the shader record identifier (SRI) DP bit associated with the node data are reset.

The instance process 5252 performs traversal within one of the nodes of the BVH (other than the root node) and reads the ray and prior committed hit 5262. In one embodiment, when one of the hit shaders identifies a hit between the ray and a primitive, then the commit process 5253 is executed to commit results, reading the ray, the potential hit, and the stack 5263. Alternatively, the continue process 5254 is executed to continue traversal of the ray, reading the ray, the committed hit, and the stack 5264.

In various circumstances, the traversal circuitry 5002 must pause traversal operations and save the current ray and associated BVH nodes, such as when a shader is required to perform a sequence of operations. For example, if a non-opaque object is hit or a procedural texture, the traversal circuitry 5002 saves the stack 5203-5204 to memory and executes the required shader. Once the shader has completed processing the hit (or other data), the traversal circuitry 5002 restores the state of the ray banks 5201-5202 and stacks 5203-5204 from memory.

In one embodiment, a traversal/stack tracker 5248 continually monitors traversal and stack operations and stores restart data in a tracking array 5249. For example, if the traversal circuitry 5002 has already traversed nodes N, N0, N1, N2, and N00, and generated results, then the traversal/stack tracker 5248 will update the tracking array to indicate that traversal of these nodes has completed and/or to indicate the next node to be processed from the stack. When the traversal circuitry 5002 is restarted, it reads the restart data from the tracking array 5249 so that it may restart traversal at the correct stage, without re-traversing any of the BVH nodes (and wasting cycles). The restart data stored in the tracking array 5249 is sometimes referred to as the "restart trail" or "RST."

As indicated in FIG. 52B, the various TraceRay processes 5251-5254 manage allocation into and out of the ray storage banks 5201-5202 via one or more functions. As illustrated for the initial process 5251, an Alloc function sets the valid bit (VLD) in a storage bank entry (indicating that the entry now contains a valid ray) and resets (Rst) the eviction ready flag (indicating that the ray data should not be evicted). The Ray function stores the ray in the selected entry and resets the data present (DP) bit (indicating that ray data is stored in the entry) and the dirty bit (indicating that the data has not been modified). Upon reading the ray from the storage bank, the Stack function sets the DP bit and retrieves the relevant BVH node from the stack (e.g., the root node in the case of the initial process 5251 and another node in the case of the instance process 5252). The HitInfo function resets the dirty bit and sets the DP bit for the initial function 5251 or resets it for all other functions. In one embodiment, Hitinfo produces data reflecting a ray hit. The Node function resets the DP bit and the SRI (shader record identifier) DP which is the DP for Shader Record Identifier. One embodiment performs a Kernel Start Pointer (KSP) lookup to ensure that KSP is not equal to zero. If it is, then different handling is implemented for non-opaque Quads.

In one embodiment, once a ray entry has been allocated in one of the storage banks 5201-5202 a fetch is performed to retrieve the node data (and potentially other data) from the stack associated with the ray. In one embodiment, a stack is maintained for each ray, comprising the working set of data for the current node through which the ray is traversed.

When moving to the next level in the BVH (e.g., upon determining that the ray intersects a parent node), the child nodes are sorted and pushed on the stack 5203-5204. The child nodes are popped off the stack sequentially and processed individually to identify child nodes which the ray traverses (traversal "hits"). In one embodiment, the stack is stored out to memory or a local cache/storage whenever there is a handoff between the RT acceleration circuitry 5110 and the shaders 4504, 4506, 4507, 5101, 5105.

When a leaf node comprising a quad or triangle (or other primitive type) is identified by the traversal circuitry 5102, it passes this information to the intersection circuitry 5103 which performs an intersection test on the quad or triangle, respectively. If the primitive is not a quad or triangle then, in one implementation, the traversal circuitry terminates traversal and passes control back to the closest hit shader 4507 (if a hit is detected) or the miss shader 4506 (if no hit is detected). In an implementation in which the intersection circuitry 5103 is designed to perform intersections for a variety of primitives in addition to quads and triangles (e.g., lines, arcs, circles, etc), then the traversal circuitry 5102 will forward leaf nodes for these primitives to the intersection circuitry 5103.

In one embodiment, when a hardware or software component generates a read request to memory 3198 or cache, a 16-bit tag is used to provide information about the data type and requestor. For example, a two-bit code may specify whether the request is for a ray, stack data, hit data, node data from the BVH, or any other type of data. When the ray, stack, and Hitinfo has been returned from memory, the ray is traversed through one or more BVH nodes and intersection testing is performed as described above.

One or more stacks 5203-5204 and rays 5206 are loaded from memory at different processing stages. For example, the initial process 5251 and/or instance process 5252 may require a new BVH to be loaded for traversal. In these circumstances, the stack 5203-5204 may be initialized to the top node (or "root" node) of the BVH. For a ray continuation 5254 within a BVH, the stack 5203-5204 may be loaded from memory and expanded. Once the stack 5203-5204 has been prepared, node data is fetched from the stack (an operation sometimes referred to below as Proc_Node_Fetch).

Figure 53:
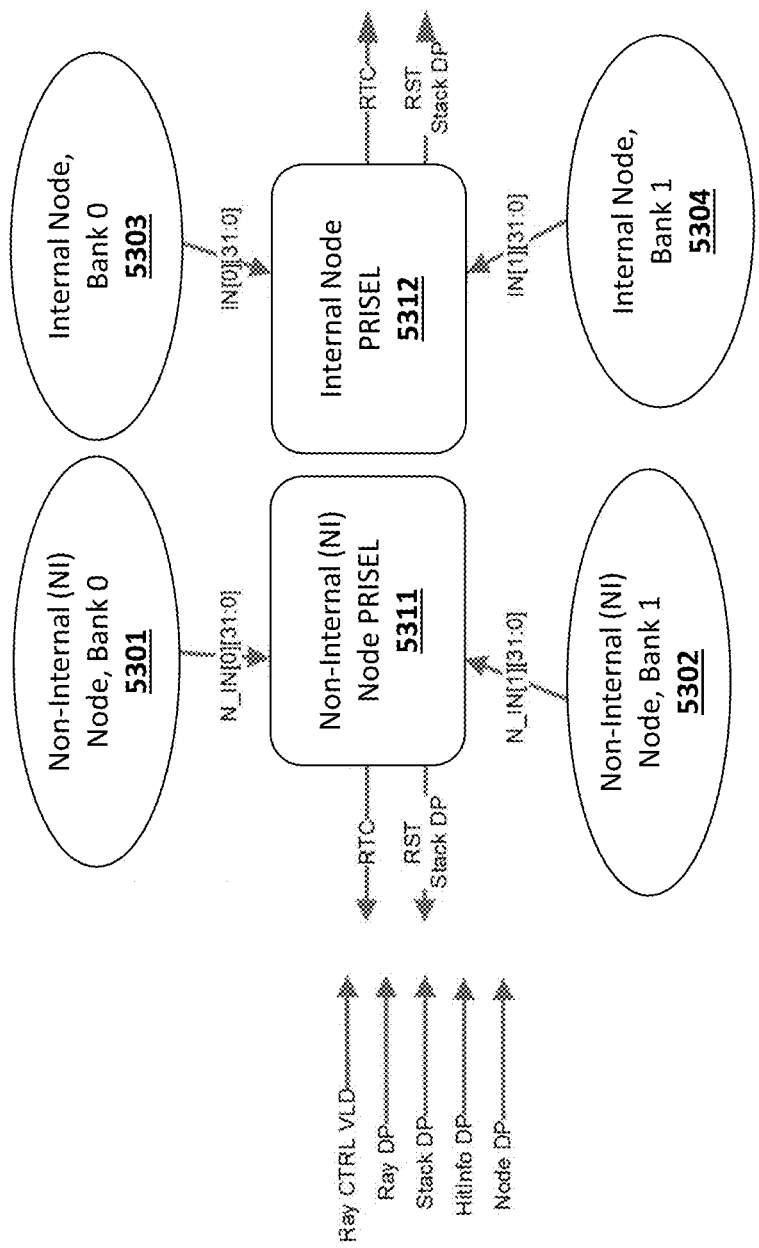
FIG. 53 illustrates one embodiment of priority selection circuitry/logic.

In one embodiment, node data is fetched by launching parallel requests for two non-internal (NI) nodes and two internal nodes. FIG. 53 illustrates one such embodiment in which NI node priority selection logic (PRISEL) 5311 requests dual NI nodes: a first NI node 5301 from Bank 0 and a second NI node 5302 from Bank 1. Concurrently, Internal Node PRISEL logic 5312 requests dual internal nodes: a first node 5303 from Bank 0 and a second node 5304 from Bank 1.

In one embodiment, NI node priority selection logic (PRISEL) 5311 prioritizes one of the first NI node 5301 and second NI node 5302, storing the prioritized result in the ray tracing cache (RTC). Similarly, Internal Node PRISEL logic 5312 requests dual internal nodes, and selects a prioritized result from a first internal node 5303 and a second internal node 5304.

Each instance of the priority selection logic 5311-5312 prioritizes one of the non-internal BVH nodes 5301-5302 and one of the internal BVH nodes 5303-5304 from a different bank if possible. In one embodiment, only one request is selected from each bank (e.g., one of requests 5302 and 5304 and one of requests 5301 and 5303). The launch of these requests may also reset the stack data present (DP) bit, as indicated, so that this entry is not retrieved in response to a node fetch operation. In one embodiment, for the instance fetch operation, the ray's data present (DP) bit is reset when the instance request is sent, and finally set when the ray is transformed after the node fetch.

In one embodiment, node_info is written at the launch of reads and the address/tag is calculated as follows for the reads requests:
  i. rtt_rtc_rd_addr[47:6]=rt_rayst_ray_ctrl.root_node_ptr[47:6]+curr_stack.child_offset; (Note: The Child offset on the node is always with respect to Current BVH Root Node)
  ii. rtt_rtc_rd_tag[6:0]={RTT_INST, rtt_alloc_entry[5:0]};
  iii. node.node_info=curr_stack.node_info.

In one embodiment, the node data returned will set the DP bit for the node and the stack.

The following cases can be distinguished based on the read tag:
  A. Internal Node: This will write to the node
  B. Instance: This will update the rt_ray.rt_ray_ctrl for next level BVH (1) and write the Node Structure.
    i. root_node_ptr=node_return.StartNodePtr
    ii. hitgrp_srbase_ptr=rt_ray_ctrl.hitgrp_srbase_ptr+rt_ray_ctrl.srstride*node_return.instancecontributiontohitgrpindex
    iii. hitgrp_sr_stride=rt_ray_ctrl.srstride*rt_ray_ctrl.shade_indx_mult
    iv. inst_leaf_ptr=rt_ray.rt_ray_ctrl.root_node_ptr+stack.current_node.child_offset—Just Logical view, grab and store the node fetch address during Instance Node fetch request itself
    v. {miss_sr_ptr, shader_indx_mult, mask}={rt_ray[0].rt_ray_ctrl.miss_sr_ptr, rt_ray[0].rt_ray_ctrl.shader_indx_mult, rt_ray[0].rt_ray_ctrl.mask} □ Preserve BVH[0]
    vi. flag[0]=rt_ray[0].rt_ray_ctrl.flag[0]|(~rt_ray[0].rt_ray_ctrl.flag[1] & Node_Return.flag[2]); → Either Preserve Opaque via Ray or Via Instance Flag (only if Ray Flag is not Force Non-Opaque)
    vii. flag[1]=(rt_ray[0].rt_ray_ctrl.flag[1])|(~rt_ray[0].rt_ray_ctrl.flag[0] & Node_Return.flag[3]); →Either Preserve Non Opaque via Ray or Via Instance Flag (only if Ray Flag is not Force Opaque)
    viii. flag[3:2]=rt_ray[0].rt_ray_ctrl.flag[3:2]; →(Accept FIRST HIT and end Search or Skip Closest Hit Shader) Preserve BVH[0]
    ix. flag[5:4]=Node_Return.flag[0] ? 2'd0: rt_ray[0].rt_ray_ctrl.flag[5:4]; →Triangle Culling is disabled VIA Instance
    x. flag[8:6]=rt_ray[0].rt_ray_ctrl.flag[8:6]; →(Disable intersection shader, Cull Opaque or Cull Non-Opaque) Preserve BVH[0]
    xi. node.node_ctrl=Not Needed for instance
    xii. node.node_data={'0, node_rtn.obj2world_p, world2obj_vzyx};
  C. Quad: This will update the node as follows
    i. node.node_ctrl={node_rtn.leafDesc.last, node_rtn.leafDesc.PrimIndex1Delta[15:0], node_rtn.leafDesc.PrimIndex0[31:0], node_rtn.shader_indx};
    ii. node.node_data={'0, Quad_mode, J[2:0], V[3:0]};→Quad_mode=node_rtn.leafDesc.PrimIndex1Delta[15:0] !_'0;

Based on the ray flag, instance flag, and the geometry flag, the opaque/non-opaque handling table shown in FIG. 54 indicates the resulting flag to be used when the node data is fetched (opaque or non-opaque). As indicated in the table, ray flags always take precedence. Additionally, some of the states are mutually exclusive. In one embodiment, these are handled in hardware with the priority of exclusive bits. In one implementation, if cull_opaque and force_opaque are both set, the associated geometry will automatically be culled.

opaque=rt_ray.rt_ray_ctrl.flag[0]|quad.flag[0]; (Note the Ray Stored per BVH Level is already accounting for the instance Flags)

nopaque=rt_ray.rt_ray_ctrl.flag[1]|~quad.flag[0];

FIG. 55A is a table showing ray flag handling and exceptions in accordance with one embodiment. Here the decision to cull is based on a combination of the ray flag, instance flag, and geometry flag.

cull_opaque=rt_ray.rt_ray_ctrl.flag[6] & (rt_ray.rt_ray_ctrl.flag[0] quad.flag[0]);
cull_nopaque=rt_ray.rt_ray_ctrl.flag[7] & (rt_ray.rt_ray_ctrl.flag[1]|~quad.flag[0]);
cull=cull_opaque|cull_nopaque;

A mask-based cull may be implemented as follows in one embodiment:

mask_kill=~|(rtc_rtt_rd_rtn.mask & rtc_rtt_rd_rtn.data.mask);

FIG. 55B is a table showing final culling in accordance with one embodiment. The Ray Flag being (cull_opaque and force_opaque) or (cull_non_opaque and force_non_opaque) are mutually exclusive. However, in this equation the Ray Flag is also accounting for the instance flag which can set the opaque/non-opaque. Only Geometry can be culled whereas both instance and geometry can be masked.

Figure 56:
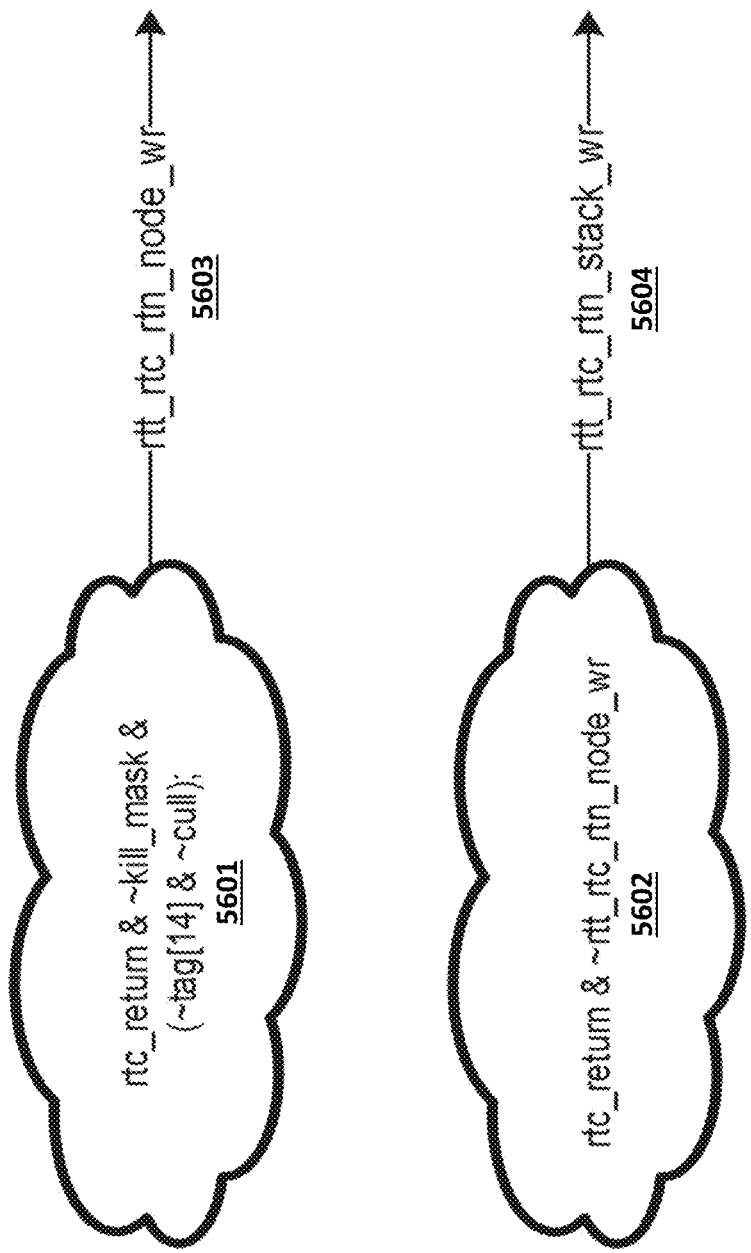
FIG. 56 illustrates one embodiment for determining early out of the ray tracing pipeline.

As illustrated in FIG. 56, in one embodiment, based on the evaluation of the cull and mask_kill settings described above, early out is determined at 5601 or 5602 and the result either sent to node storage at 5603 and/or the stack at 5604.

Figure 57:
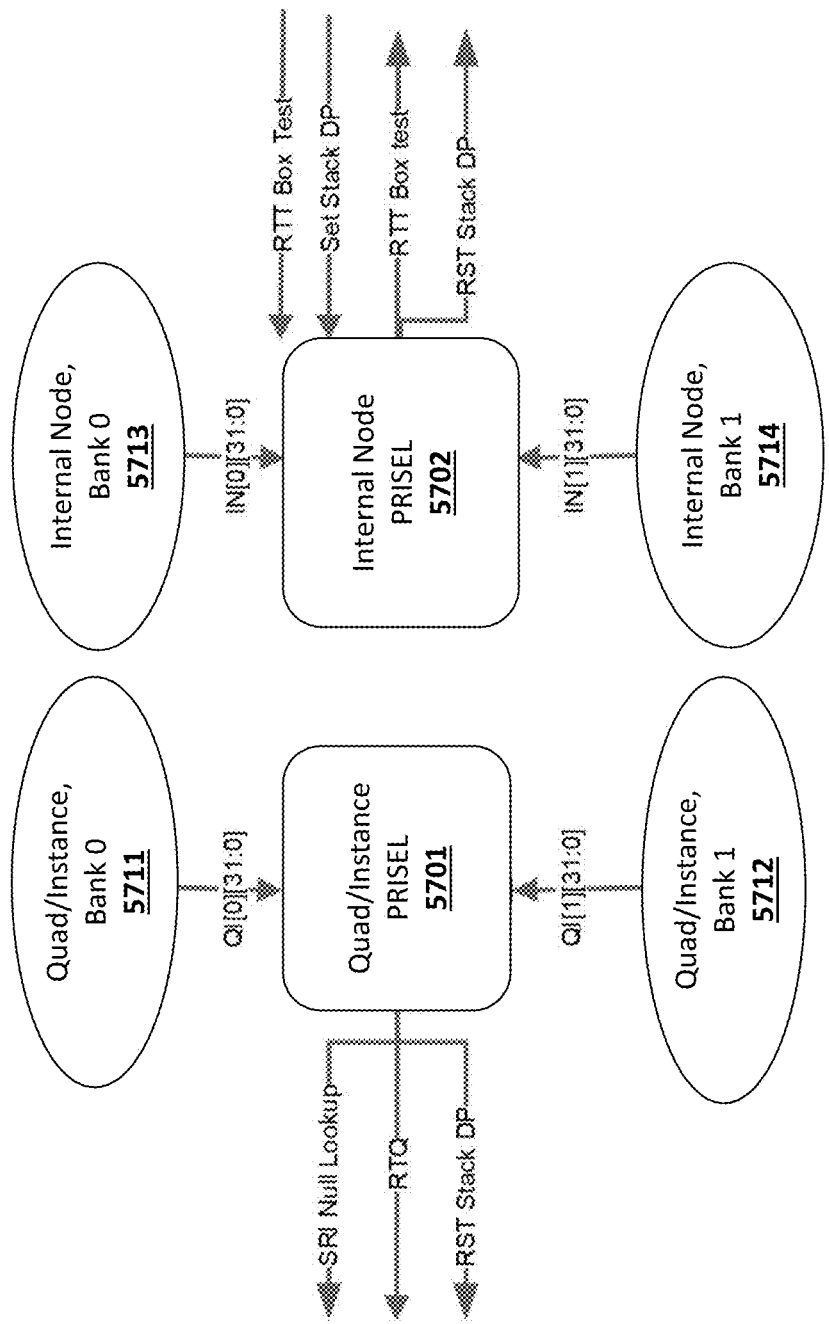
FIG. 57 illustrates one embodiment of priority selection circuitry/logic.

Once the node data is ready, box/intersection tests may be performed. This is accomplished in one embodiment by a process referred to herein as Ray_Test_Proc which has two underlying concurrent processes running, one to fill the quad/instance (QI) and another to perform the box/intersection testing. In one implementation illustrated in FIG. 57, Ray_Test_Proc launches two parallel instances of priority selection logic (PRISEL) 5701-5702: a quad/instance PRISEL 5701 for requesting and selecting between a quad/instance 5711 from Bank 0 and a second quad/instance 5712 from Bank 1, and an internal node PRISEL 5702 for requesting and selecting between an internal node from Bank 0 5713 and an internal node from Bank 1 5714.

In one embodiment, the quad/instance priority selection logic 5701 prioritizes one of the first QI node 5711 and second QI node 5712, storing the prioritized result in the ray tracing queue (RTQ) for further processing (e.g., intersection testing). Similarly, internal node PRISEL logic 5702 prioritizes one of the internal BVH nodes 5713-5714 on which a ray tracing traversal (RTT) box test is performed. In one embodiment, only one request is selected from each bank (e.g., one of requests 5711 and 5712 and one of requests 5713 and 5714). The launch of these requests may also reset the stack data present (DP) bit, as indicated, so that this entry is not retrieved in response to a node fetch operation. In one embodiment, for the instance fetch operation, the ray's data present (DP) bit is reset when the instance request is sent, and finally set when the ray is transformed after the node fetch.

Figure 60:
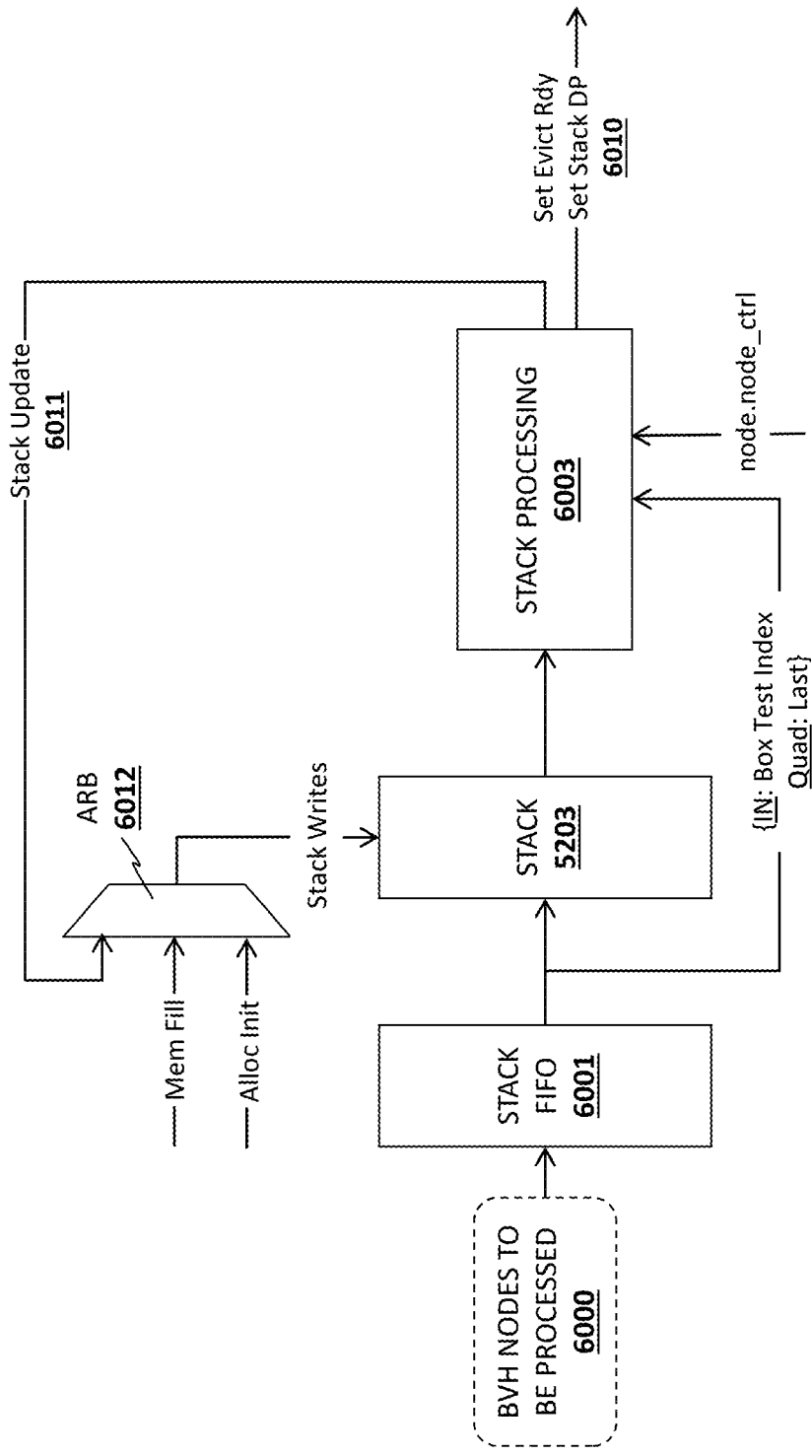
FIG. 60 illustrates one embodiment of stack management circuitry for managing a BVH stack.

As part of this process, for every quad test dispatch where the node type is non-opaque, the shader record identifier null lookup is dispatched as a bindless thread dispatch (BTD) based on the following shader record identifier lookup address:

sri_null_lookup_ptr[47:3]=2*(Ray.hitGroupSRBasePtr+Node.leafDesc.Shaderindex*ray.SRStride)+1;
sri_null_lookup_tag[7:0]={1'd0, RTT_INST, rtt_alloc_entry[5:0]};

In one embodiment, a quad/instance (QI) decouple FIFO is included to resolve temporal stack FIFO full conditions and to implement synchronous updates to the hitinfo/ray with a push into the stack FIFO (see, e.g., stack FIFO 6001 in FIG. 60). This is done so that the ray/hitinfo has a guaranteed data present (DP) bit set in subsequent processes. Note that ray/hitinfo may be assigned a fixed high priority when colliding with memory writes.

The return from RTQ can result in an Instance (e.g., an instance transformation) or a Quad (i.e., traversal/intersection test results) on two separate interfaces. Below are the two return FIFOs used for processing results in one embodiment:

a. Instance Return FIFO: Update rt_ray.rt_ray_data=rtq_rt_ray_data; ray_dirty[Entry]=1;

b. Quad Return FIFO:
  i. If the Quad is non-opaque and $(T_{far}<P_{rev\_}T_{far})$→Check SRI_NULL_DP to pop (read from) the quad/instance (QI) decoupled FIFO. Note that in one embodiment the Hitinfo write from the ray tracing queue (RTQ) FIFO has higher priority over MemHitInfo.
    1. If (KSP_NULL=1)→Treat the non-opaque quad as if it were opaque and update $T_{far}$.
    2. If (KSP_NULL !=1)→
    Write the potential HitInfo to memory with the valid bit set to 1.
    Read T, U, V, Leaf Type, PrimLeafIndex, and Front Face from the RTQ.
    Read PrimIndexDelta, PrimleafPtr from NodeData.
    Update instanceLeafPtr from Ray Data.
    hitGroupRecPtr as computed above
  ii. If the quad is non-opaque and $(T_{far}<P_{rev\_}T_{far})$→
    Update the Committed HitInfo with Valid=1.
    Read T,U,V, Leaf Type, PrimLeafIndex, Front Face from the RTQ.
    Read PrimIndexDelta, PrimleafPtr from NodeData.
    Update instanceLeafPtr from rt_ray.rt_ray_ctrl
    hitGroupRecPtr as computed for above In one embodiment, the return from the ray tracing traversal (RTT) box intersection test may push into the stack 0/1 (5203/5204) FIFO 6001 for further processing.

Figure 58:
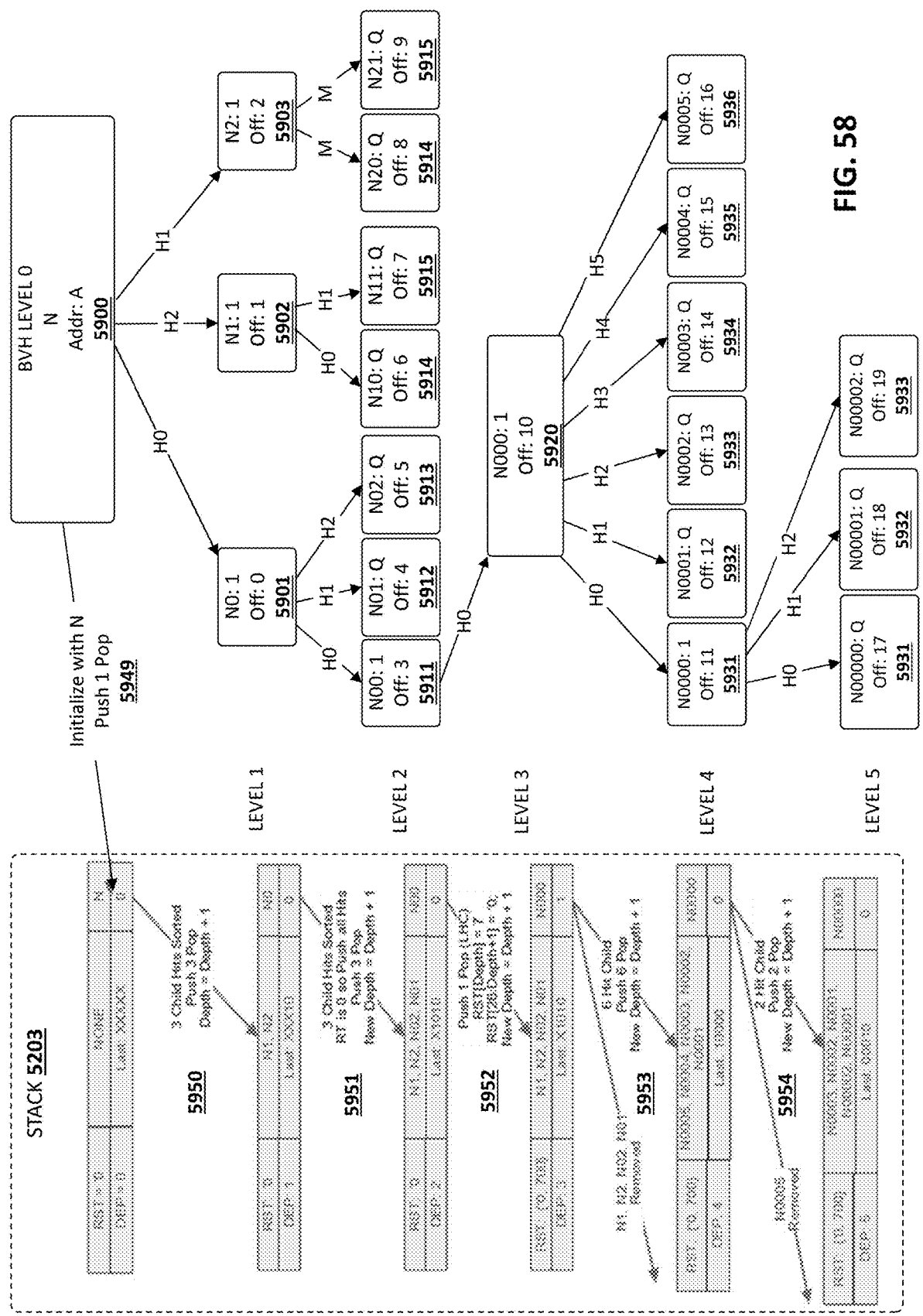
FIG. 58 illustrates an example bounding volume hierarchy (BVH) used for ray traversal operations.
Figure 59A:
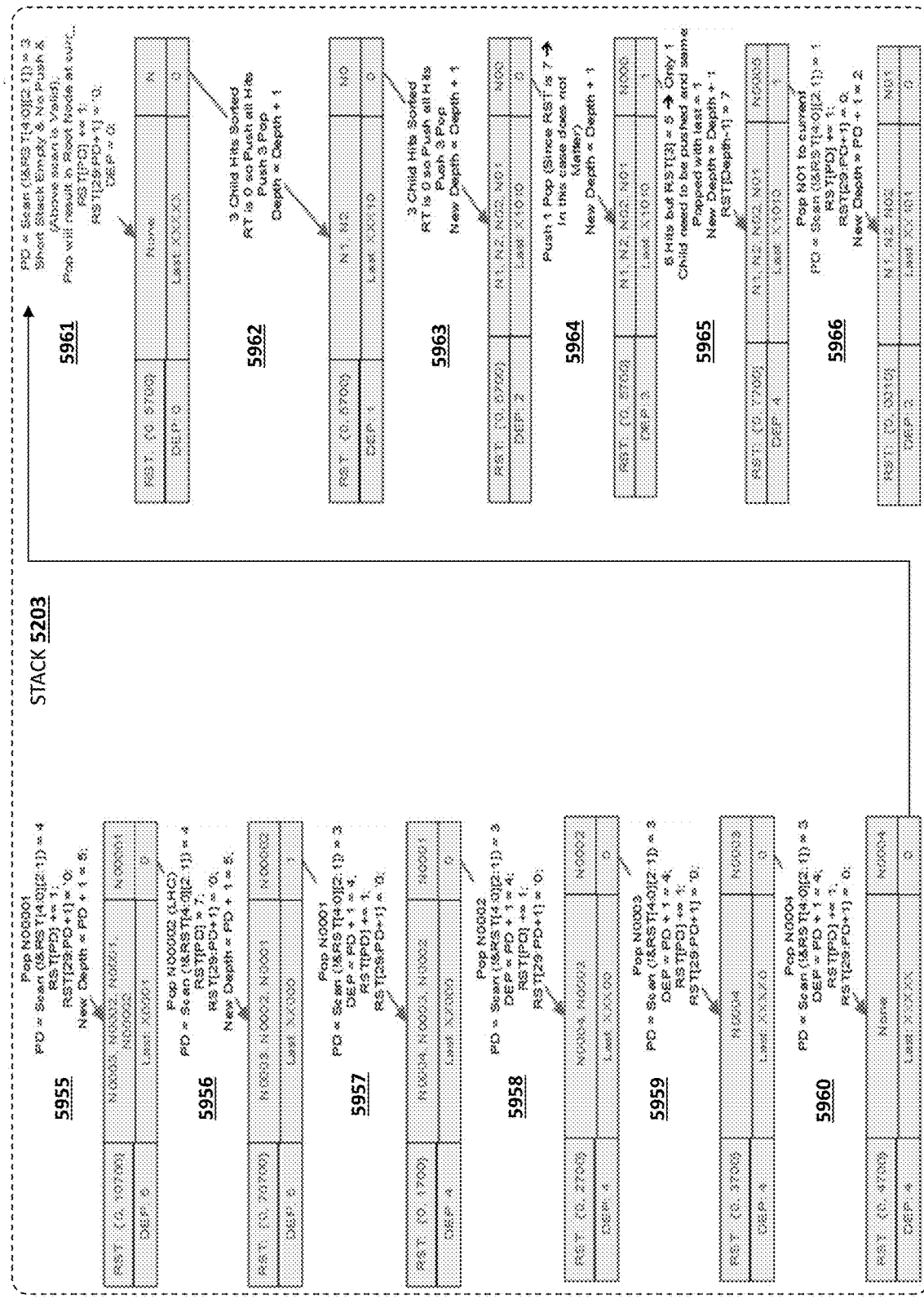
FIGS. 59A-B illustrate additional traversal operations.
Figure 59B:
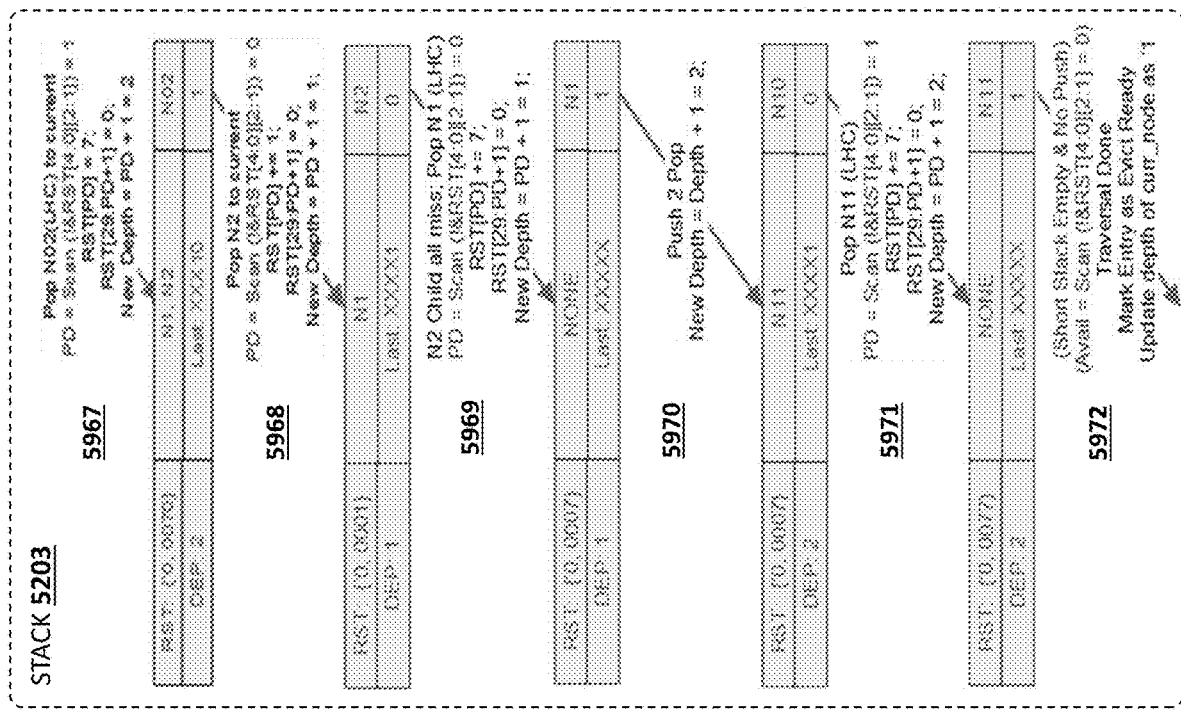

FIG. 58 and FIGS. 59A-B illustrate an example of BVH-ray processing using a "short" stack (e.g., such as stacks 5203 or 5204, which include a limited number of local stack entries). A short stack is used to conserve high speed storage in combination with intelligent node management techniques to provide a highly efficient sequence of traversal operations. In the illustrated example, the short stack 5203 includes entries for six BVH nodes. However, the underlying principles of the invention may be implemented using short stacks of various sizes.

Operations 5949-5972 push and pop stack entries during BVH traversal. In one embodiment, the operations 5949-5972 are performed on the stack 5203 by stack processing circuitry 5120 (see FIG. 51). A specific traversal sequence is shown starting with the root BVH node N 5900 at BVH level 0.

At 5949 the stack 5203 is initialized with node N, which is then popped from the stack and processed, resulting in hits H0-H2 comprising child nodes N0-N2 5901-5903 at Level 1 of the BVH (i.e., "hits" meaning that ray traverses the three child nodes N0-N2 5901-5903). The three child node hits 5901-5902 are sorted based on hit distance and pushed on the stack 5203 (operation 5950) in the sorted order. Thus, in this embodiment, whenever a new set of child nodes are evaluated, they are sorted based on hit distance and written into the stack 5203 in the sorted order (i.e., with the closer child nodes at the top of the stack).

The first child node NO 5901 (i.e., the closest child node) is popped from the stack 5203 and processed, resulting in three more child node hits N00-N02 5911-5913 at Level 2 of the BVH (the "level" is sometimes referred to as the "depth" of the BVH nodes), which are sorted and pushed to the stack 5203 (operation 5951).

Child node N00 5911 is popped from the stack and processed, resulting in a single hit comprising a single child node N000 5920 at Level 3 of the BVH (operation 5952). This node is popped and processed, resulting in six hits N0000-N0005 5931-5936 at level 4, which are sorted and pushed to the stack 5203 (operation 5953). To make room within the short stack 5203, nodes N1, N2, N02, N01 are removed as indicated (i.e., to limit the short stack to six entries). The first sorted node N0000 5931 is popped and processed, generating three hits N00000-N00002 5931-5933 at Level 5 of the BVH (operation 5954). Note N0005 is removed to make room on the short stack 5203 for the new nodes.

In one embodiment, each time a node is removed from the short stack 5203, it is saved back to memory. It will then be re-loaded to the short stack 5203 at a later time (e.g., when it is time to process the node in accordance with the traversal operation).

Processing continues on FIG. 59A where nodes N00001 and N00002 are popped and processed (operations 5955-5956) at Level 5 of the BVH. Nodes N0001, N0002, N0003, and N0004 at Level 4 are then popped and processed (operations 5957-5960), resulting in an empty short stack 5203.

Thus, a pop operation results in retrieval of the root BVH node, Node N in accordance with the restart trail (RST) (operation 5961). The three child hits N0, N1, N2, from Level 1 are again sorted and pushed to the short stack (operation 5962). Node NO is then popped and processed, followed by Nodes N00, N000, and N0005 (operations 5963-5965). Node N01 is popped and processed (operation 5966), followed by Node N02, Node N2, and Node N1 (operations 5967-5970), again resulting in an empty short stack. Consequently, the next Level 2 node, N11 is popped from the short stack and processed, completing the traversal (i.e., because Node N11 did not result in a hit).

As mentioned, one embodiment of a traversal tracker 5248 updates the tracking array 5249 which identifies the child node/subtree in each level of the BVH hierarchy which is currently being traversed. In one implementation, the length of the tracking array 5249 is equal to the depth of the BVH (6 in the illustrated example) and each entry in the tracking array 5249 includes an index value identifying the child subtree currently being traversed. In one specific implementation, for an N-wide BVH (i.e., where each internal node references N child nodes) each entry in the tracking array 5249 includes a log 2(N) bit value to identify the child nodes/subtrees. In one embodiment, child nodes/subtrees assigned an index smaller than the current child index have been fully traversed and will therefore will not be revisited in the event of a restart. In one embodiment, when last intersected child is being traversed, the child index is set to the maximum value to indicate that there are no more entries on the stack.

The short traversal stack 5203 may store the top few entries of the stack in a circular array. In one implementation, each stack entry in the short traversal stack 5203 includes an offset to a node, miscellaneous information such as the node type (internal, primitive, instance etc.) as well as one bit that indicates if this child is the last (farthest) intersected child node in a parent node. However, these specific details are not required for complying with the underlying principles of the invention.

FIG. 60 illustrates one embodiment of the stack processing circuitry/logic 5120 for performing stack management and traversal operations as described above. A stack FIFO 6001 is loaded with any child BVH nodes 6000 which require processing. For example, when a box test or quad test is completed by the traversal processing circuitry 5210, the results are pushed into the stack FIFO 6001 and used to update the stack 5203. This may include, for example, updates to the hit info such as the set of child nodes 6000 associated with a particular hit.

Stack processing circuitry/logic 6003 reads entries from the stack 5203 with data required for processing each entry including an indication as to whether the BVH node is an internal node or a leaf node and associated index data. If the node is a leaf node/quad, then the data may include quad descriptors and indices as well as shader index data. The stack processing circuitry/logic 6003 then performs the stack processing operations described herein such as identifying new nodes associated with a hit and sorting the nodes based on hit distance. Although illustrated as a separate entity, the stack processing circuitry/logic 6003 may be integrated within the traversal circuitry 5102.

As indicated, the stack processing circuitry/logic 6003 generates stack updates 6011 as it completes processing each BVH node from the stack 5203. For example, after reading an entry from the stack 5203, it may update the various control bits such as the data present (DP) bit and valid (VLD) bit. FIG. 60 illustrates the evict ready and data present bits 6010 being set. A corresponding stack update 6011 may also be sent to the stack 5203 (e.g., allowing old entries to be removed to make room for new child nodes).

Stack updates may be controlled via arbitration circuitry 6012 which selects between updating the stack 5203 with the current processing updates 6011, filling the stack 5203 from memory with one or more new BVH child nodes (Mem Fill), and performing an initial allocation to the stack from memory (e.g., starting with the root node and one or more child nodes).

In one embodiment, when a quad/instance/internal node is processed on the stack, one or more of the following operations may be performed:
  i. Eviction of the stack entry due to multiple conditions such as moving down the instance for a new BVH, processing a hit procedural, an any hit shader, etc.
  ii. Deallocate the Ray entry if the stack is evicted due to a hit procedural and/or any hit shader.
  iii. Deallocate the cache entry if that stack is evicted due to hit procedural and/or any hit shader.
  iv. Update the ray control (BVH only) if the ray needs to be passed down via the instance leaf to the new BVH.

FIGS. 61A-B illustrate tables for configuring read/write ports and setting control bits for all ray tracing traversal structures. In particular, example sub-structures, vertical structures, and read/write actions are shown for rays 6101, hits 6102, and stacks 6103. Note, however, that the underlying principles of the invention are not limited to these specific data structures/operations.

Apparatus and Method for High Quality
Ray-Traced Level of Detail Transitions

On graphics processing architectures, the "level-of-detail" (LOD) can refer to the selection of mesh resolutions based on variables such as distance from the camera. LOD techniques are used to reduce memory consumption and improve graphics processing functions such as geometric aliasing in games. For example, the details of a high resolution mesh may not be required when the mesh is far away from the current perspective of the user.

In rasterization-based implementations, smooth transitions between LODs are enabled using "stochastic LOD" techniques such as described in Lloyd et al, *Implementing Stochastic Levels of Detail with Microsoft DirectX Raytracing* (Jun. 15, 2020). Without these stochastic techniques, the transition between LODs can result in distracting artifacts where objects suddenly change in appearance when a new LOD is selected. Using stochastic LODs, a cross-dissolve between LOD levels is performed through a random assignment of pixels to one of the LODs involved in the transition (e.g., either the higher resolution or lower resolution LOD).

The above solution uses a binary mask and a binary comparison value to achieve eight transitional steps for stochastic LOD transitions when fading from a first LOD ("LOD0") to a second LOD ("LOD1"). In this implementation, an 8-bit ray mask and an 8-bit instance mask are logically ANDed to determine if an instance needs to be traversed. These 8-bit masks and the associated bit-wise logic operations result in limited LOD transition capabilities. For example, when transitioning between LOD0 and LOD1 of an object, where LOD0 has a fractional value of 0.25 and LOD1 has a fractional value of 0.75 (based on camera distance), the mask for the instance would be set to LOD0 to enable only 2 random bits (0.25 of 8 bits). The instance mask for LOD1 would be set to the binary complement of the mask of LOD0, with 6 bits enabled. For any given ray, one random bit is selected in the ray-mask to achieve a random selection of either LOD0 (with a probability of 0.25) and LOD1 (with a probability of 0.75). However, because only one of eight bits is selected, there are only 8 intermediate steps for transitioning between LOD0 and LOD1.

Figure 62:
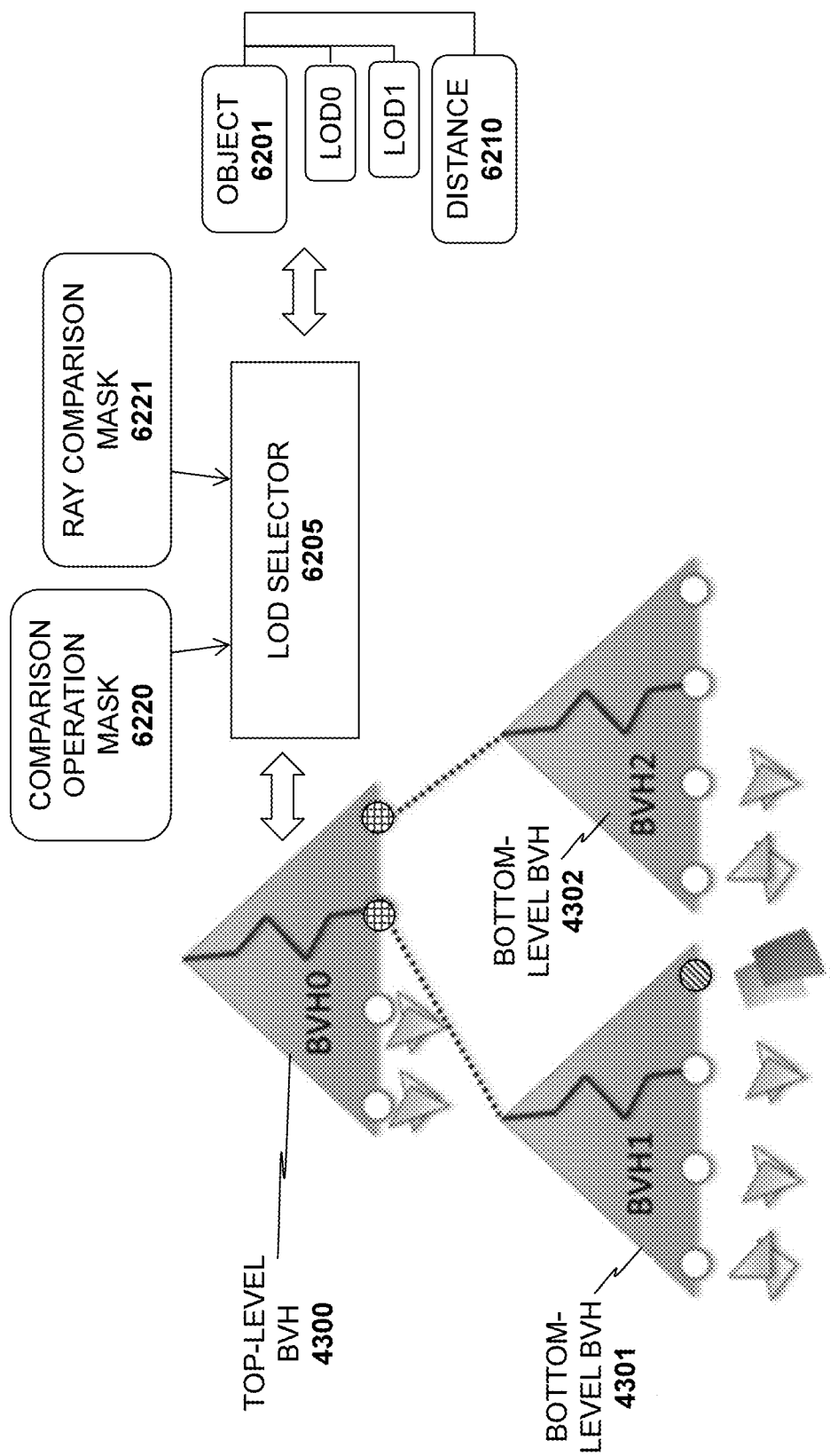
FIG. 62 illustrates an embodiment of a level of detail selector with an N-bit comparison operation mask.

As shown in FIG. 62, in one embodiment of the invention, an LOD selector 6205 is provided with an N-bit comparison operation mask 6220 which is treated as a binary value to determine a comparison operation to be performed. The selected comparison operation is used to compare against the reference to allow for more transitional LOD steps. In one embodiment, the comparison operation is selected from less-than-or-equal-to (less_equal) and greater-than (greater), although the underlying principles of the invention are not limited to these specific comparison operations. In one implementation, 8-bits are used (N=8) where 7 of the bits define an unsigned integer value in the range of [0 . . . 127], enabling 128 transitional steps for LOD cross-fading and 1 bit indicates the comparison operation (e.g., if set to 0, then a less_equal operation is performed and if set to 1, the greater operation is performed). In one embodiment, a ray comparison mask 6221 may also be provided to the LOD selector 6205 in the range [0 . . . 127] as an additional ray parameter.

The following code sequence highlights how ray traversal reacts to this new comparison mask, in one embodiment:
if(ray.InstanceMask & instance.InstanceMask)

```
{
 if(
  ( instance.ComparisonMode = = less_equal &&
 instance.ComparisonMask < = ray.ComparisonMask ) | |
  ( instance.ComparisonMode = = greater && instance.ComparisonMask
```

-continued

```
 > ray.ComparisonMask )
 )
 {
 traverseInstance(Instance);
 }
}
```

In the above code sequence, the first IF statement tests whether the binary masks allow traversal into the current instance. If so, the second IF statement then tests the comparison mode setting in view of the values for the instance comparison mask (e.g., comparison operation mask 6220) and ray comparison mask 6221.

Returning to the above LOD transition example, for the instance of LOD0 with a fractional value of 0.25, the first 7 bits are set to a value of 31 (=int(0.25*127)), and the last bit is set to 0 (indicating the less_equal operation). For the instance of LOD1 with a fractional value of 0.75, the first 7 bits are set to value of 31 (=int((1.0-0.75)*127)), and the last bit is set to 1 (indicating the greater operation). Thus, for this implementation, if a uniformly distributed random number is generated in the range [0 . . . 127] as a ray comparison mask, there are up to 127 transitional steps which may be selected by LOD selector 6205 for transitioning between LOD0 and LOD1.

While the specific details set forth above are used for the purpose of explanation, the underlying principles of the invention may be implemented with other details. For example, other comparison operators may be used in place of, or in addition to less_equal and greater. For example, comparison operators such as not_equal, equal, less and greater_equal (greater than or equal to) may also be used. One implementation includes a ray flag and an instance flag that disables ANDed ray masks and enables the use of these bits as comparison masks.

Embodiments of the invention include a combination of fixed function acceleration circuitry and general purpose processing circuitry to perform ray tracing. For example, certain operations related to ray traversal of a bounding volume hierarchy (BVH) and intersection testing may be performed by the fixed function acceleration circuitry, while a plurality of execution circuits execute various forms of ray tracing shaders (e.g., any hit shaders, intersection shaders, miss shaders, etc). One embodiment includes dual high-bandwidth storage banks comprising a plurality of entries for storing rays and corresponding dual stacks for storing BVH nodes. In this embodiment, the traversal circuitry alternates between the dual ray banks and stacks to process a ray on each clock cycle. In addition, one embodiment includes priority selection circuitry/logic which distinguishes between internal nodes, non-internal nodes, and primitives and uses this information to intelligently prioritize processing of the BVH nodes and the primitives bounded by the BVH nodes.

Apparatus and Method for Compressing Ray Tracing Acceleration Structure Build Data The construction of acceleration data structures is one of the most important steps in efficient ray-traced rendering. In recent times, the bounding volume hierarchy (BVH) acceleration structure, described extensively herein, has become the most widely used structure for this purpose. The BVH is a hierarchical tree structure which serves to spatially index and organize geometry such that ray/primitive intersection queries can be resolved very efficiently. The ability to resolve these queries is one of the most critical operations for ray-traced rendering. While the embodiments of the invention described below operate on a BVH structure, the underlying principles of the invention are not limited to a BVH. These embodiments may be applied to any other acceleration data structure with similar relevant features.

Producing a BVH is typically referred to as "constructing" or "building" the BVH. Although a number of BVH construction algorithms have been proposed, top-down BVH builders are predominantly used for achieving high rendering efficiency for both real-time and offline rendering applications. Top-down BVH build algorithms typically maintain one or more temporary arrays during construction. These arrays hold data necessary to sort/organize geometry to produce the BVH structure. These arrays are read and/or written multiple times during the build (typically 1-2 times per level of the BVH hierarchy). As these arrays are often of considerable size, this process is bandwidth-intensive. Thus, improvements in BVH build compute performance, such as could be expected from a hardware BVH builder, are likely to have only a limited impact if this bandwidth issue is not addressed.

One embodiment of the invention includes a compression scheme for the temporary data maintained by many top-down BVH builders. The purpose of this compression scheme is to reduce the bandwidth required for BVH construction, thereby enabling faster and more efficient BVH construction. Note, however, that the embodiments of the invention may be used for other kinds of BVH builders and with other types of acceleration data structures, such as kd-trees.

Many top-down BVH builders maintain two primary types of data during the BVH build: (1) an axis aligned bounding box (AABB) for each primitive involved in the BVH build; and (2) an unsigned integer index associated with each primitive, which points to one of these AABBs, and/or to the original primitive from which the AABB was produced.

One embodiment of the invention utilizes a Structure of Arrays (SOA) layout for combining each AABB with a single integer index. The AABBs are maintained in one array, and the integer indices in a second array. Only the index array must be reordered to achieve BVH construction. Storing the build data in this fashion leads to a number of advantages. In this layout scheme, the AABB data is largely read-only, and AABB write bandwidth is not incurred for most of the build process.

By using an SOA structure, only the AABBs need to be infrequently compressed during the build. In fact, the AABB data may only need to be compressed once before build as a pre-process, depending on the implementation. Since the build is performed by partitioning the index arrays, one embodiment of the invention re-compresses these at every level of the build.

By operating on compressed versions of these arrays instead of their conventional, uncompressed counterparts, the bandwidth required for BVH construction is reduced. The compressed versions of the arrays are stored temporarily, and used only for the purpose of the build. They are discarded once build is complete, leaving a BVH which references the original input list of primitives.

An important characteristic of the compression techniques described herein is that they are cache line-aware. Both of the compressed arrays are stored as an array of Compression Blocks of fixed size, where the size is a whole number of cache lines. This number is greater than or equal to one. The Compression Blocks of each of the two types of array do not need to be the same size. These two types of blocks are referred to herein as AABB Compression Blocks and Index Compression Blocks.

Note that the underlying principles of the invention do not require that the size of the blocks is a whole number of cachelines. Rather, this is one of several optional features described herein. In one embodiment described below, this functionality is control by the variables AABBCompressionBlockSizeBytes and IndexCompressionBlockSizeBytes in Tables B and D, respectively.

Figure 63:
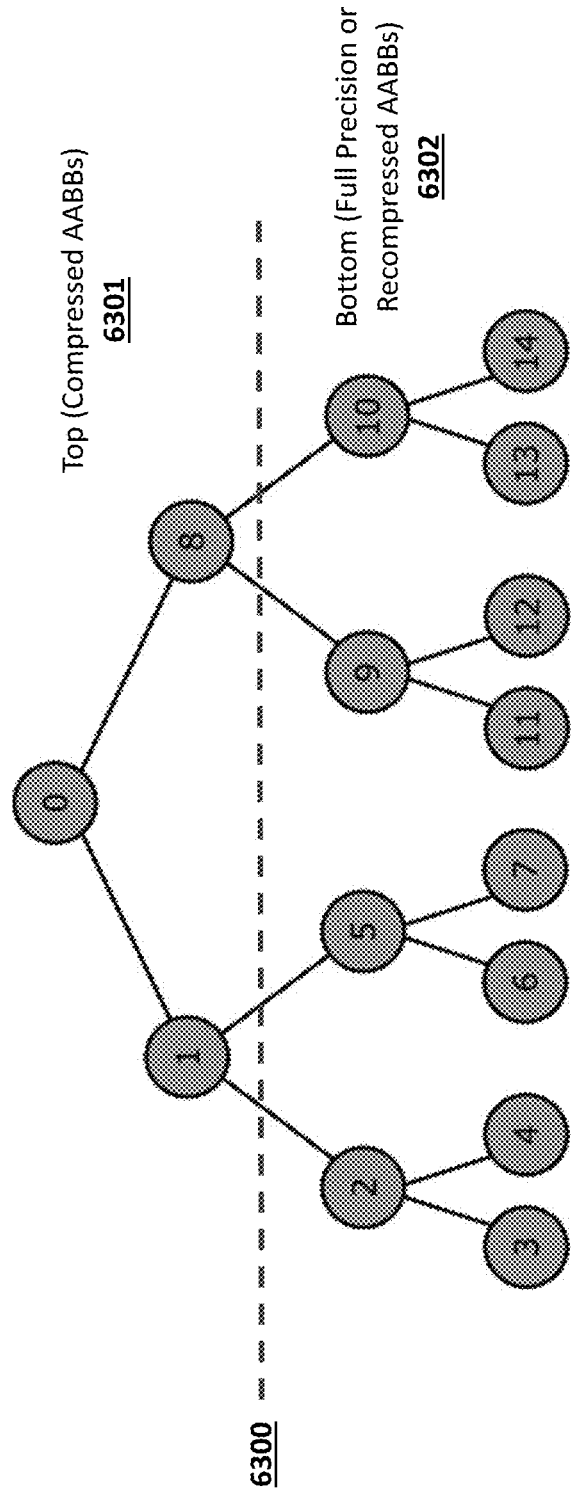
FIG. 63 illustrates an acceleration data structure in accordance with one embodiment of the invention.

Because the spatial extent of, and number of primitives referenced by, each node will generally decrease as the top-down build proceeds from the root to the leaves of the tree structure, different representations of the AABBs may be appropriate at different stages of construction. For example, the accuracy of the compressed AABBs may be less critical at the upper levels of the tree, whereas more precise representations may be needed at the lower levels to maintain reasonable tree quality. It may therefore be adequate to use lossy compression near the root of the tree to maximize bandwidth savings, and switch to an uncompressed, lossless representation of the primitives for the lower levels. This divides BVH construction into at least two phases illustrated in FIG. 63: a top phase 6301 for nodes at or above a specified level of the hierarchy (Nodes 0, 1, 8) and a bottom phase 6302 for nodes below the specified level (Nodes 2-7, 9-14). A multi-level build can proceed in such a fashion that the entirety of an upper level hierarchy (e.g. the 'Top' portion in FIG. 63) is built before any node in the lower levels are built, or the building of the levels can be interleaved. If an upper level is built entirely before any lower levels, nodes which must be split at a lower level of the build can be stored on a structure such as a queue to be partitioned at a later stage.

As an alternative to using a full-precision copy of the AABBs for the lower levels 6302, another variation of the scheme is to "re-compress" the AABBs during build for use in building the lower levels. By doing so, geometry can be compressed relative to the extent of individual subtrees. Since individual subtrees generally represent a smaller spatial extent compared to the root node, this can benefit the accuracy of the compressed representation, or the efficiency of compression. A similar pattern for a multi-level compressed build is observed in current research. The divide 6300 between different phases of construction can be defined according to a variety of node characteristics. One embodiment uses a fixed number of primitives to act as a threshold value.

A variation used in some embodiments of the invention instead opt to employ a single-level build only. For example, a single, compressed representation of the build data could be used to build the entire tree.

I. AABB Compression

In one embodiment of the invention, the input to the AABB compression logic (which may be implemented in hardware and/or software) is an array of uncompressed primitives and the output is an array of AABB compression blocks, which are of a fixed size, and aligned to some number of cache lines. Since the effective AABB compression ratio at any particular region of the mesh is highly data-dependent, one embodiment packs a variable number of AABBs per AABB compression block.

Figure 64:
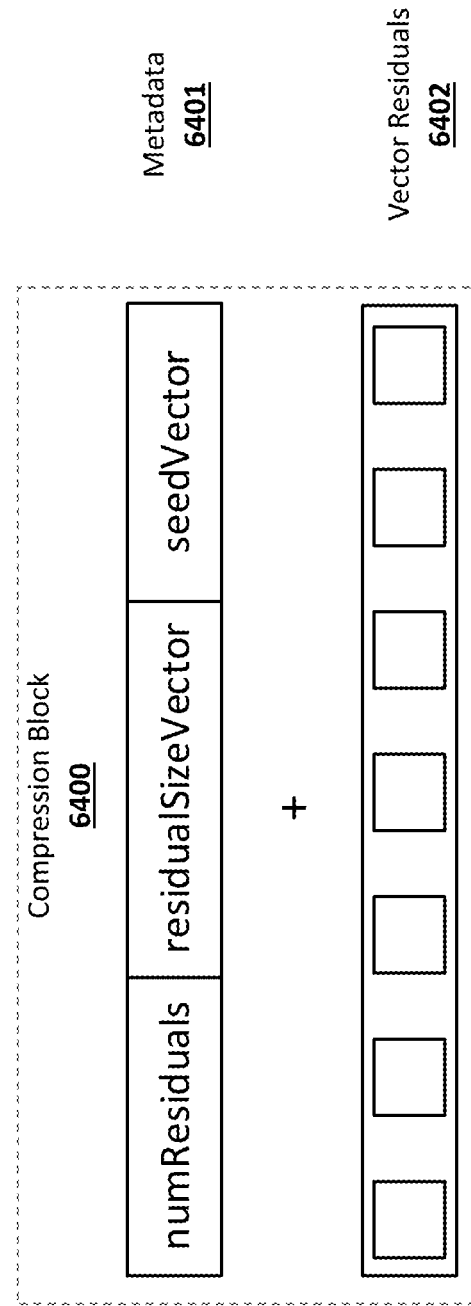
FIG. 64 illustrates one embodiment of a compression block including residual values and metadata.

As shown in FIG. 64, one embodiment of the compression block 6400 is organized in two main parts: Meta Data 6401 and Vector Residuals 6402. The MetaData 6401 provides per-block information and constants required to decode the Vector Residuals 6402 into a list of AABBs. The Vector Residuals 6402 store the bulk of the compressed information used to represent the AABBs. Each of these elements are described in more detail below.

Briefly, in one embodiment, delta compression is used. A seedVector comprises a baseline set of AABB values and the vector residuals 6402 provide offsets to these baseline values to reconstruct each AABB. The numResiduals value specifies the number of vector residuals 6402 and the residualSizeVector specifies the size of the residuals 6402.

AABB Global Compression Constants

In addition to the per-block constants that are stored in each compression block 6400, a set of AABB Global Compression Constants may store information relating to all of the blocks in the entire compression process. These are summarized in Table B for one particular implementation.

TABLE B

| Constant | Description |
| --- | --- |
| NQ {X, Y, Z} | Three values which denote the number of bits used for quantization of vertex components in each of the three spatial dimensions. |
| AABBCompression-BlockSizeBytes | Size in Bytes of an AABB Compression Block. This value will typically be aligned to a certain number of cache lines. |
| maxAABBsPerBlock | The maximum number of AABBs allowed in an AABB Compression Block. This constant is used along with the numResidualVectorsPerPrimitive Global Compression Constant to determine the number of bits needed for the numResiduals value shown in FIG. 64. |
| numResidualVectors-PerPrimitive | This value keeps track of the number of residual vectors being used to represent an AABB in the compressed blocks. A regular AABB normally consists of two 3D vectors, min and max. However, it is possible that the representation of the AABB can be transformed to a structure with a different number of vectors. An example of this is discussed in the later section on Error! Reference source not found., where a pair of 3D vectors are transformed to a single 6D vector. It is necessary for the compression algorithm to keep track of this value to perform a number of core operations correctly. |
| residualNum-Dimensions | This constant is used to keep track of how many dimensions the residual vectors will have at the point they are added to the AABB Compression Blocks. This value is needed as it is possible for the 3D AABB data to be transformed to a different number of dimensions during compression. |

AABB Compression Flow

One embodiment of the AABB compression process involves iterating through the input array of primitives in turn, and outputting an array of AABB Compression Blocks 6400. The output array contains a minimal number of AABB Compression Blocks 6400 needed to represent the AABBs of the primitives in compressed form.

Figure 65:
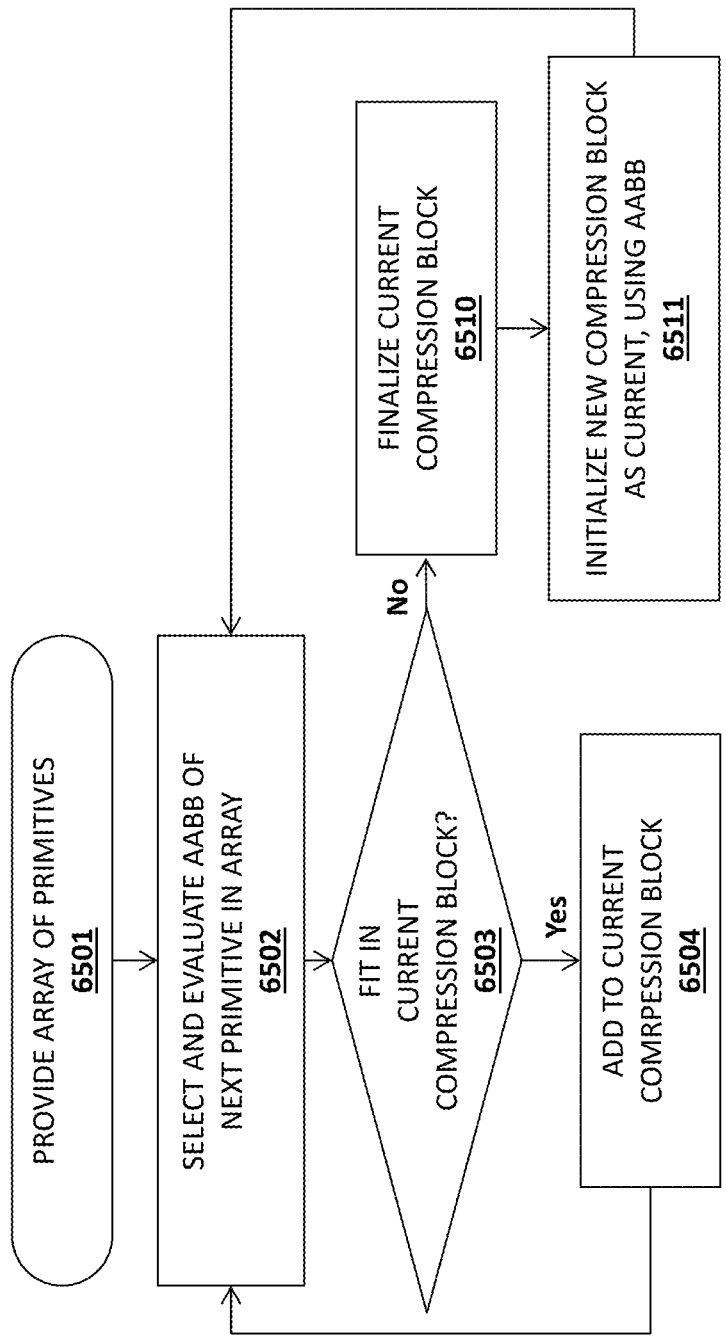
FIG. 65 illustrates a method in accordance with one embodiment of the invention.

FIG. 65 illustrates a process in accordance with one particular embodiment. As mentioned, the compression process is not limited to any particular architecture and may be implemented in hardware, software, or any combination thereof.

At 6501 an array of primitives for a BVH build is provided. At 6502, the next primitive in the array (e.g., the first primitive at the start of the process) is selected and its AABB is evaluated for compression. If the AABB fits within the current compression block, determined at 6503 (e.g., based on its mix/max data), then the AABB is added to the current compression block at 6504. As mentioned, this can include determining residual values for the AABB by calculating the distances to an existing base vector within the compression block (e.g., the seedVector).

In one embodiment, if the AABB of the primitive does not fit within the compression block, then the current compression block is finalized at 6510 and stored in memory within the output array. At 6511, a new compression block is initialized using the AABB of the primitive. In one embodiment, the primitive AABB is used as the seed vector for the new compression block. Residuals may then be generated for subsequent AABBs of primitive based on distances to the new seed vector. In one implementation, the first residual, generated for the second AABB, is determined based on distance values to the seed vector values. The second residual, for the third AABB, is then determined based on distances to the first residual. Thus, a running difference is stored, as described in greater detail below. Once the current primitive is compressed, the process returns to 6502 where the next primitive in the array is selected for compression.

Thus, visiting each primitive in turn, its AABB is determined (e.g., as a float value). A series of operations are then performed to the AABB to achieve compression and the compressed result is added to the current AABB Compression Block in the output array. If the compressed AABB fits, it is added to the current block, and the process moves to the next AABB. If the AABB does not fit, the current AABB Compression Block is finalized, and a new AABB Compression block is initialized in the output array. In this way, the number of compressed blocks needed to store the AABBs is minimized.

The pseudocode below in TABLE C shows the flow of AABB compression according to one particular embodiment of the invention. Note, however, that the underlying principles of the invention are not necessarily limited to these details.

As shown in the pseudocode sequence, for each AABB Compression Block, an integer is written in a separate array (blockOffsets) which records the position in the original primitive array at which each AABB Compression Block starts (i.e., the first primitive AABB it contains). The blockOffsets array is used during the build for resolving the original primitive IDs that the compressed block represents.

AABB Residual Computation

In one embodiment, each input AABB goes through a set of stages to compress it before adding it to a compressed block, resulting in the Vector Residuals shown in FIG. 64. The process is captured as the code on line 26 of Table C, where the CompressionCore is used to convert the AABB to a list of compressed vectors.

TABLE C

```
1:   uint numBoxesEncoded = 0;
2:   uint blockStartIndex = 0;
3:   uint currentBlock = 0;
4:   CompressedAABBBlock compressedBlocks = [ ]
5:   uint blockOffsets = [ ]
6:   uint totalNumBoxes = geometry.getNumPrimitives( );
7:   uint maxBitsPerBlock = AABBCompresszonBiockSizeBytes * 8;
8:   uint numBitsRequiredCurrentBlock = 0;
9:
10:  while (numBoxesEncoded < totalNumBoxes)
11:  {
```

TABLE C-continued

```
12:     CompressionCore cCore;
13:     InitBlock(compressedBlocks, currentBlock);
14:     blockOffsets.append(numBoxesEncoded);
15:     blockStartIndex = numBoxesEncoded;
16:     numBitsRequiredCurrentBlock = 0;
17:
18:     while (numBitsRequiredCurrentBlock < maxBitsPerBlock &&
19:            numBoxesEncoded < totalNumBoxes &&
20:            (numBoxesEncoded - blockStartIndex) <
            maxAABBsPerBlock)
21:     {
22:       Primitive p = geometry.getPrimitive(numEncoded);
23:       AABB box = p.getBoundingBox( );
24:
25:       Vector compressedVectors = [ ];
26:       compressedVectors = cCore.compress(box);
27:       numBitsRequiredCurrentBlock =
28:         TestAddToBlock(compressedBlocks[currentBlock],
             compressedVectors);
29:
30:       if (numBitsRequiredCurrentBlock <= maxBitsPerBlock)
31:       {
32:         CommitToBlock(compressedBlocks[currentBlock],
              compressedVectors);
33:         numBoxesEncoded++;
34:       }
35:       else
36:         break;
37:     }
38:
39:     FinalizeBlock(compressedBlocks[currentBlock++]);
40:   }
41:
42:   if(numBoxesEncoded - blockStartIndex > 0)
43:     FinalizeBlock(compressedBlocks[currentBlock++]);
```

In one embodiment, compression of an AABBs occurs in the following stages: (1) quantization, (2) transform, and (3) prediction/delta coding.

1. Quantization

In one embodiment, the floating-point AABB values are first quantized to an unsigned integer representation using a fixed number of bits per axis. This quantization step may be performed in a variety of ways. For example, in one implementation, the following values for each axis i are determined:

$$L_i = S_{max,i} - S_{min,i}$$

$$N_{B,i} = 2^{NQ_i}$$

$$VU_{min,i} = (VF_{min,i} - S_{min,i})/L_i \times N_{B,i}$$

$$VU_{max,i} = (VF_{max,i} - S_{min,i})/L_i \times N_{B,i}$$

where $S_{min}$ and $S_{max}$ are the minimum and maximum coordinates of the entire set of geometry for which a BVH is to be built, $N_{B,i}$ is the number of cells in the quantized grid in the i-th axis, $NQ_i$ corresponds to the value in Table B, $VU_{min}$ and $VU_{max}$ are the minimum and maximum coordinates of the quantized AABB, $VF_{min}$ and $VF_{max}$ are the minimum and maximum coordinates of the original floating-point AABB, and the subscript i denotes a given axis (i∈{x,y,z}). As any floating-point computation can introduce error, the intermediate values should be rounded up or down to minimize the values of $VU_{min}$ and maximize the values of $VU_{max_i}$. The values may also be converted to integer and clamped to the valid range, to ensure a watertight AABB residing inside the AABB of the entire set of geometry.

$S_{min}$ and $S_{max}$ could also represent the extent of a subset of the geometry (e.g. a subtree within a larger BVH). This could occur, for example, in a multi-level compressed build as per FIG. 63.

2. Transform

In one embodiment, a transform stage is implemented in which data is transformed into a form that is more amenable to compression. Although a variety of transforms may be used, one embodiment of the invention employs a novel transform referred to herein as Position-Extent Transform, which combines $VU_{min}$ and $VU_{max}$ into a single 6 dimensional (6D) vector per primitive, VT, as shown below:

$$E_x = VU_{max,x} - VU_{min,x}, E_y = VU_{max,y} - VU_{min,y}$$
$$E_z = VU_{max,z} - VU_{min,z}$$

$$V_T = (VU_{min,x}, VU_{min,y}, VU_{min,z}, E_x, E_y, E_z)$$

where $VU_{min}\{x,y,z\}$ and $VU_{max}\{x,y,z\}$ are the components of $VU_{min}$ and $VU_{max}$ respectively. Essentially, this transform allows the position and extent/size characteristics of the AABB to be treated separately in the remaining compression stages. As mentioned, other transforms may also be used.

3. Prediction/Delta Coding

In one implementation, a conventional delta coding technique is used to achieve good compression performance. In one embodiment, the first vector in each compression block is designated as a "seed" vector and stored verbatim in the AABB compression block 6400, as shown in FIG. 64. For subsequent vectors, a running difference of the values is stored (i.e., residuals 6402). This corresponds to a prediction scheme where the prediction for the next input vector in the sequence is always the previous input vector, and the residual value is the difference between the current and previous input vectors. Residual values 6402 in this embodiment are thus signed values, which requires an additional sign bit. Various other prediction/delta coding may be used while still complying with the underlying principles of the invention.

One embodiment stores the residual values 6402 with the minimum number of required bits, in order to maximize compression. Based on the size of the residual values at the end of the residual coding steps, a certain number of bits will be required for each of the vector dimensions to accommodate the range of values encountered in that dimension.

The number of bits required are stored in a Residual Size Vector (RSV), as illustrated in the metadata 6401 in FIG. 64. The RSV is fixed for a given compression block 6400, and so all values in a given dimension of a particular block use the same number of bits for their residuals 6402.

The value stored in each element of the RSV is simply the minimum number of bits needed to store the entire range of residual values in the dimension as a signed number. While compressing a given AABB Compression Block (i.e. lines 18-37 of Table C), a running maximum of the number of bits needed to accommodate all the vectors seen so far is maintained. The RSV is determined for each newly-added AABB (i.e. CommitToBlock, line 32 of Table C) and stored in the compression blocks' metadata.

To test whether a new AABB will fit into the current block (i.e. TestAddToBlock, line 28 of Table C and operation 6503 in FIG. 65), we compute the expected new RSV that would occur from adding the new AABB, sum the expected RSV vector, and then multiply this value by the total number of residuals that would exist in the block if the new AABB was added. If this value is within the budget available for storing residuals (i.e. less than or equal to the total block size minus the meta data 6401 size), it can be added to the current block. If not, then a new compression block is initialized.

Entropy Coding

One embodiment of the invention includes an additional step to the AABB residual computation which includes an entropy coding of the residuals after prediction/delta coding. The underlying principles of the invention are not limited to this particular implementation.

Pre-Sorting/Re-Ordering Capability

As an optional pre-process, the input geometry can be sorted/re-ordered to improve spatial coherence, which may improve compression performance. Sorting can be performed in a variety of ways. One way to achieve this is to use a Morton Code sort. Such a sort is already used as major step in other BVH builders to promote spatial coherence in the geometry before extracting a hierarchy.

The compressed AABBs can be written in any desired order, but if the AABBs are reordered/sorted, then it is necessary to store an additional array of integers which records the sorted ordering. The array consists of a single integer index per primitive. The build can proceed with the primary index used to reference the re-ordered list of primitives. When the original primitive ID is needed (such as when the contents of a leaf node are being written), we must use the primary index to look up the original primitive ID in the additional array to ensure that the tree references the original input geometry list correctly.

II. AABB Decompression

In one embodiment, decompression of the AABBs is performed for an entire AABB Compression Block 6400 at a time. The residual data is first reconstructed by inspecting the metadata 6401 of the compression block 6400 and interpreting the stored residuals based on this information (e.g., adding the distance values to the seed vector and prior residual values in the sequence). The inverse of each of the AABB Compression Stages is then performed to decompress the single-precision floating point AABBs represented by the compression block.

One embodiment implements a variation of the decompression step in the case of BVH builders which employ reduced-precision construction techniques which are aligned to a compressed hierarchy output. Such reduced-precision builders are described in the co-pending application entitled "An Architecture for Reduced Precision Bounding Volume Hierarchy Construction", Ser. No. 16/746,636, Filed Jan. 17, 2020, which is assigned to the assignee of the present application. A reduced-precision builder performs much of its computation in a reduced-precision, integer space. Consequently, one embodiment of the invention aligns the quantization step of the AABB Residual Computation described herein with the quantization employed in the reduced-precision builder. The AABBs may then be decompressed to integer only, aligned with the coordinate space of whatever node is currently being processed by the reduced-precision builder. A similar variation may be implemented with a builder which does not output a compressed hierarchy, but performs quantization of vertices.

III. Index Compression

Figure 66:
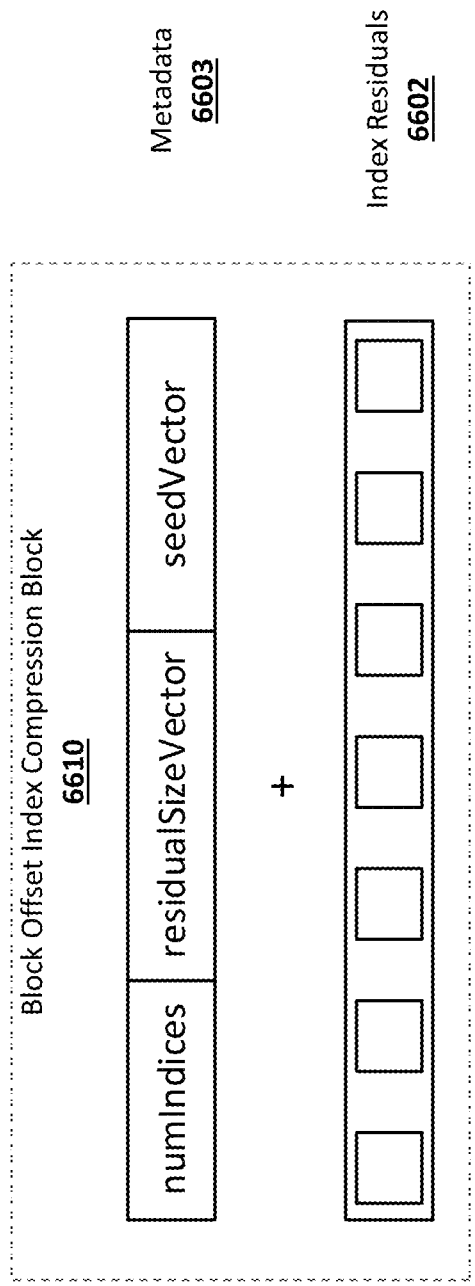
FIG. 66 illustrates one embodiment of a block offset index compression block.

In one embodiment of the invention, the index array is compressed into an array of Index Compression Blocks. FIG. 66 illustrates one embodiment of an index compression block 6610 comprising metadata 6603 and index residuals 6602. The index array differs from the AABB array as it must be re-compressed as the indices are partitioned/reordered during the build process.

In many conventional BVH builders, indices are represented as unsigned integers, generally with one index per primitive. The purpose of the index array is to point to primitive AABBs. Each AABB/primitive may be allocated a fixed size in memory. It is therefore possible to randomly access any particular primitive p or AABB a in the arrays. However, when AABB compression leads to a variable number of AABBs per cache line, the AABB compression block storing a given primitive is not easily determined after compression. Storing conventional indices is therefore not compatible with the AABB Compression Blocks described herein.

In one embodiment of the invention, the indexing techniques used to identify the location of primitive AABBs also allow for compression of the indices themselves. Two novel techniques are referred to below as Block Offset Indexing (BOI) and Hierarchical Bit-Vector Indexing (HBI). These indexing implementations may be used alone or in combination in the various embodiments of the invention. In addition, both indexing techniques can be used as part of a multi-level build, as per FIG. 63, and both types of indices may also be used as part of the same BVH build. These indexing techniques allow the BVH build to proceed in a similar manner to a conventional BVH builder, but with compressed representations of both the AABB and the corresponding index arrays.

Global Index Compression Constants

Index compression employs a set of Global Index Compression Constants, which apply to all Index Compression Blocks. Both of the index compression schemes described below share the same global constants, which are summarized in Table D below.

TABLE D

| Constant | Description |
| --- | --- |
| IndexCompression-BlockSizeBytes | Size in Bytes of an Index Compression Block. This value will typically be aligned to a certain number of cache lines. |
| maxIndicesPerBlock | The maximum number of indices allowed in an Index Compression Block. This value determines the number of bits needed to store the number of indices represented by a given block. |

Block Offset Indexing

In Block Offset Indexing (BOI), the regular single-integer index is changed to a structure containing two integers, one of which identifies the compression block 6400 and one of which comprises an offset to identify the primitive AABB data within the compression block 6400. One embodiment of the new data structure is generated in accordance with the following code sequence:

```
struct blockOffsetIndex
{
   uint blockIdx;
   uint blockOffset;
}
```

Here, blockIdx stores an index to an AABB Compression Block, and blockOffset references a specific primitive AABB inside the block (i.e., blockIdx in combination with blockOffset provides the address of the primitive AABB). This information is sufficient to fully reference a particular AABB within its compression block during a build.

In one embodiment, one of these structures is generated for each primitive in the BVH build, so the size of the list is predictable. However, given a variable number of AABBs per AABB Compression Block, there will be a variable number of these index structures for each of these compression blocks (e.g., not all possible values of blockOffset will exist for each AABB Compression Block). Therefore, to correctly initialize the array of Block Offset Indices, it is necessary to refer to the blockOffsets array (see, e.g., the code sequence in Table C), from which the number of primitives in each AABB Compression Block can be determined, either concurrently with, or as a post-process to, the AABB compression. Once initialized, the Block Offset Indices can be treated in essentially the same manner as conventional indices found in conventional BVH builders.

Single-integer indices used in conventional BVH builders are typically 4 bytes in size. In one embodiment, 26 bits are used for blockIdx and 6 bits are used for blockOffset. In an alternate embodiment, smaller numbers of bits are used for each variable to reduce the overall memory footprint. In one embodiment, since a fixed size for the blockOffset must be chosen, this places limits on the maximum number of primitives per AABB Compression Block. In the case of 6 bits, a maximum of 64 primitives can be represented per AABB Compression Block.

The remaining item to address for Block Offset Indexing is how compression can be achieved. Block Offset Indices are delta coded and packed in order into Index Compression Blocks. Each block is packed with as many indices as possible, and a new Index Compression Block is started each time the previous one reaches capacity. This is performed in a very similar manner to the AABB Compression Blocks (as shown in Table C), leading to a variable number of indices per Index Compression Block.

FIG. 66 illustrates one example of a block offset index compression block 6610 comprising metadata 6603 identifying the number of indices in addition to a residual size vector and seed vector. In one embodiment, a two-channel encoding is used for the index residuals 6602, where the blockIdx and blockOffset values are separately delta-compressed. Similar to AABB Compression Blocks, the index compression block 6610 stores an indication of the number of indices in the block, the number of bits for the residuals (as the residual size vector), and a seed vector comprising a first seed vector for blockIdx and a second seed vector for blockOffset. The index residual values 6602 comprise a pair of difference values resulting from compression. For example, an index residual value may comprise a first difference value representing a difference between the current input blockIdx value and a prior input blockIdx value and a second difference value representing a difference between the current input blockOffset value and a prior input blockOffset value. The first blockIdx and blockOffset values in the sequence are stored verbatim in the seedVector field, which represents the vector from which the first residual value is computed.

Hierarchical Bit-Vector Indexing

One embodiment of the invention uses another primitive index compression technique referred to as Hierarchical Bit-Vector Indexing (HBI), which may be used alone or in combination with Block Offset Indexing (BOI). HBI is unlike both conventional integer indices and BOI in that a single HBI Index can reference multiple primitives at once. In fact, an HBI Index can reference up to an entire AABB Compression Block.

Figure 67A:
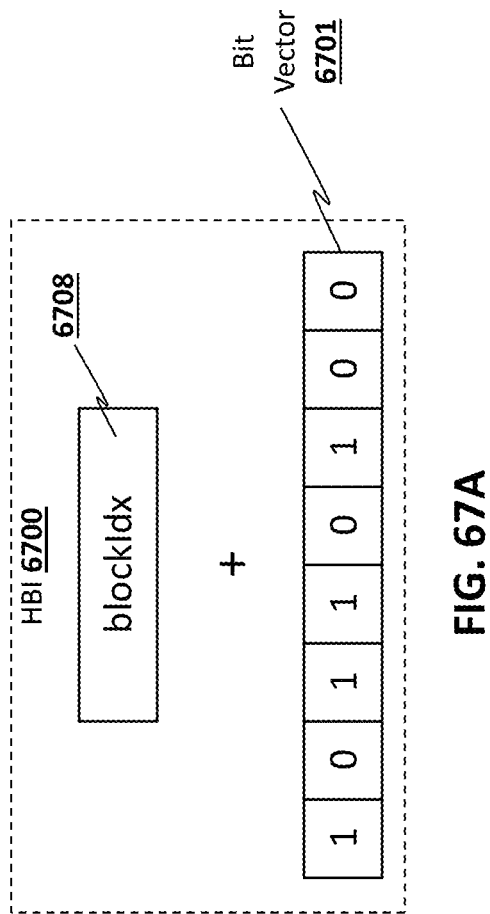
FIG. 67A illustrates a Hierarchical Bit-Vector Indexing (HBI) in accordance with one embodiment of the invention.
Figure 67B:
FIG. 67B illustrates an index compression block in accordance with one embodiment of the invention.

An expanded structure of this type of index is shown in FIGS. 67A-B. Each HBI index 6700 consists of two elements. The blockIdx 6708 points to a given AABB Compression Block, serving the same purpose as the corresponding element in Block Offset Indices. The second component is a bit vector 6701 which has a number of bits equal to the maximum number of AABBs allowed in an AABB Compression Block (i.e., maxAABBsPerBlock). Each bit in the bit vector 6701 signifies if the corresponding element in the AABB Compression Block is referenced by this index. For example, if the third bit in the bit-vector is a '1', this signifies that the third AABB/primitive of the AABB Compression Block is referenced by the HBI index. If the bit is '0', then that AABB/primitive is not referenced.

In contrast to BOI indices, a single HBI index 6700 per AABB Compression Block is created when the array is initialized. The blockIdx values 6708 are set to ascending values starting from 0, and the initial bit vectors 6701 are set to all 1's. As partitioning occurs in the top down builder, if all of the primitives referenced by a given HBI index 6700 all lie on the same side of the splitting plane, the index can simply be partitioned as-is into one side of the list, similar to a conventional integer index. However, if the HBI index 6700 references primitives on both sides of a splitting plane, then the index must be split into two new HBI indices, with one HBI index being placed in each of the two new index sub-lists corresponding to the left and right partitions. To split an HBI index, the index is duplicated and the bit-vectors 6701 are updated in each copy of the index to reflect the primitives referenced by the two new indices. This means that the number of HBI indices in the array can grow, and the duplication of indices is somewhat similar to how spatial splits are handled in some conventional BVH builders. A simple way to handle the potentially growing list is simply to allocate a "worst-case" amount of memory.

HBI indices 6700 can be packed into Index Compression Blocks using delta compression on the blockIdx components 6708. In addition, HBI indices also offer a hierarchical compression opportunity from which they derive their name. Any HBI index which does not straddle a splitting plane will have all elements of its bit-vector equal to '1'. When packing HBI indices into Index Compression Blocks, a single-bit flag may be used (sometimes referred to herein as a bit-vector occupancy flag) to indicate that the entire bit-vector is "all 1s". A value of '0' indicates that the bit-vector is stored verbatim in the block, and a value of '1' indicates that the vector is "all 1s" and thus is not stored at all (except for the flag). Thus, HBI indices derive compression from two techniques: delta coding and hierarchical bit-vectors. Like BOI indices, HBI indices are also packed into compression blocks in a very similar manner to AABB Compression Blocks. To perform this correctly, the compression operation must also monitor the index bit-vectors to decide if any bit-vectors must be stored verbatim, and factor this into the required size for the block.

FIG. 67B shows how a sequence of HBI indices can be coded into an HBI compression block 6710 including residual data 6704 and metadata 6701. In this embodiment, the residual data includes blockIdx residuals 6702 and hierarchical membership bit-vectors 6703. HBI indexing is intended to operate near the top of the hierarchy, or near the tops of subtrees for which the AABB Compression Blocks have recently been recompressed, as per a multi-level build situation of FIG. 63. This is because HBI indices are impacted more directly by changing spatial coherence in the AABB Compression Blocks compared to other indexing methods. In fact, although HBI indices provide compression, the worst-case situation can actually result in an expansion of the index data (up to an upper bound). Transitioning to Block Offset Indexing (BOI) or conventional integer indices mid-build can avoid this situation, and may be more effective if re-compression has not been recently performed.

Index Transitions Between Build Levels

If either BOI or HBI indices are used in a BVH build, and the build transitions to another stage (as per a multi-level build situation of FIG. 63), then it will be necessary to decode the indices to a form that is appropriate for the next build stage. For example, in the simple case of using Block Offset Indexing for the upper levels of the tree, and transitioning from a compressed AABB representation to a conventional AABB representation, then it will be necessary to decode the Block Offset Indices into conventional integer indices. The Block Offset Indices can be discarded after the transition.

A similar transition will need to occur for HBI indexing, and for transitioning between two compressed build levels employing different AABB compression configurations. The transition process is relatively simple, as both Block Offset Indices and Hierarchical Bit-Vector indices represent alternative encodings of the same underlying information, and can also always be decoded to conventional integer indices that reference the original set of primitives.

Partitioning Compressed Index Arrays

In top-down BVH builds, it is necessary to partition/sort the list of integer indices in order to recurse during the build and for the index ordering to reflect the tree structure. In conventional BVH builders, this step is straightforward, as the indices are a regular, uncompressed data structure. However, the embodiments of the invention described herein result in a new challenge in that a list of Index Compression Blocks must be partitioned rather than a list of indices. Moreover, it is not possible to predict the number of blocks until after all of the indices are compressed. As the indices are re-compressed after each partitioning step, this challenge is present throughout the build.

Although it is not possible to predict the size of the compressed index array in advance, we can place an upper bound on the maximum size of the array, if we know the number of indices to be compressed. In a top-down BVH builder, the number of indices in each index sub-array resulting from a node partition is typically known before the partitioning occurs, and so an upper bound can be derived for both sub-arrays at each partitioning step.

In the case of BOI, the maximum size of the array occurs when no compression of the indices is achieved by delta compression. By factoring in the size of the metadata for a block, it is possible to predict the maximum number of blocks, and thus the maximum size in bytes.

In the case of HBI indexing, the maximum size occurs when no delta compression of the blockIdx is achieved, and the HBI indices are split to such an extent that each HBI index represents only a single primitive (only one bit is set in each index bit-vector). By factoring in all of the metadata, include the additional bit used for the first level of the hierarchical bit-vector (the bit-vector occupancy flag), we can compute the maximum number of blocks, and thus the maximum size in bytes for a given number of primitives.

Given that an upper bound can be placed on the size of the array, a simple technique is used to partition the Index Compression Block array using a pair of arrays. Both arrays are sized to the maximum possible size based on the index type, as discussed previously in this section. At the beginning of the build, a set of initial indices is written to one of the arrays in the pair. For each level, blocks from one array are read, interpreted, and newly compressed blocks written out to the second array which reflect the partitioned indices. On recursion, the roles of each of the arrays can be switched, always reading from the array that has just been written. Since the ordering of the indices is changing to reflect the partitioning, the index arrays are continually recompressed.

Since the maximum number of blocks in a partition can be predicted, each sub-array resulting from a partition can be written in a position of the other array such that the maximum size can always be accommodated. This can effectively lead to "gaps" in the arrays, but still achieves bandwidth compression. If partitioning indices in this way, the BVH builder may keep track of the start/end of the current build task in terms of the Index Compression Blocks referencing its primitives, as well as the number of primitives in the build task.

Spatial Splits

A widely used technique to improve BVH traversal efficiency in some cases is the use of spatial splits. As the AABBs are not recompressed at each level of the build, it is difficult to incorporate spatial splits which occur during the build itself (as is seen in some related works) into the compression scheme. However, the compression scheme should be compatible with a pre-splitting approach, as per other previous designs. Such schemes deliver a set of AABBs to the BVH build, and generally require little or no modification to the build itself.

One way to combine these pre-splitting schemes with the embodiments of the invention is to prepare the array of float AABBs in advance, including all split primitives (rather than computing them as per line 23 of Table C), and to keep an array of IDs linking them back to the original primitives. We could then use the BOI or HBI indices, or conventional indices, to reference these AABBs during the build, and link them back to the original primitives when required (such as when writing leaf nodes).

Figure 68:
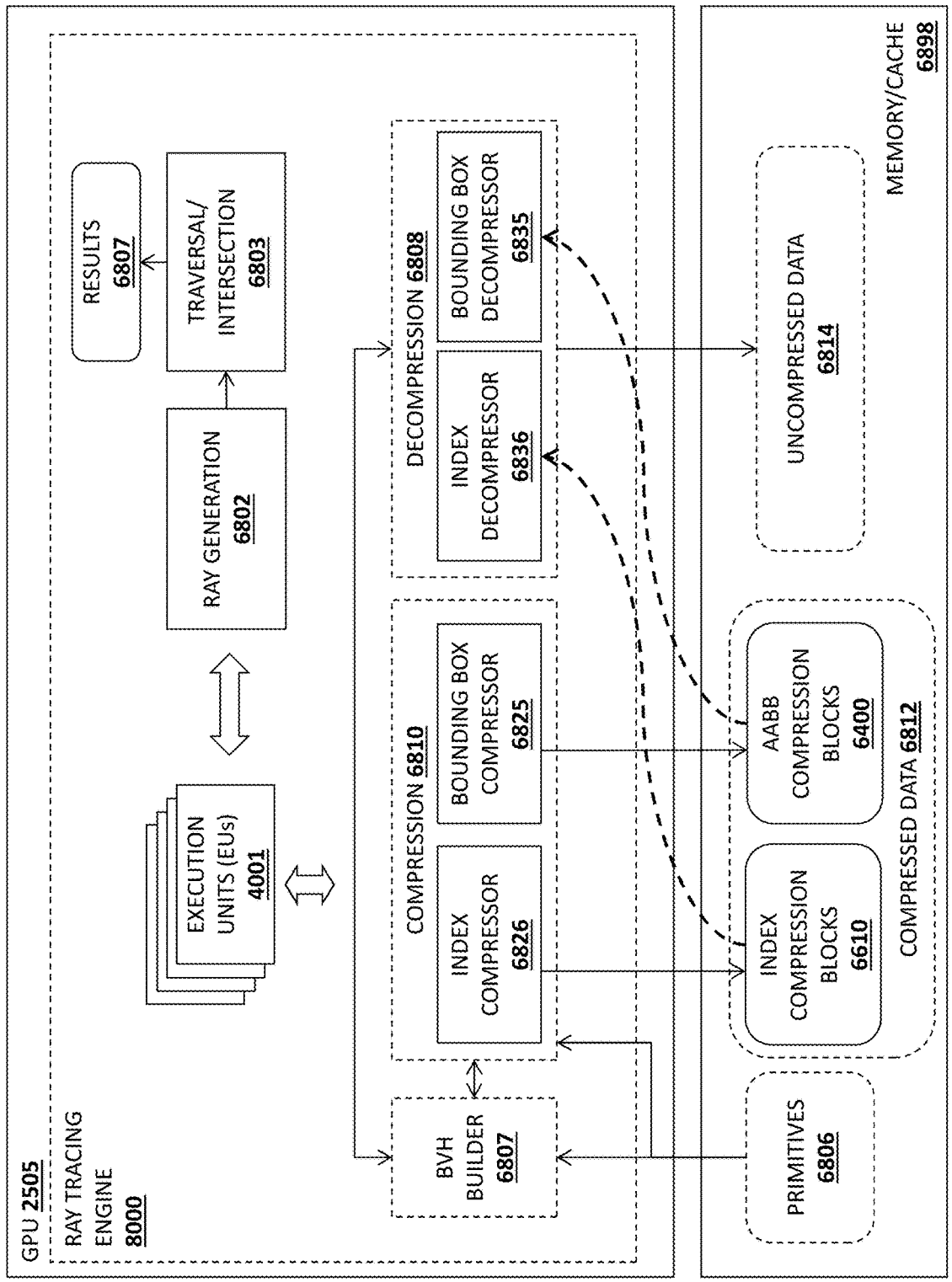
FIG. 68 illustrates an example architecture including BVH compression circuitry/logic and decompression circuitry/logic.

FIG. 68 illustrates one embodiment of a ray tracing engine 8000 of a GPU 2505 with compression hardware logic 6810 and decompression hardware logic 6808 for performing the compression and decompression techniques described herein. Note, however, that FIG. 68 includes many specific details which are not required for complying with the underlying principles of the invention.

A BVH builder 6807 is shown which constructs a BVH based on a current set of primitives 6806 (e.g., associated with a current graphics image). In one embodiment, BVH compression logic 6810 operates in concert with the BVH builder 6807 to concurrently compress the underlying data used by the BVH builder 6807 to generate a compressed version of the data 6812. In particular, the compression logic 6810 includes a bounding box compressor 6825 to generate AABB compression blocks 6400 and index compressor 6826 to generate index compression blocks 6610 as described herein. While illustrated as a separate unit in FIG. 68, the compression logic 6810 may be integrated within the BVH builder 6807. Conversely, a BVH builder is not required for complying with the underlying principles of the invention.

When a system component requires uncompressed data 6814 (e.g., such as the BVH builder 6807), decompression logic 6808 implements the techniques described herein to decompress the compressed data 6812. In particular, an index decompressor 6836 decompresses the index compression blocks 6610 and bounding box decompressor 6835 decompresses the AABB compression blocks 6400 to generate uncompressed AABBs of the uncompressed data 6814. The uncompressed data 6814 may then be accessed by other system components.

The various components illustrated in FIG. 68 may be implemented in hardware, software, or any combination thereof. For example, certain components may be executed on one or more of the execution units 4001 while other components such as the traversal/intersection unit 6803 may be implemented in hardware.

Moreover, the primitives 6806, compressed data 6812, and uncompressed data 6814 may be stored in a local memory/cache 6898 and/or a system memory (not shown). For example, in a system that supports shared virtual memory (SVM), the virtual memory space may be mapped across one or more local memories and the physical system memory. As mentioned above, the BVH compression blocks may be generated based on the size of cache lines in the cache hierarchy (e.g., to fit one or more compression blocks per cache line).

EXAMPLES

The following are example implementations of different embodiments of the invention.

Example 1. An apparatus comprising: traversal hardware logic to traverse rays through a graphics scene comprising a plurality of primitives; and an acceleration data structure processing unit comprising: a bounding box compressor to compress a set of bounding boxes to generate a plurality of bounding box compression blocks, an index compressor to compress a set of indices to generate a plurality of index compression blocks, and an acceleration data structure builder to process the bounding box compression blocks and index compression blocks to generate acceleration data structures Example 2. The apparatus of example 1 wherein the acceleration data structure comprises a bounding volume hierarchy (BVH) to be used by the traversal hardware logic to traverse the rays through the graphics scene, the bounding boxes of the BVH stored as a number of axis-aligned bounding boxes (AABBs) comprising a hierarchical representation of the plurality of primitives.

Example 3. The apparatus of example 2 wherein the bounding box compressor is to use delta compression to compress a first plurality of the bounding boxes in a first bounding box compression block and the index compressor is to use delta compression to compress a first plurality of the indices in a first index compression block.

Example 4. The apparatus of example 3 wherein the first plurality of bounding boxes are compressed to the first bounding box compression block in a sequence, and wherein delta compression comprises determining one or more differences between values of a current bounding box and a prior bounding box compressed to the first bounding box compression block, and storing the one or more differences as a first residual value in the bounding box compression block.

Example 5. The apparatus of example 4 wherein the first plurality of indices are compressed to the first index compression block in a sequence, and wherein delta compression comprises determining one or more differences between a current index value and a prior index value compressed to the first index compression block, and storing the one or more differences as a second residual value in the index compression block.

Example 6. The apparatus of example 5 wherein the first bounding box compression block further comprises first metadata to indicate a number of bounding boxes compressed in the first bounding box compression block and a first residual size vector to indicate a bit length of each residual value in the first bounding box compression block, and wherein the first index compression block further comprises second metadata to indicate a number of indices compressed in the first index compression block and a second residual size vector to indicate a bit length of each residual value in the first index compression block including the second residual value.

Example 7. The apparatus of example 6 wherein the bounding box values compressed to the bounding box compression block comprise integer bounding box values, the apparatus further comprising: quantization hardware logic to quantize original single-precision floating-point bounding box values to integer bounding box values.

Example 8. The apparatus of example 7 further comprising: transform hardware logic to rearrange the integer bounding box values to a data format to improve delta compression.

Example 9. The apparatus of example 6 wherein the index compressor further comprises: an index converter to convert each index value to a first value identifying a bounding box compression block and a second value indicating a location in the bounding box compression block of a residual value or set of residual values for a bounding box associated with the index value.

Example 10. The apparatus of example 9 wherein the second value comprises an offset into the bounding box compression block or a bit value in a bitfield.

Example 11. The apparatus of example 10 wherein if the second value comprises an offset into the bounding box compression block, then the index converter implements block offset indexing (BOI) to generate the offset and if the second value comprises a bit value in a bitfield, then the index converter implements hierarchical bit-vector indexing (HBI).

Example 12. The apparatus of example 1 wherein the acceleration data structure processing unit further comprises: an index decompressor to decompress the index compression blocks and a bounding box decompressor to decompress the bounding box compression blocks to generate the corresponding bounding boxes.

Example 13. A method comprising: compressing build data for building an acceleration data structure, the build data comprising bounding boxes and indices associated with the bounding boxes, wherein compressing comprises: compressing the bounding boxes to generate a plurality of bounding box compression blocks, and compressing the indices to generate a plurality of index compression blocks; building the acceleration data structure by processing the bounding box compression blocks and index compression blocks; and traversing rays through the acceleration data structure.

Example 14. The method of example 13 wherein the acceleration data structure comprises a bounding volume hierarchy (BVH) to be used to traverse the rays through the graphics scene, the bounding boxes of the BVH stored as a number of axis-aligned bounding boxes (AABBs) comprising a hierarchical representation of the plurality of primitives.

Example 15. The method of example 14 wherein delta compression is used to compress a first plurality of the bounding boxes in a first bounding box compression block and to compress a first plurality of the indices in a first index compression block.

Example 16. The method of example 15 wherein the first plurality of bounding boxes are compressed to the first bounding box compression block in a sequence, and wherein delta compression comprises determining one or more differences between values of a current bounding box and a prior bounding box compressed to the first bounding box compression block, and storing the one or more differences as a first residual value in the bounding box compression block.

Example 17. The method of example 16 wherein the first plurality of indices are compressed to the first index compression block in a sequence, and wherein delta compression comprises determining one or more differences between a current index value and a prior index value compressed to the first index compression block, and storing the one or more differences as a second residual value in the index compression block.

Example 18. The method of example 17 wherein the first bounding box compression block further comprises first metadata to indicate a number of bounding boxes compressed in the first bounding box compression block and a first residual size vector to indicate a bit length of each residual value in the first bounding box compression block, and wherein the first index compression block further comprises second metadata to indicate a number of indices compressed in the first index compression block and a second residual size vector to indicate a bit length of each residual value in the first index compression block including the second residual value.

Example 19. The method of example 18 wherein the bounding box values compressed to the bounding box compression block comprise integer bounding box values, the method further comprising: quantizing original single-precision floating-point bounding box values to integer bounding box values.

Example 20. The method of example 19 further comprising: rearranging the integer bounding box values to a data format to improve delta compression.

Example 21. The method of example 18 further comprising: converting each index value to a first value identifying a bounding box compression block and a second value indicating a location in the bounding box compression block of a residual value or set of residual values for a bounding box associated with the index value.

Example 22. The method of example 21 wherein the second value comprises an offset into the bounding box compression block or a bit value in a bitfield.

Example 23. The method of example 22 wherein block offset indexing (BOI) is used to generate the offset into the bounding box compression block or hierarchical bit-vector (HBI) indexing is used to generate the bit value in the bitfield.

Example 24. The method of example 13 further comprising: decompressing the index compression blocks and bounding box compression blocks to generate the corresponding uncompressed bounding boxes.

Example 25. A machine-readable medium having program code stored thereon which, when executed by a machine, causes the machine to perform the operations of: compressing build data for building an acceleration data structure, the build data comprising bounding boxes and indices associated with the bounding boxes, wherein compressing comprises: compressing the bounding boxes to generate a plurality of bounding box compression blocks, and compressing the indices to generate a plurality of index compression blocks; building the acceleration data structure by processing the bounding box compression blocks and index compression blocks; and traversing rays through the acceleration data structure.

Example 26. The machine-readable medium of example 25 wherein the acceleration data structure comprises a bounding volume hierarchy (BVH) to be used to traverse the rays through the graphics scene stored as a number of axis-aligned bounding boxes (AABBs) comprising a hierarchical representation of the plurality of primitives.

Example 27. The machine-readable medium of example 26 wherein delta compression is used to compress a first plurality of the bounding boxes in a first bounding box compression block and to compress a first plurality of the indices in a first index compression block.

Example 28. The machine-readable medium of example 27 wherein the first plurality of bounding boxes are compressed to the first bounding box compression block in a sequence, and wherein delta compression comprises determining one or more differences between values of a current bounding box and a prior bounding box compressed to the first bounding box compression block, and storing the one or more differences as a first residual value in the bounding box compression block.

Example 29. The machine-readable medium of example 28 wherein the first plurality of indices are compressed to the first index compression block in a sequence, and wherein delta compression comprises determining one or more differences between a current index value and a prior index value compressed to the first index compression block, and storing the one or more differences as a second residual value in the index compression block.

Example 30. The machine-readable medium of example 29 wherein the first bounding box compression block further comprises first metadata to indicate a number of bounding boxes compressed in the first bounding box compression block and a first residual size vector to indicate a bit length of each residual value in the first bounding box compression block, and wherein the first index compression block further comprises second metadata to indicate a number of indices compressed in the first index compression block and a second residual size vector to indicate a bit length of each residual value in the first index compression block including the second residual value.

Example 31. The machine-readable medium of example 30 wherein the bounding box values compressed to the bounding box compression block comprise integer bounding box values, the machine-readable medium further comprising: quantizing original single-precision floating-point bounding box values to integer bounding box values.

Example 32. The machine-readable medium of example 31 further comprising program code to cause the machine to perform the operations of: rearranging the integer bounding box values to a data format to improve delta compression.

Example 33. The machine-readable medium of example 30 further comprising program code to cause the machine to perform the operations of: converting each index value to a first value identifying a bounding box compression block and a second value indicating a location in the bounding box compression block of a residual value for a bounding box associated with the index value.

Example 34. The machine-readable medium of example 33 wherein the second value comprises an offset into the bounding box compression block or a bit value in a bitfield.

Example 35. The machine-readable medium of example 34 wherein block offset indexing (BOI) is used to generate the offset into the bounding box compression block or hierarchical bit-vector (HBI) indexing is used to generate the bit value in the bitfield.

Example 36. The machine-readable medium of example 25 further comprising program code to cause the machine to perform the operations of: decompressing the index compression blocks and bounding box compression blocks to generate the corresponding uncompressed bounding boxes.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a first circuit to traverse rays through a graphics scene comprising a plurality of primitives; and
a second circuit coupled to the first circuit, the second circuit to:
compress a set of bounding boxes to generate a plurality of bounding box compression blocks, wherein delta compression is used to compress a first plurality of the bounding boxes in a first bounding box compression block, wherein the first plurality of bounding boxes are compressed to the first bounding box compression block in a sequence, and wherein the delta compression comprises determining one or more differences between values of a current bounding box and a prior bounding box compressed to the first bounding box compression block, and storing the one or more differences as a first residual value in the first bounding box compression block,
compress a set of indices to generate a plurality of index compression blocks, and
process the bounding box compression blocks and index compression blocks to generate acceleration data structures.

2. The apparatus of claim 1 wherein the acceleration data structure comprises a bounding volume hierarchy (BVH) to be used to traverse the rays through the graphics scene, the bounding boxes of the BVH stored as a number of axis-aligned bounding boxes (AABBs) comprising a hierarchical representation of the plurality of primitives.

3. The apparatus of claim 2 wherein delta compression is used to compress a first plurality of indices in a first index compression block.

4. The apparatus of claim 3 wherein the first plurality of indices are compressed to the first index compression block in a sequence, and wherein delta compression comprises determining one or more differences between a current index value and a prior index value compressed to the first index compression block, and storing the one or more differences as a second residual value in the index compression block.

5. The apparatus of claim 4 wherein the first bounding box compression block further comprises first metadata to indicate a number of bounding boxes compressed in the first bounding box compression block and a first residual size vector to indicate a bit length of each residual value in the first bounding box compression block, and wherein the first index compression block further comprises second metadata to indicate a number of indices compressed in the first index compression block and a second residual size vector to indicate a bit length of each residual value in the first index compression block including the second residual value.

6. The apparatus of claim 5 wherein the bounding box values compressed to the first bounding box compression block comprise integer bounding box values, wherein original single-precision floating-point bounding box values are quantized to integer bounding box values.

7. The apparatus of claim 6, wherein the integer bounding box values are to be rearranged to a data format to improve the delta compression.

8. The apparatus of claim 5, wherein each index value is to be converted to a first value identifying a bounding box compression block and a second value indicating a location in the bounding box compression block of a residual value or set of residual values for a bounding box associated with the index value.

9. The apparatus of claim 8 wherein the second value comprises an offset into the bounding box compression block or a bit value in a bitfield.

10. The apparatus of claim 9 wherein if the second value comprises an offset into the bounding box compression block, then block offset indexing (BOI) is implemented to generate the offset and if the second value comprises a bit value in a bitfield, then hierarchical bit-vector indexing (HBI) is implemented.

11. The apparatus of claim 1 wherein the index compression blocks are to be decompressed and the bounding box compression blocks are to be decompressed to generate corresponding bounding boxes.

12. A method comprising:
compressing build data for building an acceleration data structure, the build data comprising bounding boxes and indices associated with the bounding boxes, wherein compressing comprises:
  compressing the bounding boxes to generate a plurality of bounding box compression blocks, wherein delta compression is used to compress a first plurality of the bounding boxes in a first bounding box compression block, wherein the first plurality of bounding boxes are compressed to the first bounding box compression block in a sequence, and wherein the delta compression comprises determining one or more differences between values of a current bounding box and a prior bounding box compressed to the first bounding box compression block, and storing the one or more differences as a first residual value in the first bounding box compression block, and
  compressing the indices to generate a plurality of index compression blocks;
building the acceleration data structure by processing the bounding box compression blocks and index compression blocks; and
traversing rays through the acceleration data structure.

13. The method of claim 12 wherein the acceleration data structure comprises a bounding volume hierarchy (BVH) to be used to traverse the rays through a graphics scene, the bounding boxes of the BVH stored as a number of axis-aligned bounding boxes (AABBs) comprising a hierarchical representation of a plurality of primitives.

14. The method of claim 13 wherein delta compression is used to compress a first plurality of indices in a first index compression block.

15. The method of claim 14 wherein the first plurality of indices are compressed to the first index compression block in a sequence, and wherein delta compression comprises determining one or more differences between a current index value and a prior index value compressed to the first index compression block, and storing the one or more differences as a second residual value in the index compression block.

16. The method of claim 15 wherein the first bounding box compression block further comprises first metadata to indicate a number of bounding boxes compressed in the first bounding box compression block and a first residual size vector to indicate a bit length of each residual value in the first bounding box compression block, and wherein the first index compression block further comprises second metadata to indicate a number of indices compressed in the first index compression block and a second residual size vector to indicate a bit length of each residual value in the first index compression block including the second residual value.

17. The method of claim 16 wherein the bounding box values compressed to the first bounding box compression block comprise integer bounding box values, the method further comprising:
  quantizing original single-precision floating-point bounding box values to integer bounding box values.

18. The method of claim 17 further comprising:
  rearranging the integer bounding box values to a data format to improve delta compression.

19. The method of claim 16 further comprising:
  converting each index value to a first value identifying a bounding box compression block and a second value indicating a location in the bounding box compression block of a residual value or set of residual values for a bounding box associated with the index value.

20. The method of claim 19 wherein the second value comprises an offset into the bounding box compression block or a bit value in a bitfield.

21. The method of claim 20 wherein block offset indexing (BOI) is used to generate the offset into the bounding box compression block or hierarchical bit-vector (HBI) indexing is used to generate the bit value in the bitfield.

22. The method of claim 12 further comprising:
  decompressing the index compression blocks and bounding box compression blocks to generate corresponding uncompressed bounding boxes.

23. A non-transitory machine-readable medium having program code stored thereon which, when executed by a machine, causes the machine to perform:
compressing build data for building an acceleration data structure, the build data comprising bounding boxes and indices associated with the bounding boxes, wherein compressing comprises:
  compressing the bounding boxes to generate a plurality of bounding box compression blocks, wherein delta compression is used to compress a first plurality of the bounding boxes in a first bounding box compression block, wherein the first plurality of bounding boxes are compressed to the first bounding box compression block in a sequence, and wherein the delta compression comprises determining one or more differences between values of a current bounding box and a prior bounding box compressed to the first bounding box compression block, and storing the one or more differences as a first residual value in the first bounding box compression block, and
  compressing the indices to generate a plurality of index compression blocks;
building the acceleration data structure by processing the bounding box compression blocks and index compression blocks; and
traversing rays through the acceleration data structure.

24. The non-transitory machine-readable medium of claim 23 wherein the acceleration data structure comprises a bounding volume hierarchy (BVH) to be used to traverse the rays through a graphics scene stored as a number of axis-aligned bounding boxes (AABBs) comprising a hierarchical representation of a plurality of primitives.

25. The non-transitory machine-readable medium of claim 24 wherein delta compression is used to compress a first plurality of indices in a first index compression block.

26. The non-transitory machine-readable medium of claim 25 wherein the first plurality of indices are compressed to the first index compression block in a sequence, and wherein delta compression comprises determining one or more differences between a current index value and a prior index value compressed to the first index compression block, and storing the one or more differences as a second residual value in the index compression block.

27. The non-transitory machine-readable medium of claim 26 wherein the first bounding box compression block further comprises first metadata to indicate a number of bounding boxes compressed in the first bounding box compression block and a first residual size vector to indicate a bit length of each residual value in the first bounding box compression block, and wherein the first index compression block further comprises second metadata to indicate a number of indices compressed in the first index compression block and a second residual size vector to indicate a bit length of each residual value in the first index compression block including the second residual value.

28. The non-transitory machine-readable medium of claim 27 wherein the bounding box values compressed to the first bounding box compression block comprise integer bounding box values, the machine-readable medium further comprising program code to cause the machine to perform:

quantizing original single-precision floating-point bounding box values to integer bounding box values.

29. The non-transitory machine-readable medium of claim 28 further comprising program code to cause the machine to perform:

rearranging the integer bounding box values to a data format to improve delta compression.

30. The non-transitory machine-readable medium of claim 27 program code to cause the machine to perform:

converting each index value to a first value identifying a bounding box compression block and a second value indicating a location in the bounding box compression block of a residual value for a bounding box associated with the index value.

31. The non-transitory machine-readable medium of claim 30 wherein the second value comprises an offset into the bounding box compression block or a bit value in a bitfield.

32. The non-transitory machine-readable medium of claim 31 wherein block offset indexing (BOI) is used to generate the offset into the bounding box compression block or hierarchical bit-vector (HBI) indexing is used to generate the bit value in the bitfield.

33. The non-transitory machine-readable medium of claim 23 program code to cause the machine to perform:

decompressing the index compression blocks and bounding box compression blocks to generate corresponding uncompressed bounding boxes.

* * * * *